US006980684B1

(12) United States Patent
Munro et al.

(10) Patent No.: US 6,980,684 B1
(45) **Date of Patent: *Dec. 27, 2005**

(54) METHOD AND APPARATUS FOR DISCRIMINATING AND COUNTING DOCUMENTS

(75) Inventors: Mark C. Munro, Park Ridge, IL (US); John E. Jones, Winnetka, IL (US); Bradford T. Graves, Arlington Heights, IL (US); William J. Jones, Kenilworth, IL (US); Douglas U. Mennie, Barrington, IL (US)

(73) Assignee: Cummins-Allison Corp., Mt. Prospect, IL (US)

(*) Notice: Subject to any disclaimer, the term of this patent is extended or adjusted under 35 U.S.C. 154(b) by 881 days.

This patent is subject to a terminal disclaimer.

(21) Appl. No.: 09/655,481

(22) Filed: Sep. 5, 2000

Related U.S. Application Data

(63) Continuation of application No. 09/126,580, filed on Jul. 30, 1998, now Pat. No. 6,351,551, which is a (Continued)

(30) Foreign Application Priority Data

Mar. 8, 1995 (WO) ..................... PCT/US95/02992
Sep. 7, 1995 (WO) ..................... PCT/US95/11393

(51) Int. Cl.$^{7}$ ............................ G06K 9/00; B07C 5/00
(52) U.S. Cl. ....................................... 382/135; 194/206
(58) Field of Search ........................ 382/135, 137–140; 209/534, 546, 548, 551; 194/206, 207

(56) References Cited

U.S. PATENT DOCUMENTS 3,246,295 A 4/1966 De Claris et al. ............. 382/56

(Continued)

FOREIGN PATENT DOCUMENTS

DE 2659929 C3 11/1977

(Continued)

OTHER PUBLICATIONS

JP-A Banking Machine Digest, No. 31, 1989—Original and Translation.

(Continued)

*Primary Examiner*—Bhavesh M. Mehta
*Assistant Examiner*—Duy M. Dang
(74) *Attorney, Agent, or Firm*—Jenkens & Gilchrist

(57) ABSTRACT

A currency counting and discrimination device for receiving a stack of currency bills, rapidly counting and discriminating the bills in the stack, and then re-stacking the bills. The device comprises an input receptacle for receiving a stack of currency bills to be discriminated, a discriminating unit for discriminating the denomination of the currency bills, and one or more output receptacles for receiving the currency bills after being discriminated by the discriminating unit. The device further comprises a transport mechanism for transporting the currency bills, one at a time, from the input receptacle past a sensor of the discriminating unit and to the one or more output receptacles. One or more counters keep track of the value of bills that are discriminated. Furthermore, means are provided for an operator of the device to indicate the value of any bills whose denomination are not determined by the discriminating unit; the bills whose denomination are not determined by the discriminating unit being termed no call bills. The value indicating means appropriately effects the one or more counters.

29 Claims, 81 Drawing Sheets

Related U.S. Application Data continuation of application No. 08/573,392, filed on Dec. 15, 1995, now Pat. No. 5,790,697, which is a continuation-in-part of application No. 08/399,854, filed on Mar. 7, 1995, now Pat. No. 5,875,259, and a continuation-in-part of application No. 08/394,752, filed on Feb. 27, 1995, now Pat. No. 5,724,438, and a continuation-in-part of application No. 08/362,848, filed on Dec. 22, 1994, now Pat. No. 5,870,487, and a continuation-in-part of application No. 08/340,031, filed on Nov. 14, 1994, now Pat. No. 5,815,592, and a continuation-in-part of application No. 08/317,349, filed on Oct. 4, 1994, now Pat. No. 5,640,463, and a continuation-in-part of application No. 08/287,882, filed on Aug. 9, 1994, now Pat. No. 5,652,802, and a continuation-in-part of application No. 08/243,807, filed on May 16, 1994, now Pat. No. 5,633,949, and a continuation-in-part of application No. 08/226,660, filed on Apr. 12, 1994, now Pat. No. 6,539,104.

U.S. PATENT DOCUMENTS 3,280,974 A 10/1966 Riddle et al. ............ 209/111.8
3,480,785 A 11/1969 Aufderheide ............... 250/219
3,496,370 A 2/1970 Haville et al. .............. 250/219
3,509,535 A 4/1970 Berube ....................... 340/149
3,612,835 A 10/1971 Andrews et al. ...... 235/61.11 D
3,618,765 A 11/1971 Cooper et al. .............. 209/534
3,679,314 A 7/1972 Mustert ....................... 356/71
3,778,628 A 12/1973 Novak et al. ............... 250/556
3,842,281 A 10/1974 Goodrich .................... 250/461
3,870,629 A 3/1975 Carter et al. ............. 209/111.8
3,906,449 A 9/1975 Marchak ................. 340/149 R
3,976,198 A 8/1976 Carnes et al. ......... 209/111.7 T
4,041,456 A 8/1977 Ott et al. ................. 346/146.3
4,096,991 A 6/1978 Iquchi ........................ 235/419
4,114,804 A 9/1978 Jones et al. ................. 235/476
4,147,430 A 4/1979 Gorgone et al. .............. 356/51
4,179,685 A 12/1979 O'Maley .................... 382/135
4,249,552 A 2/1981 Margolin et al. ........... 133/1 R
4,250,806 A 2/1981 Boyson et al. ................. 101/2
4,255,651 A 3/1981 Phillips ....................... 235/92
4,275,874 A 6/1981 DiBlasio ..................... 271/187
4,277,774 A 7/1981 Fujii et al. ............... 340/146.3
4,283,708 A 8/1981 Lee ..................... 340/146.3 Z
4,288,781 A 9/1981 Sellner et al. ....... 340/146.3 Q
4,302,781 A 11/1981 Ikeda et al. ................. 358/486
4,311,914 A 1/1982 Huber ........................ 250/556
4,313,598 A 2/1982 DiBlasio ..................... 271/124
4,334,619 A 6/1982 Horino et al. .............. 209/551
4,348,656 A 9/1982 Gorgone et al. ...... 340/146.3 R
4,349,111 A 9/1982 Shah et al. ................. 209/534
4,352,988 A 10/1982 Ishida ........................ 250/559
4,355,300 A 10/1982 Weber ................ 340/146.3 C
4,356,473 A 10/1982 Freudenthal ......... 340/146.3 H
4,365,700 A 12/1982 Arimato et al. ................ 194/2
4,381,447 A 4/1983 Horvath et al. ............. 250/223
4,386,432 A 5/1983 Nakamura et al. ............. 382/7
4,442,541 A 4/1984 Finkel et al. .................. 382/7
4,461,028 A 7/1984 Okubo ........................ 382/15
4,464,786 A 8/1984 Nishito et al. ................. 382/7
4,464,787 A 8/1984 Fish et al. ..................... 382/7
4,480,177 A 10/1984 Allen ......................... 235/379
4,487,306 A 12/1984 Nao et al. ................... 382/135
4,490,846 A 12/1984 Ishida et al. ................... 382/7
4,513,439 A 4/1985 Gorgone et al. ............... 382/7
4,532,641 A 7/1985 Nishimura ................... 377/14
4,539,702 A 9/1985 Oka .............................. 382/7
4,542,829 A 9/1985 Emery et al. ............... 209/534
4,547,896 A 10/1985 Ohtombe et al. ........... 382/318
4,553,846 A 11/1985 Hilton et al. ............... 356/429
4,556,140 A 12/1985 Okada ........................... 194/4
4,557,597 A 12/1985 Iwama ........................ 356/71
4,558,224 A 12/1985 Gober ..................... 250/460.1
4,559,451 A 12/1985 Curl ........................... 250/560
4,559,452 A 12/1985 Igaki et al. ................. 250/560
4,563,771 A 1/1986 Gorgone et al. ............... 382/7
4,567,370 A 1/1986 Falls ....................... 250/461.1
4,587,412 A 5/1986 Apisdorf ..................... 235/449
4,587,434 A 5/1986 Roes et al. ................. 250/556
4,592,090 A 5/1986 Curl et al. ...................... 382/7
4,611,345 A 9/1986 Ohniski et al. ................ 382/7
4,625,870 A 12/1986 Nao et al. ................... 209/534
4,628,194 A 12/1986 Dobbins et al. ............ 235/379
4,645,936 A 2/1987 Gorgone ..................... 250/556
4,653,647 A 3/1987 Hashimoto .................. 209/534
4,677,682 A 6/1987 Miyagawa et al. ............ 382/7
4,681,229 A 7/1987 Uesaka et al. .............. 209/534
4,690,268 A 9/1987 Ueshin ....................... 198/399
4,694,963 A 9/1987 Takesako .................... 209/534
4,697,071 A 9/1987 Hiraoka et al. ............. 235/379
4,700,368 A 10/1987 Munn et al. ................... 377/8
4,722,444 A 2/1988 Murphy et al. ............. 209/583
4,733,308 A 3/1988 Nakamura et al. .......... 358/496
4,747,492 A 5/1988 Saito et al. ................. 209/534
4,764,976 A 8/1988 Kallin et al. .................. 382/65
4,820,909 A 4/1989 Kawauchi et al. .......... 235/379
4,823,393 A 4/1989 Kawakami ..................... 382/7
4,827,531 A 5/1989 Milford .......................... 382/7
4,881,268 A 11/1989 Uchida et al. ................. 382/7
4,905,840 A 3/1990 Yuge et al. ................. 209/534
4,908,516 A 3/1990 West .......................... 250/556
4,913,295 A 4/1990 Muphy et al. .............. 209/583
4,973,851 A 11/1990 Lee ............................ 250/556
4,984,280 A 1/1991 Abe .............................. 382/7
4,992,860 A 2/1991 Hamaquchi et al. .......... 358/75
4,996,604 A 2/1991 Oqawa et al. .............. 358/486
5,020,787 A 6/1991 Arikawa ........................ 271/3
5,027,415 A 6/1991 Hara et al. .................. 382/135
5,047,871 A 9/1991 Meyer et al. ............... 358/486
5,054,621 A 10/1991 Murphy et al. ............. 209/534
5,055,834 A 10/1991 Chiba ......................... 382/135
5,068,519 A 11/1991 Bryce ......................... 235/449
5,122,754 A 6/1992 Gotaas ....................... 324/676
5,163,672 A 11/1992 Mennie ...................... 271/187
5,167,313 A 12/1992 Dobbins et al. ............ 194/317
5,172,907 A 12/1992 Kalisiak ..................... 271/187
5,199,543 A 4/1993 Kamagami et al. ......... 194/207
5,201,395 A 4/1993 Takezawa et al. .......... 194/206
5,207,788 A 5/1993 Geib et al. .................. 271/122
5,220,395 A 6/1993 Yamashita et al. .......... 355/313
5,236,072 A 8/1993 Cargill ....................... 194/207
5,240,116 A 8/1993 Stevens et al. ............. 209/534
5,261,518 A 11/1993 Bryce ......................... 194/206
5,295,196 A 3/1994 Raterman et al. ........... 382/135
5,304,813 A 4/1994 De Man ...................... 250/556
5,308,992 A 5/1994 Crane et al. ................ 250/556
5,309,515 A 5/1994 Troung et al. .................. 382/7
5,341,408 A 8/1994 Melcher et al. ................ 377/8
5,363,949 A 11/1994 Matsubayashi ............. 194/206
5,367,577 A 11/1994 Gotaas ....................... 382/135
5,397,003 A 3/1995 Stevens et al. ............. 209/534
5,430,664 A 7/1995 Cargill et al. .............. 364/550
5,437,357 A 8/1995 Ota et al. .................. 382/135
5,465,821 A 11/1995 Akioka ....................... 194/207
5,467,405 A 11/1995 Raterman et al. ........... 382/135
5,467,406 A 11/1995 Graves et al. .............. 382/135
5,478,992 A 12/1995 Hamada et al. ............. 235/379
D369,984 S 5/1996 Larsen ........................ D10/97
5,633,949 A 5/1997 Graves et al. .............. 382/135
5,640,463 A 6/1997 Csulits ....................... 382/135
5,652,802 A 7/1997 Graves et al. .............. 382/135
5,687,963 A 11/1997 Mennie ...................... 271/119
5,692,067 A 11/1997 Raterman et al. ........... 382/135
5,704,491 A 1/1998 Graves ....................... 209/534
5,724,438 A 3/1998 Graves ....................... 382/135

| | | | | |
|---|---|---|---|---|
| 5,751,840 | A | 5/1998 | Raterman et al. | 382/135 |
| 5,790,693 | A | 8/1998 | Graves et al. | 382/135 |
| 5,790,697 | A * | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,938,044 | A | 8/1999 | Weggesser | 209/534 |
| 5,940,623 | A | 8/1999 | Watts et al. | 395/712 |
| 5,943,655 | A | 8/1999 | Jacobsen | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,026,175 | A | 2/2000 | Munro et al. | 382/135 |
| 6,028,951 | A | 2/2000 | Raterman et al. | 382/135 |
| 6,039,645 | A | 3/2000 | Mazur | 453/10 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,128,402 | A | 10/2000 | Jones et al. | 382/135 |
| 6,220,419 | B1 | 4/2001 | Mennie | 194/207 |
| 6,237,739 | B1 | 5/2001 | Mazur et al. | 194/207 |
| 6,241,069 | B1 | 6/2001 | Mazur et al. | 194/207 |
| 6,256,407 | B1 | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 914/346 |
| 6,351,551 | B1 * | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 2001/0019624 | A1 | 9/2001 | Raterman et al. | 382/135 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |

FOREIGN PATENT DOCUMENTS

| | | | | |
|---|---|---|---|---|
| DE | 2935668 | C2 | 9/1979 | |
| EP | 0077464 | A2 | 4/1983 | |
| EP | 0101115 | | 2/1984 | |
| EP | 0130825 | A2 | 6/1984 | |
| EP | 0132329 | A2 | 6/1984 | |
| EP | 0168202 | A1 | 1/1986 | |
| EP | 0168202 | A1 | 1/1986 | |
| EP | 0206675 | B1 | 6/1986 | |
| EP | 0253935 | A2 | 10/1986 | |
| EP | 0264125 | A1 | 10/1987 | |
| EP | 0338123 | A2 | 11/1988 | |
| EP | 0342647 | A2 | 5/1989 | |
| EP | 0338123 | | 10/1989 | |
| EP | 0342647 | | 11/1989 | |
| EP | 0487 316 | A2 | 5/1992 | G07D 7/00 |
| EP | 0613107 | A1 | 8/1994 | |
| EP | 0613107 | A1 | 8/1994 | |
| EP | 0718 809 | A2 | 6/1997 | G07D 7/00 |
| GB | 2061232 | A | 5/1981 | |
| GB | 2061232 | A | 5/1981 | |
| GB | 2119138 | A | 11/1983 | |
| GB | 2190996 | | 12/1987 | |
| GB | 2204166 | | 11/1988 | |
| GB | 2217086 | | 10/1989 | |
| GB | 2272762 | | 11/1993 | |
| GB | 2270904 | | 3/1994 | |
| JP | 54-71673 | | 6/1979 | |
| JP | 54-71674 | | 6/1979 | |
| JP | 56-16287 | | 2/1981 | |
| JP | 56-136689 | | 10/1981 | |
| JP | S60-215293 | | 11/1985 | |
| JP | 61-14557 | | 4/1986 | |
| JP | 61-82290 | | 4/1986 | |
| JP | 61-41439 | | 9/1986 | |
| JP | 63-271687 | | 11/1988 | |
| WO | WO81/02111 | | 4/1981 | |
| WO | WO 90/07165 | | 6/1990 | |
| WO | WO 91/11778 | | 8/1991 | |
| WO | WO 92/17394 | | 10/1992 | |
| WO | WO 93/23824 | | 11/1993 | |
| WO | WO 94/19773 | | 9/1994 | |
| WO | WO 95/24691 | | 9/1995 | |
| WO | WO 96/10800 | | 4/1996 | |

OTHER PUBLICATIONS

Operation Manual of the D-202, D-204 Mixed Paper Currency Counter of Billcon, Co., Ltd.—Translation.

Service Manual of the D-202, D-204 Mixed Paper Currency Counter of Billcon Co., Ltd.—Translation.

Mosler Inc. brochure "The Mosler/Toshiba CF-420", 1989.

AFB Currency Recognition System (1982).

Description of Toshiba-Mosler CF-420 Device; estimated 1989.

Currency Systems International, Medium Speed Currency Sorting Family, CPS 600 and CPS 900; 4 pages; date: copyr. 1994.

Currency System Intl'l, Mr. W. Kranister in Conversation With Richard Haycock; pp. 1-5; dated: estimated 1994.

Description of Currency Systems International's CPS 600 and CPS 900 devices; date: estimated 1994.

Glory GSA-500 Sortmaster brochure; 2 pages; date: Jan. 14, 1994.

Glory UF-1 D brochure; 2 pages; date:estimated before Aug. 9, 1994.

Currency Systems International/Currency Processing Systems, CPS 300; 4 pages; date: copyr. 1992.

Glory GFB-200/210/220/230, Desk-Top Bank Note Counter; 2 pages; date: estimated before Aug. 9, 1994.

JetScan Currency Scanner/Counter, Model 4060, Operator's Manual by Cummins-Allison (Aug. 1991).

Sale of JetScan Currency Scanner/Counter, Model 4060 (Aug. 1991).

JetScan Currency Scanner/Counter, Model 4061, Operating Instructions by Cummins-Allison (Apr. 20, 1993).
Sale of JetScan Currency Scanner/Counter, Model 4061 (Apr. 20, 1993).
JetScan Currency Scanner/Counter, Model 4062, Operating Instructions by Cummins-Allison (Nov. 28, 1994).
Sale of JetScan Currency Scanner/Counter, Model 4062 (Nov. 28, 1994).
Glory Instruction Manual for GFR-100 Currency Reader Couner (Aug. 15, 1995).
News Product News by Toyocom, "Toyocom Currency Counter Now Reads Denominations" (Sep. 26, 1994) (1 page).
Brochure by Toyocom, "New Currency Counter with Denomination Recognition, Toyocom NS" (Sep. 26, 1994) (1 page).
Toyocom Currency Counter, Model NS-100, "Operation Guide (Preliminary)" (Jun. 13, 1995).
Brochure of Mosler Model CS 6600 Optical Currency Counter/Sorter, 4 pages, copyr. 1992.
Toshiba-Mosler Operator's Manual for CF-420 Cash Settlement System; pps 1 to C-3; copyr. 1989 (See eg. pp. 3-10; 4-10; and 5-7).
Currency Systems International, CPS 1200; 4 pages; date: copyr. 1992.
Glory GSA-500 Sortmaster brochure; 4 pages; dated: estimated 1994.
Brochure "DeLa Rue Systems, The processing of money and documents;" date: copyr. 1987 (See e.g. 3120 Currency Sorting Machine, p. 3).
Chp. 7 of Mosler CF-420 Cash Management System, Operator's Manual© 1989.
Drawings of portions of Mosler CFD-420 Cash Mangement System (FIGs. A-C) and description fo the same (1989).
Brochure: DeLaRue Systems "3100 Series, L' internationale des Machines a trier les Billets"; date: 1989, 2 pages.
First Translation of JP 61-14557.
Second Translation of 61-14557 (Glory).
Translation of JP 54-71673.
Translation of JP 54-71674.
Translation of JP 61-41439.
First Translation of JP 56-136689.
Second Translation of JP 56-136689 (Glory).
Billcon D-202/204 Service Manual (cover marked 630229) (Japanese).
Translation of Billcon D-202/204 Service Manual—(H13).
Billcon D-202, D204 Operator's Manual (cover marked 611215) (Japanese).
First Translation of Billcon D-202, D204 Operator's Manual (H15).
Second Translation of Billcon D-202, D204 Operator's Manual (15) (Glory).
Banking Machine Digest No. 31 (last page of H19 translation has a date of Dec. 5, 1988) (Japanese).
First Translation of Banking Machine Digest No. 31 (H18).
Second Translation of Banking Machine Digest No. 31 (H18) (Glory).
Third Translation of Banking Machine Digest No. 31 (H18).
Cummins-Allison Corp. v. Glory U.S.A., Inc., N.D. III.
Translation of EP 0 077 464 A2.
Translation of EP 0 342 647 A2.
Glory Brochure "Tank Tough Currency Discriminators" GFR-110 & GFB 700, 2 pages, Aug. 6, 1998.
Glory Bank Note Counting Machine, model GFB-700, Operating Instructions, 32 pages, Sep. 1998.
G&D CHP 50 User's Guide, 61 pages, Mar. 1998.
De la Rue, 2700 VB Brochure, 1 page, Dec. 9, 1996.
De la Rue, 2700 User Guide, 52 pages, Aug. 1999.
Complaint Cummins-Allison Corp. v. Glory Ltd., Glory Shoji Co. Ltd., and Glory (U.S.A.), Inc., Civil Action No. 02C-7008, N.D. III.
Redated Declaration of Hiroya Mouri (12 pages) (Nov. 19, 2002).
Glory Model UF-1, Instruction Manual (30 pages) (date uncertain, prior to Nov. 20, 2002)(Japanese)[Nov. 19, 2002 Mouri Ex. 1].
Glory Model UF-1, Translation of Instruction Manual—(29 pages) (date uncertain, prior to Nov. 20, 2002) (Glory's translation) [Nov. 19, 2002 Mouri Ex. 1a].
Glory UF-1 brochure (2 page)(date unknown, prior to Nov. 20, 2002) (Japanese) [Nov. 19, 2002 Mouri Ex. 2].
Glory GFB-30 brochure (2 page) (date unknown, prior to Nov. 20, 2002) (Japanese) [Nov. 19, 2002 Mouri Ex. 3].
Glory GFB-30 operation manual (16 pages) (date unknown, prior to Nov. 20, 2002) (Japanese) [Nov. 19, 2002 Mouri Ex. 6].
Glory GSA-500 Service Manual (119 pages) (May 1989) [Nov. 19, 2002 Mouri Ex. 5].
Glory GFU-200 operator manual (26 pages) (date unknown, first page marked Mar. 2, 1992) (Japanese) [Nov. 19, 2002 Mouri Ex. 8].
Glory GFR-110 Instruction Manual—Currency Reader Counter (26 pages) (dated Aug. 23, 1999) [Nov. 19, 2002 Mouri Ex. 10].
Glory GFR-S Series Currency Counters/Discriminators GFR-S60; GFR-S80; GFR-S80V (4 pages) (date © 2002) [Nov. 19, 2002 Mouri Ex. 12].
Declaration of Sadaaki Uesaka (7 pages) (Nov. 19, 2002).
Glory's Monthly Newsletter, Jun. 1985 (38 pages) (Japanese) [Nov. 19, 2002 Uesaka Ex. 2].
Glory's Monthly Newsletter, Jun. 1985—partial translation (4 pages) [Nov. 19, 2002 Uesaka Ex. 3].
Glory Money O.A. Catalog, Jun. 1989 (44 pages) (Japanese) [Nov. 19, 2002 Uesaka Ex. 5].
Declaration of Akira Hoyo (5 pages) (Nov. 15, 2002).
Billcon D-202/204 Service Manual—Second Translation (Glory) (cover marked 630229) (25 pages) [Nov. 15, 2002 Hoyo Ex. 2a].
Billcon D-202/204—Nikkin Newspaper ad, Apr. 17, 1987 (2 pages) (Japanese) [Nov. 15, 2002 Hoyo Ex. 3].
Billcon D-202/204—Nikkin Newspaper ad, Apr. 17, 1987 (2 pages) (English translation) [Nov. 15, 2002 Hoyo Ex. 3a].
Billcon D-202/204 brochure (2 pages) (date uncertain, prior to Nov. 20, 2002) (Japanese) [Nov. 15, 2002 Hoyo Ex. 5].
Billcon D-202/204 brochure (2 pages) (date uncertain, prior to Nov. 20, 2002) (English translation) [Nov. 15, 2002 Hoyo Ex. 5a].
Billcon D-202/204 videotape of Japanese television show entitled "Small and Worldwide Companies" (allegedly aired Jan. 10, 1988) (Japanese) [Nov. 15, 2002 Hoyo Ex. 6].
Declaration of Philip C. Dolsen (6 pages)(Nov. 20, 2002).
Dolsen, Philip C. Cirriculum (4 pages) (Oct. 29, 2002) [Nov. 20, 2002 Dolsen Ex. 1].
OKI Semiconductor data book, MSM80C85A-2RS/GS/JS—8 Bit CMOS Microprocessor (10 pages) (alleged Mar. 1989) [Nov. 20, 2002 Dolsen Ex. 3A].
OKI Semiconductor data book, MSM80C88A-2RS/GS/JS—8 Bit CMOS Microprocessor (27 pages) (alleged Mar. 1989) [Nov. 20, 2002 Dolsen Ex. 3B].

Intel 80286, Intel data sheet, High Performance Microprocessor with Memory Management and Protection (28 pages; pp. 3-1 to 3-55) (alleged 1988) [Nov. 20, 2002 Dolsen Ex. 4].

NEC uPD780C-1 Microprocessor, NEC data book (23 pages; pp. 4-3 to 4-25) (alleged 1987) [Nov. 20, 2002 Dolsen Ex. 5].

NEC PD70216 processor, NEC data book (34 pages; pp. 3-161 to 3-227) (alleged 1987) [Nov. 20, 2002 Dolsen Ex. 6].

Glory GFR-S80V Operation Keys, pp. 1-11 (May 17, 2002) English (GL000106-116).

Glory Catalog pp. 4-11 listing various Glory machines including GFU-100, GFF-8CF, GFF-8, GFB-500/520, GFF-8E, and GSA-500 and maintenance policy and fees, English (GL001916-1923) (date uncertain, last page dated Aug. 15, 1990).

De La Rue 3000 Series Used banknote sorting machines, 10 legal size pages, English (GL001924-33) (date uncertain, prior to Nov. 4, 2002).

De La Rue 3400/3500 Series High Speed Currency Sorting Systems brochure, 4 pages, English (GL001934-37)(© 1989).

The New Billcon K-300 Series brochure, 2 pages, English (GL002389-90) (Dec. 1999).

The New Billcon N-Series Compact Note Counter brochure, 2 pages, English (GL002391-92) (© 2000).

The New Billcon K-300 Series Brochure, 2 pages, (© 1999) English (GL002396-97).

Billcon D-202/204 brochure, 2 pages, Japanese (date uncertain, prior to Nov. 7, 2002) (GL002398-99).

De La Rue Teller Cash Dispatch™ Applications brochure, 8 pages, (© 1999) English (GL002475-2482).

De La Rue Cash Systems, Coin Processing Banknote Counting brochure, 4 legal pages, (date uncertain, prior to Nov. 7, 2002) English (G1002485-88).

De La Rue Cash Systems, 2650 Currency Counting Machine brochure, 2 pages, (date uncertain, prior to Nov. 7, 2002) English (GL002489-90).

De La Rue Cash Systems, The Euro Range for Note and Coin Handling brochure, 4 pages, (date uncertain, prior to Nov. 7, 2002) English (GL002491-94).

Currency Systems International Cobra™ Banknote Sorter brochure, 3 pages (middle page legal), (© 2001) English (GL002495-97).

De La Rue Cash Systems Cobra™ 4004 Banknote Sorter brochure, 2 legal pages, (© 2001) English (GL002498-99).

De La Rue Cash Systems TCR Twin Safe™ Teller Cash Recycler, 2 pages, (© 2001) English (GL002500-01).

De La Rue's WestLB Panmore Marketing Pamphlet regarding Cash Systems Division, 16 pages, (Apr. 29, 2002) English (GL002502-17).

De La Rue Cash Systems 2800 VB Balancing currency counter brochure, 2 pages (Sep. 1999) English (GL002518-19).

De La Rue Cash Systems 8672 Máquina contadora de billetes brochure, 2 pages (date uncertain, handwritten date Nov. 1999) (Spanish) (GL002520-21).

Sprintquip Quicksort™ 2800 brochure, 2 pages, (hand dated Sep. 1999) English (GL002523-24).

Brandt® Model 8643 Currency/Document Counter brochure, 2 pages, (© 1995) English (GL002527-28).

De La Rue Cash Systems 2700VB Currency Counting Machine brochure, 2 pages (hand dated Sep. 1999) English (GL002529-30).

De La Rue Cash Systems Brandt 8625 Currency Counting Machine, 2 pages (hand dated Nov. 1999) English (GL002531-32).

De La Rue Cash Systems Branch Cash Automation Applications (Powerpoint), 28 pages, (date uncertain, prior to Nov. 7, 2002) English (GL002539-66).

De La Rue Commercial Self Service (Powerpoint), 24 pages, (date uncertain, prior to Nov. 7, 2002) English (GL002567-90).

De La Rue Automated Depositories (Powerpont), 2 pages, (date uncertain, prior to Nov. 7, 2002) English (GL002591-92).

De La Rue Systems 2800VB Value Balancing Sorter/Counter brochure, 2 pages, (date uncertain, prior to Nov. 7, 2002) English (GL002593-94).

De La Rue Systems 2700VB Specification page of brochure, 1 page, (date uncertain, prior to Nov. 7, 2002) English (GL002595).

Magner® 15 Desktop banknote counter brochure, 2 pages, (date uncertain, prior to Nov. 7, 2002) English (G1002596-97).

MAG II Model 20 Currency Counter brochure, 2 pages, (date uncertain, prior to Nov. 7, 2002) English (GL002605-06).

Banc Equip Magner Products Product Price List, 2 pages, (date uncertain, prior to Nov. 7, 2002) English (GL002613-14).

Magner Model 35 Currency Counting Machines brochure, 2 pages, (date uncertain, prior to Nov. 7, 2002) English (GL002625-26).

Magner 75 Series Currency Counting Machines brochure, 2 pages, (date uncertain, prior to Nov. 7, 2002) English (GL002627-28).

G&D BPS 200 Desktop Banknote Processing System brochure, 10 pages, (date uncertain, prior to Nov. 7, 2002) English (GL002629-38).

G&D BPS 200 Desktop Banknote Processing System brochure, 2 pages, (date uncertain, prior to Nov. 7, 2002) English (GL002643-44).

G&D One Size Does Not Fit All! Brochure, 1 page, (date uncertain, prior to Nov. 7, 2002) English (GL002645).

G&D BPS 500 Banknote Processing System brochure, 4 pages, (date uncertain, prior to Nov. 7, 2002) English (GL002646-49).

G&D Numeron webpage picture of sorting machine and Design Award for Numeron, 2 page, (Mar. 29, 2002) (GL002650-51).

G&D BPS 200 Banknote Processing System brochure, 2 pages, (date uncertain, prior to Nov. 7, 2002) English (GL002652-53).

G&D BPS 500 Banknote Processing System brochure, 1 page (hand dated Sep. 1999) English (GL002654).

G&D Company Magazine, 36 pages, (Mar. 1998) English (GL002655-90).

G&D Cards and Card Systems brochure, 15 pages, (© 1998) English (GL002691-2705).

G&D Portrait of a Company Group brochure, 19 pages, (© 1997?) English (GL002706-24).

Mosler TouchSort™ *Plus* Currency Processing System brochure, 2 pages (© 1999) English (GL002727-28).

Mosler Satellite Branch Facilities—Riddell National Bank, Brazil, Indiana brochure, 1 page, (date uncertain, prior to Nov. 7, 2002) English (GL002729).

Mosler TouchSort™ Currency Processing System brochure, 2 pages, (date uncertain, prior to Nov. 7, 2002) English (GL002730-31).
Mosler marketing brochure, 4 pages, (© 1999) English, (GL002732-35).
Glory UC-10-10A Brochure, 2 pages, (date uncertain, prior to Nov. 7, 2002) Japanese (GL002777-78).
Glory UC-10A pamphlet, 1 legal page, (date uncertain, prior to Nov. 7, 2002) Japanese (GL002779).
Glory pamphlet of various machines, 1 legal page, (date uncertain, prior to Nov. 7, 2002) Japanese (GL002780).
Glory UF-1 brochure, 2 pages, (date uncertain, prior to Nov. 7, 2002) Japanese (GL002781-82).
Glory GFU-200 Desk-top Currency Fitness Sorter/Counter brochure, 2 pages, (date uncertain, prior to Nov. 7, 2002) English (GL002839-40).
Glory GFR-100 Currency Reader Counter brochure, 4 pages, (© 1995, English (GL002860-63).
Glory GFR-100 Currency Reader Counter Instruction Manual, 31 pages (Jan. 8, 1996) English (GL002864-94).
Glory Tank Currency Discriminators GFR-110 & GFR-S80 brochure, 2 pages, (© 2000) English (GL002959-60).
Glory Currency Reader Counter GFR-S80, S60 Instruction Manual, 33 pages (Nov. 1, 2000) English (GL002961-93).
Glory UW-100 Compact Currency Fitness Sorter brochure, 2 pages (© 1999) English (GL003027-28).
Glory Currency Fitness Sorter UW-100 Instruction Manual, 38 pages (Feb. 19, 2002) English (GL003029-66).
Glory UW-200 Multi-Purpose Company Currency Sorter brochure, 2 legal pages (© 1999) English (GL003067).
Glory Currency Sorter UW-200 With Fitness sorting mode (FIT) Instruction Manual, 44 pages (Oct. 23, 2001) English (GL003068-111).
Billcon D-202-204 brochures, 6 pages, (date uncertain, prior to Nov. 7, 2002) Japanese (G1003112-17).
Billcon® R-900 E-DS Note Counter with Dual Speed and Denomination Sorting Function brochure, 2 pages, (date uncertain, prior to Nov. 7, 2002) English (GL003167-68).
Billcon R-900DS Currency Counter Operating Manual, 6 pages, (date uncertain, prior to Nov. 7, 2002) English (GL003169-74).
Billcon R-900 Currency Counter Service Manual (601221), 31 pages, (date uncertain, prior to Nov. 7, 2002) English (GL003175-3205).
Translation of JP S60-215293 (G3 above).
Declaration of Toshio Numata.
De La Rue Notice of Opposition to EP 0731954B (English) (Oct. 22, 2003).
De La Rue TCD 9210—Autodeposit User Manual, 7 pages (English) (Dec. 20, 1993).
Declaration of John A. Skinner (English) (Oct. 20, 2003).
Declaration of Volker Glaser (English) (Oct. 20, 2003).
De La Rue Cashmaster-Deposit 3D/UV Invoice (German) (Mar. 25, 1994).
De La Rue Cashmaster-Deposit 3D/UV Delivery note (German) (Mar. 4, 1994).
European Search Report for EP 01129428.7, 7 pages (Jan. 11, 2005).
Glory Brochure "Tank Tough Currency Discriminators" GFR-110 & GFB 700, 2 pages.
Glory Bank Note Counting Machine, model GFB-700, Operating Instructions, 32 pages, Sep. 1998.
G&D CHP 50 User's Guide, 61 pages, Mar. 1998.
De la Rue, 2700 VB Brochure, 1 page, Dec. 9, 1996.
De la Rue, 2700 User Guide, 52 pages, Aug. 1999.

* cited by examiner

METHOD AND APPARATUS FOR DISCRIMINATING AND COUNTING DOCUMENTS

CROSS-REFERENCE TO RELATED APPLICATIONS

This application is a continuation of application Ser. No. 09/126,580, filed on Jul. 30, 1998, entitled "Method And Apparatus For Discriminating and Counting", now issued as U.S. Pat. No. 6,351,551, which is a continuation of prior application Ser. No. 08/573,392, filed on Dec. 15, 1995, now U.S. Pat. No. 5,790,697 issued Aug. 4, 1998 which is a continuation-in-part of the following United States patent applications:

Ser. No. 08/399,854 filed Mar. 7, 1995 for a "Method and Apparatus For Discriminating and Counting Documents," now issued as U.S. Pat. No. 5,875,259;

Ser. No. 08/394,752 filed Feb. 27, 1995 for a "Method of Generating Modified Patterns and Method and Apparatus for Using the Same in a Currency Identification System," now issued as U.S. Pat. No. 5,724,438;

Ser. No. 08/362,848 filed Dec. 22, 1994, for a "Method And Apparatus For Discriminating and Counting Documents," now issued as U.S. Pat. No. 5,870,487;

Ser. No. 08/340,031 filed Nov. 14, 1994, for a "Method And Apparatus For Discriminating and Counting Documents," now issued as U.S. Pat. No. 5,815,592;

Ser. No. 08/317,349 filed Oct. 4, 1994, for a "Method And Apparatus For Authenticating Documents Including Currency," now issued as U.S. Pat. No. 5,640,463;

Ser. No. 08/287,882 filed Aug. 9, 1994 for a "Method and Apparatus for Document Identification," now issued as U.S. Pat. No. 5,652,802;

Ser. No. 08/243,807 filed May 16, 1994, for "Method And Apparatus For Currency Discrimination," now issued as U.S. Pat. No. 5,633,949; and Ser. No. 08/226,660 filed Apr. 12, 1994, for "Method And Apparatus For Currency Discrimination," now issued as U.S. Pat. No. 6,539,104.

FIELD OF THE INVENTION

The present invention relates, in general, to document identification. More specifically, the present invention relates to an apparatus and method for discriminating among a plurality of document types such as currency bills of different denominations and/or from different countries and authenticating the genuineness of the same.

BACKGROUND OF THE INVENTION

Machines that are currently available for simultaneous scanning and counting of documents such as paper currency are relatively complex and costly, and relatively large in size. The complexity of such machines can also lead to excessive service and maintenance requirements. These drawbacks have inhibited more widespread use of such machines, particularly in banks and other financial institutions where space is limited in areas where the machines are most needed, such as teller areas. The above drawbacks are particularly difficult to overcome in machines which offer much-needed features such as the ability to scan bills regardless of their orientation relative to the machine or to each other, and the ability to authenticate genuineness and/or denomination of the bills.

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals; after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for size, limpness, and thickness).

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Some of the currency scanning systems today scan for two or more characteristics of bills to discriminate among various denominations or to authenticate their genuineness. However, these systems do not efficiently utilize the information which is obtained. Rather, these systems generally conduct comparison based on the two or more characteristics independently of each other. As a result, the time required to make these comparisons is increased which in turn can reduce the operating speed of the entire scanning system.

Recent currency discriminating systems rely on comparisons between a scanned pattern obtained from a subject bill and sets of stored master patterns for the various denominations among which the system is designed to discriminate. As a result, the master patterns which are stored play an important role in a discrimination system's ability to discriminate among bills of various denominations as well as between genuine bills and counterfeit bills. These master patterns have been generated by scanning bills of various denominations known to be genuine and storing the resulting patterns. However, a pattern generated by scanning a genuine bill of a given denomination can vary depending upon a number of factors such as the condition of the bill, e.g., whether it is a crisp bill in new condition or a worn, flimsy bill, as well as year in which the bill was printed, e.g., before or after security threads were incorporated into bills of some denominations. Likewise, it has been found that bills which have experienced a high degree of usage may shrink, resulting in a reduction of the dimensions of such bills. Such shrinkage may likewise result in variations in scanning patterns. As a result, if, for example, a $20 master pattern is generated by scanning a crisp, genuine $20 bill, the discrimination system may reject an unacceptable number of genuine but worn $20 bills. Likewise, if a $20 master pattern is generated using a very worn, genuine $20 bill, the discrimination system may reject an unacceptable number of genuine but crisp $20 bills.

It has been found that scanning U.S. bills of different denominations along a central portion thereof provides scanning patterns sufficiently divergent to enable accurate discrimination between different denominations. Such a discrimination device is disclosed in U.S. Pat. No. 5,295,196. However, currencies of other countries can differ from U.S. currency and from each other in a number of ways. For example, while all denominations of U.S. currencies are the same size, in many other countries currencies vary in size by denomination. Furthermore, there is a wide variety of bill sizes among different countries. In addition to size, the color of currency can vary by country and by denomination. Likewise, many other characteristics may vary between bills from different countries and of different denominations.

As a result of the wide variety of currencies used throughout the world, a discrimination system designed to handle bills of one country generally can not handle bills from another country. Likewise, the method of discriminating bills of different denominations of one country may not be appropriate for use in discriminating bills of different denominations of another country. For example, scanning for a given characteristic pattern along a certain portion of bills of one country, such as optical reflectance about the central portion of U.S. bills, may not provide optimal discrimination properties for bills of another country, such as German marks.

Furthermore, there is a distinct need for an identification system which is capable of accepting bills of a number of currency systems, that is, a system capable of accepting a number of bill-types. For example, a bank in Europe may need to process on a regular basis French, British, German, Dutch, etc. currency, each having a number of different denomination values.

Some of the optical scanning systems available today employ two optical scanheads disposed on opposite sides of a bill transport path. One of the optical scanheads scans one surface (e.g., green surface) of a currency bill to obtain a first set of reflectance data samples, while the other optical scanhead scans the opposite surface (e.g., black surface) of the currency bill to obtain a second set of reflectance data samples. These two sets of data samples are then processed and compared to stored characteristic patterns corresponding to the green surfaces of currency bills of different denominations. If degree of correlation between either set of data samples and any of the stored characteristic patterns is greater than a predetermined threshold, then the denomination of the bill is positively identified.

A drawback of the foregoing technique for scanning both surfaces of a currency bill is that it is time-consuming to process and compare both sets of data samples for the scanned bill to the stored characteristic patterns. The set of data samples corresponding to the black surface of the scanned bill are processed and compared to the stored characteristic patterns even though no match should be found. As previously stated, the stored characteristic patterns correspond to the green surfaces of currency bills of different denominations.

Another drawback of the foregoing scanning technique is that the set of data samples corresponding to the black surface of the scanned bill occasionally leads to false positive identification of a scanned bill. The reason for this false positive identification is that if a scanned bill is slightly shifted in the lateral direction relative to the bill transport path, the set of data samples corresponding to the black surface of the scanned bill may sufficiently correlate with one of the stored characteristic patterns to cause a false positive identification of the bill. The degree of correlation between the set of "black" data samples and the stored "green" characteristic patterns should, of course, not be greater than the predetermined threshold for positively identifying the denomination of the bill.

Furthermore, in currency discriminating systems that rely on comparisons between a scanned pattern obtained from a subject bill and sets of stored master patterns, the ability of a system to accurately line up the scanned patterns to the master patterns to which they are being compared is important to the ability of a discrimination system to discriminate among bills of various denominations as well as between genuine bills and counterfeit bills without rejecting an unacceptable number of genuine bills. However, the ability of a system to line up scanned and master patterns is often hampered by the improper initiation of the scanning process which results in the generation of scanned patterns. If the generation of scanned patterns is initiated too early or too late, the resulting pattern will not correlate well with the master pattern associated with the identity of the currency; and as a result, a genuine bill may be rejected. There are a number of reasons why a discrimination system may initiate the generation of a scanned pattern too early or too late, for example, stray marks on a bill, the bleeding through of printed indicia from one bill in a stack onto an adjacent bill, the misdetection of the beginning of the area of the printed indicia which is desired to be scanned, and the reliance on the detection of the edge of a bill as the trigger for the scanning process coupled with the variance, from bill to bill, of the location of printed indicia relative to the edge of a bill. Therefore, there is a need to overcome the problems associated with correlating scanned and master patterns.

In some currency discriminators bills are transported, one at a time, passed a discriminating unit. As the bills pass the discriminating unit, the denomination of each bill is determined and a running total of each particular currency denomination and/or of the total value of the bills that are processed is maintained. A number of discriminating techniques may be employed by the discriminating unit including optical or magnetic scanning of bills. A plurality of output bins are provided and the discriminator includes means for sorting bills into the plurality of bins. For example, a discriminator may be designed to recognize a number of different denominations of U.S. bills and comprise an equal number of output bins, one associated with each denomination. These discriminators also include a reject bin for receiving all bills which cannot be identified by the discriminating unit. These bills may later be examined by an operator and then either re-fed through the discriminator or set aside as unacceptable.

Depending on the design of a discriminator, bills may be transported and scanned either along their long dimension or their narrow dimension. For a discriminator that transport bills in their narrow dimension, it is possible that a given bill may be oriented either face up or face down and either top edge first ("forward" direction) or top edge last ("reverse" direction). For discriminators that transport bills in their long dimension, it is possible that a given bill may be oriented either face up or face down and either left edge first ("forward" direction) or left edge last ("reverse" direction). The manner in which a bill must be oriented as it passes a discriminating unit depends on the characteristics of the discriminator. Some discriminators are capable of identifying the denomination of a bill only if it is fed with a precise orientation, e.g., face up and top edge first. Other discriminators are capable of identifying bills provided they are "faced" (i.e., fed with a predetermined face orientation, that is all face up or all face down). For example, such a discriminator may be able to identify a bill fed face up regardless of whether the top edge is fed first or last. Other discriminators are capable of identifying the denomination fed with any orientation. However, whether a given discriminator can discriminate between bills fed with different orientations depends on the discriminating method used. For example, a discriminator that discriminates bills based on patterns of transmitted light may be able to identify the denomination of a forward fed bill regardless of whether the bill is fed face up or face down, but the same discriminator would not be able to discriminate between a bill fed face up and a bill fed face down.

Currently, discriminators are known which discriminate and/or sort by denomination when bills are properly faced. In such systems, all reverse-faced bills are not identified and are routed to a reject receptacle. Also discriminators are known which discriminate and/or sort between all bills facing up and all bills facing down. For example, in a multi-output pocket system, all face up bills, regardless of denomination, may be routed to a first pocket and all face down bills, regardless of denomination, may be routed to a second pocket. Furthermore, there is currently known discriminators designed to accept a stack of faced bills and flag the detection of a reverse-faced bill, thus allowing the reverse-faced bill to be removed from the stack. However, there remains a need for a discriminator that can detect and flag the presence of a bill oriented with an incorrect forward/reverse orientation and a discriminator that can sort between forward-oriented bills and reverse-oriented bills.

Furthermore, for a number of reasons, a discriminating unit may be unable to determine the denomination of a bill. These reasons include a bill being excessively soiled, worn, or faded, a bill being torn or folded, a bill being oriented in a manner that the discriminating unit cannot handle, and the discriminating unit having poor discriminating performance. Furthermore, the discriminating unit and/or a separate authenticating unit may determine that a bill is not genuine. In current discriminators, such unidentified or non-genuine bills are deposited in a reject receptacle.

A characteristic of the above described discriminators is that the value of any rejected unidentified bills is not added to the running total of the aggregate value of the stack of bills nor do the counters keeping track of the number of each currency denomination reflect the rejected unidentified bills. While this is desirable with respect to bills which are positively identified as being fake, it may be undesirable with respect to bills which were not identified for other reasons even though they are genuine bills. While the bills in a reject receptacle may be re-fed through the discriminator, the operator must then add the totals from the first batch and the second batch together. Such a procedure can be inefficient in some situations. Also, if a bill was rejected the first time because it was, for example, excessively soiled or too worn, then it is likely that the bill will remain unidentified by the discriminating unit even if re-fed.

A problem with the above described situations where the totals and/or counts do not reflect all the genuine bills in a stack is that an operator must then count all the unidentified genuine bills by hand and add such bills to separately generated totals. As a result the chance for human error increases and operating efficiency decreases. Take for example a bank setting where a customer hands a teller a stack of currency to be deposited. The teller places the stack of bills in a discriminator, the display on the discriminator indicates that a total of $730 has been identified. However, fourteen genuine bills remain unidentified. As a result, the teller must count these fourteen bills by hand or re-fed through the discriminator and then add their total to the $730 total. An error could result from the teller miscounting the unidentified bills, the teller forgetting to add the two totals together, or the teller overlooking the unidentified bills entirely and only recording a deposit of $730. Moreover, even if the teller makes no mistakes, the efficiency of the teller is reduced by having to manually calculate additional totals. The decrease in efficiency is further aggravated where detailed records must be maintained about the specific number of each denomination processed during each transaction.

Therefore, there is a need for a currency discriminator which is capable of conveniently and efficiently accommodating genuine bills that, for whatever reason, remain unidentified after passing through the discriminating unit of a discriminator.

A number of methods have been developed for authenticating the genuineness of security documents. These methods include sensing magnetic, optical, conductive, and other characteristics of documents under test. In general, it has been found that no single authentication test is capable of detecting all types of counterfeit documents while at the same time not rejecting any genuine documents. Therefore, more than one test may be employed whereby a first test is used to detect certain types of counterfeits and additional tests are used to detect other types of counterfeits.

It has been known that the illumination of certain substances with ultraviolet light causes the substances to fluoresce, that is, to emit visible light. Some documents employ fluorescent materials as a security feature to inhibit counterfeiting. Typically, these fluorescent security features comprise a marking which is visibly revealed when the document is illuminated with ultraviolet light. Previous methods have been developed to authenticate such documents by sensing the fluorescent light emitted by a document illuminated by ultraviolet light and comparing the sensed fluorescent light to the fluorescent light emitted by genuine documents.

Conversely, some documents, such as United States currency, are manufactured from special paper designed not to fluoresce under ultraviolet light. Previously known authenticating methods for such documents have sensed for the emission of fluorescent light under ultraviolet illumination and have rejected as counterfeit those documents emitting fluorescent light.

However, it has been found that the presently known ultraviolet authentication methods do not detect all types of counterfeits. For example, while many counterfeit United States bills do emit fluorescent light under ultraviolet illumination, some counterfeit United States bills do not.

SUMMARY OF THE INVENTION

It is an object of the present invention to provide an improved method and apparatus for identifying documents.

It is an object of the present invention to provide an improved method and apparatus for identifying, authenticating, and counting currency bills comprising a plurality of currency denominations.

It is an object of the present invention to provide an improved method and apparatus for discriminating among documents of different types including currency documents of different denominations.

It is an object of the present invention to provide an improved method and apparatus for discriminating among currency bills comprising a plurality of currency denominations.

It is another object of this invention to provide an improved method and apparatus of the above kind which is capable of efficiently discriminating among, authenticating, and counting bills of several currency denominations at a high speed and with a high degree of accuracy.

It is another object of this invention to provide an improved method and apparatus of the above kind which is capable of efficiently discriminating currencies from a number of different countries.

It is another object of this invention to provide a currency evaluation device able to discriminate among different denominations of bills from two or more currency systems.

It is another object of this invention to provide a currency evaluation device able to discriminate among different denominations of both Canadian and German bills.

It is another object of this invention to provide an improved method and apparatus of the above kind which is capable of scanning a document such as a currency bill along two or more laterally displaced segments to thereby identify the document.

It is another object of this invention to provide an improved method and apparatus of the above kind which is capable of scanning a document along two or more laterally displaced segments by using two or more laterally displaced scanheads.

It is another object of this invention to provide an improved method and apparatus of the above kind which is capable of scanning a document along two or more laterally displaced segments by using two or more laterally displaced sensors of a linear array scanhead.

It is another object of this invention to provide an improved method and apparatus of the above kind which is capable of scanning a document along two or more laterally displaced segments by using one or more laterally moveable scanheads.

It is another object of this invention to provide an improved method and apparatus of the above kind wherein the above scanheads or sensors retrieve optical reflectance information from a document under test and use such reflectance information to determine the identity of the document.

It is another object of this invention to provide an improved method and apparatus of the above kind which identifies a document by comparing one or more scanned patterns generated by scanning a document under test with one or more scanheads or one or more sensors and comparing the scanned pattern or patterns with one or more master patterns associated with genuine documents.

It is another object of this invention to provide an improved method and apparatus of the above kind which identifies a document by determining the size of the document.

It is another object of this invention to provide an improved method and apparatus of the above kind which identifies a document by determining the color of the document.

It is another object of this invention to provide an improved method and apparatus of the above kind which identifies a document based on a combination of size information and scanned/master pattern comparison.

It is another object of this invention to provide an improved method and apparatus of the above kind which identifies a document based on a combination of color information and scanned/master pattern comparison.

It is another object of this invention to provide an improved method and apparatus of the above kind which identifies a document based on a combination of size information, color information, and scanned/master pattern comparison.

It is another object of this invention to provide an improved method and apparatus of the above kind in which only selected ones of a number of scanheads or sensors are activated to scan a document.

It is another object of this invention to provide an improved method and apparatus of the above kind in which scanned patterns are generated only from the output or data derived therefrom of selected ones of a number of scanheads or sensors which are activated to scan a document.

It is another object of this invention to provide an improved method and apparatus of the above kind in which the selection of one or more of a number of scanheads or sensors to scan a document is based on size information.

It is another object of this invention to provide an improved method and apparatus of the above kind in which the selection of one or more of a number of scanheads or sensors to scan a document is based on color information.

It is another object of this invention to provide an improved method and apparatus of the above kind in which the lateral positioning of one or more moveable scanheads is based on size and/or color information detected from the document.

It is another object of this invention to provide an improved method and apparatus of the above kind in which the selection of the output or data derived therefrom of one or more of a number of scanheads or sensors for the generation of scanned patterns is based on size information.

It is another object of this invention to provide an improved method and apparatus of the above kind in which the selection of the output or data derived therefrom of one or more of a number of scanheads or sensors for the generation of scanned patterns is based on color information.

It is another object of this invention to provide an improved method and apparatus of the above kind which is capable of scanning either side or both sides of a document.

It is another object of this invention to provide an improved method and apparatus of the above kind in which the amount of information that must be processed is reduced by tailoring the areas from which scanned patterns are derived, such reduction being based on pre-scan information detected from a document such as the size and/or color of a document to be scanned.

It is another object of this invention to provide an improved method and apparatus of the above kind in which the amount of information that must be processed is reduced by tailoring the data which must be assembled into one or more scanned patterns, such reduction being based on information detected from a document during the scanning process itself, the information detected during the scanning process itself including, for example, size and/or color information.

It is another object of this invention to provide an improved method and apparatus of the above kind in which size and/or color information detected from a document is used to generate a preliminary set of potentially matching documents and in which one or more scanned patterns generated from a document are compared with master patterns chosen from the preliminary set.

It is another object of this invention to provide an improved method and apparatus of the above kind in which a document to be scanned is transported past one or more scanheads in a centered or justified manner along a transport path.

It is another object of this invention to provide an improved method and apparatus of the above kind in which a document to be scanned is transported past one or more scanheads along a transport path and in which one or more sensors separate from the one or more scanheads are used to determine the lateral positioning of the document within the transport path.

It is another object of this invention to provide an improved method and apparatus of the above kind in which a document to be scanned is transported past one or more scanheads along a transport path and in which the lateral positioning of the document within the transport path is determined by analyzing the output of one or more scanheads.

It is another object of this invention to provide an improved method and apparatus of the above kind in which a document to be scanned is transported past one or more scanheads along a transport path and in which the skew of the document is determined by analyzing of output of one or more scanheads or analyzing the output of one or more separate sensors.

It is another object of this invention to provide an improved method and apparatus of the above kind which is capable of accepting documents fed either face up or face down.

It is another object of this invention to provide an improved method and apparatus of the above kind which is capable of accepting documents fed in either the forward or reverse direction, i.e., top edge first or top edge last.

A related object of the present invention is to provide such an improved currency discrimination and counting apparatus which is compact, economical, and has uncomplicated construction and operation.

It is an object of the present invention to provide an improved currency scanning and counting machine which is relatively simple and compact, while at the same time providing a variety of advanced features which make the machine convenient and useful to the operator.

Another object of this invention is to provide such an improved currency scanning and counting machine that is relatively inexpensive to manufacture and maintain, and which also facilitates service and maintenance. In this connection, a related object of the invention is to provide such a machine having a relatively small number of parts, and in which most of the parts are arranged in a manner to have a long operating life with little or no maintenance.

It is a further object of this invention to provide such a machine that is capable of operating at a faster throughput rate than any previous machine able to determine the denomination of the scanned bills.

It is another object of the present invention to provide an improved method and apparatus for identifying a currency as belonging to a set of one or more currency bills.

It is another object of the present invention to provide an improved method and apparatus for determining the identity of a currency bill.

It is another object of the present invention to provide an improved method of generating modified scanned patterns.

It is another object of the present invention to provide an improved method of generating modified master patterns.

It is another object of the present invention to provide an improved method and apparatus for determining the identity of a currency bill by comparing a modified version of a scanned pattern with one or more master patterns.

It is another object of the present invention to provide an improved method and apparatus for determining the identity of a currency bill by comparing modified versions of one or more master patterns with a scanned pattern.

It is another object of the present invention to provide an improved method and apparatus using an improved pattern generation method for improving the ability of a discrimination system to accurately reject improper bills while reducing the likelihood of rejecting genuine bills.

It is another object of this invention to provide an improved document counting and discriminating apparatus that is capable of flagging unidentified bills.

It is another object of this invention to provide an improved document counting and discriminating apparatus that flags unidentified bills by suspending operation of the apparatus.

It is another object of this invention to provide an improved document counting and discriminating apparatus of the above type that can conveniently be caused to resume operation after an operator of the apparatus has examined an unidentified bill.

It is another object of this invention to provide an improved document counting and discriminating apparatus of the above type whereby the denomination or kind of any unidentified bill may be conveniently added to appropriate counters and the operation of the apparatus conveniently resumed when an operator determines that an unidentified bill is acceptable and whereby the operation of the apparatus may be conveniently resumed without adversely affecting any counter when an operator determines that an unidentified bill is not acceptable.

It is another object of this invention to provide an improved document counting and discriminating apparatus whereby the discriminator prompts the operator as to the identity of any flagged bills, such as by prompting the operator as to the denomination of any bill whose denomination has not been determined by the discriminator.

It is another object of this invention to provide an improved document discriminating apparatus that can flag a document based on the forward or reverse orientation of the document.

It is another object of this invention to provide an improved document discriminating apparatus that can sort between documents having a forward orientation and documents having a reverse orientation.

It is another object of the present invention to provide an improved method and apparatus for authenticating documents including currency documents.

It is another object of the present invention to provide an improved method and apparatus for authenticating United States currency bills.

It is another object of the present invention to provide an improved method and apparatus for authenticating documents which may be employed in a currency discriminating apparatus.

It is an object of the present invention to provide an improved method and apparatus for authenticating documents including currency documents by illuminating a document with ultraviolet light.

It is another object of the present invention to provide an improved method and apparatus for authenticating documents which improves the ability of a system to accurately reject improper documents while reducing the likelihood of rejecting genuine documents.

Other objects and advantages of the invention will become apparent upon reading the following detailed description in conjunction with the accompanying drawings.

In accordance with one embodiment of the present invention, the foregoing objectives are realized by providing a currency counting and discrimination device for receiving a stack of currency bills, rapidly counting and discriminating the bills in the stack, and then re-stacking the bills. This device includes an input receptacle for receiving a stack of currency bills to be discriminated, a discriminating unit for discriminating the currency bills by denomination, an output receptacle for receiving the currency bills after they have been discriminated, and a transport mechanism for transporting the currency bills, one at a time, from the input receptacle past the discriminating unit and to the output receptacle. The transport mechanism includes stripping wheels for stripping the lowermost bill from a stack of bills in the input receptacle, and a pair of driven transport rolls on opposite sides of the discriminating unit for transporting each bill past the discriminating unit. One of the transport rolls also receives bills directly from the stripping wheels and transports the received bills to the region between the pair of transport rolls.

In one embodiment, a pair of photosensors are located at opposite sides of the bill transport path, each photosensor including a light source and a protective lens on one side of the bill, and a photodetector and a protective lens on the other side of the bill. The lenses for both the light sources and the photodetectors are located sufficiently close to each other that the lenses are wiped by the bills transported therebetween.

In accordance with one embodiment of the present invention, the objectives enumerated above are achieved by scanning a document along one or more segments, generating one or more scanned patterns therefrom, and comparing the one or more scanned patterns to one or more master patterns associated with scans along corresponding segments of genuine documents. According to one embodiment, bills are fed in and scanned across their narrow dimension. According to another embodiment, bills are fed in and scanned across their wide dimension. One embodiment of the present invention involves a technique based on the optical sensing of reflectance characteristics obtained by illuminating and scanning a document such as a currency bill along an appropriately selected segment or segments of a document. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved across the illuminated strip. Accordingly, a fixed number of reflectance samples is obtained across the note. The data samples obtained for a bill scan are subjected to digital processing, including a normalizing process to deaccentuate variations due to contrast fluctuations in the printed pattern or indicia existing on the surface of the bill being scanned. The normalized reflectance data represent a characteristic pattern that is fairly unique for a given bill identity and incorporates sufficient distinguishing features between characteristic patterns for different bill-types so as to accurately differentiate therebetween.

By using the above approach, a series of master characteristic patterns are generated and stored using standard bills for each denomination of currency that is to be detected. The "standard" bills used to generate the master characteristic patterns are preferably bills that are slightly used bills. According to one embodiment, two or four characteristic patterns are generated and stored within system memory for each detectable bill-type. The stored patterns correspond, respectively, to optical scans performed on one or both sides of a bill along "forward" and "reverse" directions relative to the pattern printed on the bill. For bills which produce significant pattern changes when shifted slightly to the left or right, such as the $10 bill in U.S. currency, it is preferred to store two patterns for each of the "forward" and "reverse" directions, each pair of patterns for the same direction represent two scan areas that are slightly displaced from each other along the lateral dimension of the bill. The document identification system of this invention may be adapted to identify different denominations of a plurality of currency systems. Accordingly, a master set of different characteristic patterns is stored within the system memory for subsequent correlation purposes.

According to one embodiment a master pattern for a given denomination is generated by averaging a plurality of component patterns, typically three, each generated by scanning a genuine bill of the given denomination.

According to one method, a master pattern for a given denomination is generated by averaging a plurality of component patterns, wherein the component patterns are generated by scanning one or more genuine bills of "standard" or average quality of the given denomination. A "standard" bill is a slightly used bill, as opposed to a crisp new bill or one which has been subject to a high degree of usage.

According to another method, a master pattern for a given denomination is generated by averaging a plurality of component patterns, wherein some of the component patterns are generated by scanning one or more new bills of the given denomination and some of the component patterns are generated by scanning one or more old bills of the given denomination.

According to the correlation technique of this invention, the pattern generated by scanning a bill under test and processing the sampled data is compared with each of the prestored characteristic patterns within a preliminary set (to be described below) to generate, for each comparison, a correlation number representing the extent of similarity between corresponding ones of the plurality of data samples for the compared patterns. Bill identification is based on designating the scanned bill as belonging to the bill-type corresponding to the stored characteristic pattern for which the correlation number resulting from pattern comparison is determined to be the highest. The possibility of a scanned bill having its identity mischaracterized following the comparison of characteristic patterns is significantly reduced by defining a bi-level threshold of correlation that must be satisfied for a "positive" call to be made.

In essence, the present invention utilizes an optical sensing and correlation technique for positively identifying any of a plurality of different bill-types regardless of whether the bill is scanned along the "forward" or "reverse" directions. Likewise in one embodiment of the present invention, the system is capable of identifying any of a plurality of different bill-types regardless of whether the bill is fed into the system with a "face up" or "face down" orientation. Face orientation can be accommodated by storing master patterns scanned from both sides of genuine documents, using a system having one or more scanheads on a single side of a document transport path, and comparing scanned patterns to master patterns retrieved from both sides of genuine documents. Alternatively, scanheads may be placed on both sides of a document transport path, scanned patterns retrieved from respective sides can be compared to master patterns from both sides or master patterns from corresponding sides where face orientation can be determined. Additionally, a cross check can be performed so that the identity determined by a match of patterns from one side of a document is consistent with the identity indicated by comparing patterns from the other side of the document. For both one-sided and two-sided scanhead systems, where the face orientation of a document can be determined before patterns are compared, scanned patterns from one side of a document can be compared only to master patterns retrieved from a corresponding side. Similar methods can be employed for accommodating documents fed in forward and reverse directions.

In one embodiment, the invention is particularly adapted to be implemented with a system programmed to track each identified currency identity so as to conveniently present aggregate totals for bills that have been identified at the end of a scan run. One embodiment incorporates an abbreviated curved transport path for accepting currency bills that are to be counted and transporting the bills about their narrow dimension across a scanhead located downstream of the curved path and onto a conventional stacking station where sensed and counted bills are collected. In one embodiment, a scanhead of the present invention operates in conjunction with an optical encoder which is adapted to initiate the capture of a predefined number of reflectance data samples when a bill (and, thus, the indicia or pattern printed thereupon) moves across a coherent strip of light focused by the scanhead.

In one embodiment, a scanhead of the present invention uses a pair of light-emitting diodes ("LEDs") to focus a coherent light strip of predefined dimensions and having a normalized distribution of light intensity across the illuminated area. The LEDs are angularly disposed and focus the desired strip of light onto the narrow dimension of a bill positioned flat across the scanning surface of the scanhead. A photodetector detects light reflected from the bill. The sampling of the photodetector output is controlled by the optical encoder to obtain the desired reflectance samples. In one embodiment, initiation of sampling is based upon detection of the edge of a bill. In another embodiment for bills having a borderline surrounding the remaining printed indicia, initiation of sampling is based upon detection of the borderline of a bill.

Some of the above described techniques and apparatus as tailored to scanning U.S. currency are more fully disclosed in U.S. Pat. No. 5,295,196, for a "Method and Apparatus for Currency Discrimination and Counting" incorporated herein in its entirety.

In adapting the currency discriminating method and apparatus disclosed in U.S. Pat. No. 5,295,196 to optimize the scanning of currencies from countries other than the United States, it is first noted that while it has been found that scanning along the central portion of the green side of U.S. bills provides good patterns to discriminate between the different U.S. denominations, foreign bills may require scanning along segments located in locations other than the center and the desirable areas to scan bills can vary from bill-type to bill-type. For example, it may be determined that it is desirable to scan German marks in the forward direction along a segment 1 inch (2.54 cm) to the left of center along the top face of a bill while it may be desirable to scan British pounds along a segment 1.5 inches (3.81 cm) to the right of center. To provide a system capable of scanning along a plurality of laterally displaced segments, the present invention utilizes either a plurality of laterally displaced stationary scanheads, one or more laterally moveable scanheads, or a linear array scanhead having a plurality of laterally displaced sensors. In one embodiment, the scanheads or sensors are arranged in a symmetrical manner about the center of document to be scanned. Such a symmetrical arrangement aids in providing a system which is capable of accepting bills fed in both the forward and reverse directions.

Additionally, while all denominations of U.S. currency have the same size, currencies from other countries may vary in size from country to country as well as from denomination to denomination for currency from the same country. In one embodiment of the present invention, variance in size is accommodated by incorporating means for determining the size of a document. These size determining means may include sensors separate from the scanheads or scanning sensors discussed above or alternatively, in some embodiments of the present invention, may include the scanheads or scanning sensors discussed above which are used for the retrieval of scanned characteristic patterns. Based on the size information retrieved from a bill, selected scanheads may be activated, laterally moveable scanheads may be appropriately positioned and activated, and/or selected sensors in a linear array scanhead may be activated to permit scanning along appropriate segments of a bill based on its size. Alternatively, all scanheads or scanning sensors may be activated and the output of appropriately positioned scanheads or scanning sensors may be processed to generate scanned patterns based on the size of a bill. Furthermore, based on the size of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

Likewise, the transport mechanism which transports documents to be scanned past the above described scanheads may be designed to transport documents in a centered manner, left or right justified manner, in a non-controlled lateral positioned manner, in a non-skewed manner, or in a skewed manner. Sensors separate and distinct from the above described scanheads or the above described scanheads themselves may be used to determine the lateral positioning of transported bills and/or their degree of skew. Based on a determination of the lateral positioning of a bill and/or its skew, appropriately positioned scanheads or scanning sensors may be activated or laterally moveable scanheads may be appropriately positioned and activated or the output from appropriately positioned scanheads or scanning sensors may be processed to generate scanned patterns based on the lateral positioning and/or skew of the bill.

Additionally, while all denominations of U.S. currency have the same colors (a “green” side and a “black” side), currencies from other countries may vary in color from country to country as well as from denomination to denomination for currency from the same country. In one embodiment of the present invention, variance in color is accommodated by incorporating means for determining the color of a document. These color determining means may include sensors separate from the scanheads or sensors discussed above or alternatively, in some embodiments of the present invention, may include the appropriately modified scanheads or sensors discussed above which are used for the retrieval of scanned characteristic patterns. For example, colored filters may be placed in front of the above described scanheads or sensors. Based on the color information retrieved from a bill, selected scanheads may be activated, laterally moveable scanheads may be appropriately positioned and activated, and/or selected sensors in a linear array scanhead may be activated to permit scanning along appropriate segments of a bill based on its color. Alternatively, all scanheads or scanning sensors may be activated and the output of appropriately positioned scanheads or scanning sensors may be processed to generate scanned patterns based on the color of a bill. Furthermore, based on the color of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

In one embodiment of the present invention, both color and size information may be utilized as described above.

In one embodiment of the present invention, scanheads are positioned on both sides of a document transport path so as to permit scanning of either or both sides of a document.

According to one embodiment, an apparatus for currency discrimination comprises first and second stationary scanheads, disposed on opposite sides of a bill transport path, for scanning respective first and second opposing surfaces of a bill traveling along the bill transport path and for producing respective output signals. The bill travels along the transport path in the direction of a predetermined dimension of the bill. A memory stores master characteristic patterns corresponding to associated predetermined surfaces (e.g., green surfaces) of a plurality of denominations of genuine bills. Sampling circuitry samples the output signals associated with the respective first and second opposing surfaces of the scanned bill. A signal processor is programmed to determine which one of the first and second opposing surfaces corresponds to the associated predetermined surfaces of the plurality of denominations of genuine bills. According to one embodiment adapted for discriminating, for example, U.S. bills, the determination as to which surface of a bill corresponds to a predetermined surface is made by detecting the borderlines on each side of a bill and determining the relative times of detection of each borderline. The processor then correlates the output signal associated with the one of the first and second opposing surfaces corresponding to the associated predetermined surfaces with the master characteristic patterns. If the degree of correlation between the selected output signal and any of the stored characteristic patterns is greater than a predetermined threshold, then the denomination of the bill is positively identified.

For each scanhead, initiation of sampling is based upon detection of the change in reflectance value that occurs when the outer border of the printed pattern on a bill is encountered relative to the reflectance value obtained at the edge of the bill where no printed pattern exists. According to one embodiment of this invention, illuminated strips of at least two different dimensions are used for the scanning process. A narrow strip is used initially to detect the starting point of the printed pattern on a bill and is adapted to distinguish the thin borderline that typically marks the starting point of and encloses the printed pattern on a bill. For the rest of the preselected dimension scanning following detection of the borderline of the printed pattern, a substantially wider strip of light is used to collect the predefined number of samples for a bill scan. The generation and storage of characteristic patterns using standard notes and the subsequent comparison and correlation procedure for classifying the scanned bill as belonging to one of several predefined currency denominations is based on the above-described sensing and correlation technique.

Furthermore, in accordance with another feature of the present invention, the objectives enumerated above in connection with correlating patterns are achieved by repetitively comparing a scanned pattern with multiple sets of master patterns until a sufficient match is found, or alternatively, by repetitively comparing a set of original master patterns with multiple scanned patterns until a sufficient match is found. The multiple sets of master patterns comprise an original set of master patterns plus one or more sets of modified versions of the original master patterns. The multiple scanned patterns comprise an original scanned pattern plus one or more modified versions of the original scanned patterns. Each modified pattern comprises one or more replicated data values from a corresponding original pattern to which each modified pattern is to be compared. Alternatively, each modified master pattern comprises one or more data values which are set equal to zero.

Briefly, in accordance with one embodiment, an improved method of generating modified scanned or master patterns for use in a discrimination system capable of identifying one or more currency bills is provided. Each of the scanned and master patterns comprises a sequence of data values representing analog variations of characteristic information along a segment of a bill and each pattern has a leading end and a trailing end. Each of the data values has an associated sequence position. The modified scanned or master patterns are generated by designating either the scanned pattern or the master pattern for modification and inserting a predetermined number, R, of data values at either the trailing end of the sequence of data values of the designated pattern when the modification is performed in the forward direction or the leading end of the sequence of data values of the designated pattern when the modification is performed in the backward direction. This modification effectively removes R data values from the leading or trailing end of the designated pattern. Either the last R data values of the designated pattern are set equal to the last R data values of the non-designated pattern when the modification is performed in the forward direction or the first R data values of the designated pattern are set equal to the first R data values of the non-designated pattern when the modification is performed in the backward direction. Alternatively, the modified master patterns are generated by inserting R data samples at the leading or trailing ends of the master patterns and by setting the first R or last R data samples of the modified master pattern equal to zero.

According to one method, a modified scanned pattern is generated by removing a predetermined number of leading or trailing data values of an original scanned pattern. Trailing or leading data values, respectively, are added to the modified scanned pattern with the added data values being copied from corresponding sequence positions of a corresponding master pattern. Alternatively, instead of explicitly removing leading or trailing data values, the leading or trailing data values may be effectively removed by adding data values to the opposite end of the scanned pattern and treating the modified scanned pattern as not including the "removed" leading or trailing data values.

According to another method, a modified master pattern is generated in a similar manner except that added trailing or leading data values of the modified master pattern are set equal to data values copied from corresponding sequence positions of a scanned pattern.

According to another method, a modified master pattern is generated in a similar manner except that added trailing or leading data values of the modified master pattern are set equal to zero.

The above described modified patterns or pattern generation methods may be employed in currency identification systems to compensate for misalignment between scanned and master patterns.

According to another method, a scanned pattern comprising a number of data values is compared with one or more master patterns also comprising a number of data values. The scanned and master patterns represent analog variations in characteristic information retrieved from bills along corresponding segments. For example, the patterns may comprise 64 data values generated by sampling the output of a photodetector as a bill is moved relative to a scanhead, the output of the photodetector representing analog variation in the reflectance of light along a given segment of the bill. If none of the master patterns sufficiently match the scanned pattern, the scanned pattern may be modified and the modified scanned pattern compared to the master patterns. For example, data values #1 and #2 may be removed from the scanned pattern sequence, scanned patterns #3 and #4 may be made the first and second values in the modified sequence with subsequent data values modified accordingly. As a result of such a process, the original data values #63 and #64 now become modified data values #61 and #62. As a result of the above steps an incomplete modified pattern of data values #1–#62 is generated. According to one embodiment, modified data values #63 and #64 are generated by replicating data values #63 and #64 of the master patterns to which the modified scanned pattern is to be compared. If the modified patterns do not sufficiently match any of the master patterns, the modification process may be reiterated except that new scanned modified values #61–#64 are generated by replicating master pattern values #61–#64. This process is repeated until a sufficient match is found or until a predetermined number of modification iterations have occurred.

According to another embodiment, scanned patterns may be modified backwards instead of the forward modification described above.

According to another embodiment, master patterns may be modified instead of scanned patterns. According to this method, data values from scanned patterns are replicated into appropriate locations in modified master pattern sequences.

According to another embodiment, trailing or leading sequence positions of modified master patterns may be filled with zeros instead of replicated data values from a scanned pattern to which modified master patterns are to be compared.

According to another embodiment, modified master patterns with trailing or leading data values equal to zero are stored in a memory of an identification system along with corresponding unmodified master patterns, the master patterns and modified master patterns being stored before a bill under test is scanned by the identification system. When a bill under test is scanned by the identification system it is compared to one or more of the master patterns. If the identity of the bill can not be determined based on this comparison, the scanned pattern is compared with one or more of the modified master patterns. This process can be repeated, with the scanned pattern being compared to multiply modified master patterns if necessary.

According to another embodiment, a currency evaluation device is provided that is able to discriminate among bills of different denominations from two or more currency systems. In one embodiment, such a device is provided that is able to discriminate among both Canadian and German bills of different denominations. In one embodiment, such a device utilizes three scanheads when scanning Canadian bills and a single scanhead when scanning German bills. The device is able to accept faced Canadian and German bills fed in either the forward or reverse directions. According to one embodiment, the operator of the device pre-declares whether Canadian or German bills are to be discriminated. According to one embodiment the measured length of the narrow dimension of German bills is utilized in discriminating German bills. To accommodate for possible lateral shifting of bills relative to the scanhead, multiple German master patterns associated with laterally displaced scans are stored for some denominations. To accommodate for possible lateral shifting of bills relative to the scanheads, multiple Canadian patterns associated with laterally displaced scans are generated and averaged in generated stored Canadian master patterns. To compensate for problems associated with triggering scanning relative to the edge of a bill, multiple patterns are stored for both Canadian and German bills associated with both leading and lagging printed indicia.

In accordance with another embodiment of the present invention, a correlation technique is utilized whereby a scanned pattern generated from the green side of a test bill is correlated against stored green-side master patterns. If as a result of the green-side correlation, the denomination of the test bill can not be called, a scanned pattern generated from the black side of the test bill is correlated against stored black-side master patterns. More particularly, if the green-side correlation results in an indication that the test bill is a $20, $50, or $100 bill but not with sufficiently high certainty so as to permit calling the denomination of the test bill, then the black-side scanned pattern is correlated against one or more black-side master patterns, provided the best call green-side correlation number is greater than a predetermined threshold.

According to one embodiment, documents, including currency bills, are discriminated by comparing a scanned pattern retrieved from a first side of a test document with one or more stored master patterns retrieved from a first side of one or more genuine documents and comparing a scanned pattern retrieved from a second side of a test document with one or more stored master patterns retrieved from a second side of one or more genuine documents.

According to one embodiment a currency discriminator is provided that counts and discriminates bills as they pass a discriminating unit and that flags an unidentified bill or one having a predetermined characteristic, for example a bill having a specified orientation, by transferring the flagged bill to a location where it can be conveniently examined by an operator and then suspending the operation of the discriminator. The operator may then examine the bill and determine whether the bill is acceptable or not. Denomination selection elements such as keys are provided to enable the operator with the depression of a single button to indicate the denomination of an unidentified but acceptable bill, to cause the value of the bill to be reflected in any appropriate counters, and to cause the discriminator to resume operation. A continuation selection element is also provided to enable the operator to cause the discriminator to resume operation without adversely affecting any counters when an unidentified bill is determined to be unacceptable.

According to one embodiment of the present invention, a discriminator is provided with a single output receptacle in which all bills are stacked after they pass by the discriminating unit. When an unidentified bill is detected, the discriminator halts operation with the unidentified bill positioned at a predetermined location within the stack such as at the top or back of the stack of bills in the output receptacle or at a predetermined position just prior to the stack. The bill may then be conveniently examined by the operator.

According to another embodiment of the present invention, a discriminator is provided with an examining station where unidentified bills are transferred before the discriminator halts operation. Upon determination that a bill is acceptable, the bill may then be transferred to the output receptacle in a single output receptacle discriminator or to an output receptacle associated with the denomination or other characteristic of the bill in a multi-output receptacle discriminator. Additionally, a reject receptacle may be provided for receiving bills which are determined to be unacceptable.

In one embodiment, a discriminator is provided with two or more output receptacles. All flagged bills are delivered to a separate output receptacle while the discriminator continues to process any remaining bills. Alternatively, bills that are positively determined to be suspect bills may be delivered to one output receptacle, all other flagged bills may be delivered to a second output receptacle, and all unflagged and identified bills may be delivered to one or more additional output receptacles. In another embodiment, suspect bills are routed to a separate output receptacle while all other bills are routed to one or more additional output receptacles.

The discriminator, in another embodiment is designed to suspend operation upon encountering one or more types of flagged bills. For example, the discriminator may halt operation when a no call bill is detected but not when a suspect bill is detected, e.g., when suspect bills are routed to an output receptacle separate from the output receptacle or receptacles to which other bills are routed. According to another embodiment, the discriminator does not suspend its operation upon detecting a flagged bill but rather continues processing any remaining bills, e.g., when flagged bills are routed to one or more output receptacles separate from the output receptacle or receptacles to which non-flagged bills are delivered.

According to one embodiment, the value of any flagged bill such as a no call is reconciled on-the-fly, that is, at the time such bill is encountered. According to one such embodiment, the discriminator suspends operation until the value of the flagged bill is reconciled.

According to another embodiment, the value of any flagged bills is reconciled after all bills have been processed. Alternatively, the reconciliation process may begin before all bills have been processed but without suspending the processing of the remaining bills.

According to one embodiment, denomination indicating means are provided to permit the operator to indicate the value of a flagged bill such as a no call. Examples of denomination indicating means include, for example, denomination selection elements such as keys, buttons, switches, lights, and displayed keys, denominations, or messages. Such elements may be selected by, for example, pressing an appropriate one of such elements or using scroll keys. The selection of a denomination may cause that denomination to be indicated to the discriminator or, alternatively, a denomination may first have to be selected and then indicated to the discriminator by selecting an accept, yes, or enter key.

According to one embodiment, prompting means are provided whereby the discriminator is able to suggest a denomination to the operator of the discriminator in connection with a flagged bill such as no call. Examples of criteria used in prompting a denomination to the operator in connection with a flagged bill include suggesting a denomination or a sequence of denominations based on a default basis, random basis, user-defined basis, manufacturer defined basis, last bill information, last no call information, last called denomination information, historical information, comparison of scanned and reference information such as correlation information. Means for prompting a denomination may include, for example, displaying a message, highlighting or illuminating a denomination selection or indicating element or associated light.

According to another embodiment of the present invention, a discriminator discriminates a stack of bills and flags bills having a given forward/reverse orientation. Accordingly, when a stack of bills predominately oriented in the forward or reverse direction is discriminated by the discriminator, any bills oriented in the opposite forward/reverse direction may be flagged. Any flagged bills may either be removed without replacement or re-oriented in the appropriate forward or reverse direction. As a result, a stack of bills may be generated in which all bills have the same forward/reverse orientation. Alternatively, in a multi-output receptacle discriminator, instead of flagging bills based on their forward/reverse orientation, bills having a forward orientation may be routed to one output receptacle and those having a reverse orientation may be routed to another output receptacle.

Likewise a discriminator may flag or sort bills based on their face orientation, that is face up or face down, or bills not belonging to a given denomination. Furthermore, the above criteria may be combined in various operating modes of the discriminator.

In one embodiment, the discriminator optically scans an area of a bill and generates a scanned pattern from optical reflectance samples. A scanned pattern is compared with a plurality of master patterns associated with genuine bills of different denominations. Furthermore, the discriminator may store master patterns associated wish both forward and reverse scans and/or both top surface and bottom surface scans of genuine bills.

In one embodiment, a bill is scanned for first and second characteristic information, utilizing the first characteristic information to determine the denomination of a scanned bill, and using the second characteristic information to verify the genuineness of the bill. More particularly, a currency evaluation device, according to the present invention, comprises detection circuitry for detecting first and second characteristic information from a scanned bill, a memory for storing sets of genuine first and second characteristic information for a plurality of denominations of genuine bills, and signal processing means for comparing the detected first and second characteristic information with the stored genuine first and second characteristic information. The signal processing means performs a first comparison whereby the detected first characteristic information is compared with the stored sets of genuine first characteristic information. This first comparison results in either an indication of the denomination of the scanned bill or an error. The results of the first comparison are used to streamline a second comparison between detected and stored second characteristic information. The second comparison compares the detected second characteristic information with stored genuine second characteristic information corresponding to the denomination indicated by the first comparison. The second comparison results in either an indication of the genuineness of the scanned bill or an error.

According to one embodiment of the present invention, a document to be authenticated is illuminated with ultraviolet light and the amount of ultraviolet light which is reflected off the document is measured. Based on the amount of ultraviolet light which is detected, the document is either authenticated or rejected. In the case of documents being authenticated relative to United States currency, a bill is rejected if a high level of reflected ultraviolet light is not detected.

In another embodiment, the above objectives are achieved by illuminating a document with ultraviolet light and measuring both the amount of reflected ultraviolet light and the amount of emitted visible light. Based on the amount of ultraviolet light detected and the amount of visible light detected, a document is either authenticated or rejected. In the case of documents being authenticated relative to United States currency, a bill is rejected if either a high level of reflected ultraviolet light is not detected or even a low level of visible light is detected.

As explained above, it is known that some counterfeit United States bills fluoresce, or emit visible light, when illuminated by ultraviolet light. As genuine United States currency does not fluoresce, the emission of visible light has been employed as a means of detecting counterfeit United States currency. However, it has been found that not all counterfeit United States bills fluoresce; and hence, such counterfeits will not be detected by the above described fluorescence test.

It has been found that genuine United States currency reflects a high level of ultraviolet light when illuminated by an ultraviolet light source. It has also been found that some counterfeit United States bills do not reflect a high level of ultraviolet light. Such counterfeit bills may or may not also fluoresce under ultraviolet light. The present invention employs an authentication test wherein the amount of reflected ultraviolet light is measured and a bill is rejected if it does not reflect a high amount of ultraviolet light. By employing such a test, counterfeit United States bills which do not reflect a high level of ultraviolet light may be properly rejected.

While not all counterfeit United States bills fail to reflect a high level of ultraviolet light and hence not all counterfeit United States bills will be detected using this test, the present invention provides an additional means for detecting counterfeit bills which might otherwise go undetected. Furthermore, the likelihood of a counterfeit United States bill going undetected may be further reduced by employing an alternative embodiment of the present invention wherein both the amount of reflected ultraviolet light and the amount of emitted visible light are measured. In such a system, a bill is rejected as counterfeit if either it fails to reflect a high level of ultraviolet light or it fluoresces.

The above described embodiments may be adapted to authenticate currencies from other countries and other types of documents such as food stamps and checks. For instance some genuine documents may be designed to reflect ultraviolet light only in certain locations and/or in a predetermined pattern. An alternative embodiment of the present invention may be designed to accept documents which exhibit similar characteristics while rejecting those which do not. Likewise, an alternative embodiment of the present invention may be employed to authenticate documents based on both their characteristics with respect to reflected ultraviolet light and their characteristics with respect to fluorescent emissions, e.g., detecting the amount, location, and/or pattern of fluorescent emissions.

DETAILED DESCRIPTION OF THE EMBODIMENTS

Figure 1:
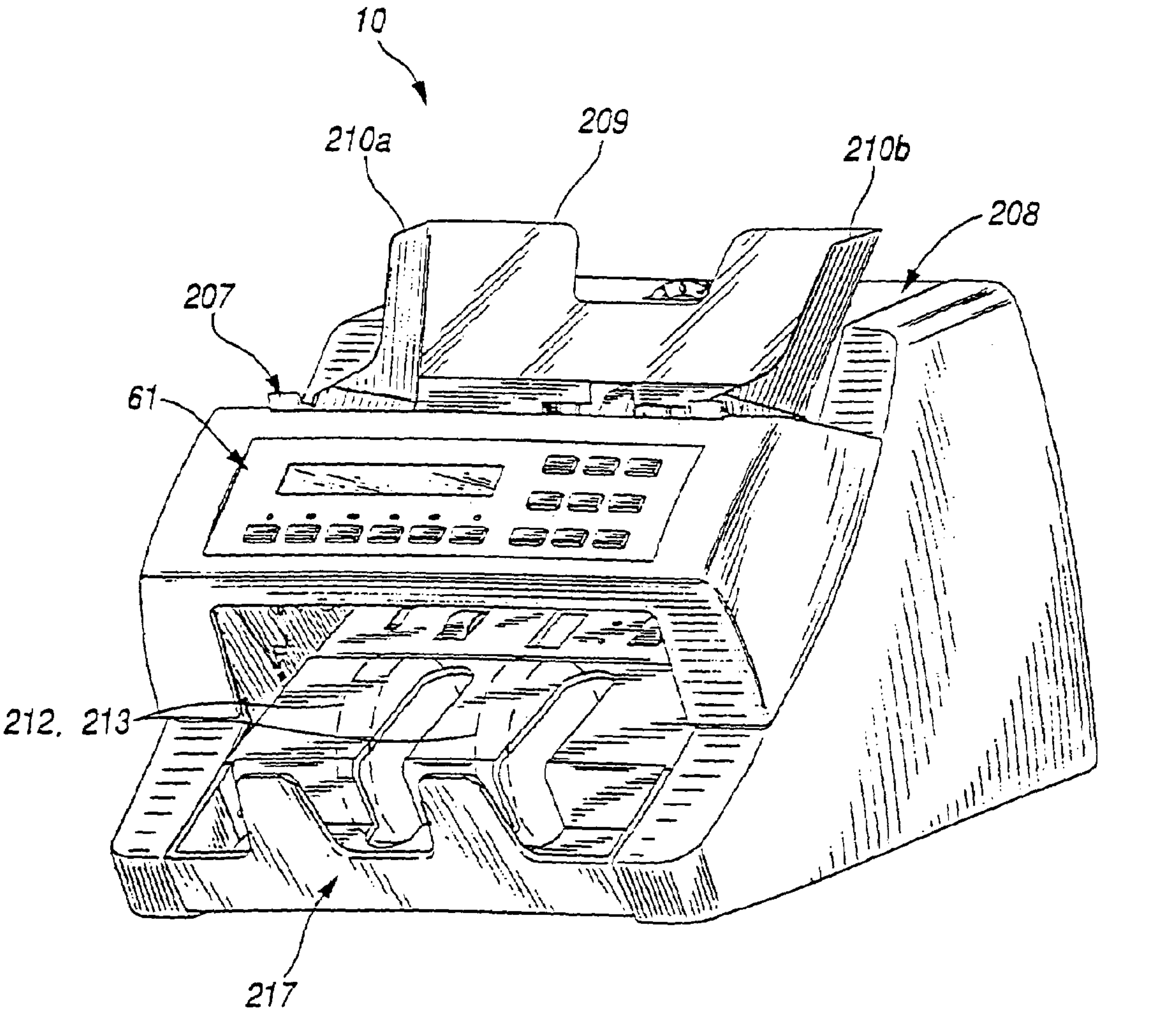
FIG. 1 is a perspective view of a currency scanning and counting machine embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

According to one embodiment of the present invention, a currency discrimination system adapted to U.S. currency is described in connection with, for example, FIGS. 1–38. Subsequently, modifications to such a discrimination system will be described in obtaining a currency discrimination system in accordance with other embodiments of the present invention, such a currency discriminator systems having multiple scanheads per side. Furthermore, while the embodiments below entail the scanning of currency bills, the system of the present invention is applicable to other documents as well. For example, the system of the present invention may be employed in conjunction with stock certificates, bonds, and postage and food stamps.

Figure 2A:
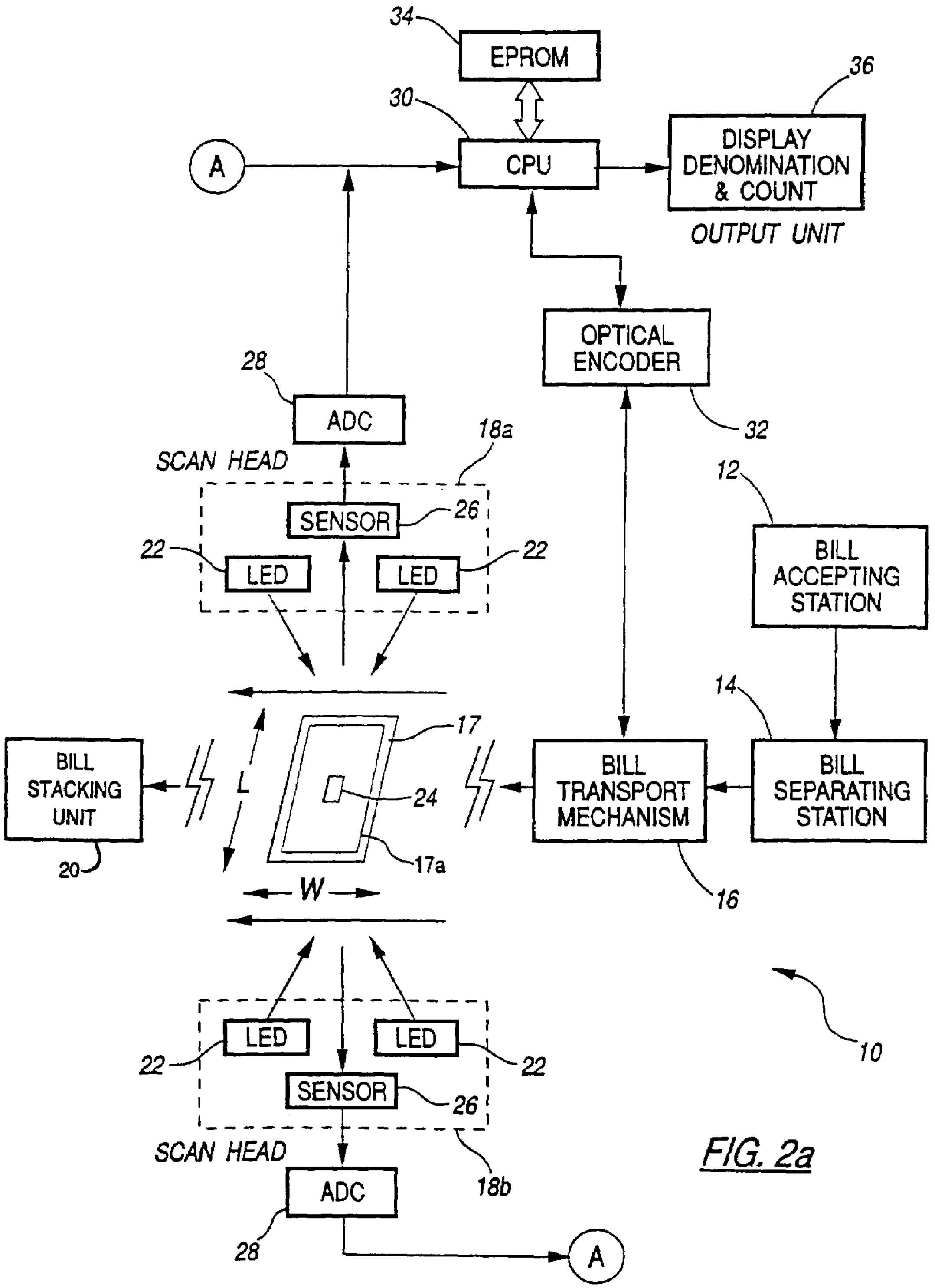
FIG. 2*a* is a functional block diagram of the currency scanning and counting machine of FIG. 1 illustrating a scanhead arranged on each side of a transport path.

Referring now to FIGS. 1 and 2*a*, there is shown one embodiment of a currency scanning and counting machine 10 according to the present invention. The machine 10 includes an input receptacle or bill accepting station 12 where stacks of currency bills that need to be identified and counted are positioned. Bills in the input receptacle are acted upon by a bill separating station 14 which functions to pick out or separate one bill at a time for being sequentially relayed by a bill transport mechanism 16 (FIG. 2*a*), according to a precisely predetermined transport path, between a pair of scanheads 18*a*, 18*b* where the currency denomination of the bill is scanned and identified. In one embodiment, bills are scanned and identified at a rate in excess of 800 bills per minute. In the embodiment depicted, each scanhead 18*a*, 18*b* is an optical scanhead that scans for characteristic information from a scanned bill 17 which is used to identify the denomination of the bill. The scanned bill 17 is then transported to an output receptacle or bill stacking station 20 where bills so processed are stacked for subsequent removal.

Each optical scanhead 18*a*, 18*b* preferably comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a central processing unit (CPU) 30.

While scanheads 18*a*, 18*b* of FIG. 2*a* are optical scanheads, it should be understood that it may be designed to detect a variety of characteristic information from currency bills. Additionally, the scanhead may employ a variety of detection means such as magnetic, optical, electrical conductivity, and capacitive sensors. Use of such sensors is discussed in more detail below (see e.g., FIG. 2*d*).

Referring again to FIG. 2*a*, the bill transport path is defined in such a way that the transport mechanism 16 moves currency bills with the narrow dimension of the bills being parallel to the transport path and the scan direction. Alternatively, the system 10 may be designed to scan bills along their long dimension or along a skewed dimension. As a bill 17 traverses the scanheads 18*a*, 18*b*, the coherent light strip 24 effectively scans the bill across the narrow dimension of the bill. In the embodiment depicted, the transport path is so arranged that a currency bill 17 is scanned across a central section of the bill along its narrow dimension, as shown in FIG. 2*a*. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations.

In order to ensure strict correspondence between reflectance samples obtained by narrow dimension scanning of successive bills, the reflectance sampling process is preferably controlled through the CPU 30 by means of an optical encoder 32 which is linked to the bill transport mechanism 16 and precisely tracks the physical movement of the bill 17 between the scanheads 18*a*, 18*b*. More specifically, the optical encoder 32 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18*a*, 18*b* by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17*a* which typically encloses the printed indicia on currency bills. Once the borderline 17*a* has been detected, the optical encoder 32 is used to control the timing and number of reflectance samples that are obtained from the outputs of the photodetectors 26 as the bill 17 moves across the scanheads.

Figure 2B:
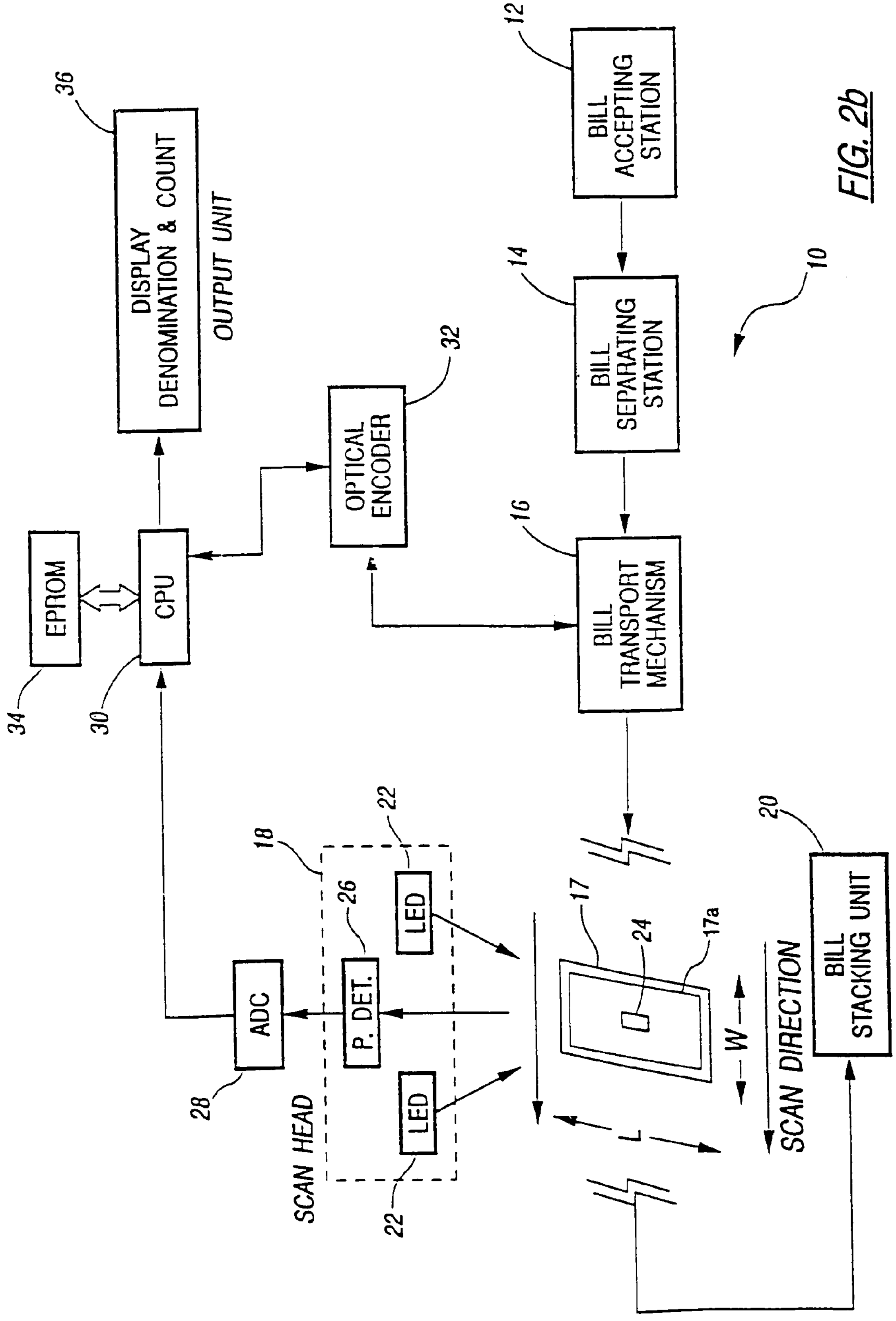
FIG. 2*b* is a functional block diagram of the currency scanning and counting machine illustrating a scanhead arranged on a single side of a transport path.

FIG. 2*b* illustrates one embodiment of a currency scanning and counting machine 10 similar to that of FIG. 2*a* but having a scanhead on only a single side of the transport path.

Figure 2C:
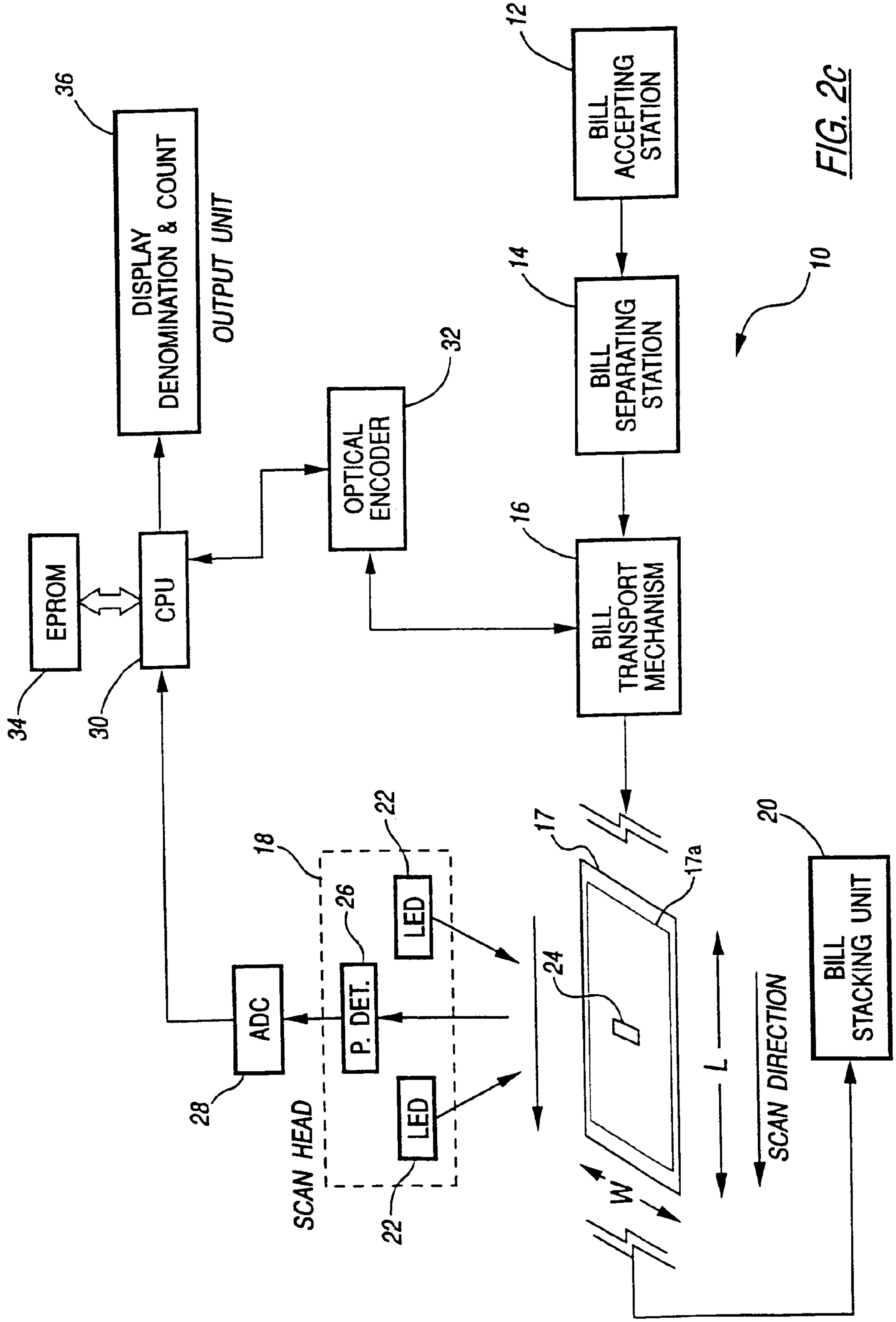
FIG. 2*c* is a functional block diagram of the currency scanning and counting machine similar to that of FIG. 2*b* but illustrating the feeding and scanning of bills along their wide direction.

FIG. 2*c* illustrates one embodiment of a currency scanning and counting machine 10 similar to that of FIG. 2*b* but illustrating feeding and scanning of bills along their wide direction.

Figure 4A:
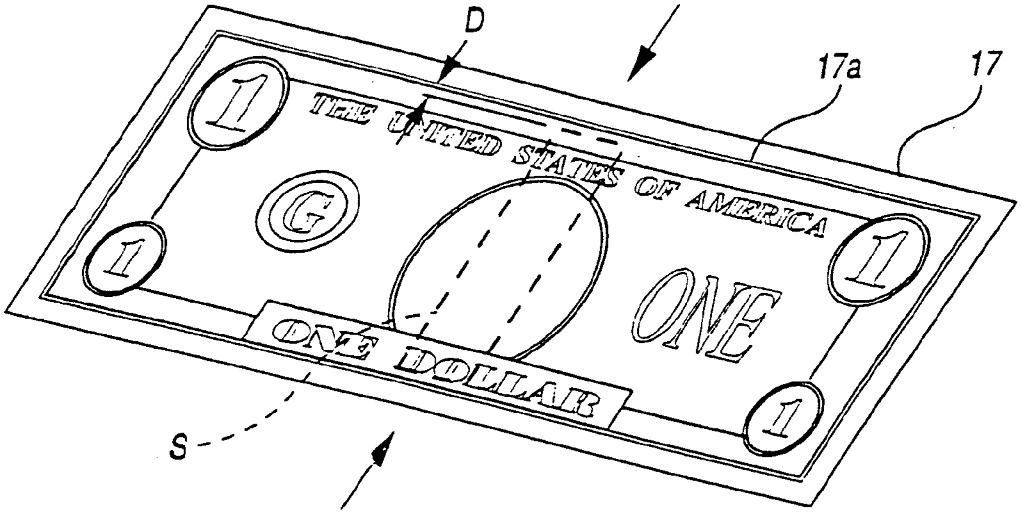
FIGS. 4*a* and 4*b* are perspective views of a bill and one area to be optically scanned on the bill.
Figure 4B:
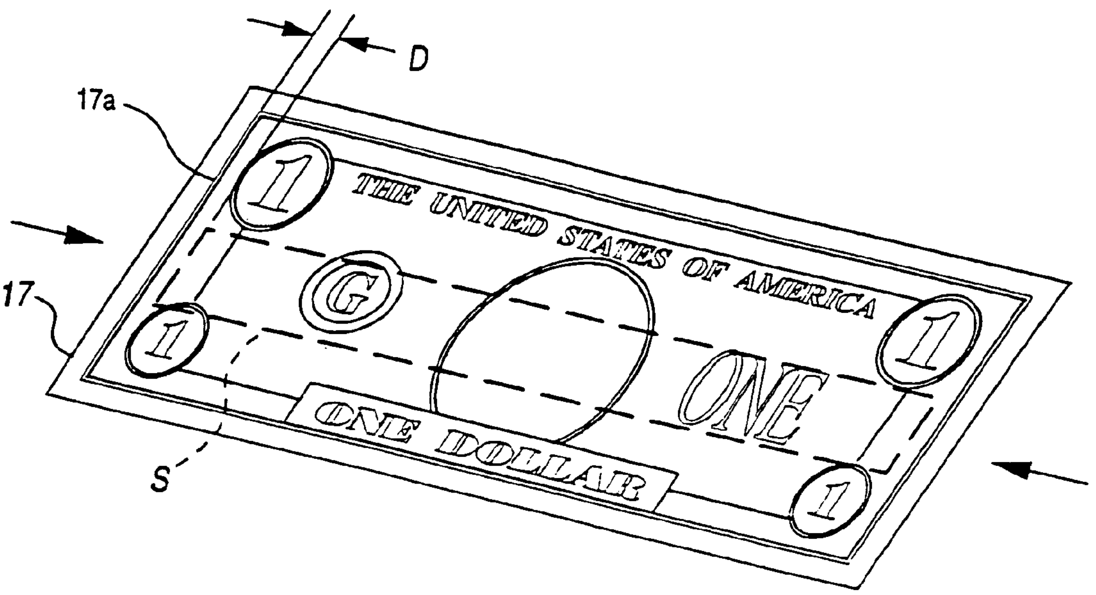

As illustrated in FIGS. 2*b*–2*c*, the transport mechanism 16 moves currency bills with a preselected one of their two dimensions (narrow or wide) being parallel to the transport path and the scan direction. FIGS. 2*b* and 4*a* illustrate bills oriented with their narrow dimension "W" parallel to the direction of movement and scanning while FIGS. 2*c* and 4*b* illustrate bills oriented with their wide dimension "L" parallel to the direction of movement and scanning.

Figure 2D:
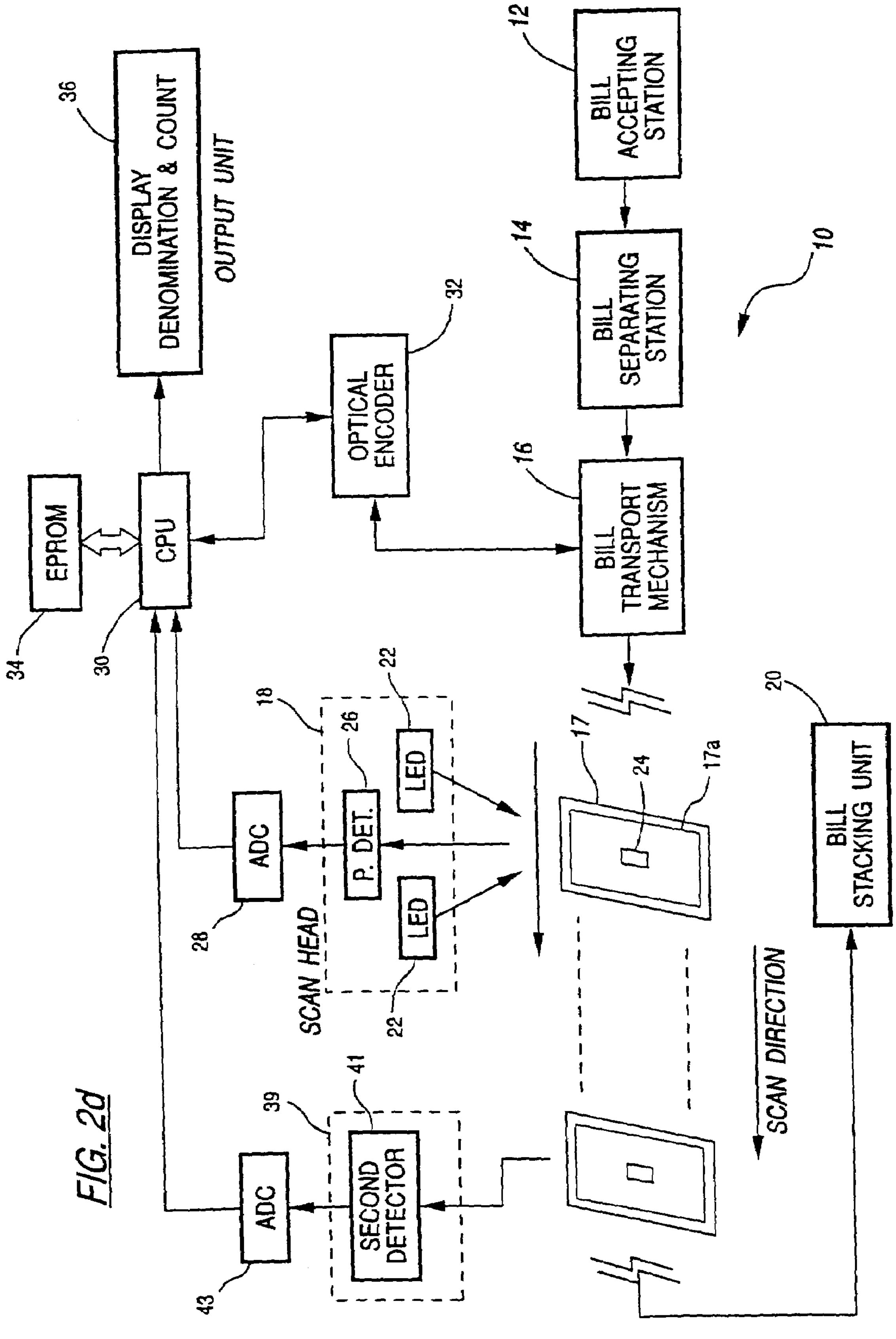
FIG. 2*d* is a functional block diagram of the currency scanning and counting machine similar to that of FIGS. 2*a*–2*d* illustrating the employment of a second characteristic detector.

Referring now to FIG. 2*d*, there is shown a functional block diagram illustrating one embodiment of a currency discriminating and authenticating system according to the present invention. The operation of the system of FIG. 2*d* is the same as that of FIG. 2*a* except as modified below. The system 10 includes a bill accepting station 12 where stacks of currency bills that need to be identified, authenticated, and counted are positioned. Accepted bills are acted upon by a bill separating station 14 which functions to pick out or separate one bill at a time for being sequentially relayed by a bill transport mechanism 16, according to a precisely predetermined transport path, across two scanheads 18 and 39 where the currency denomination of the bill is identified and the genuineness of the bill is authenticated. In the embodiment depicted, scanhead 18 is an optical scanhead that scans for a first type of characteristic information from a scanned bill 17 which is used to identify the bill's denomination. A second scanhead 39 scans for a second type of characteristic information from the scanned bill 17. While in the illustrated embodiment scanheads 18 and 39 are separate and distinct, it is understood that these may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992,860 incorporated herein by reference). The scanned bill is then transported to a bill stacking station 20 where bills so processed are stacked for subsequent removal.

The optical scanhead 18 of the embodiment depicted in FIG. 2*d* comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly above the strip. The analog output of photodetector 26 is converted into a digital signal by means of an analog-to-digital (ADC) convertor unit 28 whose output is fed as a digital input to a central processing unit (CPU) 30.

The second scanhead 39 comprises at least one detector 41 for sensing a second type of characteristic information from a bill. The analog output of the detector 41 is converted into a digital signal by means of a second analog to digital converter 43 whose output is also fed as a digital input to the central processing unit (CPU) 30.

While scanhead 18 in the embodiment of FIG. 2*d* is an optical scanhead, it should be understood that the first and second scanheads 18 and 39 may be designed to detect a variety of characteristic information from currency bills. Additionally these scanheads may employ a variety of detection means such as magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regards to optical sensing, a variety of currency characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364).

In addition to magnetic and optical sensing, other techniques of detecting characteristic information of currency include electrical conductivity sensing, capacitive sensing (U.S. Pat. No. 5,122,754 [watermark, security thread]; 3,764,899 [thickness]; 3,815,021 [dielectric properties]; 5,151,607 [security thread]), and mechanical sensing (U.S. Pat. No. 4,381,447 [limpness]; 4,255,651 [thickness]).

According to one embodiment, the detection of the borderline 17*a* constitutes an important step and realizes improved discrimination efficiency in systems designed to accommodate U.S. currency since the borderline 17*a* serves as an absolute reference point for initiation of sampling. If the edge of a bill were to be used as a reference point, relative displacement of sampling points can occur because of the random manner in which the distance from the edge to the borderline 17*a* varies from bill to bill due to the relatively large range of tolerances permitted during printing and cutting of currency bills. As a result, it becomes difficult to establish direct correspondence between sample points in successive bill scans and the discrimination efficiency is adversely affected. Accordingly, the modified pattern generation method of the present invention (to be discussed below) is especially important in discrimination systems designed to accommodate bills other than U.S. currency because many non-U.S. bills lack a borderline around the printed indicia on their bills. Likewise, the modified pattern generation method of the present invention is especially important in discrimination systems designed to accommodate bills other than U.S. currency because the printed indicia of many non-U.S. bills lack sharply defined edges which in turns inhibits using the edge of the printed indicia of a bill as a trigger for the initiation of the scanning process and instead promotes reliance on using the edge of the bill itself as the trigger for the initiation of the scanning process.

The use of the optical encoder 32 for controlling the sampling process relative to the physical movement of a bill 17 across the scanheads 18*a*, 18*b* is also advantageous in that the encoder 32 can be used to provide a predetermined delay following detection of the borderline 17*a* prior to initiation of samples. The encoder delay can be adjusted in such a way that the bill 17 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations. Accordingly, the optical encoder can be used to control the scanning process so that reflectance samples are taken for a set period of time and only after a certain period of time has elapsed after the borderline 17*a* is detected, thereby restricting the scanning to the desired central portion of the narrow dimension of the bill.

FIGS. 3–5*b* illustrate the scanning process in more detail. Referring to FIG. 4*a*, as a bill 17 is advanced in a direction parallel to the narrow edges of the bill, scanning via a slit in the scanhead 18*a* or 18*b* is effected along a segment S of the central portion of the bill 17. This segment S begins a fixed distance D inboard of the borderline 17*a*. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead. FIG. 4*b* is similar to FIG. 4*a* but illustrating scanning along the wide dimension of the bill 17.

Figure 3:
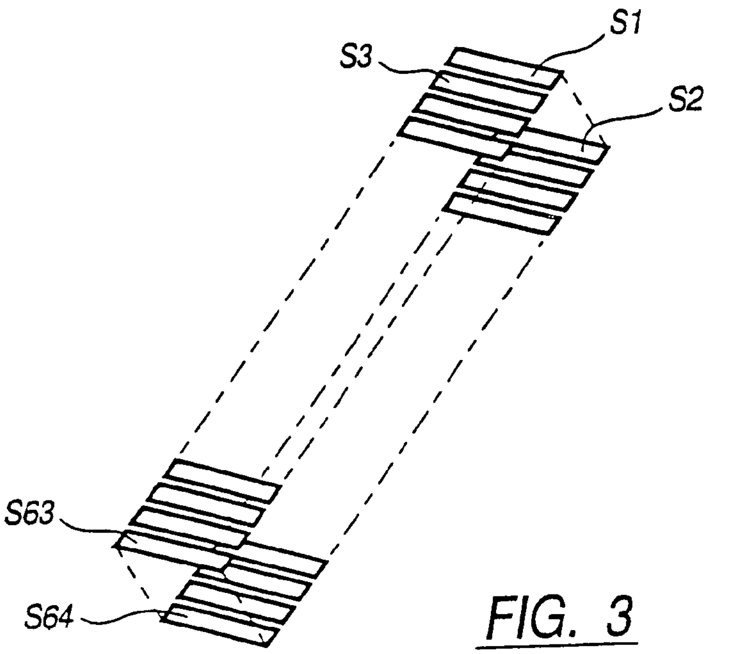
FIG. 3 is a diagrammatic perspective illustration of the successive areas scanned during the traversing movement of a single bill across an optical sensor according to one embodiment of the present invention.
Figure 5A:
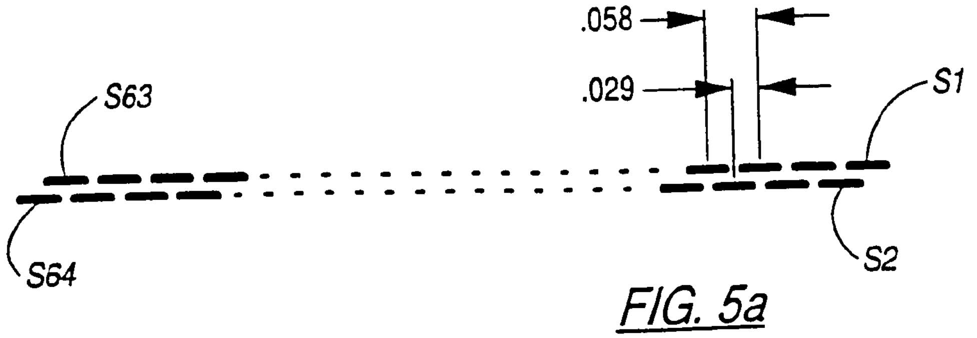
FIGS. 5*a* and 5*b* are diagrammatic side elevation views of the scan area to be optically scanned on a bill according to embodiments of the present invention.
Figure 5B:
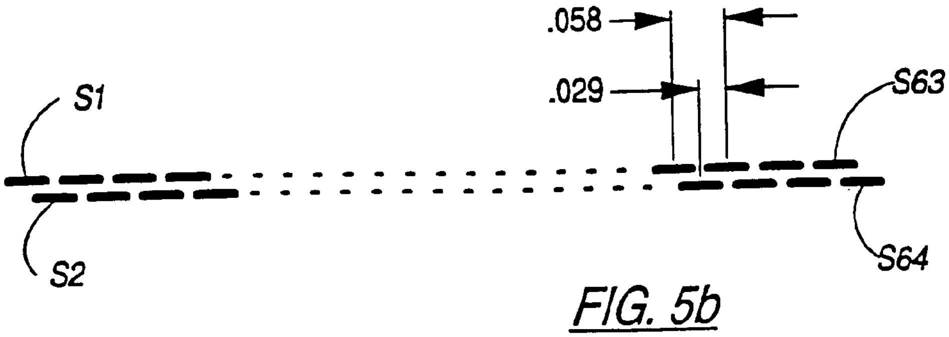

As illustrated in FIGS. 3, 5*a*, and 5*b*, it is preferred that the sampling intervals be selected so that the strips s that are illuminated for successive samples overlap one another. The odd-numbered and even-numbered sample strips have been separated in FIGS. 3, 5*a*, and 5*b* to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

Figure 6A:
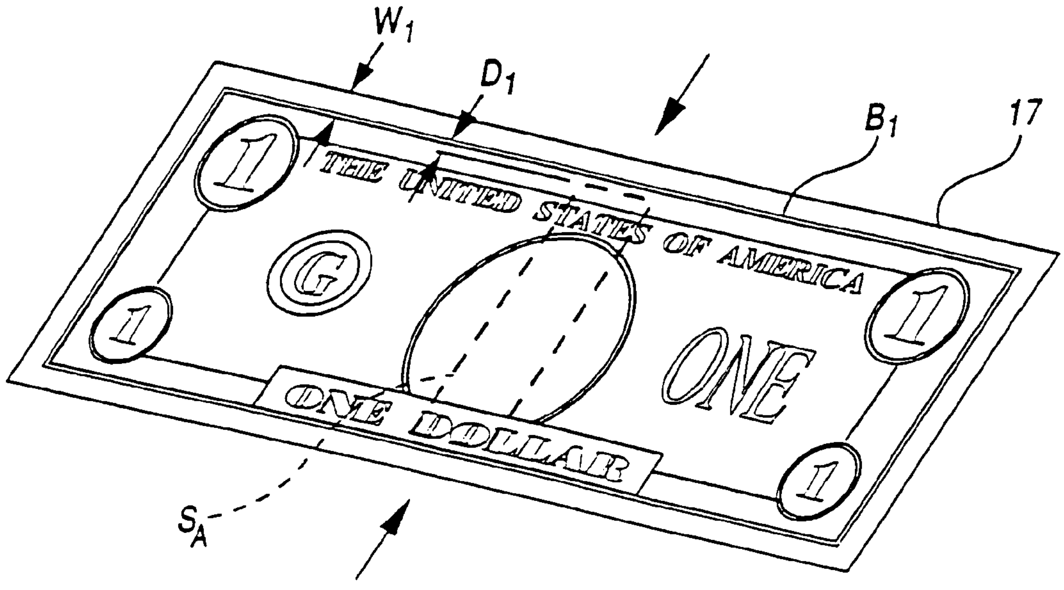
FIG. 6*a* is a perspective view of a bill showing the preferred area of a first surface to be scanned by one of the two scanheads employed in one embodiment of the present invention.
Figure 6B:
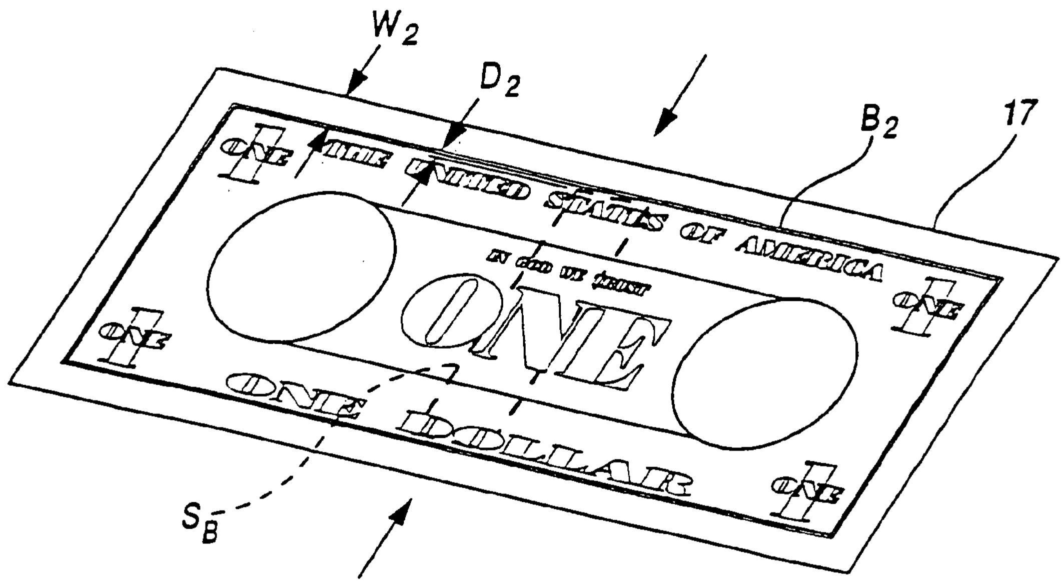
FIG. 6*b* is another perspective view of the bill in FIG. 6*a* showing the preferred area of a second surface to be scanned by the other of the scanheads employed in one embodiment of the present invention.

FIGS. 6*a* and 6*b* illustrate two opposing surfaces of U.S. bills. The printed pattern on the black and green surfaces of the bill are each enclosed by respective thin borderlines $B_1$ and $B_2$. As a bill is advanced in a direction parallel to the narrow edges of the bill, scanning via the wide slit of one of the scanheads is effected along a segment $S_A$ of the central portion of the black surface of the bill (FIG. 6*a*). As previously stated, the orientation of the bill along the transport path determines whether the upper or lower scanhead scans the black surface of the bill. This segment $S_A$ begins a fixed distance $D_1$ inboard of the borderline $B_1$, which is located a distance $W_1$ from the edge of the bill. The scanning along segment $S_A$ is as describe in connection with FIGS. 3, 4*a*, and 5*a*.

Similarly, the other of the two scanheads scans a segment $S_B$ of the central portion of the green surface of the bill (FIG. 6*b*). The orientation of the bill along the transport path determines whether the upper or lower scanhead scans the green surface of the bill. This segment $S_B$ begins a fixed distance $D_2$ inboard of the border line $B_2$, which is located a distance $W_2$ from the edge of the bill. For U.S. currency, the distance $W_2$ on the green surface is greater than the distance $W_1$ on the black surface. It is this feature of U.S. currency which permits one to determine the orientation of the bill relative to the upper and lower scanheads 18, thereby permitting one to select only the data samples corresponding to the green surface for correlation to the master characteristic patterns in the EPROM 34. The scanning along segment $S_B$ is as describe in connection with FIGS. 3, 4*a*, and 5*a*.

Figure 6C:
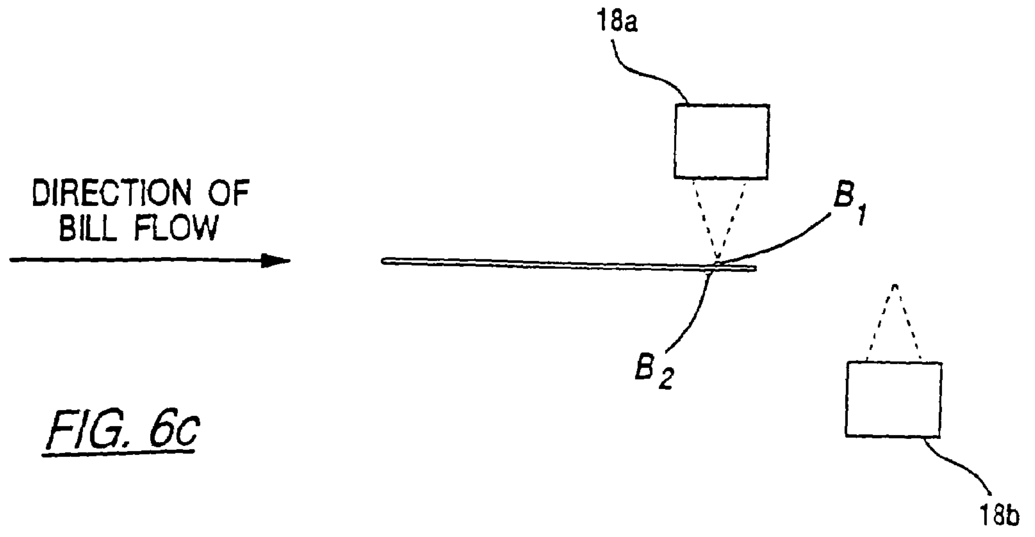
FIG. 6*c* is a side elevation showing the first surface of a bill scanned by an upper scanhead and the second surface of the bill scanned by a lower scanhead.
Figure 6D:
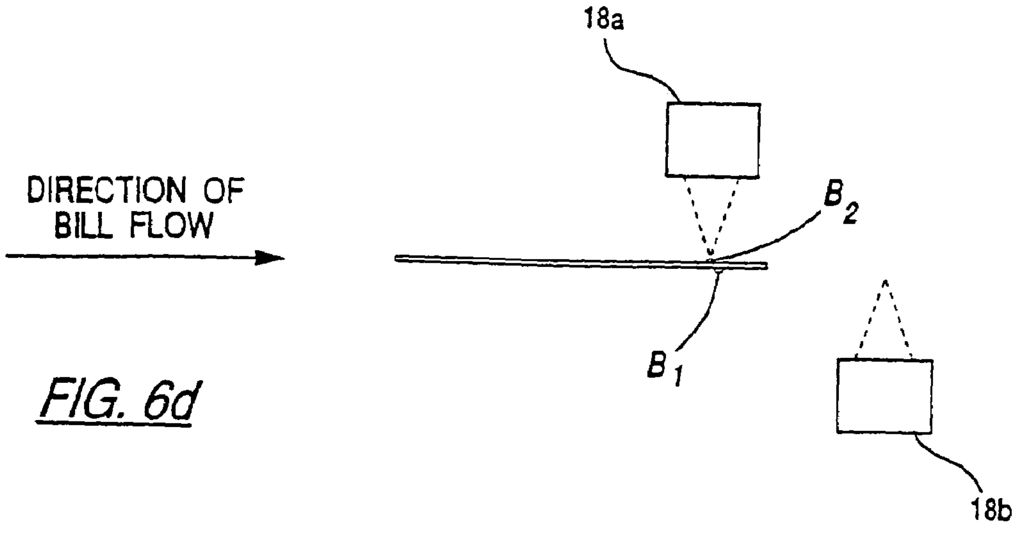
FIG. 6*d* is a side elevation showing the first surface of a bill scanned by a lower scanhead and the second surface of the bill scanned by an upper scanhead.

FIGS. 6*c* and 6*d* are side elevations of FIG. 2*a* according to one embodiment of the present invention. FIG. 6*c* shows the first surface of a bill scanned by an upper scanhead and the second surface of the bill scanned by a lower scanhead while FIG. 6*d* shows the first surface of a bill scanned by a lower scanhead and the second surface of the bill scanned by an upper scanhead. FIGS. 6*c* and 6*d* illustrate the pair of optical scanheads 18*a*, 18*b* are disposed on opposite sides of the transport path to permit optical scanning of both opposing surfaces of a bill. With respect to United States currency, these opposing surfaces correspond to the black and green surfaces of a bill. One of the optical scanheads 18 (the "upper" scanhead 18*a* in FIGS. 6*c*–6*d*) is positioned above the transport path and illuminates a light strip upon a first surface of the bill, while the other of the optical scanheads 18 (the "lower" scanhead 18*b* in FIGS. 6*c*–6*d*) is positioned below the transport path and illuminates a light strip upon the second surface of the bill. The surface of the bill scanned by each scanhead 18 is determined by the orientation of the bill relative to the scanheads 18. The upper scanhead 18*a* is located slightly upstream relative to the lower scanhead 18*b*.

The photodetector of the upper scanhead 18*a* produces a first analog output corresponding to the first surface of the bill, while the photodetector of the lower scanhead 18*b* produces a second analog output corresponding to the second surface of the bill. The first and second analog outputs are converted into respective first and second digital outputs by means of respective analog-to-digital (ADC) convertor units 28 whose outputs are fed as digital inputs to a central processing unit (CPU) 30. As described in detail below, the CPU 30 uses the sequence of operations illustrated in FIG. 12 to determine which of the first and second digital outputs corresponds to the green surface of the bill, and then selects the "green" digital output for subsequent correlation to a series of master characteristic patterns stored in EPROM 34. According to one embodiment, as explained below, the master characteristic patterns are generated by performing scans on the green surfaces, not black surfaces, of bills of different denominations. According to one embodiment, the analog output corresponding to the black surface of the bill is not used for subsequent correlation.

The optical sensing and correlation technique is based upon using the above process to generate a series of stored intensity signal patterns using genuine bills for each denomination of currency that is to be detected. According to one embodiment, two or four sets of master intensity signal samples are generated and stored within the system memory, preferably in the form of an EPROM 34 (see FIG. 2*a*), for each detectable currency denomination. According to one embodiment these are sets of master green-surface intensity signal samples. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2, the $10 and/or the $100 bills in U.S. currency, it is preferred to store two green-side patterns for each of the "forward" and "reverse" directions, each pair of patterns for the same direction represent two scan areas that are slightly displaced from each other along the long dimension of the bill. Accordingly, a set of 16 [or 18] different green-side master characteristic patterns are stored within the EPROM for subsequent correlation purposes (four master patterns for the $10 bill [or four master patterns for the $10 bill and the $2 bill and/or the $100 bill] and two master patterns for each of the other denominations). The generation of the master patterns is discussed in more below. Once the master patterns have been stored, the pattern generated by scanning a bill under test is compared by the CPU 30 with each of the 16 [or 18] master patterns of stored intensity signal samples to generate, for each comparison, a correlation number representing the extent of correlation, i.e., similarity between corresponding ones of the plurality of data samples, for the sets of data being compared.

According to one embodiment, in addition to the above set of 18 original green-side master patterns, five more sets of green-side master patterns are stored in memory. These sets are explained more fully in conjunction with FIGS. 18*a* and 18*b* below.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. If a "positive" call can not be made for a scanned bill, an error signal is generated.

According to one embodiment, master patterns are also stored for selected denominations corresponding to scans along the black side of U.S. bills. More particularly, according to one embodiment, multiple black-side master patterns are stored for $20, $50 and $100 bills. For each of these denominations, three master patterns are stored for scans in the forward and reverse directions for a total of six patterns for each denomination. For a given scan direction, black-side master patterns are generated by scanning a corresponding denominated bill along a segment located about the center of the narrow dimension of the bill, a segment slightly displaced (0.2 inches) to the left of center, and a segment slightly displaced (0.2 inches) to the right of center. When the scanned pattern generated from the green side of a test bill fails to sufficiently correlate with one of the green-side master patterns, the scanned pattern generated from the black side of a test bill is then compared to black-side master patterns in some situations as described in more detail below in conjunction with FIGS. 19*a*–19*c*.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 (FIG. 2*a* and FIG. 2*b*) which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Referring again to the embodiment depicted in FIG. 2*d*, as a result of the first comparison described above based on the reflected light intensity information retrieved by scanhead 18, the CPU 30 will have either determined the denomination of the scanned bill 17 or determined that the first scanned signal samples fail to sufficiently correlate with any of the sets of stored intensity signal samples in which case an error is generated. Provided that an error has not been generated as a result of this first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 39. The scanning and processing by scanhead 39 may be controlled in a manner similar to that described above with regard to scanhead 18.

In addition to the sets of stored first characteristic information, in this example stored intensity signal samples, the EPROM 34 stores sets of stored second characteristic information for genuine bills of the different denominations which the system 10 is capable of handling. Based on the denomination indicated by the first comparison, the CPU 30 retrieves the set or sets of stored second characteristic data for a genuine bill of the denomination so indicated and compares the retrieved information with the scanned second characteristic information. If sufficient correlation exists between the retrieved information and the scanned information, the CPU 30 verifies the genuineness of the scanned bill 17. Otherwise, the CPU generates an error. While the embodiment illustrated in FIG. 2*d* depicts a single CPU 30 for making comparisons of first and second characteristic information and a single EPROM 34 for storing first and second characteristic information, it is understood that two or more CPUs and/or EPROMs could be used, including one CPU for making first characteristic information comparisons and a second CPU for making second characteristic information comparisons. Using the above sensing and correlation approach, the CPU 30 is programmed to count the number of bills belonging to a particular currency denomination whose genuineness has been verified as part of a given set of bills that have been scanned for a given scan batch, and to determine the aggregate total of the currency amount represented by the bills scanned during a scan batch.

Figure 7A:
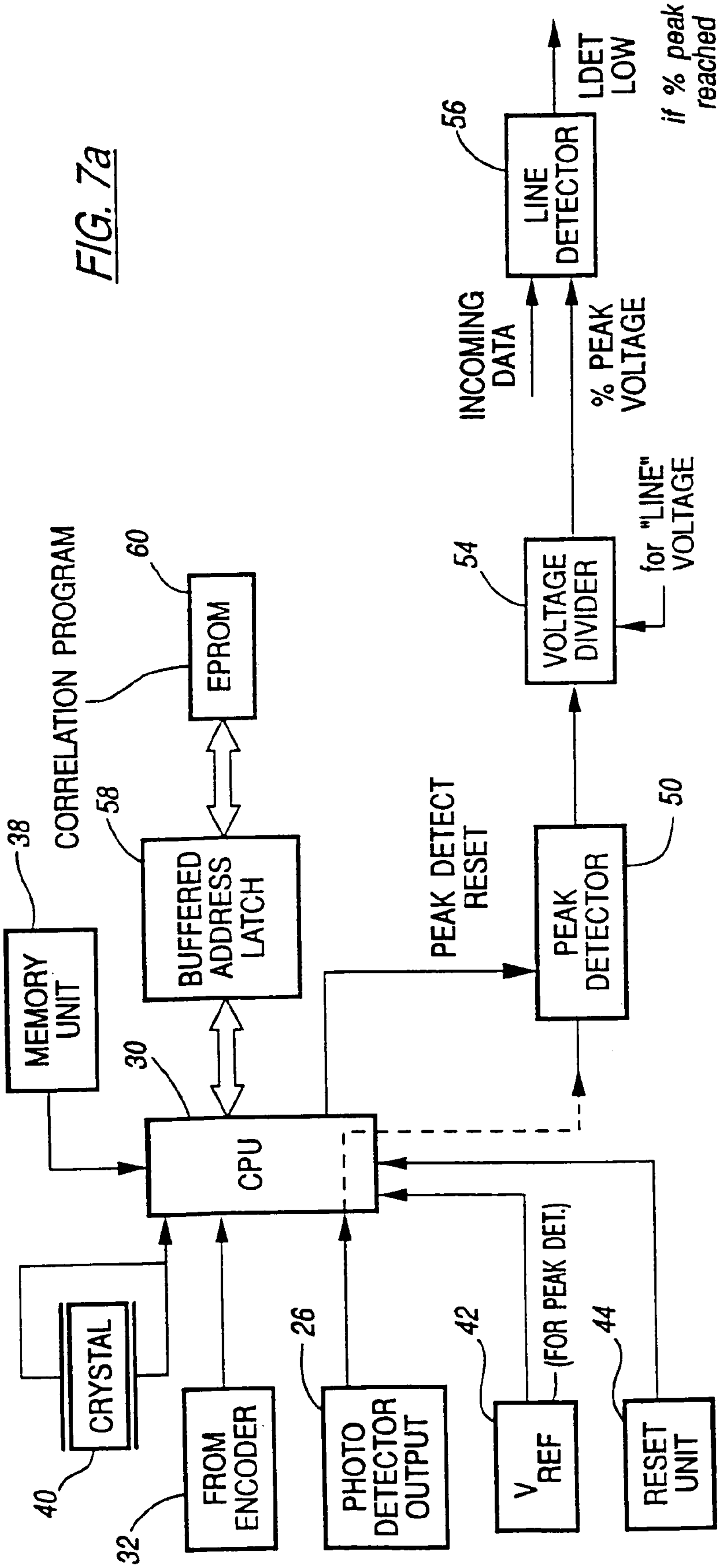
FIGS. 7*a* and 7*b* form a block diagram illustrating one circuit arrangement for processing and correlating reflectance data according to the optical sensing and counting technique of this invention.
Figure 7B:
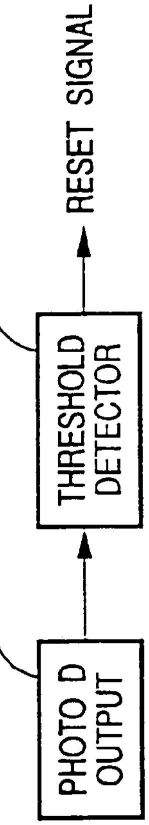

Referring now to FIGS. 7*a* and 7*b*, there is shown a representation, in block diagram form, of one circuit arrangement for processing and correlating reflectance data according to the system of this invention. The CPU 30 accepts and processes a variety of input signals including those from the optical encoder 32, the sensor 26 and the erasable programmable read only memory (EPROM) 60. The EPROM 60 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ 42 on the basis of which peak detection of sensed reflectance data is performed.

According to one embodiment, the CPU 30 also accepts a timer reset signal from a reset unit 44 which, as shown in FIG. 7*b*, accepts the output voltage from the photodetector 26 and compares it, by means of a threshold detector 44*a*, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 2*a*) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

The machine-direction dimension, that is, the dimension parallel to the direction of bill movement, of the illuminated strip of light produced by the light sources within the scanhead is set to be relatively small for the initial stage of the scan when the thin borderline is being detected, according to one embodiment. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples at a rapid rate. The use of a wider slit for the actual sampling also smooths out the output characteristics of the photodetector and realizes the relatively large magnitude of analog voltage which is essential for accurate representation and processing of the detected reflectance values.

The CPU 30 processes the output of the sensor 26 through a peak detector 50 which essentially functions to sample the sensor output voltage and hold the highest, i.e., peak, voltage value encountered after the detector has been enabled. For U.S. currency, the peak detector is also adapted to define a scaled voltage on the basis of which the printed borderline on the currency bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_S$ is set to be about 70–80 percent of the peak voltage.

The scaled voltage $V_S$ is supplied to a line detector 56 which is also provided with the incoming instantaneous output of the sensor 26. The line detector 56 compares the two voltages at its input side and generates a signal $L_{DET}$ which normally stays "low" and goes "high" when the edge of the bill is scanned. The signal $L_{DET}$ goes "low" when the incoming sensor output reaches the pre-defined percentage of the peak output up to that point, as represented by the voltage VS. Thus, when the signal $L_{DET}$ goes "low", it is an indication that the borderline of the bill pattern has been detected. At this point, the CPU 30 initiates the actual reflectance sampling under control of the encoder 32 and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is preferably an EPROM. During currency discrimination, the reflectance values resulting from the scanning of a test bill are sequentially compared, under control of the correlation program stored within the EPROM 60, with the corresponding master characteristic patterns stored within the EPROM 60. A pattern averaging procedure for scanning bills and generating characteristic patterns is described below in connection with FIGS. 15*a*–15*e*.

In addition to the optical scanheads, the bill-scanning system (e.g., FIGS. 2*a*–2*d*) preferably includes a magnetic scanhead. A variety of currency characteristics can be measured using magnetic scanning. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

Figure 8A:
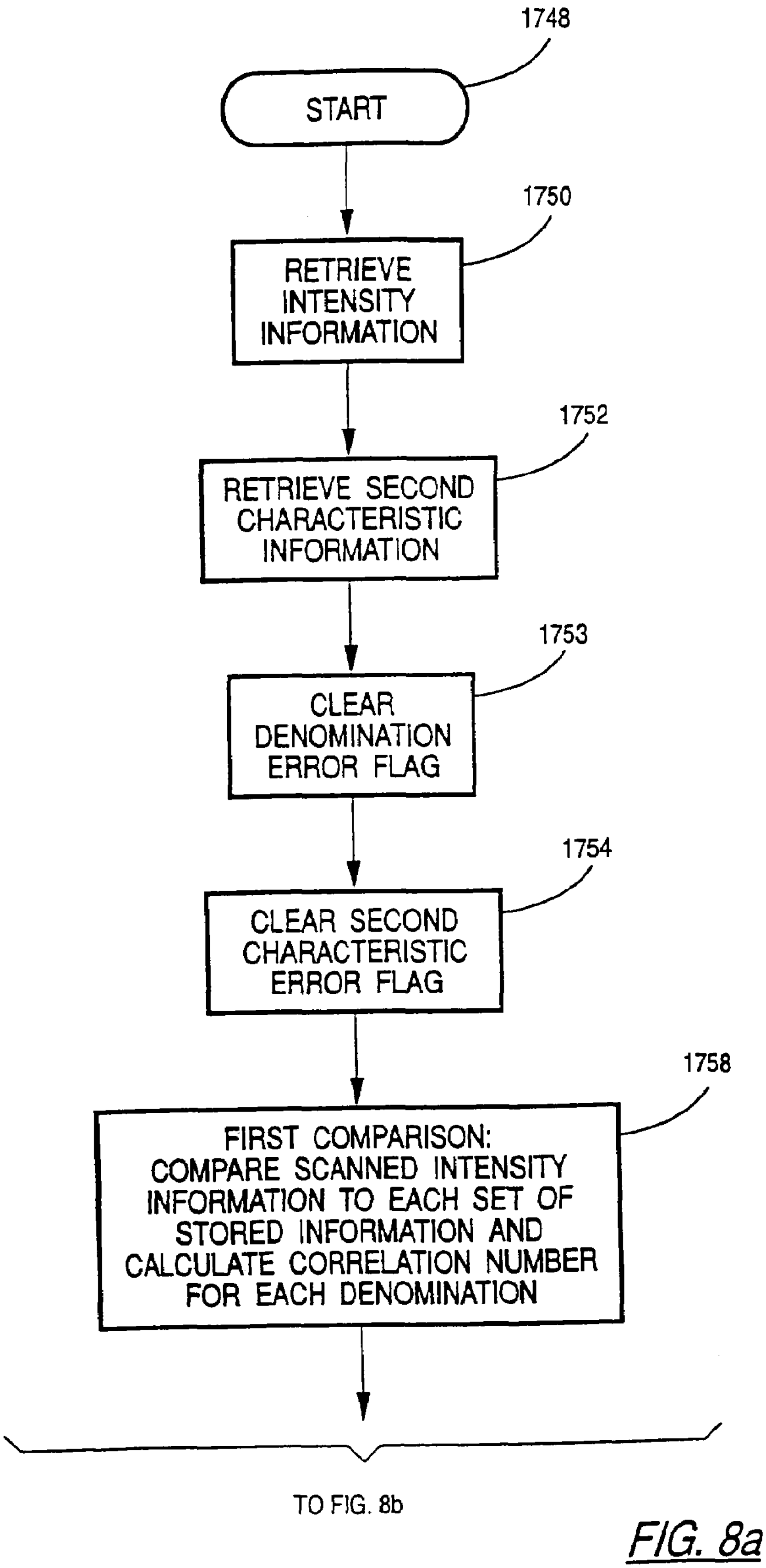
FIGS. 8*a* and 8*b* comprise a flowchart illustrating the sequence of operations involved in implementing a discrimination and authentication system according to one embodiment of the present invention.
Figure 8B:
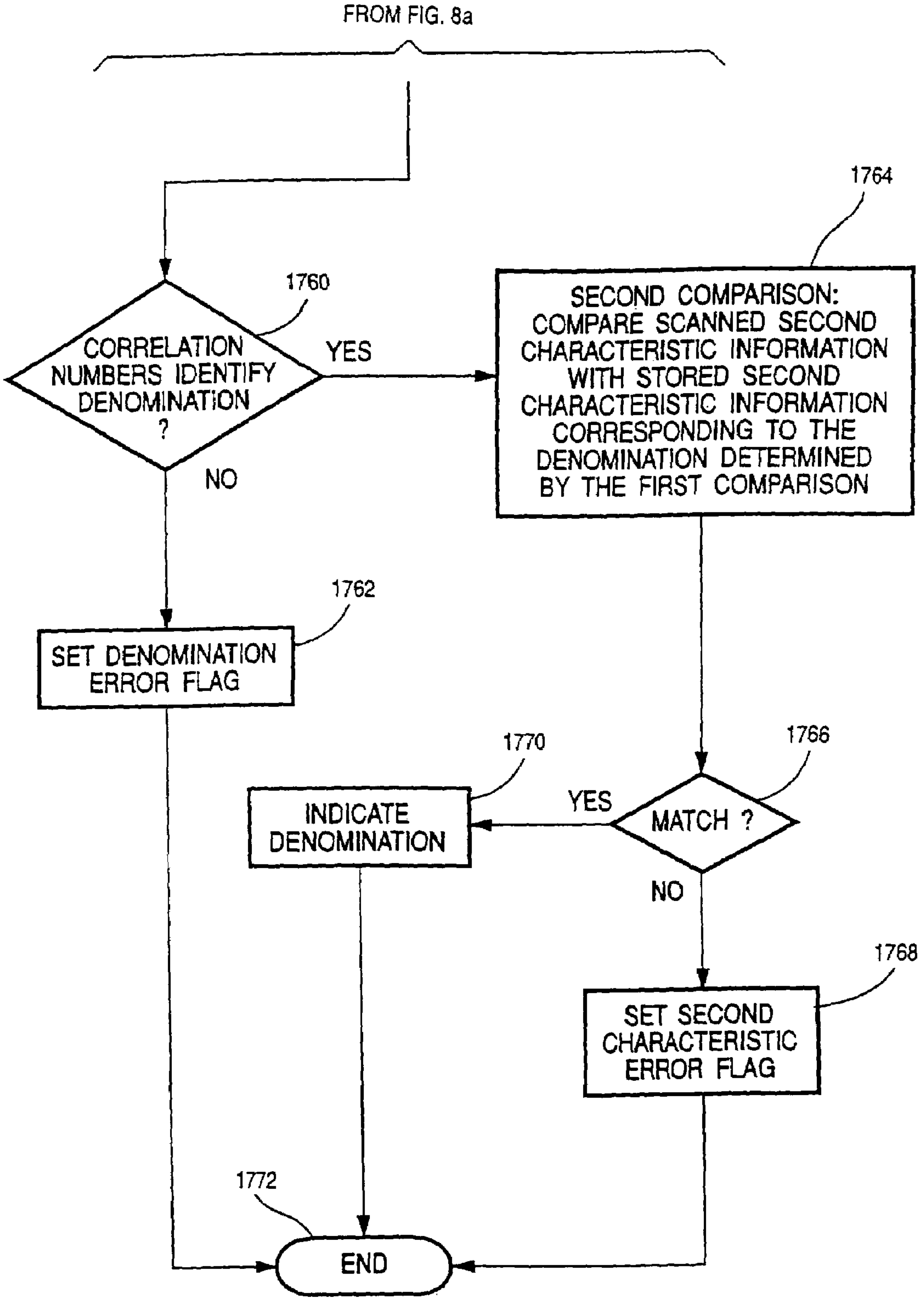

The interrelation between the use of the first and second type of characteristic information can be seen by considering FIGS. 8*a* and 8*b* which comprise a flowchart illustrating the sequence of operations involved in implementing a discrimination and authentication system according to one embodiment of the present invention. Upon the initiation of the sequence of operations (step 1748), reflected light intensity information is retrieved from a bill being scanned (step 1750). Similarly, second characteristic information is also retrieved from the bill being scanned (step 1752). Denomination error and second characteristic error flags are cleared (steps 1753 and 1754).

Next the scanned intensity information is compared to each set of stored intensity information corresponding to genuine bills of all denominations the system is programmed to accommodate (step 1758). For each denomination, a correlation number is calculated. The system then, based on the correlation numbers calculated, determines either the denomination of the scanned bill or generates a denomination error by setting the denomination error flag steps 1760 and 1762). In the case where the denomination error flag is set (step 1762), the process is ended (step 1772). Alternatively, if based on this first comparison, the system is able to determine the denomination of the scanned bill, the system proceeds to compare the scanned second characteristic information with the stored second characteristic information corresponding to the denomination determined by the first comparison (step 1764).

For example, if as a result of the first comparison the scanned bill is determined to be a $20 bill, the scanned second characteristic information is compared to the stored second characteristic information corresponding to a genuine $20 bill. In this manner, the system need not make comparisons with stored second characteristic information for the other denominations the system is programmed to accommodate. If based on this second comparison (step 1764) it is determined that the scanned second characteristic information does not sufficiently match that of the stored second characteristic information (step 1766), then a second characteristic error is generated by setting the second characteristic error flag (step 1768) and the process is ended (step 1772). If the second comparison results in a sufficient match between the scanned and stored second characteristic information (step 1766), then the denomination of the scanned bill is indicated (step 1770) and the process is ended (step 1772).

An example of an interrelationship between authentication based on a first and second characteristic can be seen by considering Table 1. The denomination determined by optical scanning of a bill may be used to facilitate authentication of the bill by magnetic scanning, using the relationship set forth in Table 1.

TABLE 1

| | Sensitivity | | | | |
|---|---|---|---|---|---|
| Denomination | 1 | 2 | 3 | 4 | 5 |
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Table 1 depicts relative total magnetic content thresholds for various denominations of genuine bills. Columns 1–5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

In order to avoid problems associated with re-feeding bills, counting bills by hand, and adding together separate totals, according to one embodiment of the present invention a number of selection elements associated with individual denominations are provided. In FIG. 1, these selection elements are in the form of keys or buttons of a keypad. Other types of selection elements such as switches or displayed keys in a touch-screen environment may be employed. The operation of the selection elements and several of the operating modes of the discriminator 10 are described below in conjunction with FIGS. 56 and 59.

Figure 9:
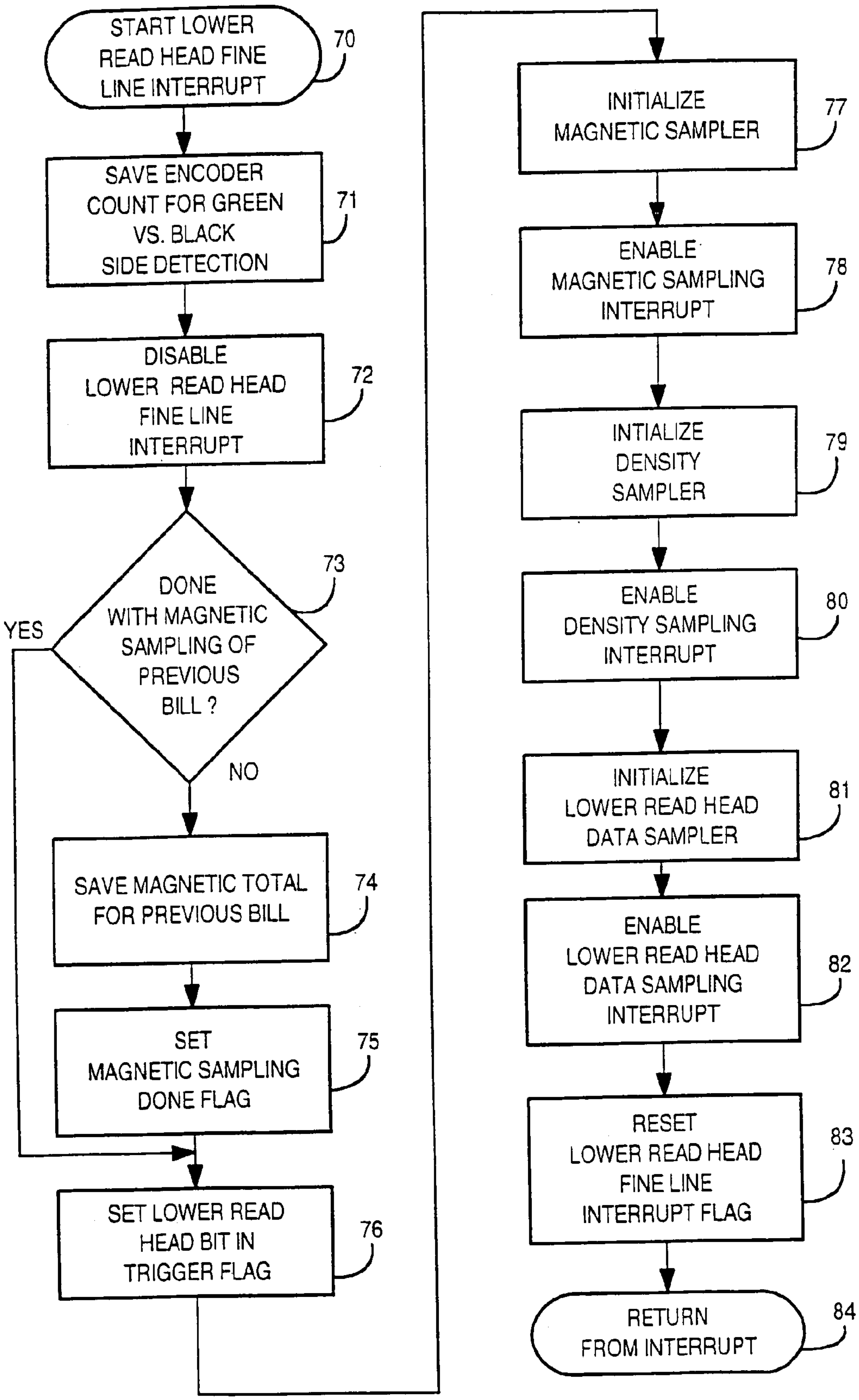
FIG. 9 is a flow chart illustrating the sequential procedure involved in detecting the presence of a bill adjacent the lower scanhead and the borderline on the side of the bill adjacent to the lower scanhead.
Figure 10:
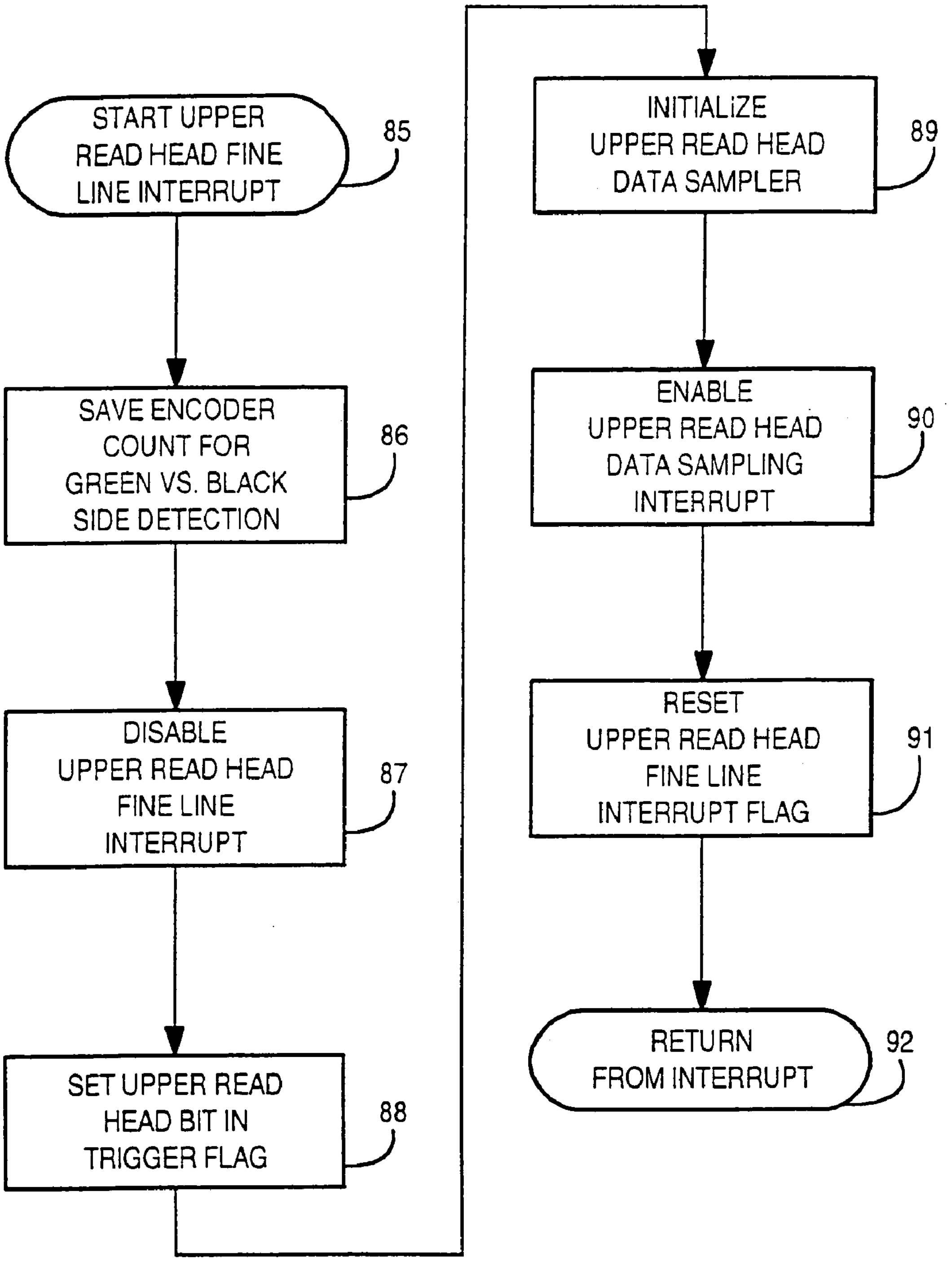
FIG. 10 is a flow chart illustrating the sequential procedure involved in detecting the presence of a bill adjacent the upper scanhead and the borderline on the side of the bill adjacent to the upper scanhead.

Referring now to FIGS. 9–11*b*, there are shown flow charts illustrating the sequence of operations involved in implementing the above-described optical sensing and correlation technique. FIGS. 9 and 10, in particular, illustrate the sequences involved in detecting the presence of a bill adjacent the scanheads and the borderlines on each side of the bill. Turning to FIG. 9, at step 70, the lower scanhead fine line interrupt is initiated upon the detection of the fine line by the lower scanhead. An encoder counter is maintained that is incremented for each encoder pulse. The encoder counter scrolls from 0–65,535 and then starts at 0 again. At step 71 the value of the encoder counter is stored in memory upon the detection of the fine line by the lower scanhead. At step 72 the lower scanhead fine line interrupt is disabled so that it will not be triggered again during the interrupt period. At step 73, it is determined whether the magnetic sampling has been completed for the previous bill. If it has not, the magnetic total for the previous bill is stored in memory at step 74 and the magnetic sampling done flag is set at step 75 so that magnetic sampling of the present bill may thereafter be performed. Steps 74 and 75 are skipped if it is determined at step 73 that the magnetic sampling has been completed for the previous bill. At step 76, a lower scanhead bit in the trigger flag is set. This bit is used to indicate that the lower scanhead has detected the fine line. The magnetic sampler is initialized at step 77 and the magnetic sampling interrupt is enabled at step 78. A density sampler is initialized at step 79 and a density sampling interrupt is enabled at step 80. The lower read data sampler is initialized at step 81 and a lower scanhead data sampling interrupt is enabled at step 82. At step 83, the lower scanhead fine line interrupt flag is reset and at step 84 the program returns from the interrupt.

Turning to FIG. 10, at step 85, the upper scanhead fine line interrupt is initiated upon the detection of the fine line by the upper scanhead. At step 86 the value of the encoder counter is stored in memory upon the detection of the fine line by the upper scanhead. This information in connection with the encoder counter value associated with the detection of the fine line by the lower scanhead may then be used to determine the face orientation of a bill, that is whether a bill is fed green side up or green side down in the case of U.S. bills as is described in more detail below in connection with FIG. 12. At step 87 the upper scanhead fine line interrupt is disabled so that it will not be triggered again during the interrupt period. At step 88, the upper scanhead bit in the trigger flag is set. This bit is used to indicate that the upper scanhead has detected the fine line. By checking-the lower and upper scanhead bits in the trigger flag it can be determined whether each side has detected a respective fine line. Next, the upper scanhead data sampler is initialized at step 89 and the upper scanhead data sampling interrupt is enabled at step 90. At step 91, the upper scanhead fine line interrupt flag is reset and at step 92 the program returns from the interrupt.

Figure 11A:
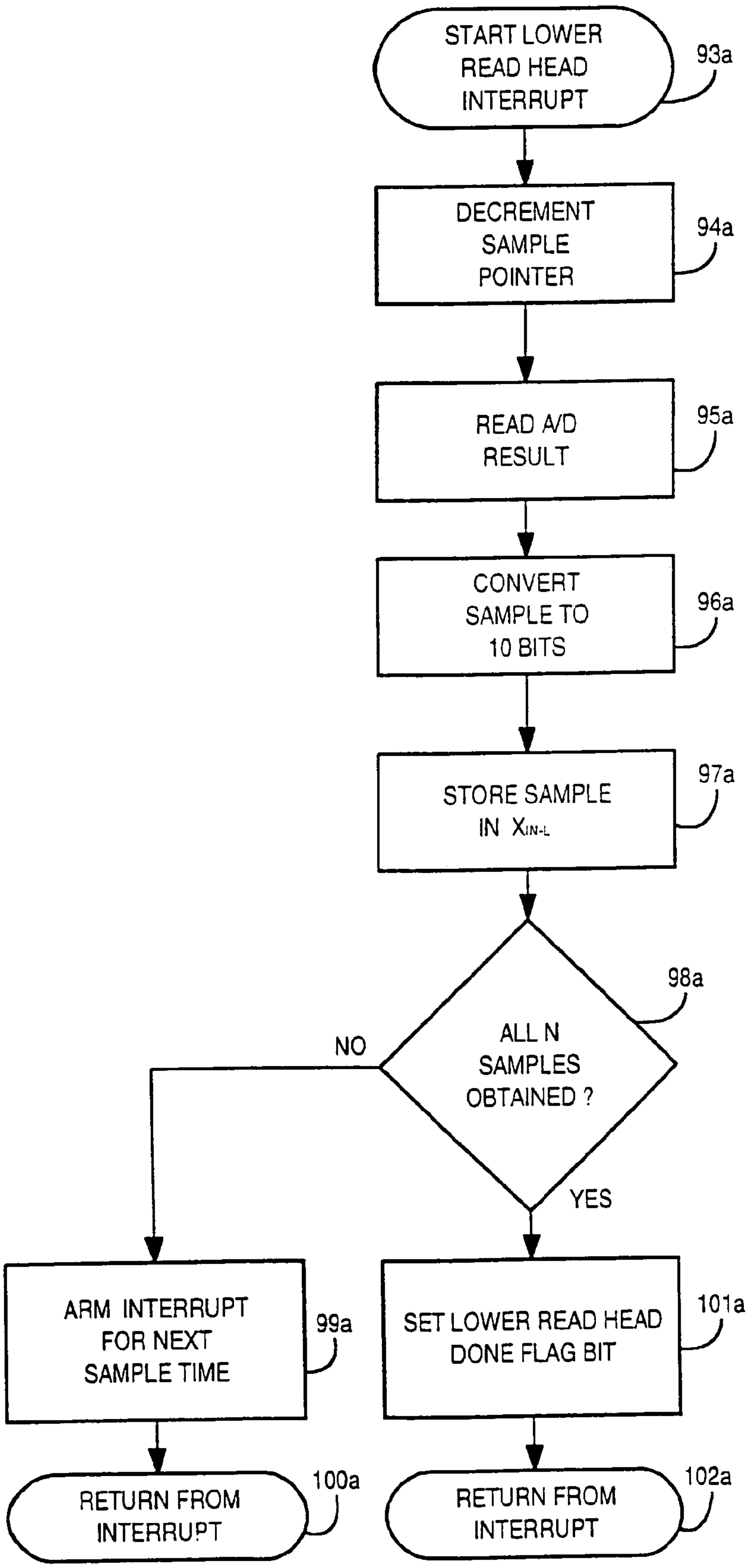
FIG. 11*a* is a flow chart illustrating the sequential procedure involved in the analog-to-digital conversion routine associated with the lower scanhead.
Figure 11B:
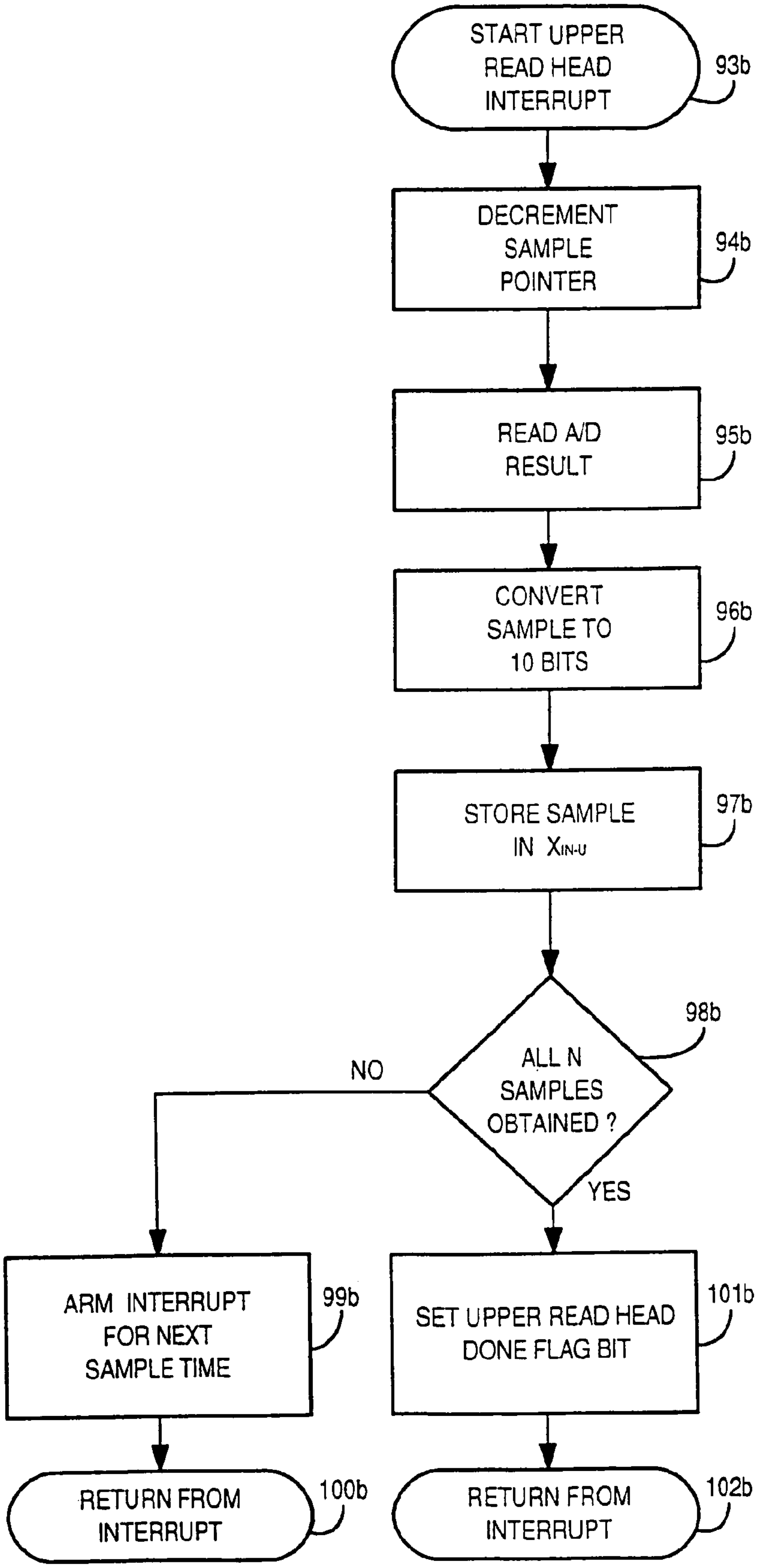
FIG. 11*b* is a flow chart illustrating the sequential procedure involved in the analog-to-digital conversion routine associated with the upper scanhead.

Referring now to FIGS. 11*a* and 11*b* there are shown, respectively, the digitizing routines associated with the lower and upper scanheads. FIG. 11*a* is a flow chart illustrating the sequential procedure involved in the analog-to-digital conversion routine associated with the lower scanhead. The routine is started at step 93*a*. Next, the sample pointer is decremented at step 94*a* so as to maintain an indication of the number of samples remaining to be obtained. The sample pointer provides an indication of the sample being obtained and digitized at a given time. At step 95*a*, the digital data corresponding to the output of the photodetector associated with the lower scanhead for the current sample is read. The data is converted to its final form at step 96*a* and stored within a pre-defined memory segment as $X_{IN-L}$ at step 97*a*.

Next, at step 98*a*, a check is made to see if the desired fixed number of samples "N" has been taken. If the answer is found to be negative, step 99*a* is accessed where the interrupt authorizing the digitization of the succeeding sample is enabled and the program returns from interrupt at step 100*a* for completing the rest of the digitizing process. However, if the answer at step 98*a* is found to be positive, i.e., the desired number of samples have already been obtained, a flag, namely the lower scanhead done flag bit, indicating the same is set at step 101*a* and the program returns from interrupt at step 102*a*.

FIG. 11*b* is a flow chart illustrating the sequential procedure involved in the analog-to-digital conversion routine associated with the upper scanhead. The routine is started at step 93*b*. Next, the sample pointer is decremented at step 94*b* so as to maintain an indication of the number of samples remaining to be obtained. The sample pointer provides an indication of the sample being obtained and digitized at a given time. At step 95*b*, the digital data corresponding to the output of the photodetector associated with the upper scanhead for the current sample is read. The data is converted to its final form at step 96*b* and stored within a pre-defined memory segment as $X_{IN-U}$ at step 97*b*.

Next, at step 98*b*, a check is made to see if the desired fixed number of samples "N" has been taken. If the answer is found to be negative, step 99*b* is accessed where the interrupt authorizing the digitization of the succeeding sample is enabled and the program returns from interrupt at step 100*b* for completing the rest of the digitizing process. However, if the answer at step 98*b* is found to be positive, i.e., the desired number of samples have already been obtained, a flag, namely the upper scanhead done flag bit, indicating the same is set at step 101*b* and the program returns from interrupt at step 102*b*.

Figure 12:
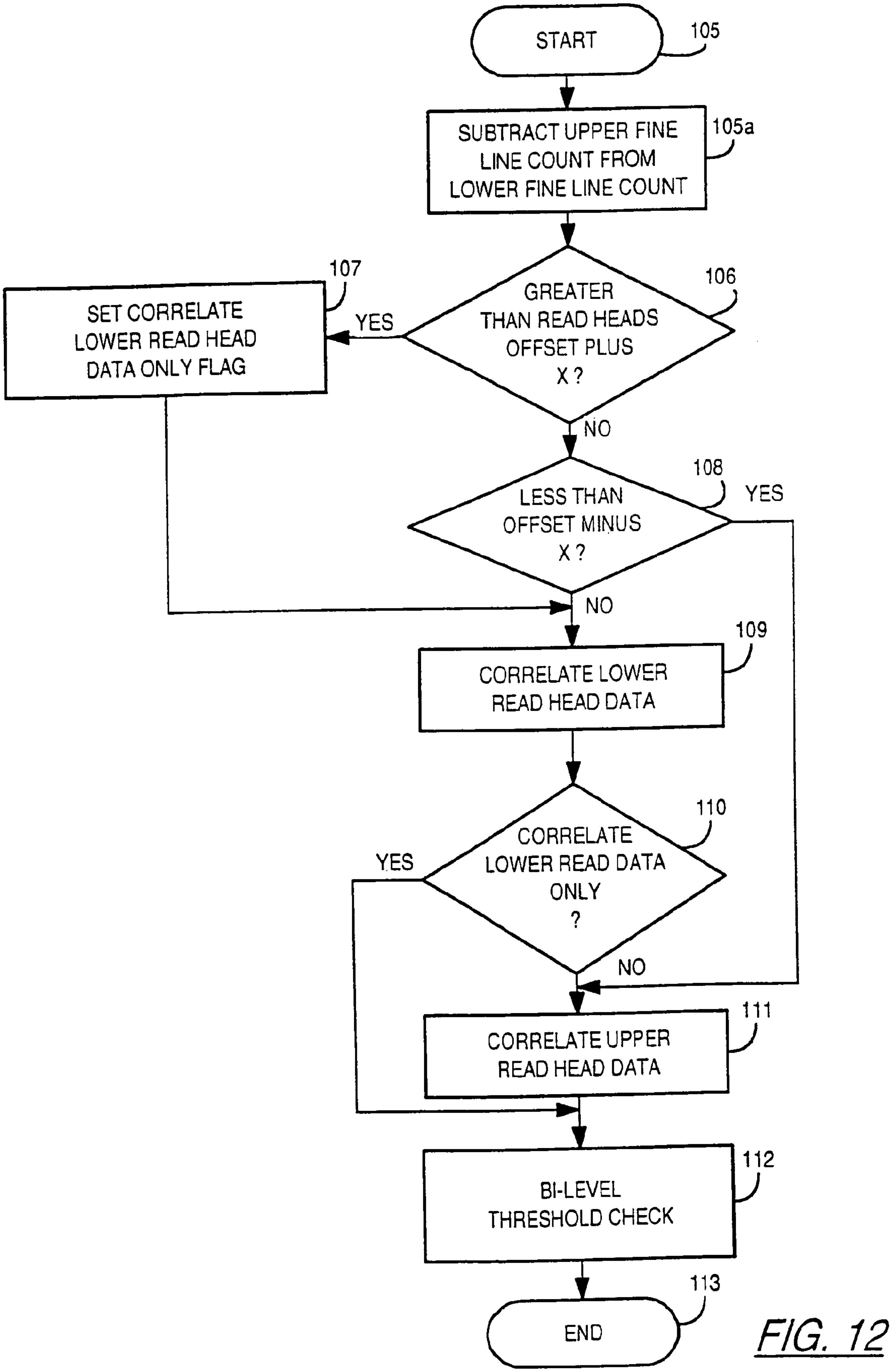
FIG. 12 is a flow chart illustrating the sequential procedure involved in determining which scanhead is scanning the green side of a U.S. currency bill.

The CPU 30 is programmed with the sequence of operations in FIG. 12 to correlate at least initially only the test pattern corresponding to the green surface of a scanned bill. As shown in FIGS. 6*c*–6*d*, the upper scanhead 18*a* is located slightly upstream adjacent the bill transport path relative to the lower scanhead 18*b*. The distance between the scanheads 18*a*, 18*b* in a direction parallel to the transport path corresponds to a predetermined number of encoder counts. It should be understood that the encoder 32 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 18*a*, 18*b*, the CPU 30 monitors the output of the upper scanhead 18*a* to detect the borderline of a first bill surface facing the upper scanhead 18*a*. Once this borderline of the first surface is detected, the CPU 30 retrieves and stores a first encoder count in memory. Similarly, the CPU 30 monitors the output of the lower scanhead 18*b* to detect the borderline of a second bill surface facing the lower scanhead 18*b*. Once the borderline of the second surface is detected, the CPU 30 retrieves and stores a second encoder count in memory.

Referring to FIG. 12, the CPU 30 is programmed to calculate the difference between the first and second encoder counts (step 105*a*). If this difference is greater than the predetermined number of encoder counts corresponding to the distance between the scanheads 18*a*, 18*b* plus some safety factor number "X", e.g., 20 (step 106), the bill is oriented with its black surface facing the upper scanhead 18*a* and its green surface facing the lower scanhead, 18*b*. This can best be understood by reference to FIG. 6*c* which shows a bill with the foregoing orientation. In this situation, once the borderline $B_1$ of the black surface passes beneath the upper scanhead 18*a* and the first encoder count is stored, the borderline $B_2$ still must travel for a distance greater than the distance between the upper and lower scanheads 18*a*, 18*b* in order to pass over the lower scanhead 18*b*. As a result, the difference between the second encoder count associated with the borderline $B_2$ and the first encoder count associated with the borderline $B_1$ will be greater than the predetermined number of encoder counts corresponding to the distance between the scanheads 18*a*, 18*b*. With the bill oriented with its green surface facing the lower scanhead, the CPU 30 sets a flag to indicate that the test pattern produced by the lower scanhead 18*b* should be correlated (step 107). Next, this test pattern is correlated with the green-side master characteristic patterns stored in memory (step 109).

If at step 106 the difference between the first and second encoder counts is less than the predetermined number of encoder counts corresponding to the distance between the scanheads 18*a*, 18*b*, the CPU 30 is programmed to determine whether the difference between the first and second encoder counts is less than the predetermined number minus some safety number "X", e.g., 20 (step 108). If the answer is negative, the orientation of the bill relative to the scanheads 18*a*, 18*b* is uncertain so the CPU 30 is programmed to correlate the test patterns produced by both the upper and lower scanheads 18*a*, 18*b* with the green-side master characteristic patterns stored in memory (steps 109, 110, and 111).

If the answer is affirmative, the bill is oriented with its green surface facing the upper scanhead 18*a* and its black surface facing the lower scanhead 18*b*. This can best be understood by reference to FIG. 6*d*, which shows a bill with the foregoing orientation. In this situation, once the borderline $B_2$ of the green surface passes beneath the upper scanhead 18*a* and the first encoder count is stored, the borderline $B_1$ must travel for a distance less than the distance between the upper and lower scanheads 18*a*, 18*b* in order to pass over the lower scanhead 18*b*. As a result, the difference between the second encoder count associated with the borderline $B_1$ and the first encoder count associated with the borderline $B_2$ should be less than the predetermined number of encoder counts corresponding to the distance between the scanheads 18*a*, 18*b*. To be on the safe side, it is required that the difference between first and second encoder counts be less than the predetermined number minus the safety number "X". Therefore, the CPU 30 is programmed to correlate the test pattern produced by the upper scanhead 18*a* with the green-side master characteristic patterns stored in memory (step 111).

After correlating the test pattern associated with either the upper scanhead 18*a*, the lower scanhead 18*b*, or both scanheads 18*a*, 18*b*, the CPU 30 is programmed to perform the bi-level threshold check (step 112).

A simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "n" samples) obtained for a bill scan run is first obtained as below:

$$\overline{X} = \sum_{i=0}^{n} \frac{X_i}{n} \tag{1}$$

Subsequently, a normalizing factor Sigma ("σ") is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \tag{2}$$

In the final step, each reflectance sample is normalized by obtaining the difference between the sample and the above-calculated mean value and dividing it by the square root of the normalizing factor σ as defined by the following equation:

$$X_n = \frac{X_i - \overline{X}}{(\sigma)^{1/2}} \tag{3}$$

The result of using the above correlation equations is that, subsequent to the normalizing process, a relationship of correlation exists between a test pattern and a master pattern such that the aggregate sum of the products of corresponding samples in a test pattern and any master pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to one embodiment of this invention, the fixed number of reflectance samples which are digitized and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In one embodiment, for instance, the factor of unity which results when a hundred percent correlation exists is represented in terms of the binary number $2^{10}$, which is equal to a decimal value of 1024. Using the above procedure, the normalized samples within a test pattern are compared to the master characteristic patterns stored within the system memory in order to determine the particular stored pattern to which the test pattern corresponds most closely by identifying the comparison which yields a correlation number closest to 1024.

A bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second threshold level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made.

The procedure involved in comparing test patterns to master patterns is discussed below in connection with FIG. 18*a*.

Figure 13:
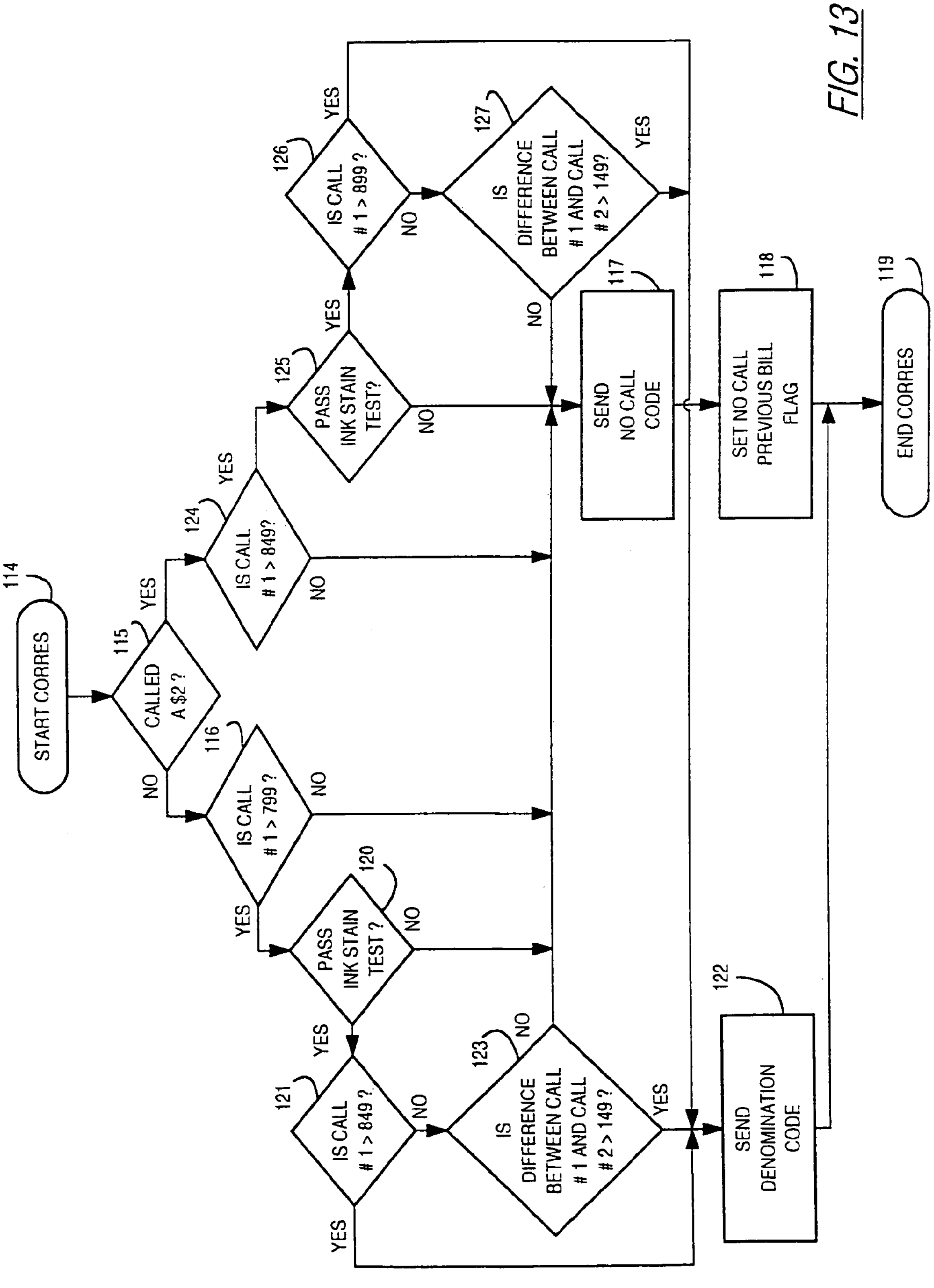
FIG. 13 is a flow chart illustrating the sequence of operations involved in determining the bill denomination from the correlation results.
Figure 14:
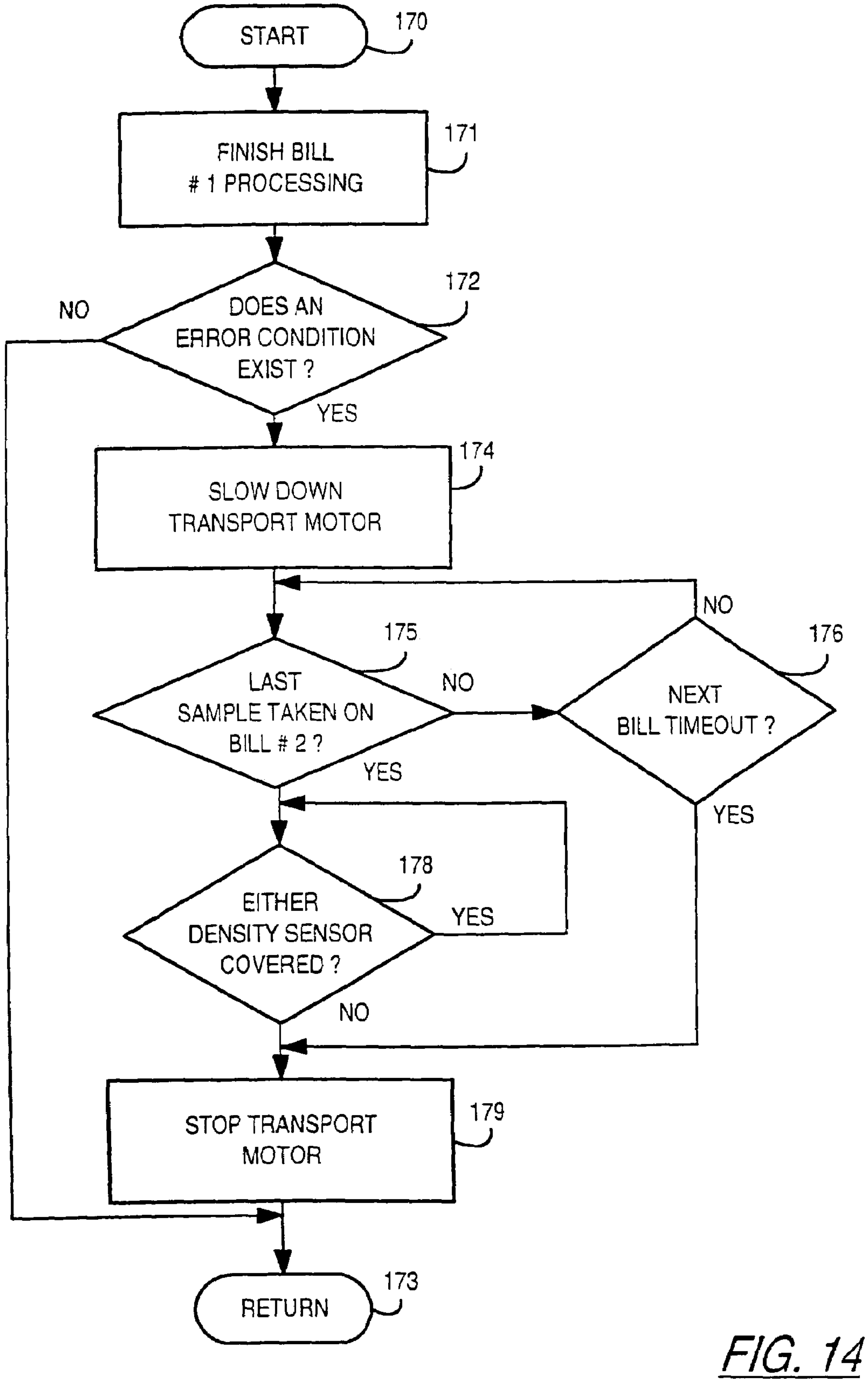
FIG. 14 is a flow chart illustrating the sequential procedure involved in decelerating and stopping the bill transport system in the event of an error.

Next a routine designated as "CORRES" is initiated. The procedure involved in executing the routine CORRES is illustrated at FIG. 13 which shows the routine as starting at step 114. Step 115 determines whether the bill has been identified as a $2 bill, and, if the answer is negative, step 116 determines whether the best correlation number ("call #1") is greater than 799. If the answer is negative, the correlation number is too low to identify the denomination of the bill with certainty, and thus step 117 generates a "no call" code. A "no call previous bill" flag is then set at step 118, and the routine returns to the main program at step 119.

An affirmative answer at step 116 advances the system to step 120, which determines whether the sample data passes an ink stain test (described below). If the answer is negative, a "no call" code is generated at step 117. If the answer is affirmative, the system advances to step 121 which determines whether the best correlation number is greater than 849. An affirmative answer at step 121 indicates that the correlation number is sufficiently high that the denomination of the scanned bill can be identified with certainty without any further checking. Consequently, a "denomination" code identifying the denomination represented by the stored pattern resulting in the highest correlation number is generated at step 122, and the system returns to the main program at step 119.

A negative answer at step 121 indicates that the correlation number is between 800 and 850. It has been found that correlation numbers within this range are sufficient to identify all bills except the $2 bill. Accordingly, a negative response at step 121 advances the system to step 123 which determines whether the difference between the two highest correlation numbers ("call #1" and "call #2") is greater than 149. If the answer is affirmative, the denomination identified by the highest correlation number is acceptable, and thus the "denomination" code is generated at step 122. If the difference between the two highest correlation numbers is less than 150, step 123 produces a negative response which advances the system to step 117 to generate a "no call" code.

Returning to step 115, an affirmative response at this step indicates that the initial call is a $2 bill. This affirmative response initiates a series of steps 124–127 which are identical to steps 116, 120, 121 and 123 described above, except that the numbers 799 and 849 used in steps 116 and 121 are changed to 849 and 899, respectively, in steps 124 and 126. The result is either the generation of a "no call" code at step 117 or the generation of a $2 "denomination" code at step 122.

One problem encountered in currency recognition and counting systems is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to the system stacker and the CRU brought to a halt with bill $B_1$ being the last bill deposited in the output receptacle, while at the same time ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of 800 to 1500 bills per minute), it is practically impossible to totally halt the system following a "no call" without the following bill $B_2$ already overlapping the optical scanhead and being partially scanned. As a result, it is virtually impossible for the CRU system to retain the transitional status of the recognition/counting process (particularly with respect to bill $B_2$) in order that the process may be resumed once the bad bill $B_1$ has been transported to the stacker, conveniently removed therefrom, and the system restarted. The basic problem is that if the CRU is halted with bill $B_2$ only partially scanned, it is difficult to reference the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call" any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls."

The above problems are solved by the use of a currency detecting and counting technique whereby a scanned bill identified as a "no call" is transported directly to the top of the system stacker and the CRU is halted without adversely affecting the data collection and processing steps for a succeeding bill. Accordingly, when the CRU is restarted, the overall bill recognition and counting procedure can be resumed without any disruption as if the CRU had never been halted at all.

According to one technique, if the bill is identified as a "no call" based on any of a variety of conventionally defined bill criteria, the CRU is subjected to a controlled deceleration process whereby the speed at which bills are moved across the scanhead is reduced from the normal operating speed. During this deceleration process the "no call" bill ($B_1$) is transported to the top of the stacker and, at the same time, the following bill $B_2$ is subjected to the standard scanning procedure in order to identify the denomination.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast, while at the same time ensuring that bill $B_1$ has in fact been transported to the stacker.

It has been experimentally determined that at nominal operating speeds of the order of 1000 bills per minute, the deceleration is preferably such that the CRU operating speed is reduced to about one-fifth of its normal operating speed at the end of the deceleration phase, i.e., by the time optical scanning of bill $B_2$ has been completed. It has been determined that at these speed levels, positive calls can be made as to the denomination of bill $B_2$ based on reflectance samples gathered during the deceleration phase with a relatively high degree of certainty (i.e., with a correlation number exceeding about 850).

Once the optical scanning of bill $B_2$ has been completed, the speed is reduced to an even slower speed until the bill $B_2$ has passed bill-edge sensors S1 and S2 described below, and the bill $B_2$ is then brought to a complete stop. At the same time, the results of the processing of scanned data corresponding to bill $B_2$ are stored in system memory. The ultimate result of this stopping procedure is that the CRU is brought to a complete halt following the point where the scanning of bill $B_2$ has been reliably completed, and the scan procedure is not subjected to the disruptive effects (backlash, etc.) which would result if a complete halt were attempted immediately after bill $B_1$ is identified as a "no call."

The reduced operating speed of the machine at the end of the deceleration phase is such that the CRU can be brought to a total halt before the next following bill $B_3$ has been transported over the optical scanhead. Thus, when the CRU is in fact halted, bill $B_1$ is positioned at the top of the system stacker, bill $B_2$ is maintained in transit between the optical scanhead and the stacker after it has been subjected to scanning, and the following bill $B_3$ is stopped short of the optical scanhead.

When the CRU is restarted, presumably after corrective action has been taken in response to the "minor" error which led to the CRU being stopped (such as the removal of the "no call" bill from the output receptacle), the overall scanning operation can be resumed in an uninterrupted fashion by using the stored call results for bill $B_2$ as the basis for updating the system count appropriately, moving bill $B_2$ from its earlier transitional position along the transport path into the stacker, and moving bill $B_3$ along the transport path into the optical scanhead area where it can be subjected to normal scanning and processing. A routine for executing the deceleration/stopping procedure described above is illustrated by the flow chart in FIG. 14. This routine is initiated at step 170 with the CRU in its normal operating mode. At step 171, a test bill $B_1$ is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 13. If the answer at step 172 is negative, i.e., the test bill $B_1$ can be identified, step 173 is accessed where normal bill processing is continued in accordance with the procedures described above. If, however, the test bill $B_1$ is found to be a "no call" at step 172, step 174 is accessed where CRU deceleration is initiated, e.g., the transport drive motor speed is reduced to about one-fifth its normal speed.

Subsequently, the "no call" bill $B_1$ is guided to the stacker while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 results in the transport drive motor being stopped at step 179 while a negative answer at step 176 causes steps 175 and 176 to be reiterated until one of them produces an affirmative response.

After the scanning of bill $B_2$ is complete and before stopping the transport drive motor, step 178 determines whether either of the sensors S1 or S2 (described below) is covered by a bill. A negative answer at step 178 indicates that the bill has cleared both sensors S1 and S2, and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken; the top-most bill in the stacker is easily removed therefrom and the CRU is then in condition for resuming the scanning process. Accordingly, the CRU can be restarted and the stored results corresponding to bill $B_2$, are used to appropriately update the system count. Next, the identified bill $B_2$ is guided along the transport path to the stacker, and the CRU continues with its normal processing routine. While the above deceleration process has been described in a context of a "no call" error, other minor errors (e.g., suspect bills, stranger bills in stranger mode, etc.) are handled in the same manner.

In currency discrimination systems in which discrimination is based on the comparison of a pattern obtained from scanning a subject bill to stored master patterns corresponding to various denominations, the patterns which are designated as master patterns significantly influence the performance characteristics of a discrimination system. For example, in the system described in U.S. Pat. No. 5,295,196, the correlation procedure and the accuracy with which a denomination is identified directly relates to the degree of correspondence between reflectance samples on the test pattern and corresponding samples on the stored master patterns. In other systems, master patterns have been produced by scanning a genuine bill for a given denomination and storing the resulting pattern as the master pattern for that denomination. However, due to variations among genuine bills, this method is likely to result in poor performance of the discrimination system by rejecting an unacceptable number of genuine bills. It has been found that the relative crispness, age, shrinkage, usage, and other characteristics of a genuine bill can effect the resulting pattern generated by scanning. These factors are often interrelated. For example, it has been found that currency bills which have experienced a high degree of usage exhibit a reduction in both the narrow and wide dimensions of the bills. This shrinkage of "used" bills which, in turn, causes corresponding reductions in their narrow dimensions, can possibly produce a drop in the degree of correlation between such used bills of a given denomination and the corresponding master patterns.

As a result, a discrimination system which generates a master pattern based on a single scan of a genuine bill is not likely to perform satisfactorily. For example, if the $20 master pattern is generated by scanning a crisp, genuine $20 bill, the discrimination system may reject an unacceptable number of genuine but worn $20 bills. Likewise, if the $20 master pattern is generated using a very worn, genuine $20 bill, the discrimination system may reject an unacceptable number of genuine but crisp $20 bills.

According to one embodiment of the present invention, a master pattern for a given denomination is generated by averaging a plurality of component patterns. Each component pattern is generated by scanning a genuine bill of the given denomination.

Figure 15A:
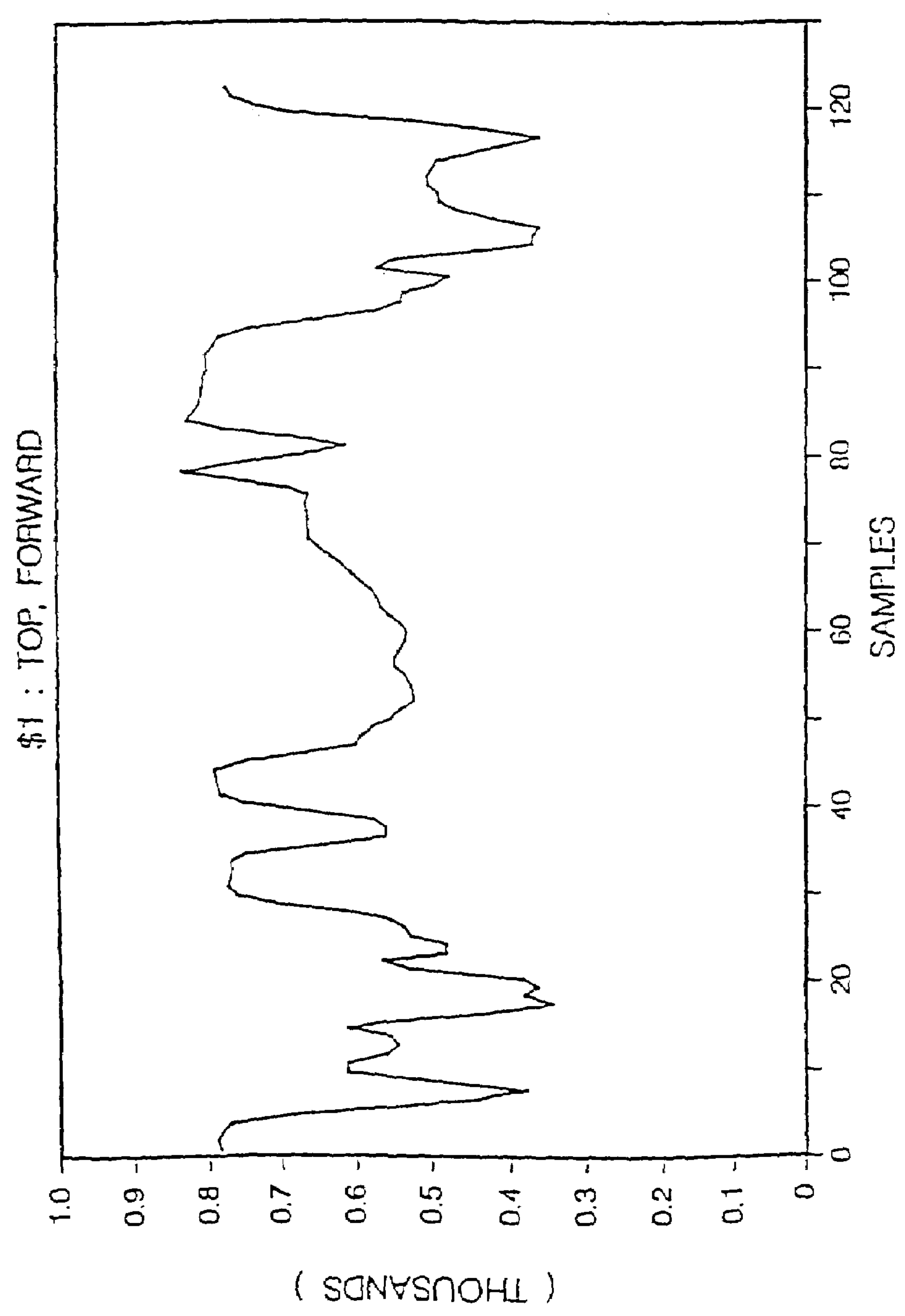
FIG. 15*a* is a graphical illustration of representative characteristic patterns generated by narrow dimension optical scanning of a $1 currency bill in the forward direction.
Figure 15B:
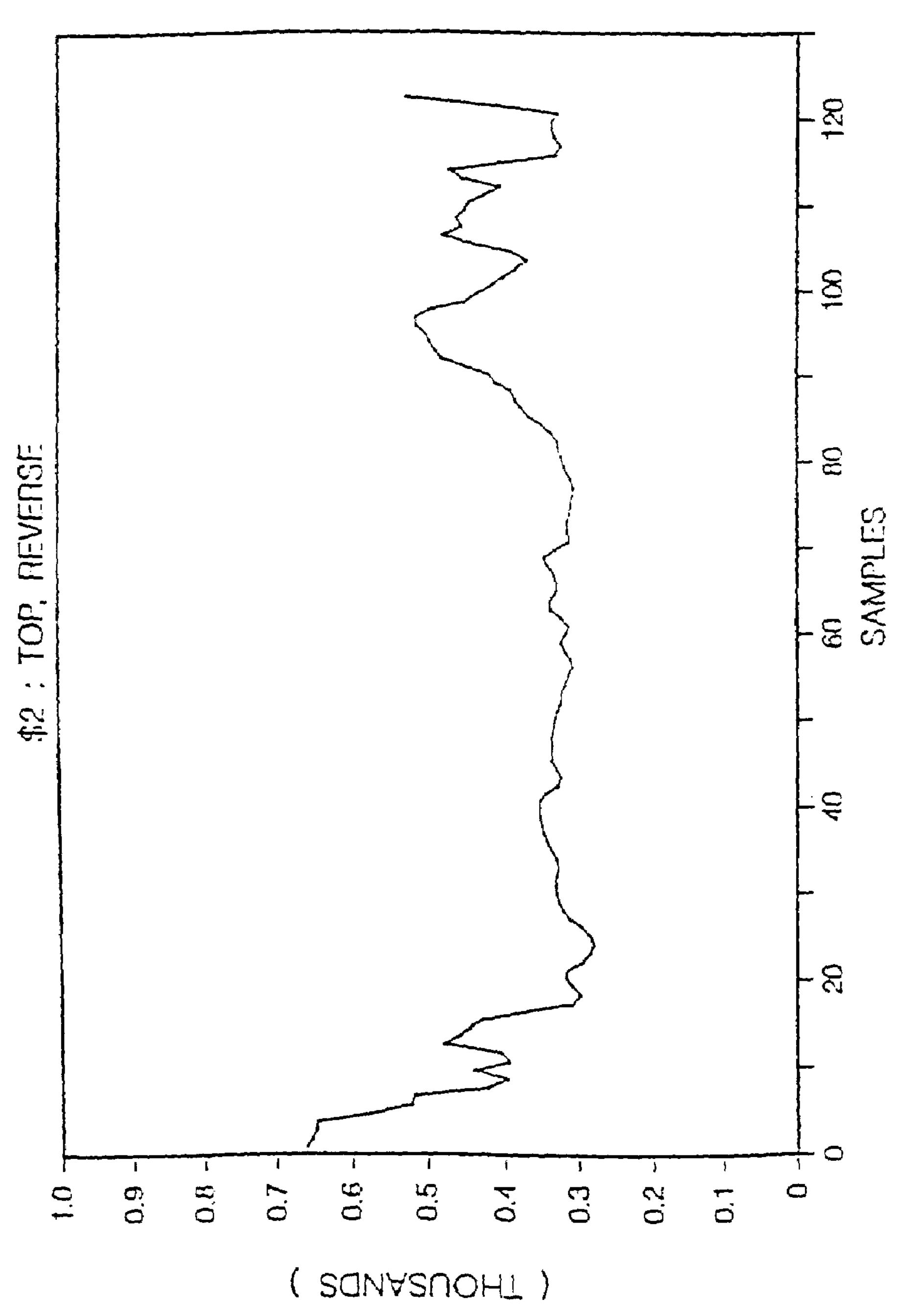
FIG. 15*b* is a graphical illustration of representative characteristic patterns generated by narrow dimension optical scanning of a $2 currency bill in the reverse direction.
Figure 15C:
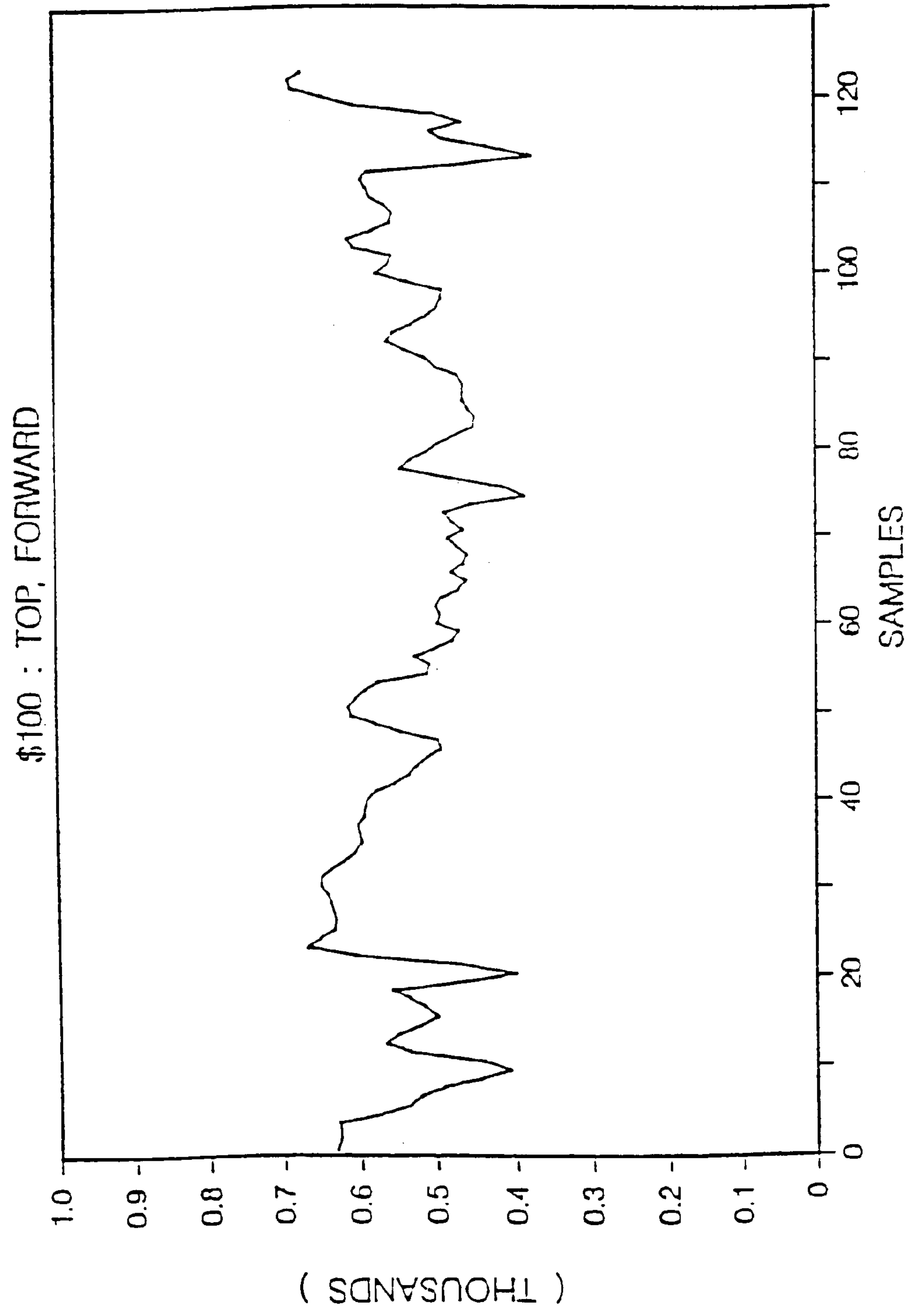
FIG. 15*c* is a graphical illustration of representative characteristic patterns generated by narrow dimension optical scanning of a $100 currency bill in the forward direction.

According to a first method, master patterns are generated by scanning a standard bill a plurality of times, typically three (3) times, and obtaining the average of corresponding data samples before storing the average as representing a master pattern. In other words, a master pattern for a given denomination is generated by averaging a plurality of component patterns, wherein all of the component patterns are generated by scanning a single genuine bill of "standard" quality of the given denomination. The "standard" bill is a slightly used bill, as opposed to a crisp new bill or one which has been subject to a high degree of usage. Rather, the standard bill is a bill of good to average quality. Component patterns generated according to this first methods are illustrated in FIGS. 15*a*–15*c*. More specifically, FIGS. 15*a*–15*c* show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 15*a*–15*c* were generated by using 128 reflectance samples per bill scan, as opposed to the preferred use of only 64 samples. The marked difference existing among corresponding samples for these three test patterns is indicative of the high degree of confidence with which currency denominations may be called using the foregoing optical sensing and correlation procedure.

According to a second method, a master pattern for a given denomination is generated by scanning two or more standard bills of standard quality and obtaining a plurality of component patterns. These component patterns are then averaged in deriving a master pattern. For example, it has been found that some genuine $5 bills have dark stairs on the Lincoln Memorial while other genuine $5 bills have light stairs. To compensate for this variation, standard bills for which component patterns are derived may be chosen with at least one standard bill scanned having dark stairs and with at least one standard bill having light stairs.

It has been found that an alternate method can lead to improved performance in a discrimination systems, especially with regards to certain denominations. For example, it has been found that the printed indicia on a $10 bill has changed slightly with 1990 series bills incorporating security threads. More specifically, 1990 series $10 bills have a borderline-to-borderline dimension which is slightly greater than previous series $10 bills. Likewise it has been found that the scanned pattern of an old, semi-shrunken $5 bill can differ significantly from the scanned pattern of a new $5 bill.

According to a third method, a master pattern for a given denomination is generated by averaging a plurality of component patterns, wherein some of the component patterns are generated by scanning one or more new bills of the given denomination and some of the component patterns are generated by scanning one or more old bills of the given denomination. New bills are bills of good quality which have been printed in recent years and have a security thread incorporated therein (for those denominations in which security threads are placed). New bills are preferably relatively crisp. A new $10 bill is preferably a 1990 series or later bill of very high quality, meaning that the bill is in near mint condition. Old bills are bills exhibiting some shrinkage and often some discoloration. Shrinkage may result from a bill having been subjected to a relatively high degree of use. A new bill utilized in this third method is of higher quality than a standard bill of the previous methods, while an old bill in this third method is of lower quality than a standard bill.

The third method can be understood by considering Table 2 which summarizes the manner in which component patterns are generated for a variety of denominations.

TABLE 2

| Component Scans by Denomination | | | | |
|---|---|---|---|---|
| Denomination | Scan Direction | CP1 | CP2 | CP3 |
| $1 | Forward | −0.2 std | 0.0 std | +0.2 std |
| $1 | Reverse | −0.2 std | 0.0 std | +0.2 std |
| $2, left | Forward | −0.2 std | −0.15 std | −0.1 std |
| $2, left | Reverse | −0.2 std | −0.15 std | −0.1 std |
| $2, right | Forward | 0.0 std | +0.1 std | +0.2 std |
| $2, right | Reverse | 0.0 std | +0.1 std | +0.2 std |
| $5 | Forward | −0.2 old (lt str) | 0.0 new (dk str) | +0.2 old (lt str) |
| $5 | Reverse | −0.2 old (lt str) | 0.0 new (dk str) | +0.2 old (lt str) |
| $10, left | Forward | −0.2 old | −0.1 new | 0.0 old |
| $10, left | Reverse | 0.0 old | +0.1 new | +0.2 old |
| $10, right | Forward | +0.1 old | +0.2 new | +0.3 old |
| $10, right | Reverse | −0.2 old | −0.15 new | −0.1 old |
| $20 | Forward | −0.2 old | 0.0 new | +0.2 old |
| $20 | Reverse | −0.2 old | 0.0 new | +0.2 old |
| $50 | Forward | −0.2 std | 0.0 std | +0.2 std |
| $50 | Reverse | −0.2 std | 0.0 std | +0.2 std |
| $100 | Forward | −0.2 std | 0.0 std | +0.2 std |
| $100 | Reverse | −0.2 std | 0.0 std | +0.2 std |

Table 2 summarizes the position of the scanhead relative to the center of the green surface of United States currency as well as the type of bill to be scanned for generating component patterns for various denominations. The three component patterns ("CP") for a given denomination and for a given scan direction are averaged to yield a corresponding master pattern. The eighteen (18) rows correspond to the method of storing eighteen (18) master patterns. The scanhead position is indicated relative to the center of the borderlined area of the bill. Thus a position of "0.0" indicates that the scanhead is centered over the center of the borderlined area of the bill. Displacements to the left of center are indicated by negative numbers, while displacements to the right are indicated by positive numbers. Thus a position of "−0.2" indicates a displacement of 2/10ths of an inch to the left of the center of a bill, while a position of "+0.1" indicates a displacement of 1/10ths of an inch to the right of the center of a bill.

Figure 15D:
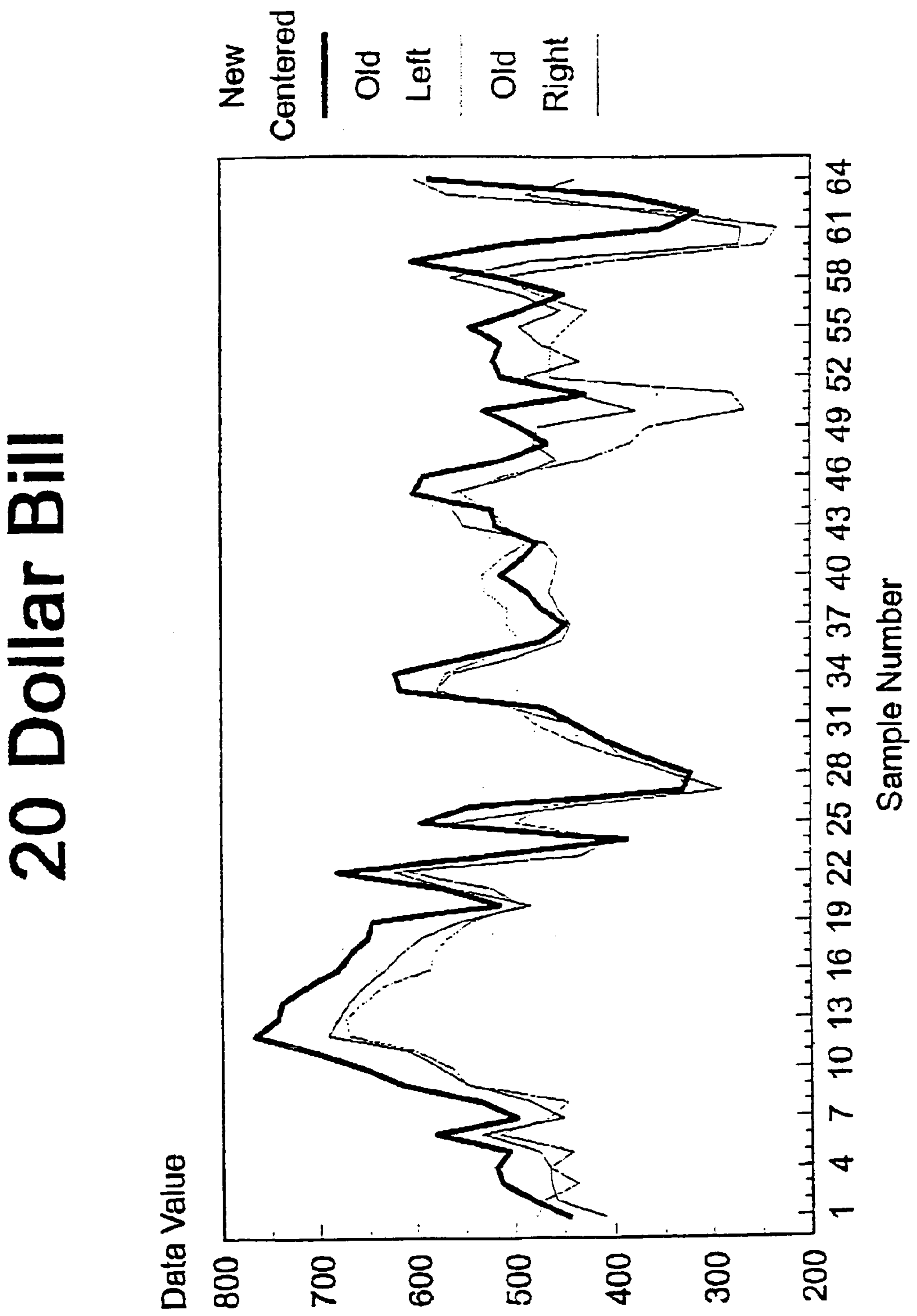
FIG. 15*d* is a graph illustrating component patterns generated by scanning old and new $20 bills according a second method according to one embodiment of the present invention.
Figure 15E:
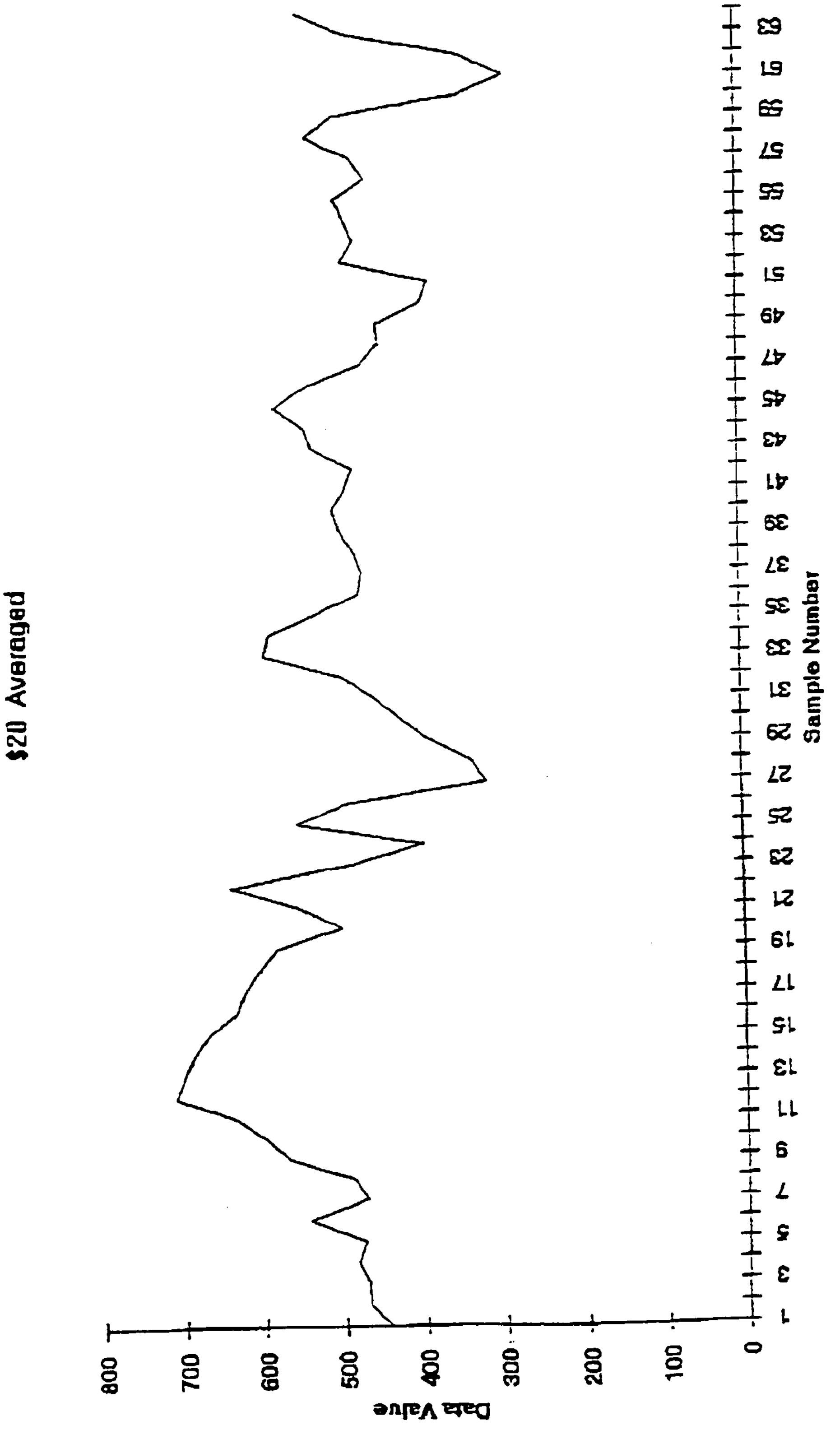
FIG. 15*e* is a graph illustrating an pattern for a $20 bill scanned in the forward direction derived by averaging the patterns of FIG. 15*d* according a second method according to one embodiment of the present invention.

Accordingly, Table 2 indicates that component patterns for a $20 bill scanned in the forward direction are obtained by scanning an old $20 bill 2/10ths of a inch to the right and to the left of the center of the bill and by scanning a new $20 bill directly down the center of the bill. FIG. 15*d* is a graph illustrating these three patterns. These three patterns are then averaged to obtain the master pattern for a $20 bill scanned in the forward direction. FIG. 15*e* is a graph illustrating an pattern for a $20 bill scanned in the forward direction derived by averaging the patterns of FIG. 15*d*. This pattern becomes the corresponding $20 master pattern after undergoing normalization. In generating the master patterns, one may use a scanning device in which a bill to be scanned is held stationary and a scanhead is moved over the bill. Such a device permits the scanhead to be moved laterally, left and right, over a bill to be scanned and thus permits the scanhead to be positioned over the area of the bill which one wishes to scan, for example, 2⁄10ths of inch to the left of the center of the borderlined area.

As discussed above, for $10 bills two patterns are obtained in each scan direction with one pattern being scanned slightly to the left of the center and one pattern being scanned slightly to the right of the center. For $5 bills, it has been found that some $5 bills are printed with darker stairs ("dk str") on the picture of the Lincoln Memorial while others are printed with lighter stairs ("lt str"). The effect of this variance is averaged out by using an old bill having light stairs and a new bill having dark stairs.

As can be seen from Table 2, for some bills, the third method of using old and new bills is not used; rather, a standard ("std") bill is used for generating all three component patterns as with the first method. Thus, the master pattern for a $1 bill scanned in the forward direction is obtained by averaging three component patterns generated by scanning a standard bill three times, once 2⁄10ths of an inch to the left, once down the center, and once 2⁄10ths of an inch to the right.

As illustrated by Table 2, a discrimination system may employ a combination of the developed methods of this invention wherein, for example, some master patterns are generated according the first method and some master patterns are generated according to the third method. Likewise, a discrimination system may combine the scanning of new, standard, and old bills to generate component patterns to be averaged in obtaining a master pattern. Additionally, a discrimination system may generate master patterns by scanning bills of various qualities and/or having various characteristics and then averaging the resultant patterns. Alternatively, a discrimination system may scan multiple bills of a given quality for a given denomination, e.g., three new $50 bills, while scanning one or more bills of a different quality for a different denomination, e.g., three old and worn $1 bills, to generate component patterns to be averaged in obtaining master patterns.

The optical sensing and correlation technique described above permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

An advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with multiple stored master characteristic patterns so that the system is made capable of identifying currency which is scanned in the "forward" or "reverse" directions along the green surface of the bill.

Another advantage accruing from the reduction in processing time realized by the sensing and correlation scheme is that the response time involved in either stopping the transport of a bill that has been identified as "spurious", i.e., not corresponding to any of the stored master characteristic patterns, or diverting such a bill to a separate stacker bin, is correspondingly shortened. Accordingly, the system can conveniently be programmed to set a flag when a scanned pattern does not correspond to any of the master patterns. The identification of such a condition can be used to stop the bill transport drive motor for the mechanism. Since the optical encoder is tied to the rotational movement of the drive motor, synchronism can be maintained between pre- and post-stop conditions.

The correlation procedure and the accuracy with which a denomination is identified directly relates to the degree of correspondence between reflectance samples on the test pattern and corresponding samples on the stored master patterns. Thus, shrinkage of "used" bills which, in turn, causes corresponding reductions in both their narrow and wide dimensions, can possibly produce a drop in the degree of correlation between such used bills of a given denomination and the corresponding master patterns. Currency bills which have experienced a high degree of usage exhibit such a reduction in both the narrow and wide dimensions of the bills. While the illustrated sensing and correlation technique remains relatively independent of any changes in the non-preselected dimension of bills, reduction along the preselected dimension can affect correlation factors by realizing a relative displacement of reflectance samples obtained as the "shrunk" bills are transported across the scanhead. Thus, if the bills are transported and scanned along their wide dimension, the sensing and correlation technique will remain relatively independent of any changes in the narrow dimension of bills and reduction along the wide dimension can affect correlation factors. Similarly, if the bills are transported and scanned along their narrow dimension, the sensing and correlation technique will remain relatively independent of any changes in the wide dimension of bills and reduction along the narrow dimension can affect correlation factors.

In order to accommodate or nullify the effect of such bill shrinking, the above-described correlation technique can be modified by use of a progressive shifting approach whereby a test pattern which does not correspond to any of the master patterns is partitioned into predefined sections, and samples in successive sections are progressively shifted and compared again to the stored patterns in order to identify the denomination. It has experimentally been determined that such progressive shifting effectively counteracts any sample displacement resulting from shrinkage of a bill along the preselected dimension.

Figure 16A:
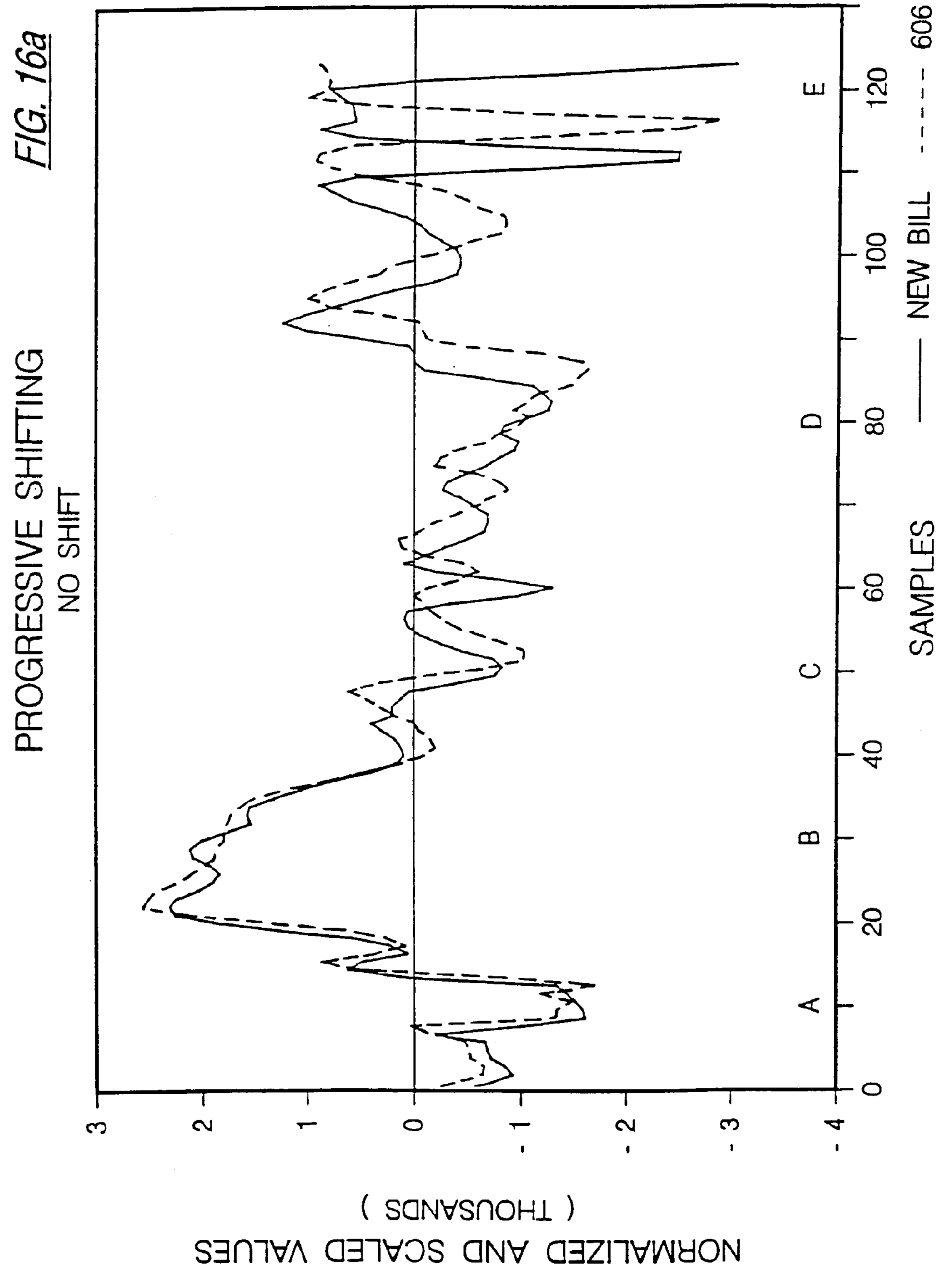
FIGS. 16*a–e* are graphical illustrations of the effect produced on correlation pattern by using the progressive shifting technique, according to an embodiment of this invention.

The progressive shifting effect is best illustrated by the correlation patterns shown in FIGS. 16*a–e*. For purposes of clarity, the illustrated patterns were generated using 128 samples for each bill scan as compared to the preferred use of 64 samples. FIG. 16*a* shows the correlation between a test pattern (represented by a heavy line) and a corresponding master pattern (represented by a thin line). It is clear from FIG. 16*a* that the degree of correlation between the two patterns is relatively low and exhibits a correlation factor of 606.

Figure 16B:
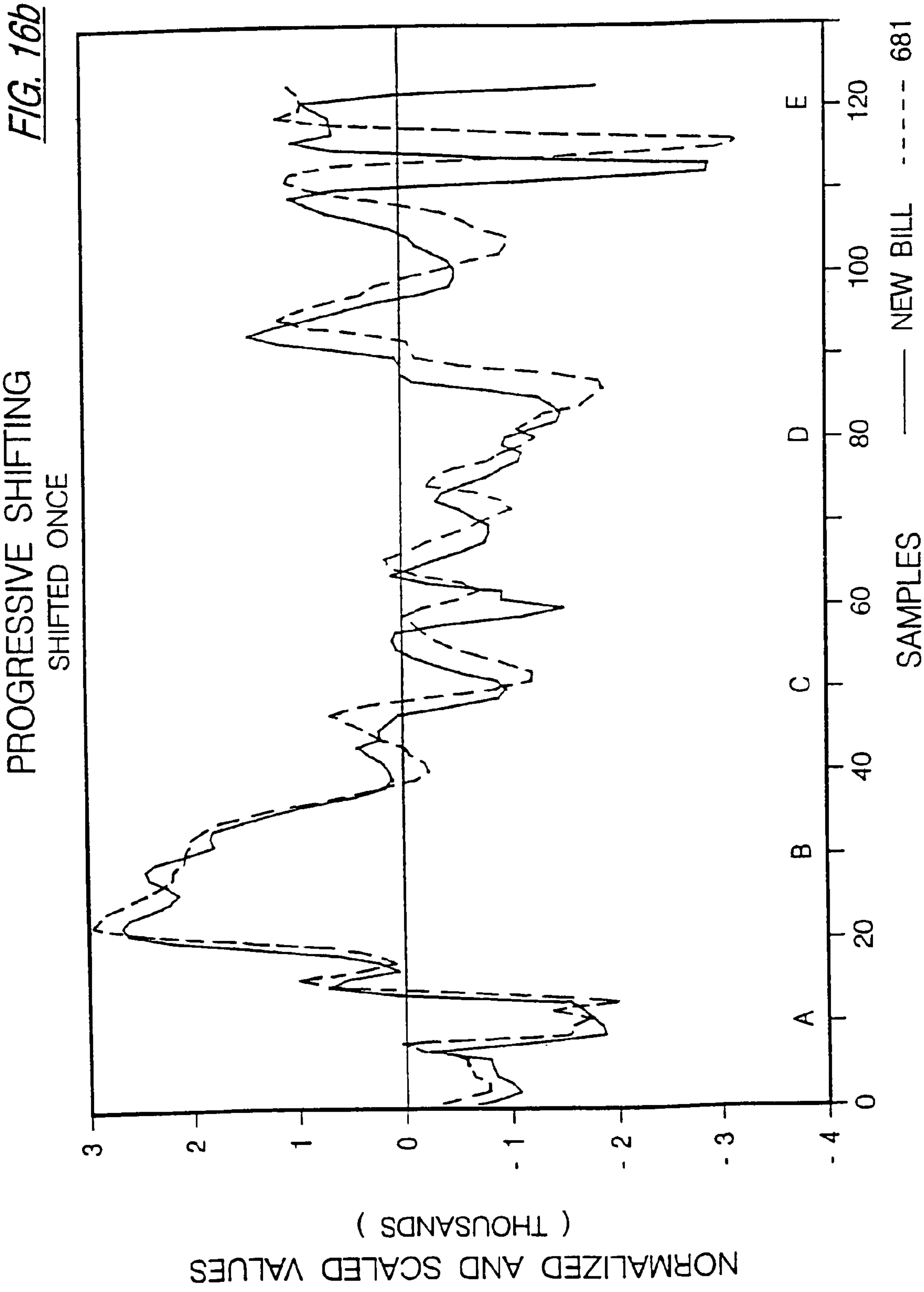

The manner in which the correlation between these patterns is increased by employing progressive shifting is best illustrated by considering the correlation at the reference points designated as A–E along the axis defining the number of samples. The effect on correlation produced by "single"

progressive shifting is shown in FIG. 16*b* which shows "single" shifting of the test pattern of FIG. 16*a*. This is effected by dividing the test pattern into two equal segments each comprising 64 samples. The first segment is retained without any shift, whereas the second segment is shifted by a factor of one data sample. Under these conditions, it is found that the correlation factor at the reference points located in the shifted section, particularly at point E, is improved.

Figure 16C:
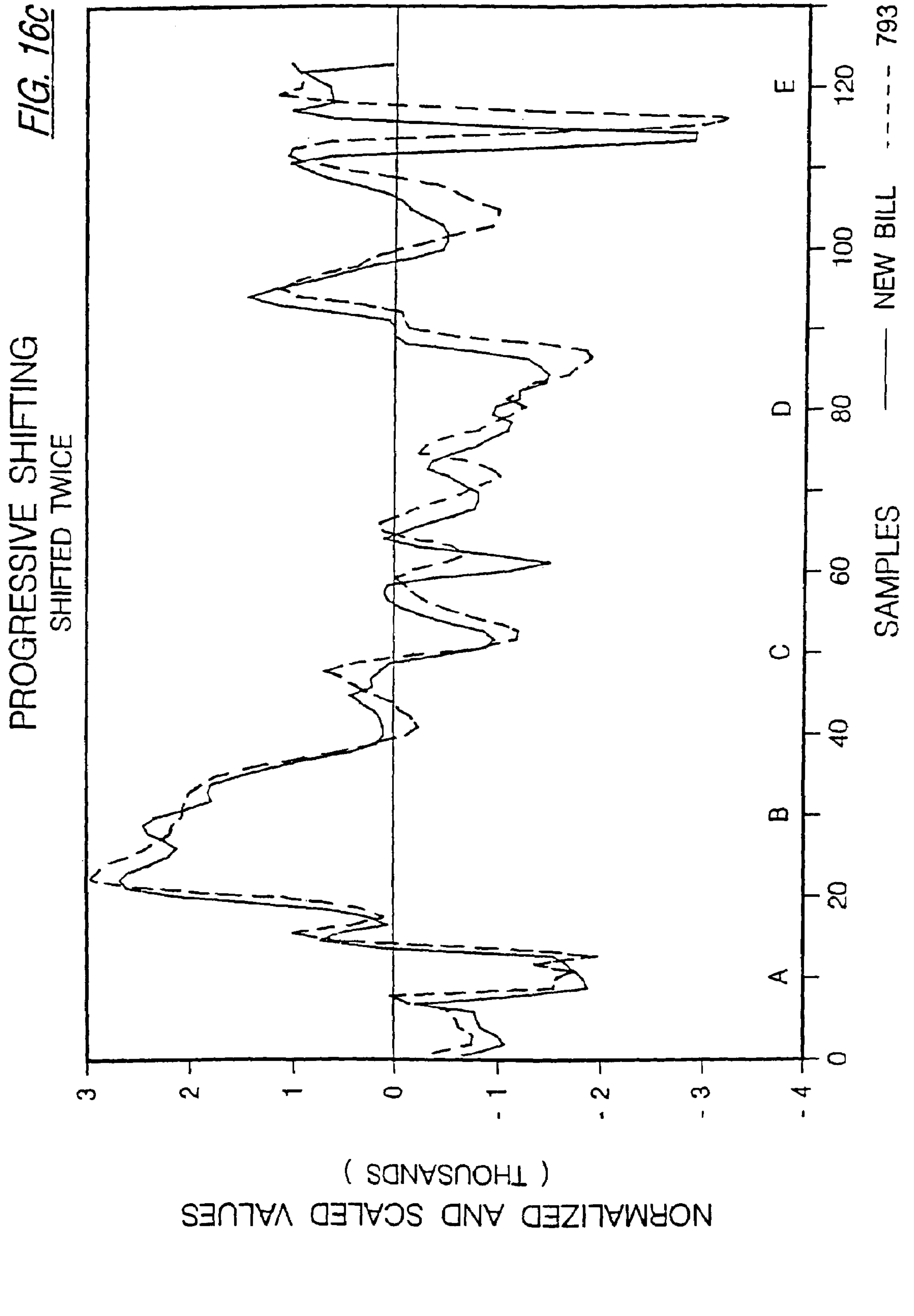

FIG. 16*c* shows the effect produced by "double" progressive shifting whereby sections of the test pattern are shifted in three stages. This is accomplished by dividing the overall pattern into three approximately equal sized sections. Section one is not shifted, section two is shifted by one data sample (as in FIG. 16*b*), and section three is shifted by a factor of two data samples. With "double" shifting, it can be seen that the correlation factor at point E is further increased.

Figure 16D:
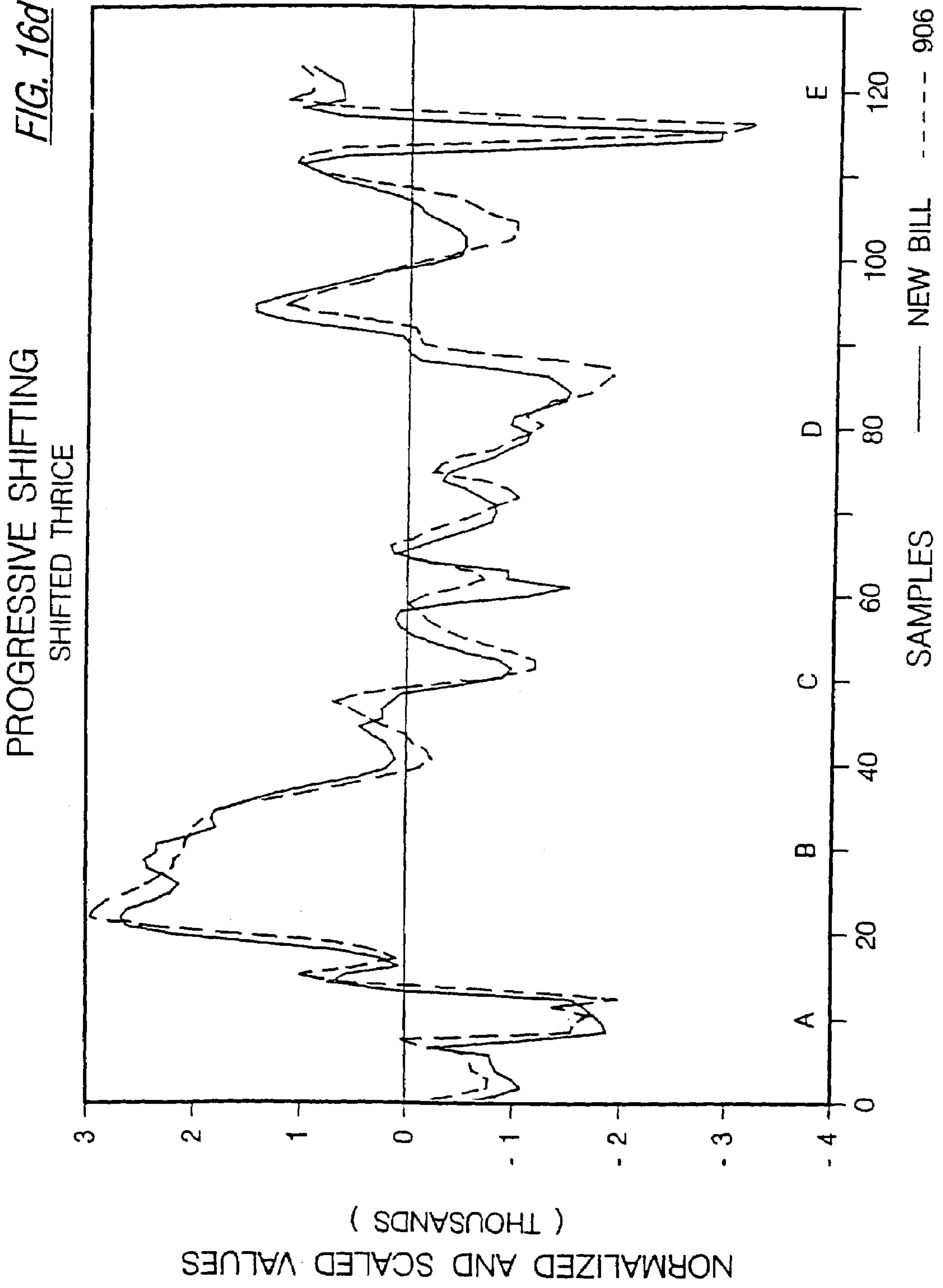

On a similar basis, FIG. 16*d* shows the effect on correlation produced by "triple" progressive shifting where the overall pattern is first divided into four (4) approximately equal sized sections. Subsequently, section one is retained without any shift, section two is shifted by one data sample, section three is shifted by two data samples, and section four is shifted by three data samples. Under these conditions, the correlation factor at point E is seen to have increased again.

Figure 16E:
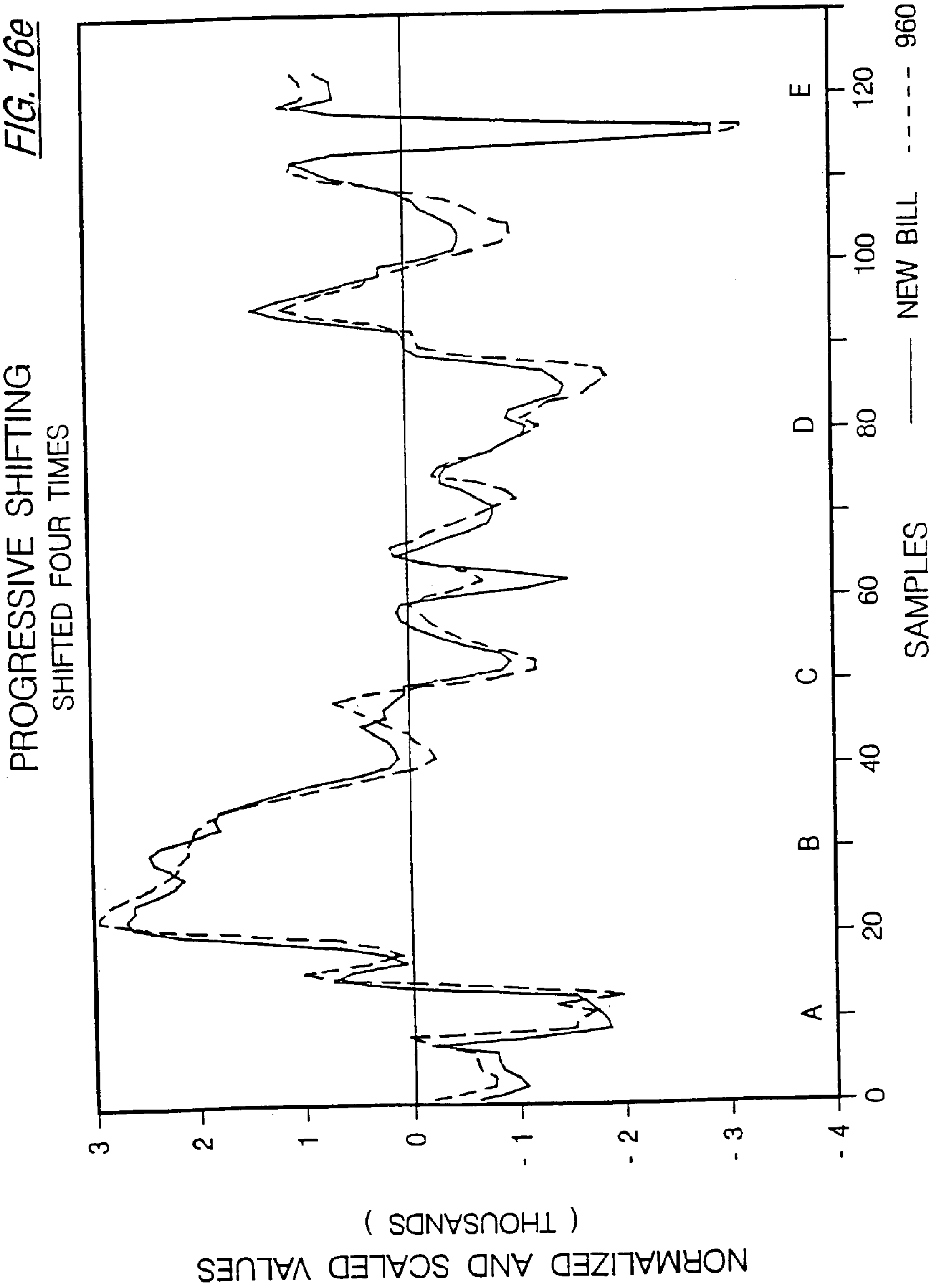

FIG. 16*e* shows the effect on correlation produced by "quadruple" shifting, where the pattern is first divided into five (5) approximately equal sized sections. The first four (4) sections are shifted in accordance with the "triple" shifting approach of FIG. 16*d*, whereas the fifth section is shifted by a factor of four (4) data samples. From FIG. 16*e* it is clear that the correlation at point E is increased almost to the point of superimposition of the compared data samples.

In an alternative progressive shifting approach, the degree of shrinkage of a scanned bill is determined by comparing the length of the scanned bill, as measured by the scanhead, with the length of an "unshrunk" bill. This "unshrunk" length is pre-stored in the system memory. The type of progressive shifting, e.g., "single", "double", "triple", etc., applied to the test pattern is then directly based upon the measured degree of shrinkage. The greater the degree of shrinkage, the greater the number of sections into which the test pattern is divided. An advantage of this approach is that only one correlation factor is calculated, as opposed to potentially calculating several correlation factors for different types of progressive shifting.

In yet another progressive shifting approach, instead of applying progressive shifting to the test pattern, progressive shifting is applied to each of the master patterns. The master patterns in the system memory are partitioned into predefined sections, and samples in successive sections are progressively shifted and compared again to the scanned test pattern in order to identify the denomination. To reduce the amount of processing time, the degree of progressive shifting which should be applied to the master patterns may be determined by first measuring the degree of shrinkage of the scanned bill. By first measuring the degree of shrinkage, only one type of progressive shifting is applied to the stored master patterns.

Instead of rearranging the scanned test pattern or the stored master patterns, the system memory may contain pre-stored patterns corresponding to various types of progressive shifting. The scanned test pattern is then compared to all of these stored patterns in the system memory. However, to reduce the time required for processing the data, this approach may be modified to first measure the degree of shrinkage and to then select only those stored patterns from the system memory which correspond to the measure degree of shrinkage for comparison with the scanned test pattern.

The advantage of using the progressive shifting approach, as opposed to merely shifting by a set amount of data samples across the overall test pattern, is that the improvement in correlation achieved in the initial sections of the pattern as a result of shifting is not neutralized or offset by any subsequent shifts in the test pattern. It is apparent from the above figures that the degree of correlation for sample points falling within the progressively shifted sections increases correspondingly.

More importantly, the progressive shifting realizes substantial increases in the overall correlation factor resulting from pattern comparison. For instance, the original correlation factor of 606 (FIG. 16*a*) is increased to 681 by the "single" shifting shown in FIG. 16*b*. The "double" shifting shown in FIG. 16*c* increases the correlation number to 793, the "triple" shifting of FIG. 16*d* increases the correlation number to 906, and, finally, the "quadruple" shifting shown in FIG. 16*e* increases the overall correlation number to 960. Using the above approach, it has been determined that used currency bills which exhibit a high degree of shrinkage and which cannot be accurately identified as belonging to the correct currency denomination when the correlation is performed without any shifting, can be identified with a high degree of certainty by using progressive shifting approach, preferably by adopting "triple" or "quadruple" shifting.

In currency discrimination systems in which discrimination is based on the comparison of a pattern obtained from scanning a subject bill to stored master patterns corresponding to various denominations, the patterns which are compared to each other significantly influence the performance characteristics of a discrimination system. For example, in the system described in U.S. Pat. No. 5,295,196, the correlation procedure and the accuracy with which a denomination is identified directly relates to the degree of correspondence between reflectance samples on the test pattern and corresponding samples on the stored master patterns. In accordance with method described above, the identity of a bill under test is determined by comparing a scanned pattern generated by scanning the bill under test with one or more master patterns associated with genuine bills. If the scanned pattern sufficiently correlates to one of the master pattern, the identity of the bill may be called. The process of identifying a bill under test may be subjected to a bi-level threshold test as described above.

However, the degree of correlation between a scanned and a master pattern may be negatively impacted if the two patterns are not properly aligned with each other. Such misalignment between patterns may in turn negatively impact upon the performance of a currency identification system. Misalignment between patterns may result from a number of factors. For example, if a system is designed so that the scanning process is initiated in response to the detection of the thin borderline surrounding U.S. currency or the detection of some other printed indicia such as the edge of printed indicia on a bill, stray marks may cause initiation of the scanning process at an improper time. This is especially true for stray marks in the area between the edge of a bill and the edge of the printed indicia on the bill. Such stray marks may cause the scanning process to be initiated too soon, resulting in a scanned pattern which leads a corresponding master pattern. Alternatively, where the detection of the edge of a bill is used to trigger the scanning process, misalignment between patterns may result from variances between the location of printed indicia on a bill relative to the edges of a bill. Such variances may result from tolerances permitted during the printing and/or cutting processes in the manufacture of currency. For example, it has been found that location of the leading edge of printed indicia on Canadian currency relative to the edge of Canadian currency may vary up to approximately 0.2 inches (approximately 0.5 cm).

According to one embodiment of the present invention, the problems associated with misaligned patterns are overcome by employing an improved method of generating multiple scanned and/or master patterns and comparing the multiple scanned and master patterns with each other. Briefly, one embodiment of the improved pattern generation method involves removing data samples from one end of a pattern to be modified and adding data values on the opposite end equal to the data values contained in the corresponding sequence positions of the pattern to which the modified pattern is to be compared. This process may be repeated, up to a predetermined number of times, until a sufficiently high correlation is obtained between the two patterns so as to permit the identity of a bill under test to be called. One embodiment of the present invention can be further understood by considering Table 3. Table 3 contains data samples generated by scanning the narrow dimension of Canadian $2 bills along a segment positioned about the center of the bill on the side opposite the portrait side. More specifically, the second column of Table 3 represents a scanned pattern generated by scanning a test Canadian $2 bill. The scanned pattern comprises 64 data samples arranged in a sequence. Each data sample has a sequence position, 1–64, associated therewith. The fifth column represents a master pattern associated with a Canadian $2 bill. The master pattern likewise comprises a sequence of 64 data samples. The third and fourth columns represent the scanned pattern after it has been modified in the forward direction one and two times, respectively. In the embodiment depicted in Table 3, one data sample is removed from the beginning of the preceding pattern during each modification.

TABLE 3

| Sequence Position | Scanned Pattern | Scanned Pattern Modified Once | Scanned Pattern Modified Twice | Master Pattern |
|---|---|---|---|---|
| 1 | 93 | 50 | −21 | 161 |
| 2 | 50 | −21 | 50 | 100 |
| 3 | −21 | 50 | 93 | 171 |
| 4 | 50 | 93 | 65 | 191 |
| 5 | 93 | 65 | 22 | 252 |
| 6 | 65 | 22 | 79 | 403 |
| 7 | 22 | 79 | 136 | 312 |
| 8 | 79 | 136 | 193 | 434 |
| 9 | 136 | 193 | 278 | 90 |
| 10 | 193 | 278 | 164 | 0 |
| 11 | 278 | 164 | 136 | 20 |
| 12 | 164 | 136 | 278 | 444 |
| . | . | . | . | . |
| . | . | . | . | . |
| . | . | . | . | . |
| 52 | −490 | −518 | −447 | −1090 |
| 53 | −518 | −447 | −646 | −767 |
| 54 | −447 | −646 | −348 | −575 |
| 55 | −646 | −348 | −92 | −514 |
| 56 | −348 | −92 | −63 | −545 |
| 57 | −92 | −63 | −205 | −40 |
| 58 | −63 | −205 | 605 | 1665 |
| 59 | −205 | 605 | 1756 | 1705 |
| 60 | 605 | 1756 | 1401 | 1685 |
| 61 | 1756 | 1401 | 1671 | 2160 |
| 62 | 1401 | 1671 | 2154 | 2271 |
| 63 | 1671 | 2154 | *2240 | 2240 |
| 64 | 2154 | *2210 | *2210 | 2210 |

The modified pattern represented in the third column is generated by adding an additional data value to the end of the original scanned pattern sequence which effectively removes the first data sample of the original pattern, e.g., 93, from the modified pattern. The added data value in the last sequence position, 64, is set equal to the data value contained in the 64th sequence position of the master pattern, e.g., 2210. This copying of the 64th data sample is indicated by an asterisk in the third column. The second modified pattern represented in the fourth column is generated by adding two additional data values to the end of the original scanned pattern which effectively removes the first two data samples of the original scanned, e.g., 93 and 50, from the second modified pattern. The last two sequence positions, 63 and 64, are filled with the data value contained in the 63rd and 64th sequence positions of the master pattern, e.g., 2240 and 2210, respectively. The copying of the 63rd and 64th data samples is indicated by asterisks in the fourth column.

In the example of Table 3, the printed area of the bill under test from which the scanned pattern was generated was farther away from the leading edge of the bill than was the printed area of the bill from which the master pattern was generated. As a result, the scanned pattern trailed the master pattern. The embodiment of the pattern generation method described in conjunction with Table 3 compensates for the variance of the distance between the edge of the bill and the edge of the printed indicia by modifying the scanned pattern in the forward direction. As a result of the modification method employed, the correlation between the original and modified versions of the scanned pattern and the master pattern increased from 705 for the original, unmodified scanned pattern to 855 for the first modified pattern and to 988 for the second modified pattern. Accordingly, the bill under test which would otherwise have been rejected may now be properly called as a genuine $2 Canadian bill through the employment of the pattern generation method discussed above.

Figure 17A:
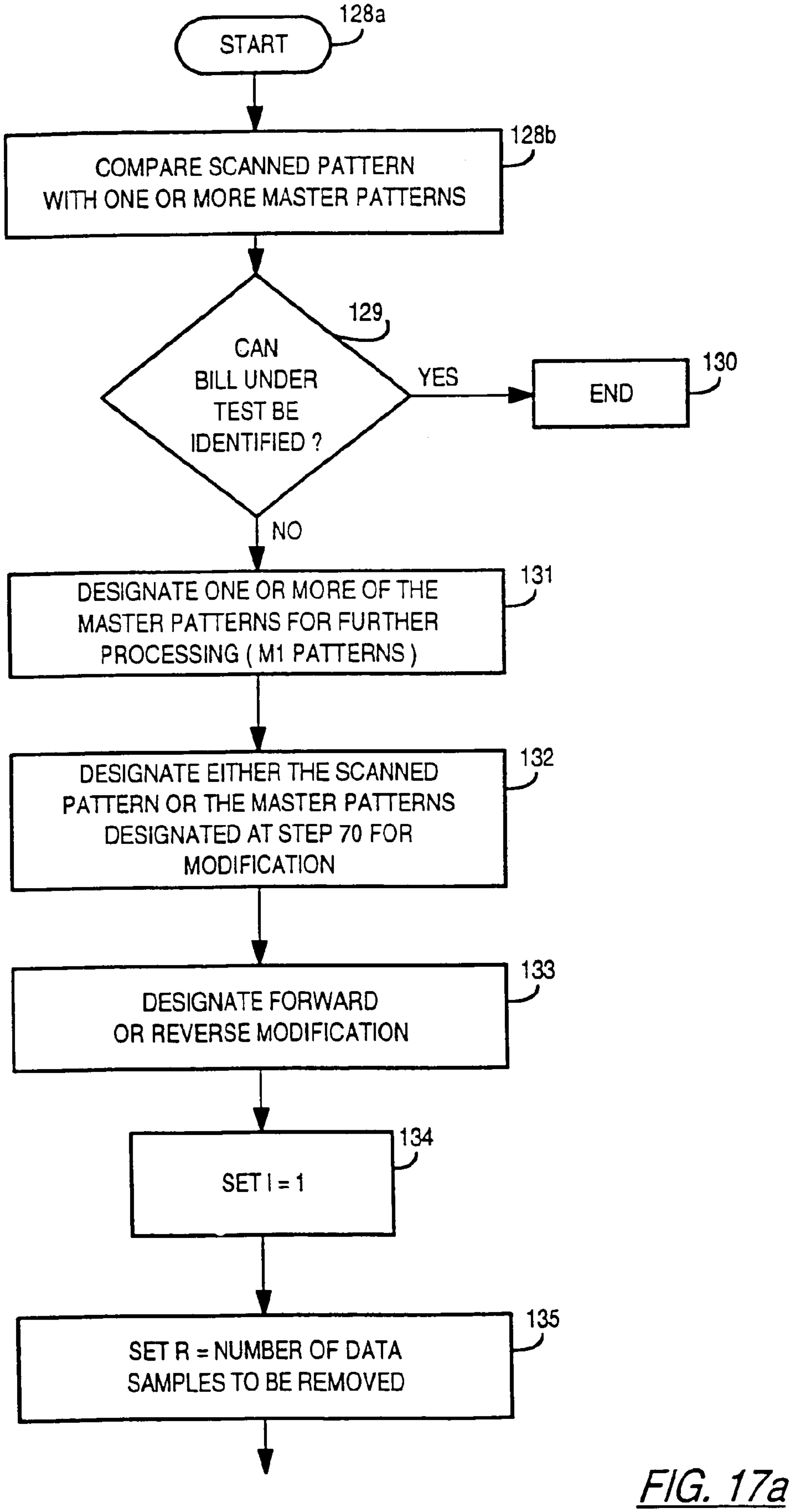
FIGS. 17*a*–17*c* are a flowchart illustrating one embodiment of a modified pattern generation method according to the present invention.
Figure 17B:
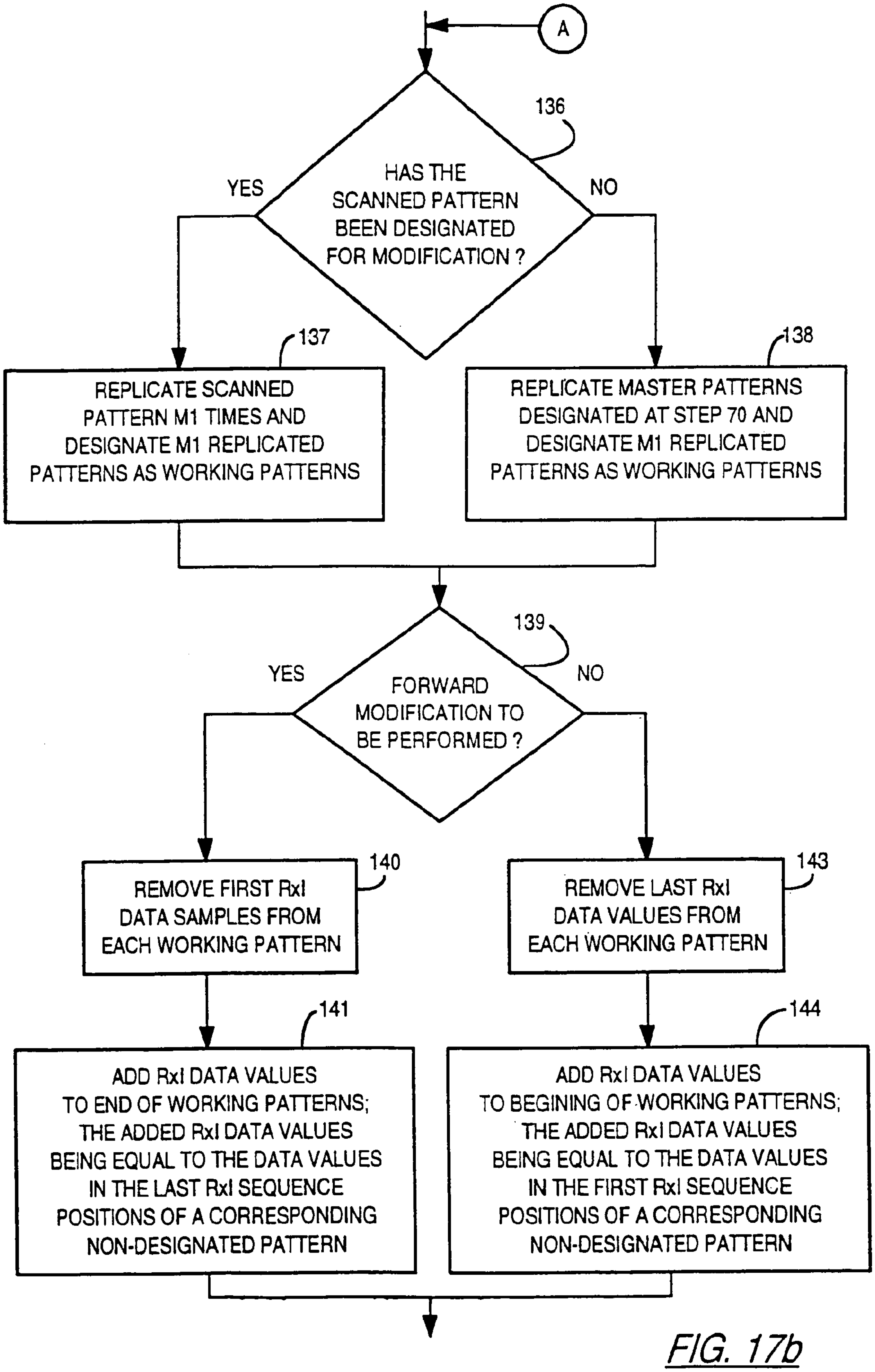
Figure 17C:
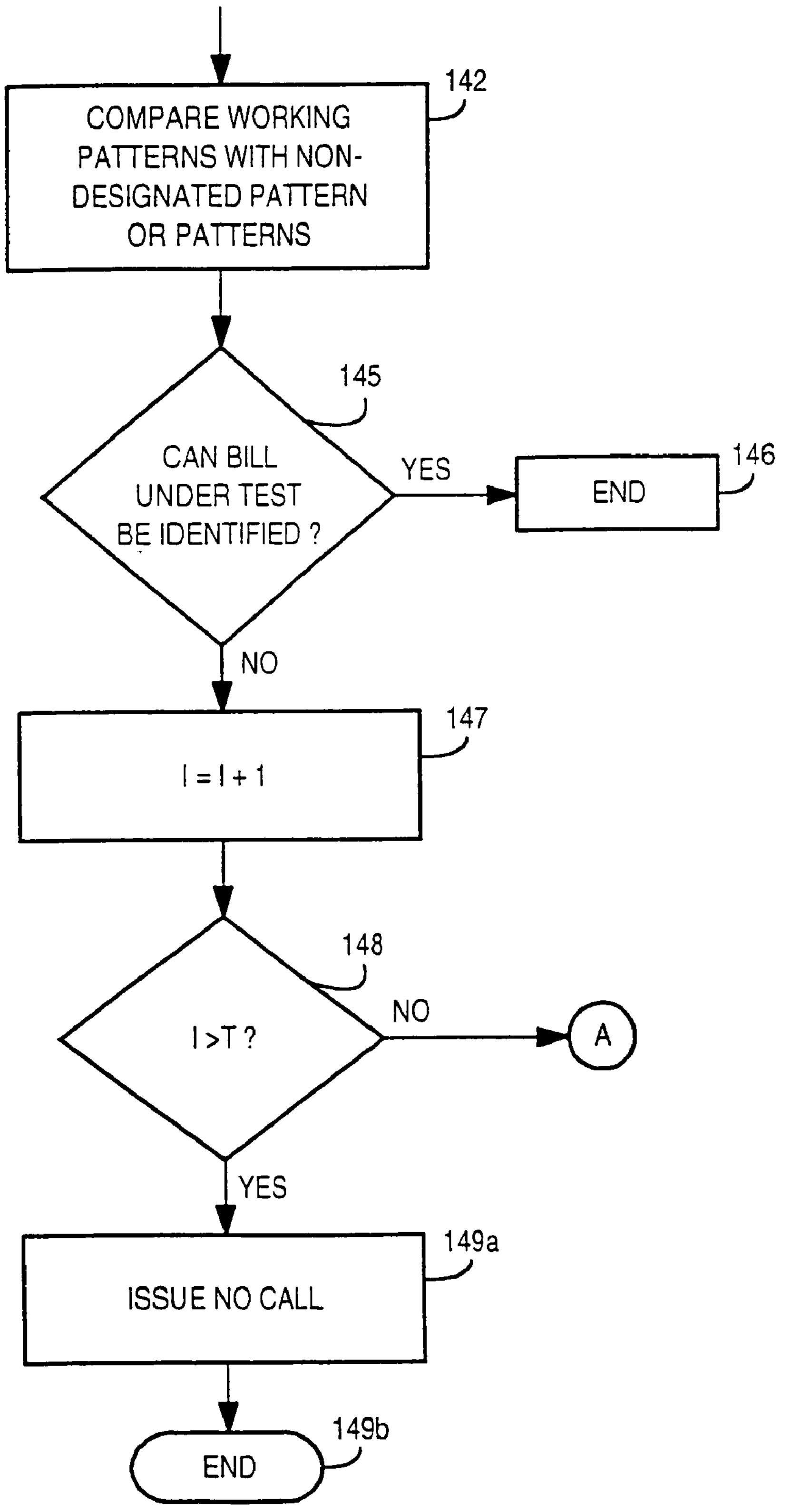

Another embodiment of the present invention can be understood with reference to the flowchart of FIGS. 17*a*–17*c*. The process of FIGS. 17*a*–17*c* involves a method of identifying a bill under test by comparing a scanned pattern retrieved from a bill under test with one or more master patterns associated with one or more genuine bills. After the process begins at step 128*a*, the scanned pattern is compared with one or more master patterns associated with genuine bills (step 128*b*). At step 129 it is determined whether the bill under test can be identified based on the comparison at step 128*b*. This may be accomplished by evaluating the correlation between the scanned pattern and each of the master patterns. If the bill can be identified, the process is ended at step 130. Otherwise, one or more of the master patterns are designated for further processing at step 131. For example, all of the master patterns may be designated for further processing. Alternatively, less than all of the master patterns may be designated based on a preliminary assessment about the identity of the bill under test. For example, only the master patterns which had the four highest correlation values with respect to the scanned pattern at step 128*b* might be chosen for further processing. In any case, the number of master patterns designated for further processing is M1.

At step 132, either the scanned pattern is designated for modification or the M1 master patterns designated at step 131 are designated for modification. In one embodiment of the present invention, the scanned pattern is designated for modification and the master patterns remain unmodified. At step 133, it is designated whether forward modification or reverse modification is to be performed. This determination may be made, for example, by analyzing the beginning or ending data samples of the scanned pattern to determine whether the scanned pattern trails or leads the master patterns.

At step 134, the iteration counter, I, is set equal to one. The iteration counter is used to keep track of how many times the working patterns have been modified. Then at step 135, the number of incremental data samples, R, to be removed during each iteration is set. For example, in one embodiment of the present invention, only one additional data sample is removed from each working pattern during each iteration in which case R is set equal to one.

At step 136, it is determined whether the scanned pattern has been designated for modification. If it has, then the scanned pattern is replicated M1 times and the M1 replicated patterns, one for each of the M1 master patterns, are designated as working patterns at step 137. If the scanned pattern has not been designated for modification, then the M1 master patterns have been so designated, and the M1 master patterns are replicated and designated as working patterns at step 138. Regardless of which pattern or patterns were designated for modification, at step 139, it is determined whether forward or reverse modification is to be performed on the working patterns.

If forward modification is to be performed, the first R×I data samples from each working pattern are removed at step 140. The first R×I data samples may either be explicitly removed from the working patterns or be removed as a result of adding additional data samples (step 141) to the end of the pattern and designating the beginning of the modified pattern to be the R×I+1 sequence position of the original pattern. As a result of the modification, the data sample which was in the 64th sequence position in the original working pattern will be in the 64−(R×I) sequence position. The added data values in the last R×I sequence positions of a working pattern are copied from the data samples in the last R×I sequence positions of a corresponding non-designated pattern at step 141. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

Alternatively, if reverse modification is to be performed, the last R×I data samples from each working pattern are removed at step 143. The last R×I data samples may either be explicitly removed from the working patterns or be removed as a result of adding additional data samples (step 144) to the beginning of the pattern and designating the beginning of the modified pattern to start with the added data samples. As a result of the modification, the data sample which was in the 1st sequence position in the original working pattern will be in the (R×I)+1 sequence position. The added data samples in first R×I sequence positions of a working pattern are copied from the data samples in the first R×I sequence positions of a corresponding non-designated pattern at step 144. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

For example, if the scanned pattern is designated for forward modification and four master patterns are designated for further processing, four working patterns are generated from the scanned pattern at step 137, one for each of the four master patterns. If R is set to two at step 135, during the first iteration the last two data samples from each of the M1 master patterns are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of the scanned pattern but with each having data values in its last two sequence positions copied from the last two sequence positions of a respective one of the M1 master patterns. After a second iteration, the last four sequence positions of each of the M1 master patterns are copied and added to the end of the M1 working patterns so as to become the last four sequence positions of a respective one of the M1 working patterns.

As another example, if four master patterns are designated for further processing and the four designated master patterns are designated for forward modification, four working patterns are generated at step 138, one from each of the four designated master patterns. If R is set to two at step 135, during the first iteration the last two data samples of the scanned pattern are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of a corresponding master pattern but with each having data values in its last two sequence position copied from the last two sequence positions of the scanned pattern. After a second iteration, the last four sequence positions of the scanned pattern are copied and added to the end of the M1 working patterns so as to become the last four sequence positions of the M1 working patterns.

After the comparison at step 142, it is determined whether the bill under test can be identified at step 145. If the bill can be identified the process is ended at step 146. Otherwise, the iteration counter, I, is incremented by one (step 147) and the incremented iteration counter is compared to a maximum iteration number, T (step 148). If the iteration counter, I, is greater than the maximum iteration number, T, then a no call is issued (step 149*a*), meaning that a match sufficient to identify the bill under test was not obtained, and the process is ended (step 149*b*). Otherwise, if the iteration is not greater than the maximum iteration number, the modification process is repeated beginning with step 136.

The flowchart of FIGS. 17*a*–17*c* is intended to illustrate one embodiment of the present invention. However, it is recognized that there are numerous ways in which the steps of the flowchart of FIGS. 17*a*–17*c* may be rearranged or altered and yet still result in the comparison of the same patterns as would be compared if the steps of FIGS. 17*a*–17*c* were followed exactly. For example, instead of generating multiple working patterns, a single working pattern may be generated and the leading or trailing sequence positions successively altered before comparisons to corresponding non-designated patterns. Likewise, instead of generating multiple modified patterns directly from unmodified patterns, multiple modified patterns may be generated from the preceding modified patterns. For example, instead of generating a twice forward modified scanned pattern by removing the first two data samples from the original scanned pattern and copying the last 2R sequence positions of a corresponding master pattern and adding these data values to the end of the original scanned pattern, the first data sample of the single forward modified scanned pattern may be removed and one data sample added to the end of the single modified scanned pattern and then the data samples in the last two sequence positions may be set equal to the data samples in the last 2R sequence positions of a corresponding master pattern.

In an alternate embodiment of the present invention, instead of copying data values from a scanned pattern into corresponding sequence positions of modified master patterns, leading or trailing sequence positions of modified master patterns are filled with zeros.

In an alternate embodiment of the present invention, modified master patterns are stored, for example in EPROM 60 of FIG. 7*a*, before a bill under test is scanned. In such an embodiment, a scanned pattern retrieved from a bill under test is compared to the modified master patterns stored in memory. Modified master patterns are generated by modifying a corresponding master pattern in either the forward or backward direction, or both, and filling in any trailing or leading sequence positions with zeros. An advantage of such one embodiment is that no modification needs to be performed during the normal operation of an identification device incorporating such an embodiment.

Figure 18A:
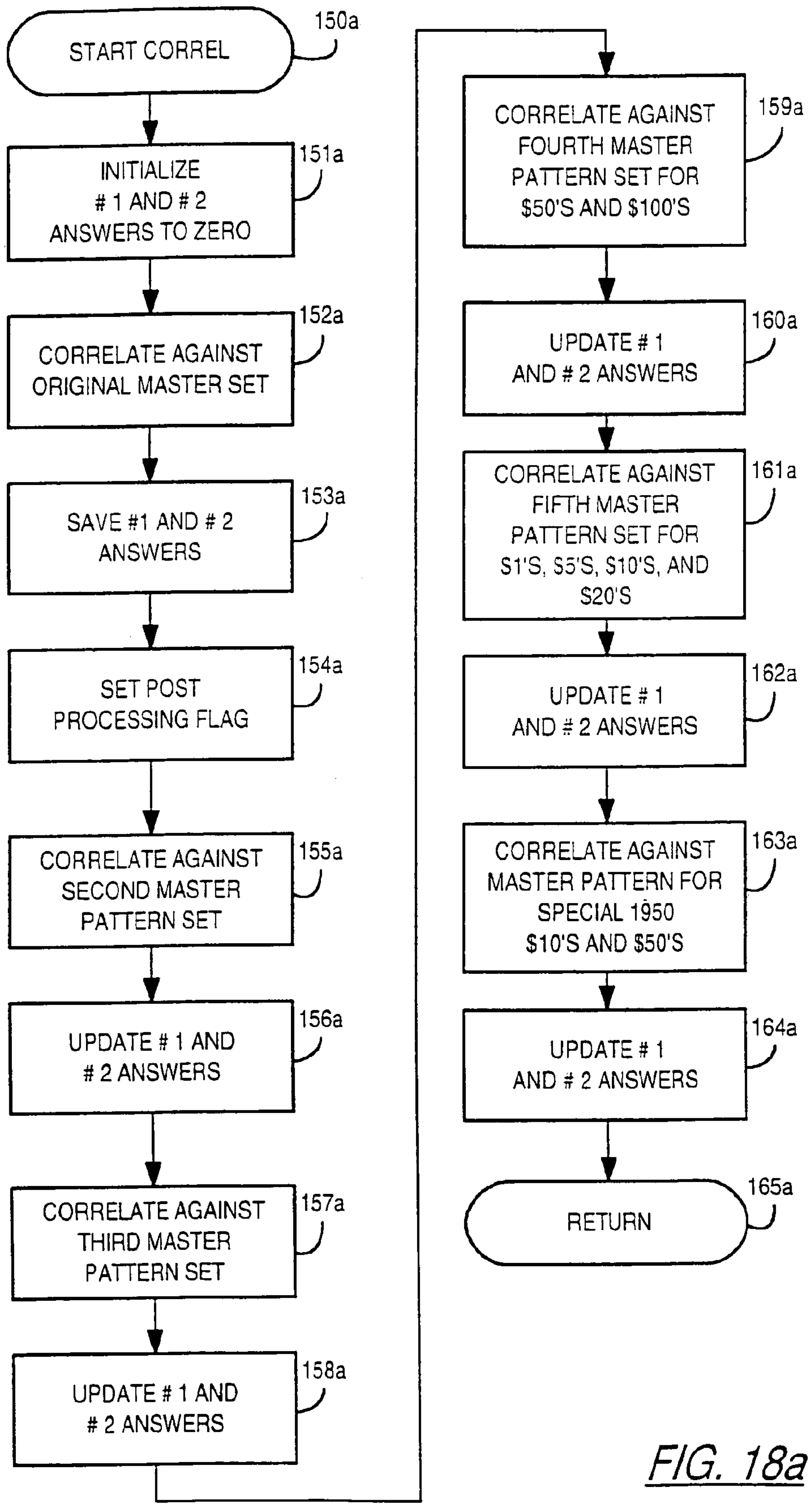
FIG. 18*a* is a flow chart illustrating the sequential procedure involved in the execution of multiple correlations of the scan data from a single bill.

An example of a procedure involved in comparing test patterns to master patterns is illustrated at FIG. 18*a* which shows the routine as starting at step 150*a*. At step 151*a*, the best and second best correlation results (referred to in FIG. 18*a* as the "#1 and #2 answers") are initialized to zero and, at step 152*a*, the test pattern is compared with each of the sixteen or eighteen original master patterns stored in the memory. At step 153*a*, the calls corresponding to the two highest correlation numbers obtained up to that point are determined and saved. At step 154*a*, a post-processing flag is set. At step 155*a* the test pattern is compared with each of a second set of 16 or 18 master patterns stored in the memory. This second set of master patterns is the same as the 16 or 18 original master patterns except that the last sample is dropped and a zero is inserted in front of the first sample. If any of the resulting correlation numbers is higher than the two highest numbers previously saved, the #1 and #2 answers are updated at step 156.

Steps 155*a* and 156*a* are repeated at steps 157*a* and 158*a*, using a third set of master patterns formed by dropping the last two samples from each of the 16 original master patterns and inserting two zeros in front of the first sample. At steps 159*a* and 160*a* the same steps are repeated again, but using only $50 and $100 master patterns formed by dropping the last three samples from the original master patterns and adding three zeros in front of the first sample. Steps 161*a* and 162*a* repeat the procedure once again, using only $1, $5, $10 and $20 master patterns formed by dropping the 33rd sample whereby original samples 34–64 become samples 33–63 and inserting a 0 as the new last sample. Finally, steps 163*a* and 164*a* repeat the same procedure, using master patterns for $10 and $50 bills printed in 1950, which differ significantly from bills of the same denominations printed in later years. This routine then returns to the main program at step 165*a*. The above multiple sets of master patterns may be pre-stored in EPROM 60.

Figure 18B:
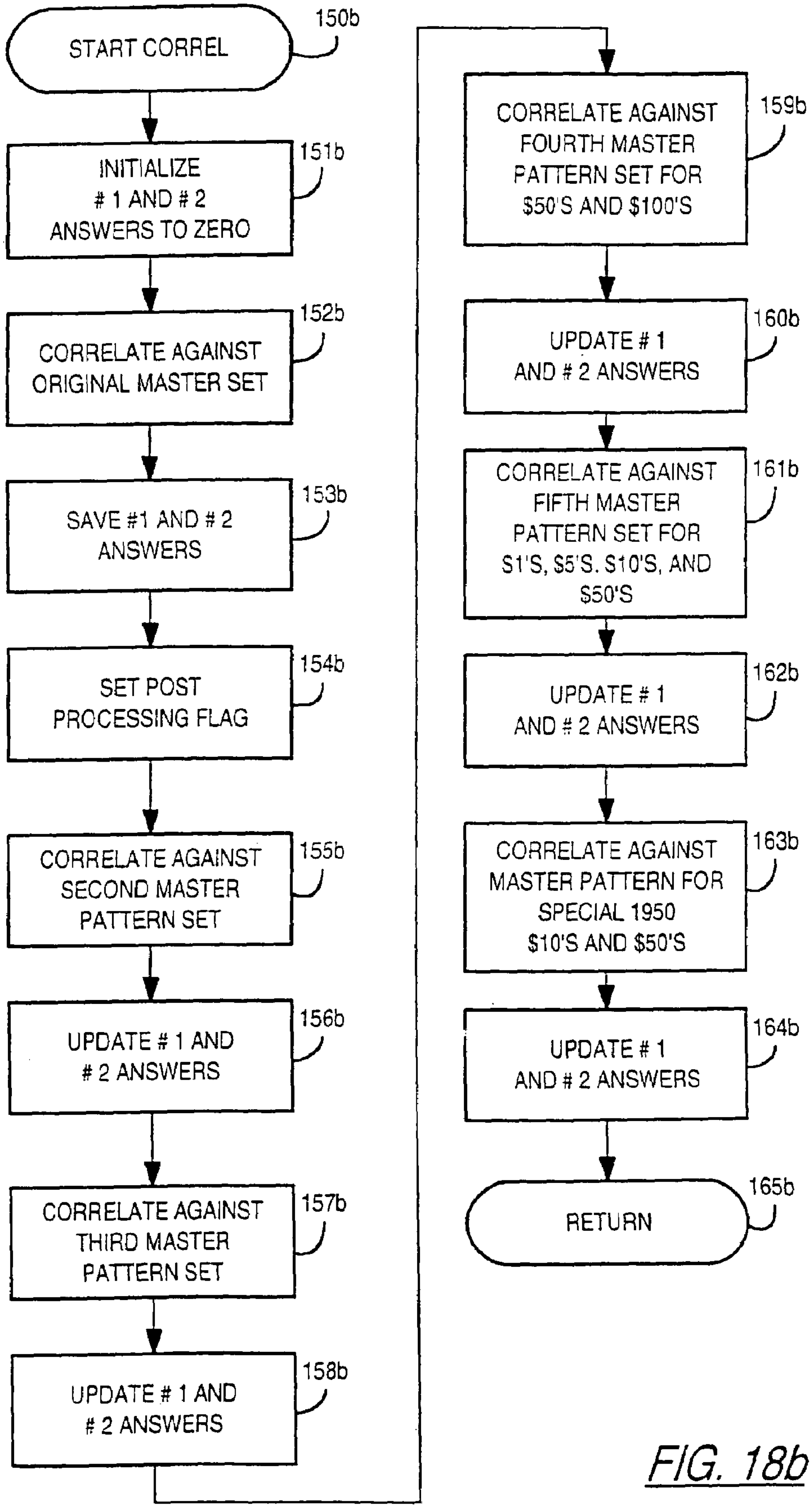
FIG. 18*b* is a flow chart illustrating a modified sequential procedure of that of FIG. 18*a;*

A modified procedure involved in comparing test patterns to green-side master patterns is illustrated at FIG. 18*b* which shows the routine as starting at step 150*b*. At step 151*b*, the best and second best correlation results (referred to in FIG. 18*b* as the "#1 and #2 answers") are initialized to zero and, at step 152*b*, the test pattern is compared with each of the eighteen original green-side master patterns stored in the memory. At step 153*b*, the calls corresponding to the two highest correlation numbers obtained up to that point are determined and saved. At step 154*b*, a post-processing flag is set. At step 155*b* the test pattern is compared with each of a second set of 18 green-side master patterns stored in the memory. This second set of master patterns is the same as the 18 original green-side master patterns except that the last sample is dropped and a zero is inserted in front of the first sample. If any of the resulting correlation numbers is higher than the two highest numbers previously saved, the #1 and #2 answers are updated at step 156*b*.

Steps 155*b* and 156*b* are repeated at steps 157*b* and 158*b*, using a third set of green-side master patterns formed by dropping the last two samples from each of the 18 original master patterns and inserting two zeros in front of the first sample. At steps 159*b* and 160*b* the same steps are repeated again, but using only $50 and $100 master patterns (two patterns for the $50 and four patterns for the $100) formed by dropping the last three samples from the original master patterns and adding three zeros in front of the first sample. Steps 161*b* and 162*b* repeat the procedure once again, using only $1, $5, $10, $20 and $50 master patterns (four patterns for the $10 and two patterns for the other denominations) formed by dropping the 33rd sample whereby original samples 34–64 become samples 33–63 and inserting a 0 as the new last sample. Finally, steps 163*b* and 164*b* repeat the same procedure, using master patterns for $10 and $50 bills printed in 1950 (two patterns scanned along a center segment for each denomination), which differ significantly from bills of the same denominations printed in later years. This routine then returns to the main program at step 165*b*. The above multiple sets of master patterns may be pre-stored in EPROM 60.

Figure 19A:
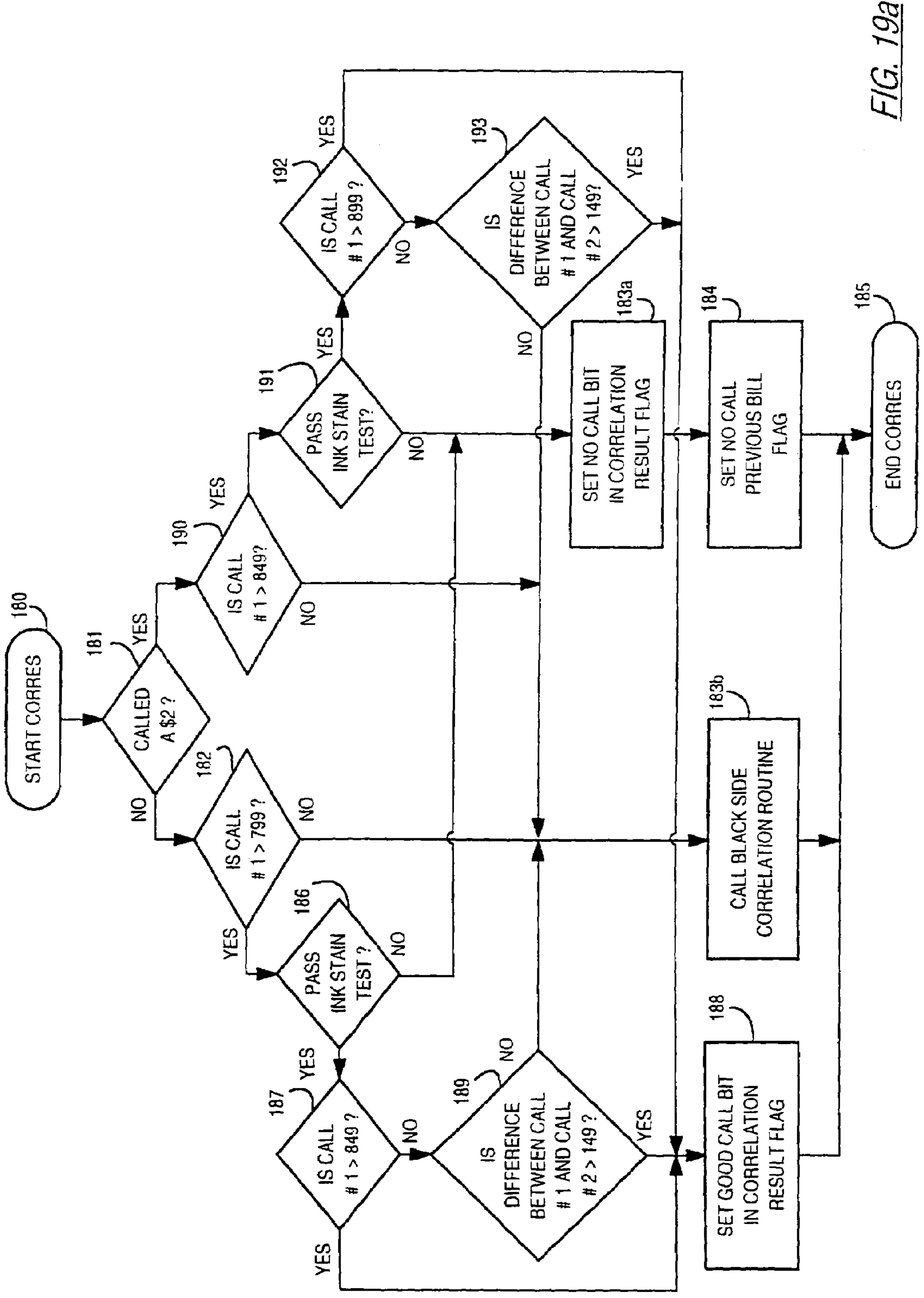
FIG. 19*a* is a flow chart illustrating the sequence of operations involved in determining the bill denomination from the correlation results using data retrieved from the green side of U.S. bills according to one embodiment of the present invention.

In one embodiment where conditional black-side correlation is to be performed a modified version of the routine designated as "CORRES" is initiated. The procedure involved in executing the modified version of CORRES is illustrated at FIG. 19*a* which shows the routine as starting at step 180. Step 181 determines whether the bill has been identified as a $2 bill, and, if the answer is negative, step 182 determines whether the best correlation number ("call #1") is greater than 799. If the answer is negative, the correlation number is too low to identify the denomination of the bill with certainty, and at step 183*b* a black side correlation routine is called (described in more detail below in conjunction with FIGS. 19*b*–19*c*).

An affirmative answer at step 182 advances the system to step 186, which determines whether the sample data passes an ink stain test (described below). If the answer is negative, a "no call" bit is set in a correlation result flag at step 183*a*. A "no call previous bill" flag is then set at step 184, and the routine returns to the main program at step 185. If the answer at step 186 is affirmative, the system advances to step 187 which determines whether the best correlation number is greater than 849. An affirmative answer at step 187 indicates that the correlation number is sufficiently high that the denomination of the scanned bill can be identified with certainty without any further checking. Consequently, a "good call" bit is set in the correlation result flag at step 188. A separate register associated with the best correlation number (#1) may then be used to identify the denomination represented by the stored pattern resulting in the highest correlation number. The system returns to the main program at step 185.

A negative answer at step 187 indicates that the correlation number is between –800 and 850. It has been found that correlation numbers within this range are sufficient to identify all bills except the $2 bill. Accordingly, a negative response at step 187 advances the system to step 189 which determines whether the difference between the two highest correlation numbers ("call #1" and "call #2") is greater than 149. If the answer is affirmative, the denomination identified by the highest correlation number is acceptable, and thus the "good call" bit is set in the correlation result flag at step 188. If the difference between the two highest correlation numbers is less than 150, step 189 produces a negative response which advances the system to step 183*b* where the black side correlation routine is called.

Returning to step 181, an affirmative response at this step indicates that the initial call is a $2 bill. This affirmative response initiates a series of steps 190–193 which are similar to steps 182, 186, 187 and 189 described above, except that the numbers 799 and 849 used in steps 182 and 187 are changed to 849 and 899, respectively, in steps 190 and 192. The result is either the setting of a "no call" bit in a correlation result flag at step 183*a*, the setting of the "good call" bit in the correlation result flag at step 188, or the calling of the black side correlation routine at step 183*b*.

Figure 19B:
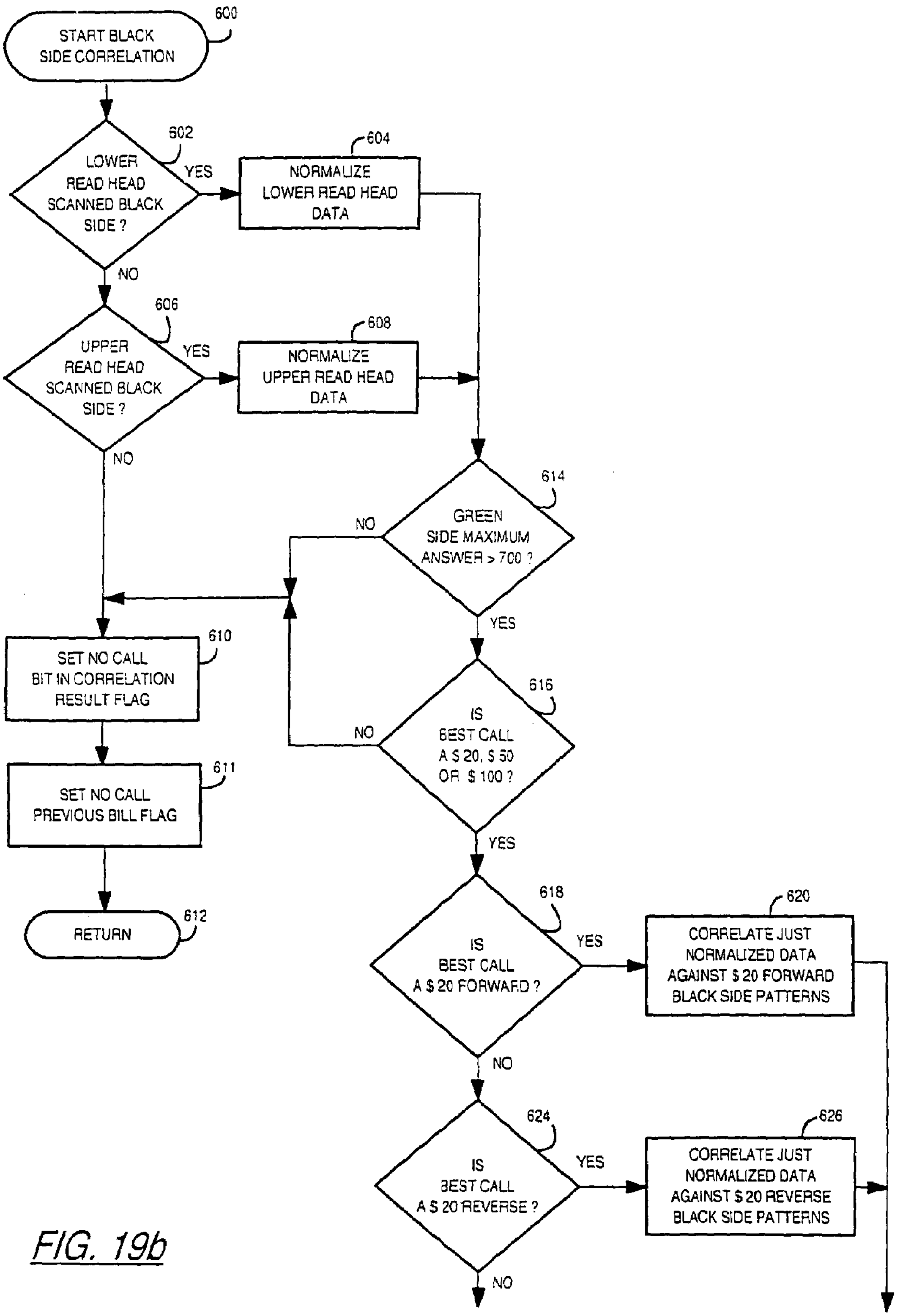
FIGS. 19*b* and 19*c* are a flow chart illustrating the sequence of operations involved in determining the bill denomination from the correlation results using data retrieved from the black side of U.S. bills.
Figure 19C:
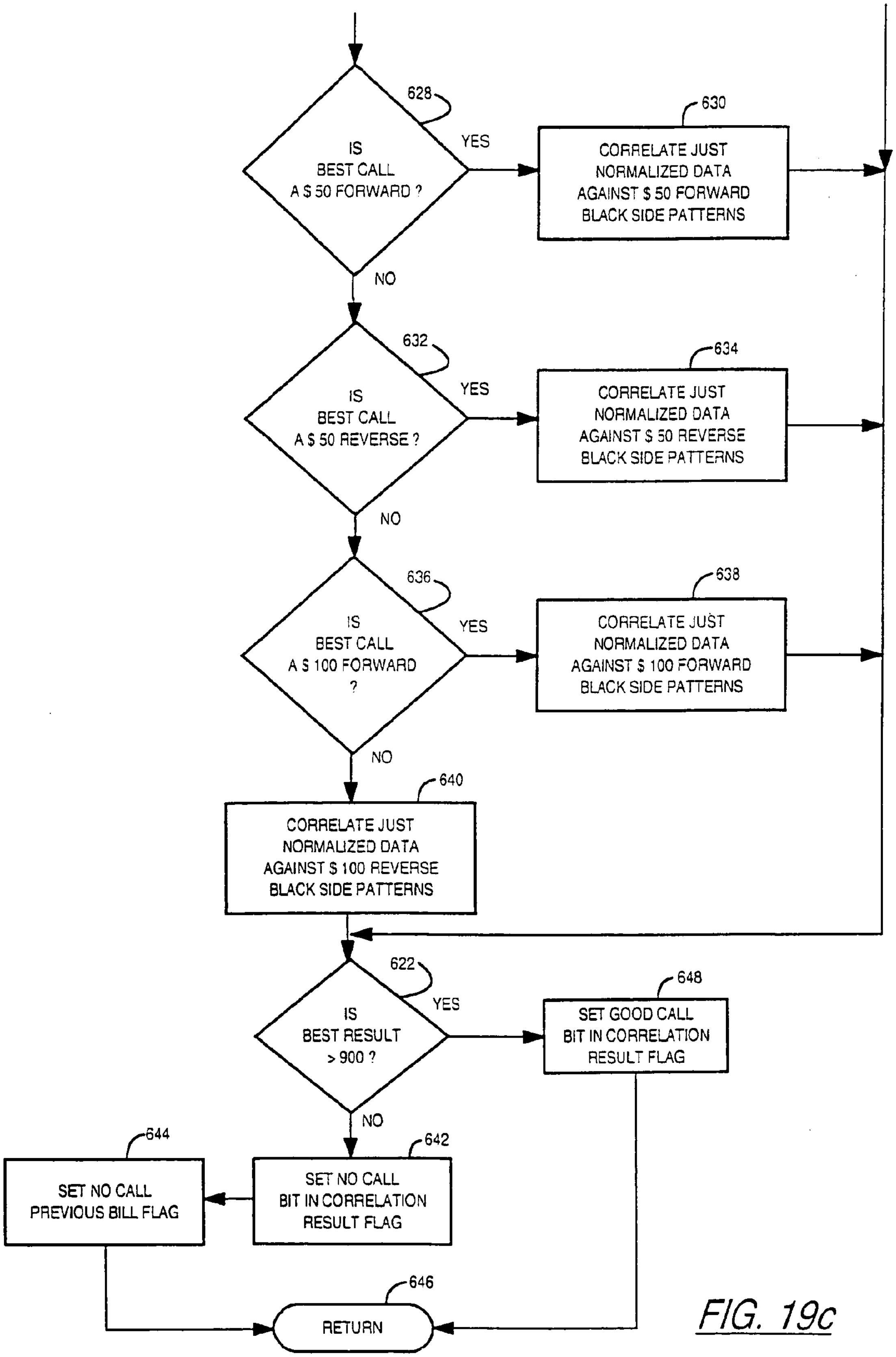

Turning now to FIGS. 19*b* and 19*c* there is shown a flowchart illustrating the steps of the black side correlation routine called at step 183*b* of FIG. 19*a*. After the black side correlation routine is initiated at step 600, it is determined at step 602 whether the lower read head was the read head that scanned the black side of the test bill. If it was, the lower read head data is normalized at step 604. Otherwise, it is determined at step 606 whether the upper read head was the read head that scanned the black side of the test bill. If it was, the upper read head data is normalized at step 608. If it cannot be determined which read head scanned the black side of the bill, then the patterns generated from both sides of the test bill were correlated against the green-side master patterns (see e.g., step 110 of FIG. 12). Under such a circumstance, the no call bit in the correlation result flag is set at step 610, the no call previous bill flag is set at step 611, and the program returns to the calling point at step 612.

After the lower read head data is normalized at step 604, or the upper read head data is normalized at step 608, it is determined whether the best green-side correlation number is greater than 700 at step 614. A negative response at step 614 results in the no call bit in the correlation result flag being set at step 610, the no call previous bill flag being set at step 611, and the program returning to the calling point at step 612. An affirmative response at step 614 results in a determination being made as to whether the best call from the green side correlation corresponds to a $20, $50, or $100 bill at step 616. A negative response at step 616 results in the no call bit in the correlation result flag being set at step 610, the no call previous bill flag being set at step 611, and thee program returning to the calling point at step 612.

If it determined at step 616 that the best call from the green side correlation corresponds to a $20, $50, or $100 bill, the scanned pattern from the black side is correlated against the black-side master patterns associated with the specific denomination and scan direction associated the best call from the green side. According to one embodiment, multiple black-side master patterns are stored for $20, $50 and $100 bills. For each of these denominations, three master patterns are stored for scans in the forward and three master patterns are stored for scans in the reverse direction for a total of six patterns for each denomination. For a given scan direction, black-side master patterns are generated by scanning a corresponding denominated bill along a segment located about the center of the narrow dimension of the bill, a segment slightly displaced (0.2 inches) to the left of center, and a segment slightly displaced (0.2 inches) to the right of center.

For example, at step 618, it is determined whether the best call from the green side is associated with a forward scan of a $20 bill and, if it is, the normalized data from the black side of the test bill is correlated against the black-side master patterns associated with a forward scan of a $20 bill at step 620. Next it is determined whether the black-side correlation number is greater than 900 at step 622. If it is, the good call bit in the correlation result flag is set at step 648 and the program returns to the calling point at step 646. If the black-side correlation number is not greater than 900, then the no call bit in the correlation result flag is set at step 642, the no call previous bill flag is set at step 644, and the program returns to the calling point at step 646. If it is determined that the best call from the green side is not associated with a forward scan of $20 bill at step 618, the program branches accordingly at steps 624–640 so that the normalized data from the black side of the test bill is correlated against the appropriate black-side master patterns.

Referring now to FIGS. 20*a*–22, the mechanical portions of the currency discrimination and counting machine include a rigid frame formed by a pair of side plates 201 and 202, a pair of top plates 203*a* and 203*b*, and a lower front plate 204. The input receptacle for receiving a stack of bills to be processed is formed by downwardly sloping and converging walls 205 and 206 formed by a pair of removable covers 207 and 208 which snap onto the frame. The rear wall 206 supports a removable hopper 209 which includes a pair of vertically disposed side walls 210*a* and 210*b* which complete the receptacle for the stack of currency bills to be processed.

From the input receptacle, the currency bills are moved in seriatim from the bottom of the stack along a curved guideway 211 which receives bills moving downwardly and rearwardly and changes the direction of travel to a forward direction. The curvature of the guideway 211 corresponds substantially to the curved periphery of the drive roll 223 so as to form a narrow passageway for the bills along the rear side of the drive roll. The exit end of the guideway 211 directs the bills onto a linear path where the bills are scanned and stacked. The bills are transported and stacked with the narrow dimension of the bills maintained parallel to the transport path and the direction of movement at all times.

Stacking of the bills is effected at the forward end of the linear path, where the bills are fed into a pair of driven stacking wheels 212 and 213. These wheels project upwardly through a pair of openings in a stacker plate 214 to receive the bills as they are advanced across the downwardly sloping upper surface of the plate. The stacker wheels 212 and 213 are supported for rotational movement about a shaft 215 journalled on the rigid frame and driven by a motor 216. The flexible blades of the stacker wheels deliver the bills into an output receptacle 217 at the forward end of the stacker plate 214. During operation, a currency bill which is delivered to the stacker plate 214 is picked up by the flexible blades and becomes lodged between a pair of adjacent blades which, in combination, define a curved enclosure which decelerates a bill entering therein and serves as a means for supporting and transferring the bill into the output receptacle 217 as the stacker wheels 212, 213 rotate. The mechanical configuration of the stacker wheels, as well as the manner in which they cooperate with the stacker plate, is conventional and, accordingly, is not described in detail herein.

Returning now to the input region of the machine as shown in FIGS. 20*a*–22, bills that are stacked on the bottom wall 205 of the input receptacle are stripped, one at a time, from the bottom of the stack. The bills are stripped by a pair of stripping wheels 220 mounted on a drive shaft 221 which, in turn, is supported across the side walls 201, 202. The stripping wheels 220 project through a pair of slots formed in the cover 207. Part of the periphery of each wheel 220 is provided with a raised high-friction, serrated surface 222 which engages the bottom bill of the input stack as the wheels 220 rotate, to initiate feeding movement of the bottom bill from the stack. The serrated surfaces 222 project radially beyond the rest of the wheel peripheries so that the wheels "jog" the bill stack during each revolution so as to agitate and loosen the bottom currency bill within the stack, thereby facilitating the stripping of the bottom bill from the stack.

The stripping wheels 220 feed each stripped bill B (FIG. 21*a*) onto a drive roll 223 mounted on a driven shaft 224 supported across the side walls 201 and 202. As can be seen most clearly in FIGS. 21*a* and 21*b*, the drive roll 223 includes a central smooth friction surface 225 formed of a material such as rubber or hard plastic. This smooth friction surface 225 is sandwiched between a pair of grooved surfaces 226 and 227 having serrated portions 228 and 229 formed from a high-friction material.

The serrated surfaces 228, 229 engage each bill after it is fed onto the drive roll 223 by the stripping wheels 220, to frictionally advance the bill into the narrow arcuate passageway formed by the curved guideway 211 adjacent the rear side of the drive roll 223. The rotational movement of the drive roll 223 and the stripping wheels 220 is synchronized so that the serrated surfaces on the drive roll and the stripping wheels maintain a constant relationship to each other. Moreover, the drive roll 223 is dimensioned so that the circumference of the outermost portions of the grooved surfaces is greater than the width W of a bill, so that the bills advanced by the drive roll 223 are spaced apart from each other, for the reasons discussed above. That is, each bill fed to the drive roll 223 is advanced by that roll only when the serrated surfaces 228, 229 come into engagement with the bill, so that the circumference of the drive roll 223 determines the spacing between the leading edges of successive bills.

To avoid the simultaneous removal of multiple bills from the stack in the input receptacle, particularly when small stacks of bills are loaded into the machine, the stripping wheels 220 are always stopped with the raised, serrated portions 222 positioned below the bottom wall 205 of the input receptacle. This is accomplished by continuously monitoring the angular position of the serrated portions of the stripping wheels 220 via the encoder 32, and then controlling the stopping time of the drive motor so that the motor always stops the stripping wheels in a position where the serrated portions 222 are located beneath the bottom wall 205 of the input receptacle. Thus, each time a new stack of bills is loaded into the machine, those bills will rest on the smooth portions of the stripping wheels. This has been found to significantly reduce the simultaneous feeding of double or triple bills, particularly when small stacks of bills are involved.

In order to ensure firm engagement between the drive roll 223 and the currency bill being fed, an idler roll 230 urges each incoming bill against the smooth central surface 225 of the drive roll 223. The idler roll 230 is journalled on a pair of arms 231 which are pivotally mounted on a support shaft 232. Also mounted on the shaft 232, on opposite sides of the idler roll 230, are a pair of grooved guide wheels 233 and 234. The grooves in these two wheels 233, 234 are registered with the central ribs in the two grooved surfaces 226, 227 of the drive roll 223. The wheels 233, 234 are locked to the shaft 232, which in turn is locked against movement in the direction of the bill movement (clockwise as view in FIG. 20*a*) by a one-way spring clutch 235. Each time a bill is fed into the nip between the guide wheels 233, 234 and the drive roll 223, the clutch 235 is energized to turn the shaft 232 just a few degrees in a direction opposite the direction of bill movement. These repeated incremental movements distribute the wear uniformly around the circumferences of the guide wheels 233, 234. Although the idler roll 230 and the guide wheels 233, 234 are mounted behind the guideway 211, the guideway is apertured to allow the roll 230 and the wheels 233, 234 to engage the bills on the front side of the guideway.

Beneath the idler roll 230, a spring-loaded pressure roll 236 (FIGS. 20*a* and 21*b*) presses the bills into firm engagement with the smooth friction surface 225 of the drive roll as the bills curve downwardly along the guideway 211. This pressure roll 236 is journalled on a pair of arms 237 pivoted on a stationary shaft 238. A spring 239 attached to the lower ends of the arms 237 urges the roll 236 against the drive roll 223, through an aperture in the curved guideway 211.

At the lower end of the curved guideway 211, the bill being transported by the drive roll 223 engages a flat guide plate 240 which carries a lower scan head 18. Currency bills are positively driven along the flat plate 240 by means of a transport roll arrangement which includes the drive roll 223 at one end of the plate and a smaller driven roll 241 at the other end of the plate. Both the driver roll 223 and the smaller roll 241 include pairs of smooth raised cylindrical surfaces 242 and 243 which hold the bill flat against the plate 240. A pair of O rings 244 and 245 fit into grooves formed in both the roll 241 and the roll 223 to engage the bill continuously between the two rolls 223 and 241 to transport the bill while helping to hold the bill flat against the guide plate 240.

The flat guide plate 240 is provided with openings through which the raised surfaces 242 and 243 of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes 254 and 255 and biased into counter-rotating contact with the corresponding upper rolls 223 and 241. The passive rolls 250 and 251 are biased into contact with the driven rolls 223 and 241 by means of a pair of H-shaped leaf springs 252 and 253 (see FIGS. 23 and 24). Each of the four rolls 250, 251 is cradled between a pair of parallel arms of one of the H-shaped leaf springs 252 and 253. The central portion of each leaf spring is fastened to the plate 240, which is fastened rigidly to the machine frame, so that the relatively stiff arms of the H-shaped springs exert a constant biasing pressure against the rolls and push them against the upper rolls 223 and 241.

The points of contact between the driven and passive transport rolls are preferably coplanar with the flat upper surface of the plate 240 so that currency bills can be positively driven along the top surface of the plate in a flat manner. The distance between the axes of the two driven transport rolls, and the corresponding counter-rotating passive rolls, is selected to be just short of the length of the narrow dimension of the currency bills. Accordingly, the bills are firmly gripped under uniform pressure between the upper and lower transport rolls within the scanhead area, thereby minimizing the possibility of bill skew and enhancing the reliability of the overall scanning and recognition process.

The positive guiding arrangement described above is advantageous in that uniform guiding pressure is maintained on the bills as they are transported through the optical scanhead area, and twisting or skewing of the bills is substantially reduced. This positive action is supplemented by the use of the H-springs 252, 253 for uniformly biasing the passive rollers into contact with the active rollers so that bill twisting or skew resulting from differential pressure applied to the bills along the transport path is avoided. The O-rings 244, 245 function as simple, yet extremely effective means for ensuring that the central portions of the bills are held flat.

Figure 23:
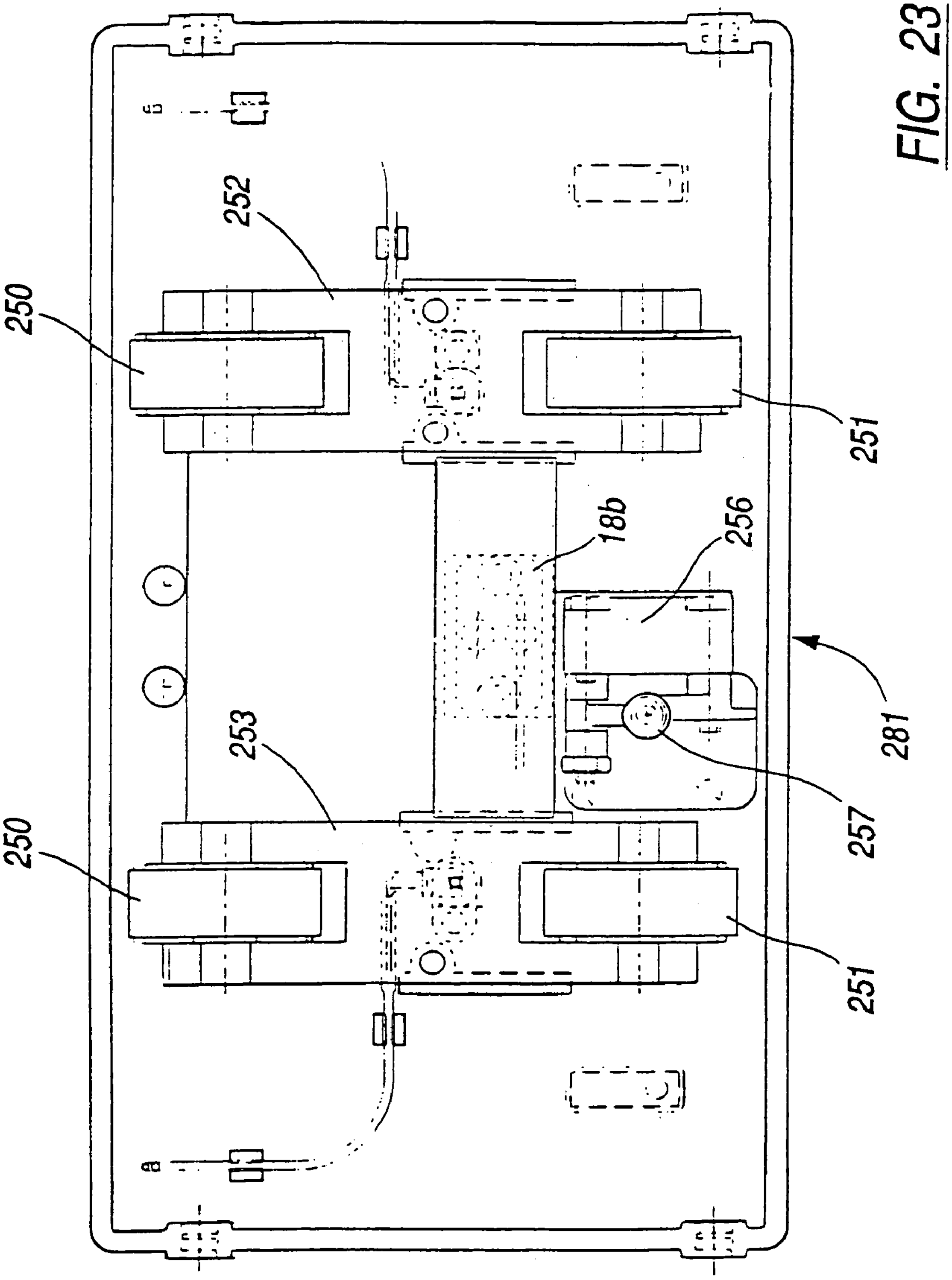
FIG. 23 is an enlarged bottom plan view of the lower support member in the machine of FIG. 1 and the passive transport rolls mounted on that member.
Figure 24:
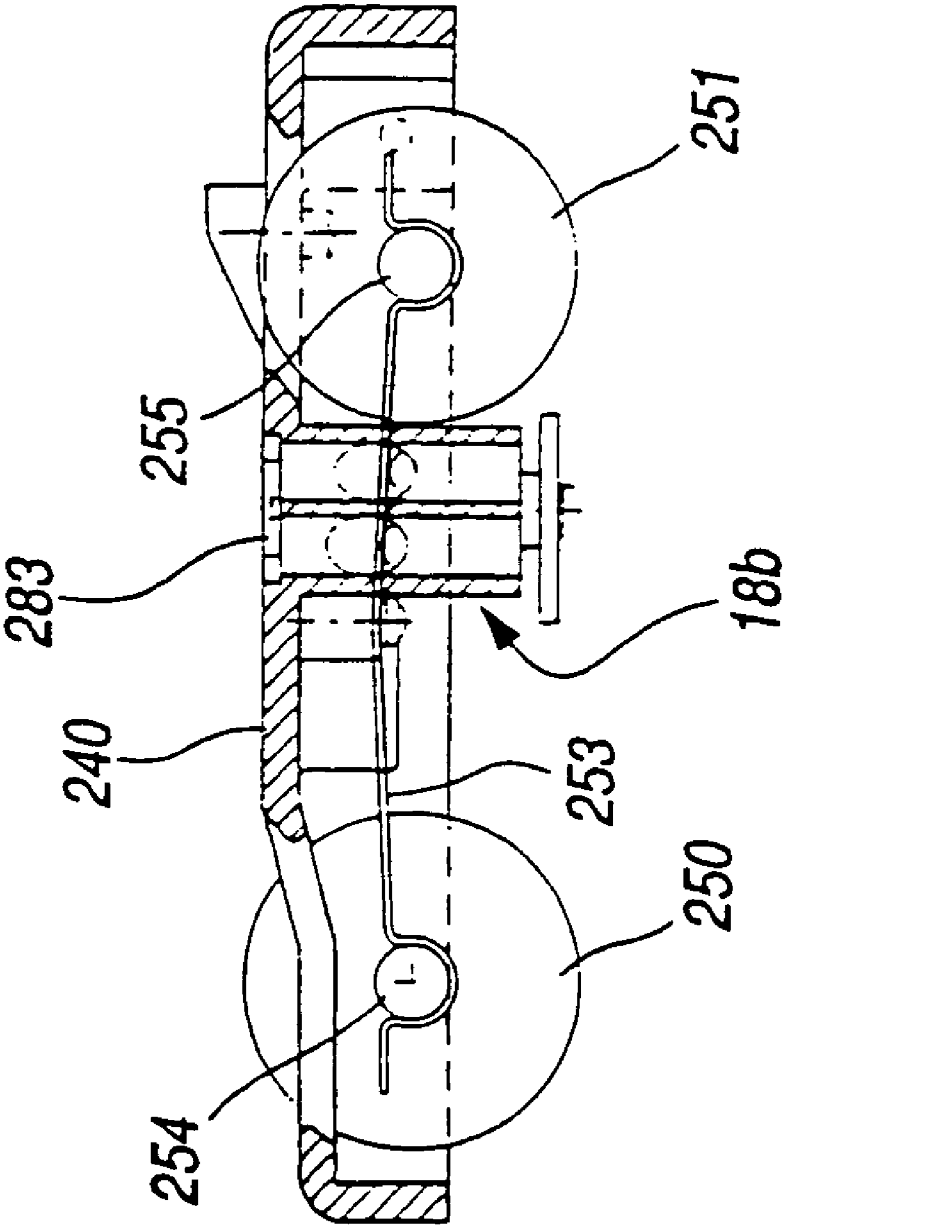
FIG. 24 is a sectional view taken across the center of the bottom support member of FIG. 23 across the narrow dimension thereof.
Figure 26:
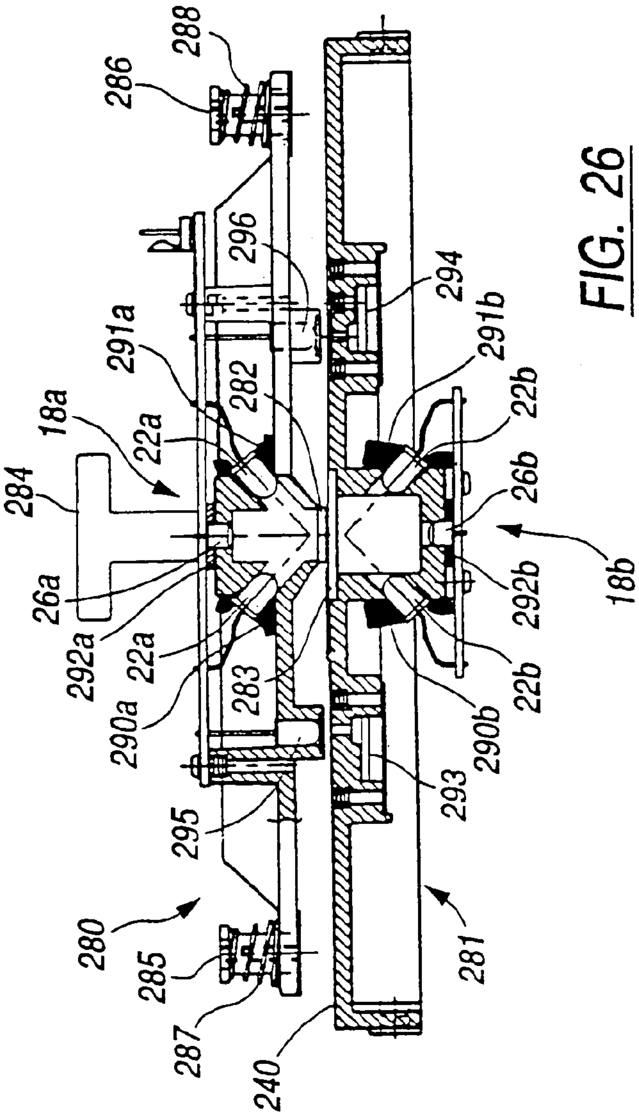
FIG. 26 is a section taken through the centers of both the upper and lower support members, along the long dimension of the lower support member shown in FIG. 23.
Figure 25:
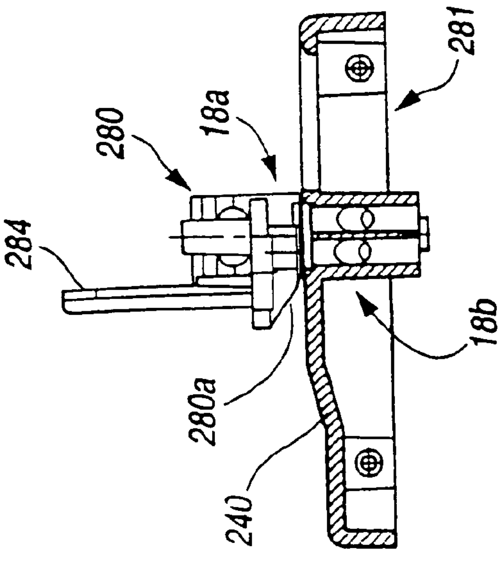
FIG. 25 is an end elevation of the upper support member which includes the upper scanhead in the machine of FIG. 1, and the sectional view of the lower support member mounted beneath the upper support member.
Figure 27:
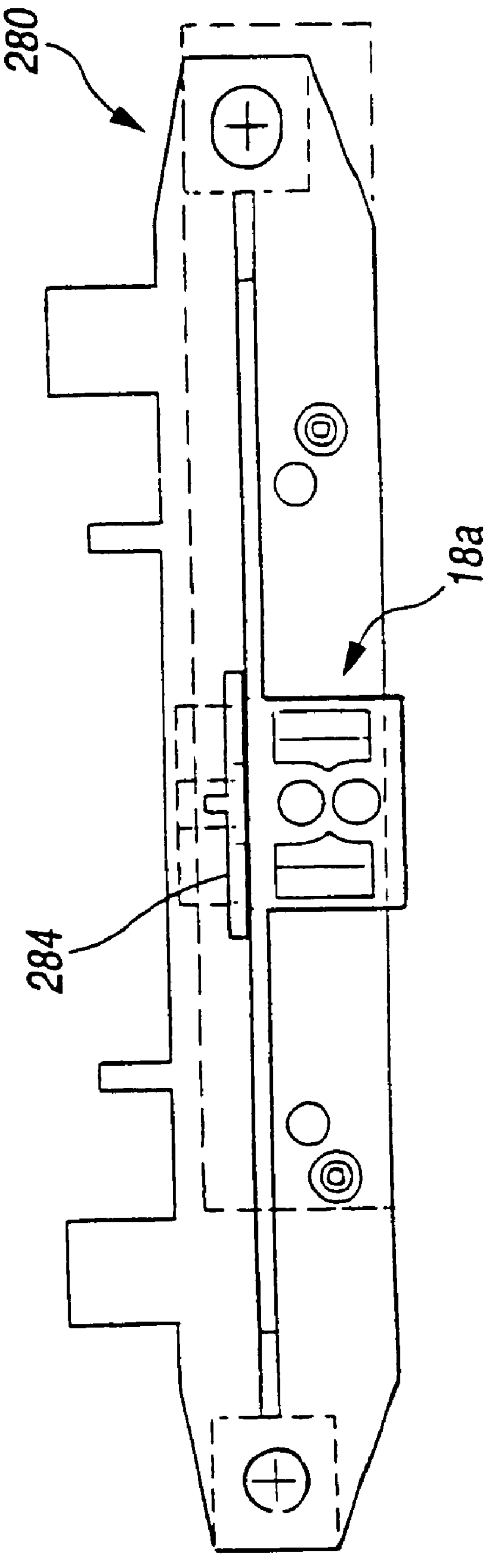
FIG. 27 is a top plan view of the upper support member which includes the upper scanhead.
Figure 28:
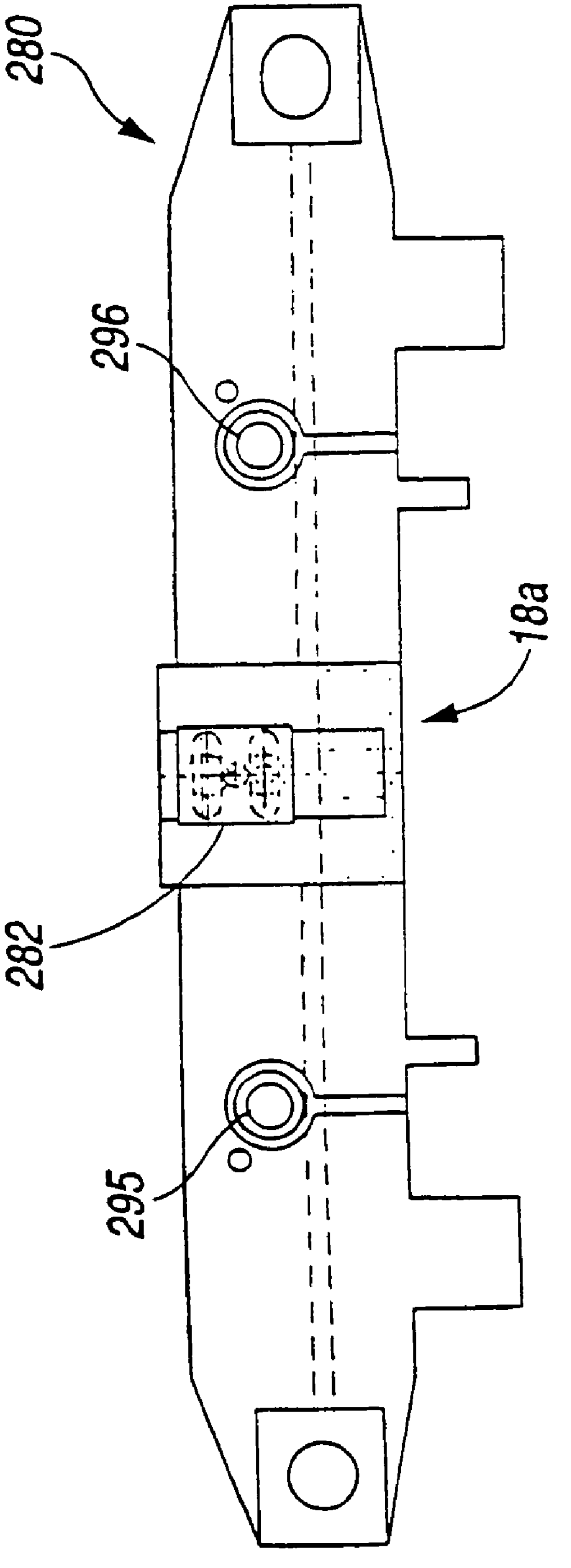
FIG. 28 is a bottom plan view of the upper support member which includes the upper scanhead.

The location of a magnetic head 256 and a magnetic head adjustment screw 257 are illustrated in FIG. 23. The adjustment screw 257 adjusts the proximity of the magnetic head 256 relative to a passing bill and thereby adjusts the strength of the magnetic field in the vicinity of the bill.

Figure 22:
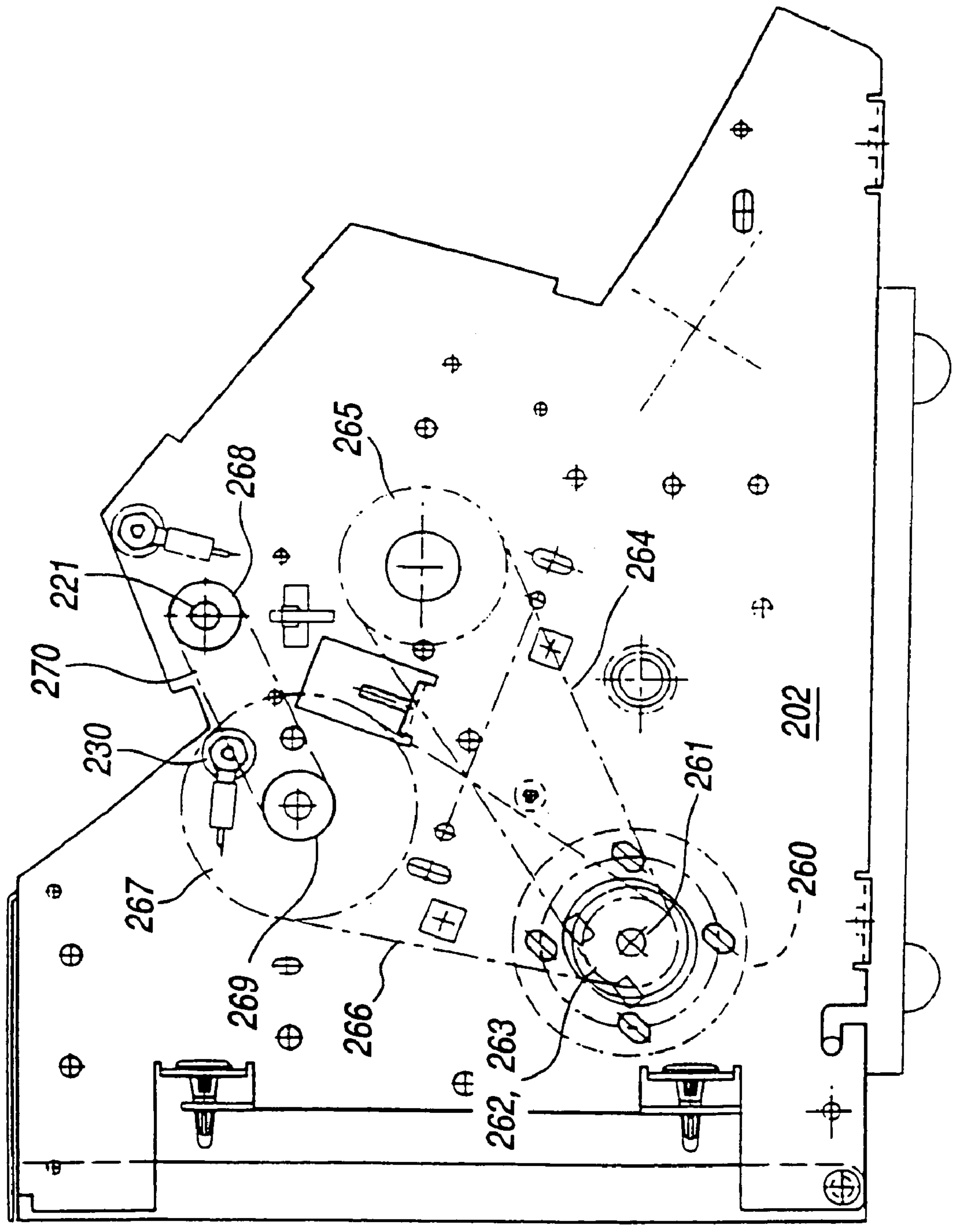
FIG. 22 is a side elevation of the machine of FIG. 1, with the side panel of the housing removed.

FIG. 22 shows the mechanical arrangement for driving the various means for transporting currency bills through the machine. A motor 260 drives a shaft 261 carrying a pair of pulleys 262 and 263. The pulley 262 drives the roll 241 through a belt 264 and pulley 265, and the pulley 263 drives the roll 223 through a belt 266 and pulley 267. Both pulleys 265 and 267 are larger than pulleys 262 and 263 in order to achieve the desired speed reduction from the typically high speed at which the motor 260 operates.

The shaft 221 of the stripping wheels 220 is driven by means of a pulley 268 provided thereon and linked to a corresponding pulley 269 on the shaft 224 through a belt 270. The pulleys 268 and 269 are of the same diameter so that the shafts 221 and 224 rotate in unison.

Figure 20A:
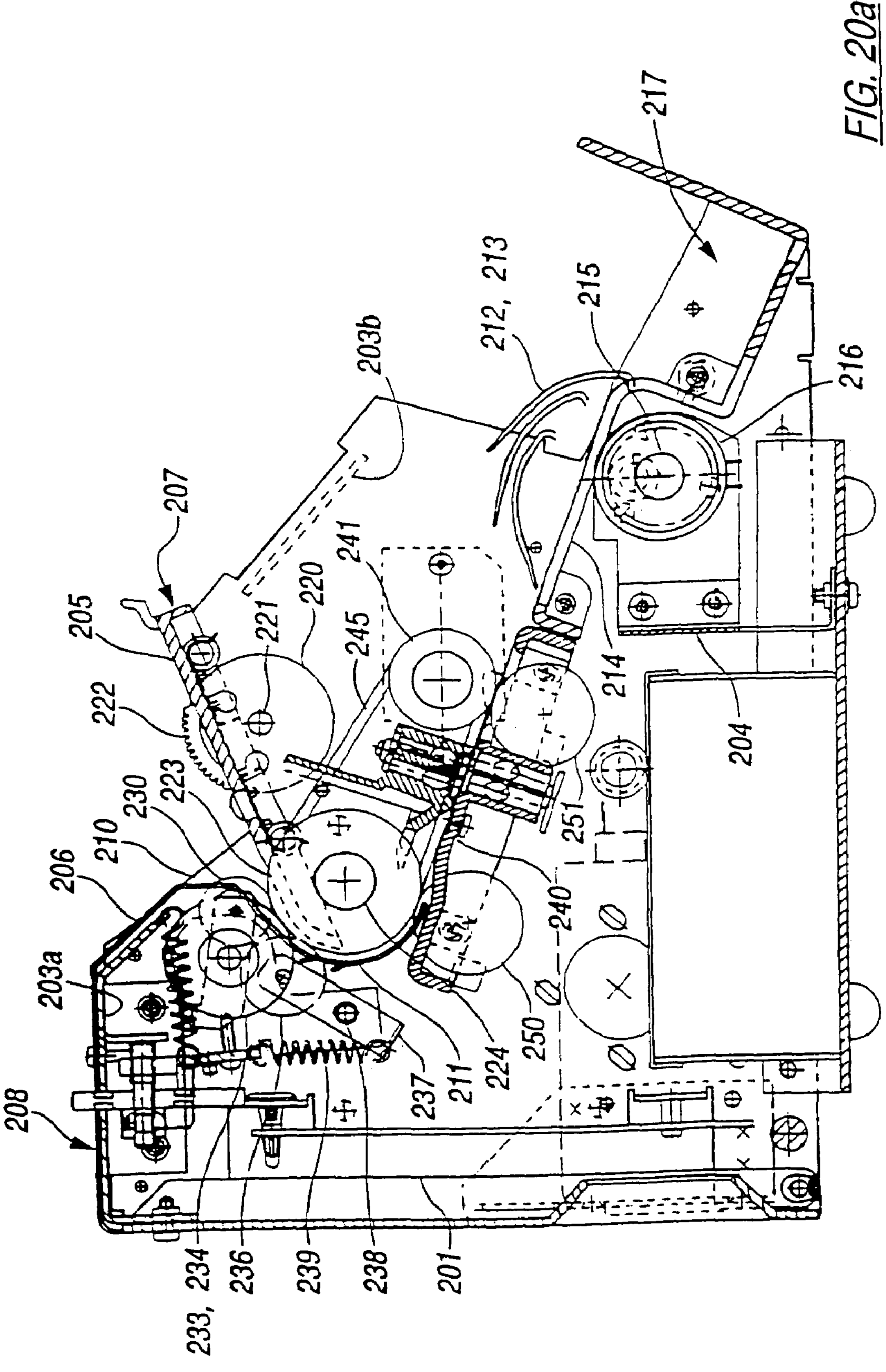
FIG. 20*a* is an enlarged vertical section taken approximately through the center of the machine, but showing the various transport rolls in side elevation.
Figure 20B:
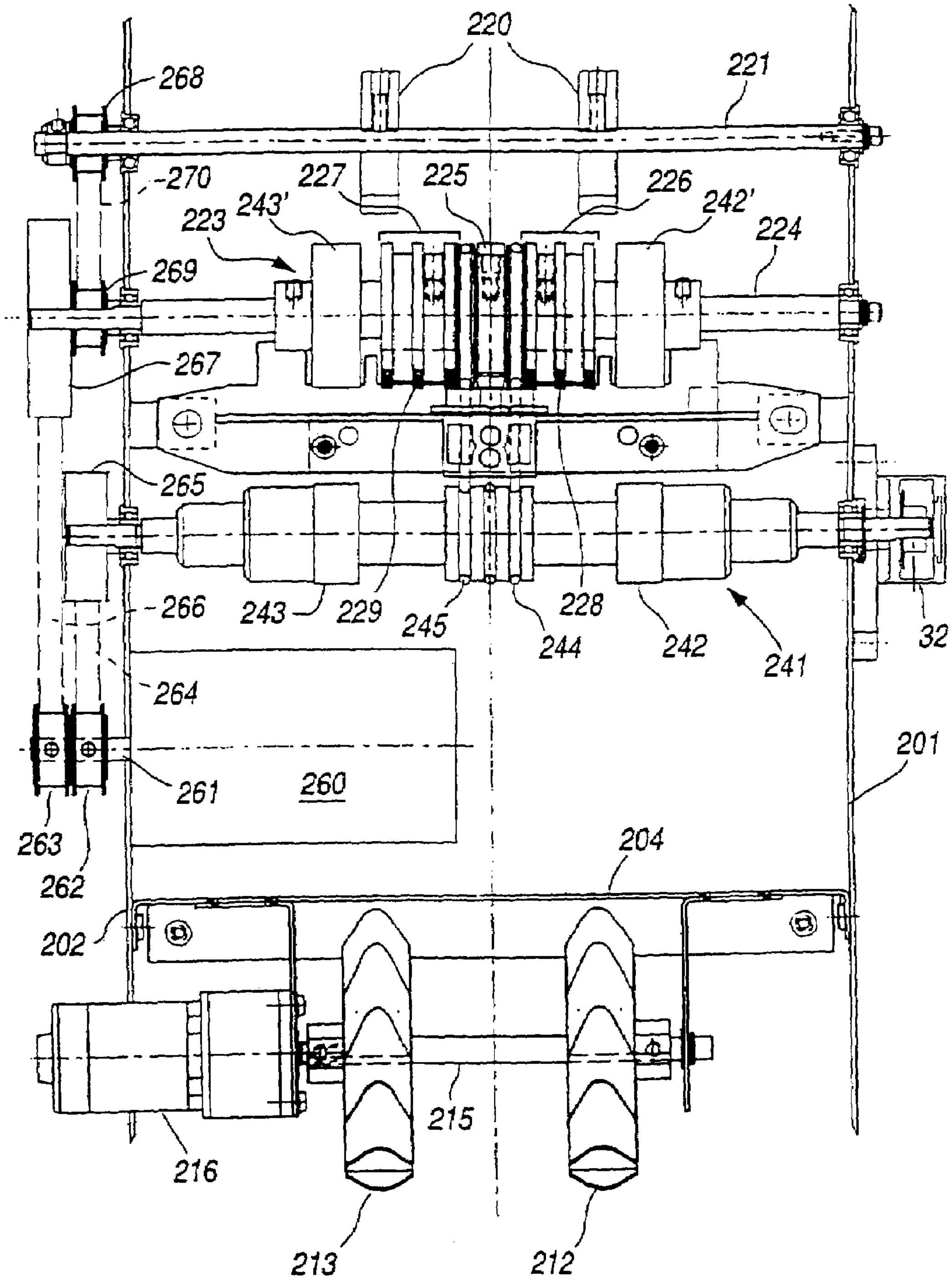
FIG. 20*b* is a top plan view of the interior mechanism of the machine of FIG. 1 for transporting bills across the optical scanheads, and also showing the stacking wheels at the front of the machine.
Figure 21A:
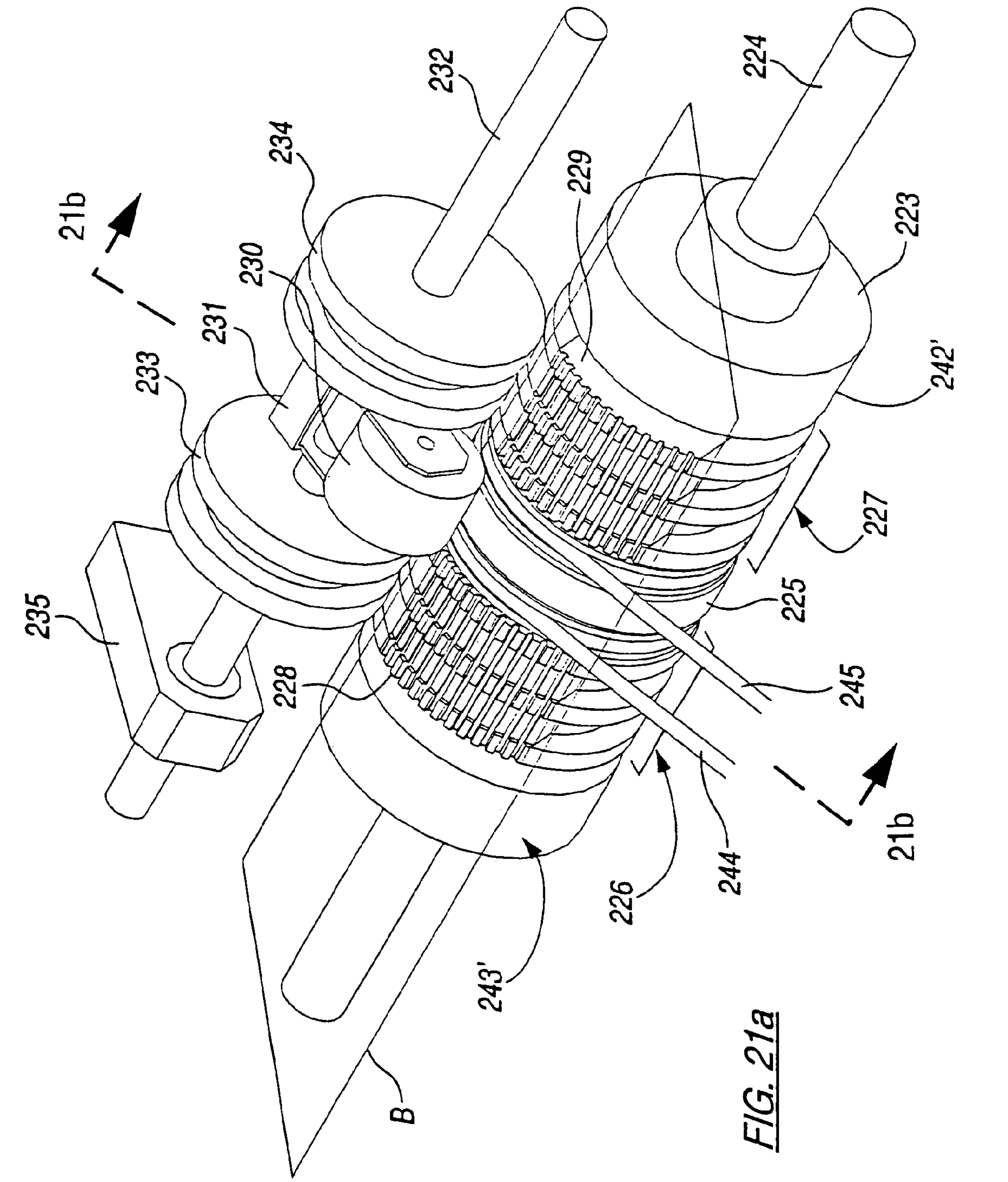
FIG. 21*a* is an enlarged perspective view of the bill transport mechanism which receives bills from the stripping wheels in the machine of FIG. 1.
Figure 21B:
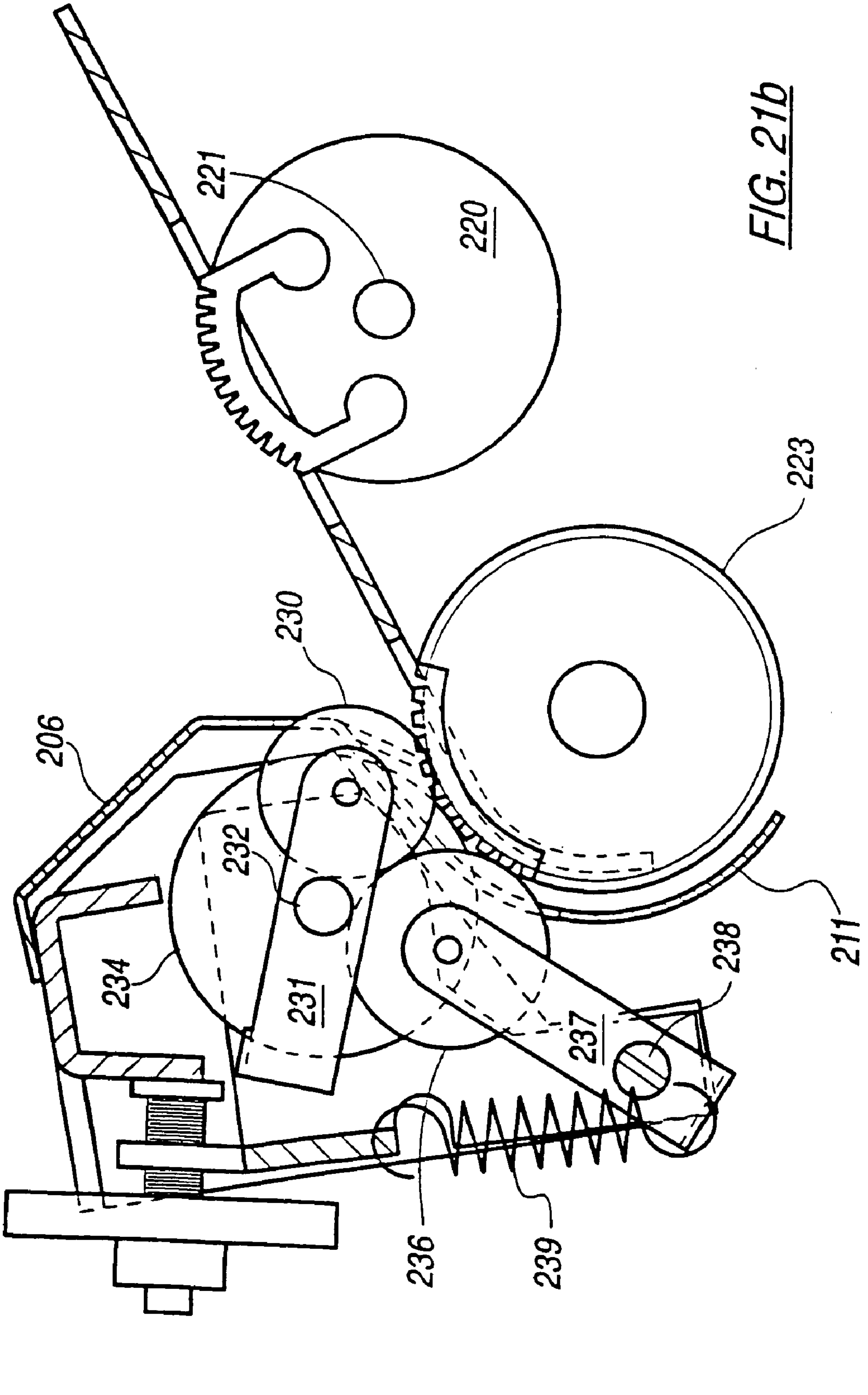
FIG. 21*b* is a cross-sectional view of the bill transport mechanism depicted in FIG. 21 along line 21*b;*

As shown in FIG. 20*b*, the optical encoder 32 is mounted on the shaft of the roller 241 for precisely tracking the position of each bill as it is transported through the machine, as discussed in detail above in connection with the optical sensing and correlation technique.

The upper and lower scanhead assemblies are shown most clearly in FIGS. 25–28. It can be seen that the housing for each scanhead is formed as an integral part of a unitary molded plastic support member 280 or 281 that also forms the housings for the light sources and photodetectors of the photosensors PS1 and PS2. The lower member 281 also forms the flat guide plate 240 that receives the bills from the drive roll 223 and supports the bills as they are driven past the scanheads 18*a* and 18*b*.

The two support members 280 and 281 are mounted facing each other so that the lenses 282 and 283 of the two scanheads 18*a*, 18*b* define a narrow gap through which each bill is transported. Similar, but slightly larger, gaps are formed by the opposed lenses of the light sources and photodetectors of the photosensors PS1 and PS2. The upper support member 280 includes a tapered entry guide 280*a* which guides an incoming bill into the gaps between the various pairs of opposed lenses.

The lower support member 281 is attached rigidly to the machine frame. The upper support member 280, however, is mounted for limited vertical movement when it is lifted manually by a handle 284, to facilitate the clearing of any paper jams that occur beneath the member 280. To allow for such vertical movement, the member 280 is slidably mounted on a pair of posts 285 and 286 on the machine frame, with a pair of springs 287 and 288 biasing the member 280 to its lowermost position.

Each of the two optical scanheads 18*a* and 18*b* housed in the support members 280, 281 includes a pair of light sources acting in combination to uniformly illuminate light strips of the desired dimension on opposite sides of a bill as it is transported across the plate 240. Thus, the upper scanhead 18*a* includes a pair of LEDs 22*a*, directing light downwardly through an optical mask on top of the lens 282 onto a bill traversing the flat guide plate 240 beneath the scanhead. The LEDs 22*a* are angularly disposed relative to the vertical axis of the scanhead so that their respective light beams combine to illuminate the desired light strip defined by an aperture in the mask. The scanhead 18*a* also includes a photodetector 26*a* mounted directly over the center of the illuminated strip for sensing the light reflected off the strip. The photodetector 26*a* is linked to the CPU 30 through the ADC 28 for processing the sensed data as described above.

Figure 29:
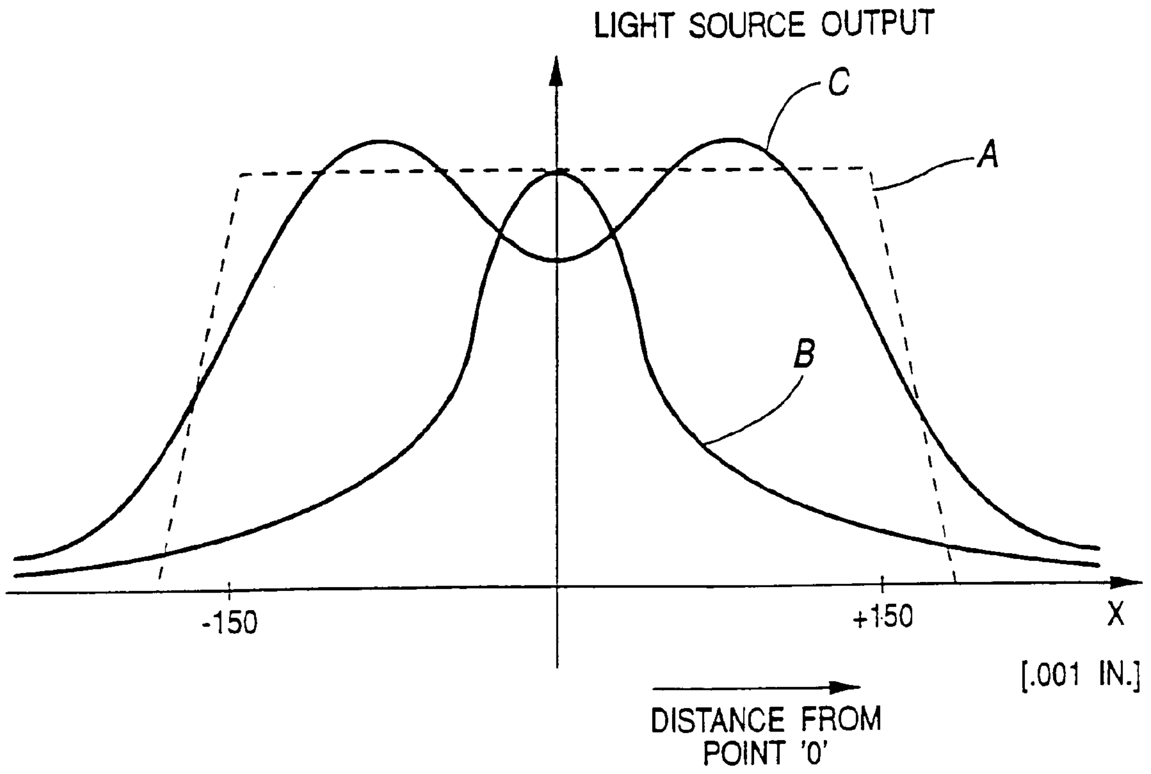
FIG. 29 is an illustration of the light distribution produced about one of the optical scanheads.

When the photodetector 26*a* is positioned on an axis passing through the center of the illuminated strip, the illumination by the LED's as a function of the distance from the central point "0" along the X axis, should optimally approximate a step function as illustrated by the curve A in FIG. 29. With the use of a single light source angularly displaced relative to a vertical axis through the center of the illuminated strip, the variation in illumination by an LED typically approximates a Gaussian function, as illustrated by the curve B in FIG. 29.

The two LEDs 22*a* are angularly disposed relative to the vertical axis by angles $\alpha$ and $\beta$ respectively. The angles $\alpha$ and $\beta$ are selected to be such that the resultant strip illumination by the LED's is as close as possible to the optimum distribution curve A in FIG. 29. The LED illumination distribution realized by this arrangement is illustrated by the curve designated as "C" in FIG. 29 which effectively merges the individual Gaussian distributions of each light source to yield a composite distribution which sufficiently approximates the optimum curve A.

In the particular embodiment of the scanheads 18*a* and 18*b* illustrated in the drawings, each scanhead includes two pairs of LEDs and two photodetectors for illuminating, and detecting light reflected from, strips of two different sizes. Thus, each mask also includes two slits which are formed to allow light from the LEDs to pass through and illuminate light strips of the desired dimensions. More specifically, one slit illuminates a relatively wide strip used for obtaining the reflectance samples which correspond to the characteristic pattern for a test bill. In one embodiment, the wide slit has a length of about 0.500" and a width of about 0.050". The second slit forms a relatively narrow illuminated strip used for detecting the thin borderline surrounding the printed indicia on currency bills, as described above in detail. In one embodiment, the narrow slit 283 has a length of about 0.300" and a width of about 0.010".

In order to prevent dust from fouling the operation of the scanheads, each scanhead includes three resilient seals or gaskets 290, 291, and 292. The two side seals 290 and 291 seal the outer ends of the LEDs 22, while the center seal 292 seals the outer end of the photodetector 26. Thus, dust cannot collect on either the light sources or the photodetectors, and cannot accumulate and block the slits through which light is transmitted from the sources to the bill, and from the bill to the photodetectors.

Figure 30A:
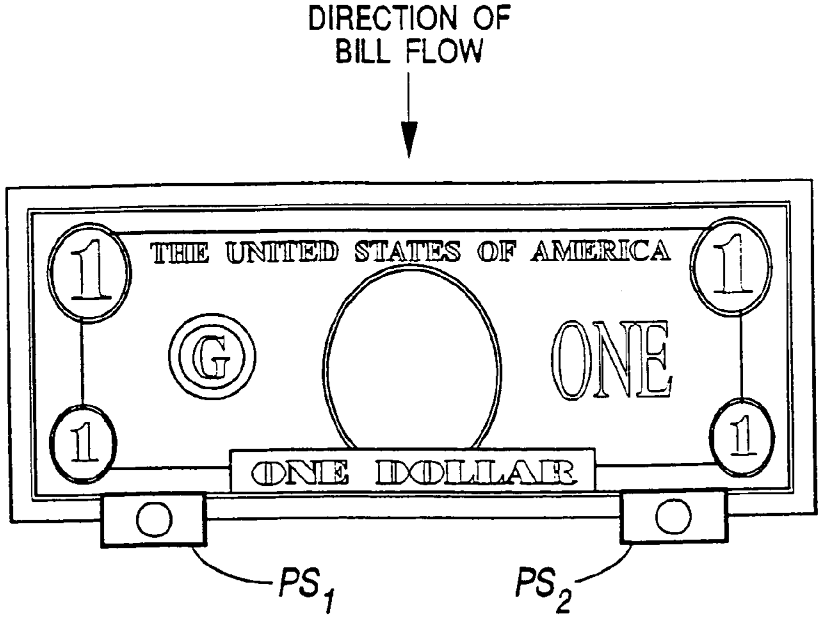
FIGS. 30*a* and 30*b* are diagrammatic illustrations of the location of two auxiliary photo sensors relative to a bill passed thereover by the transport and scanning mechanism shown in FIGS. 20*a*–28.
Figure 30B:
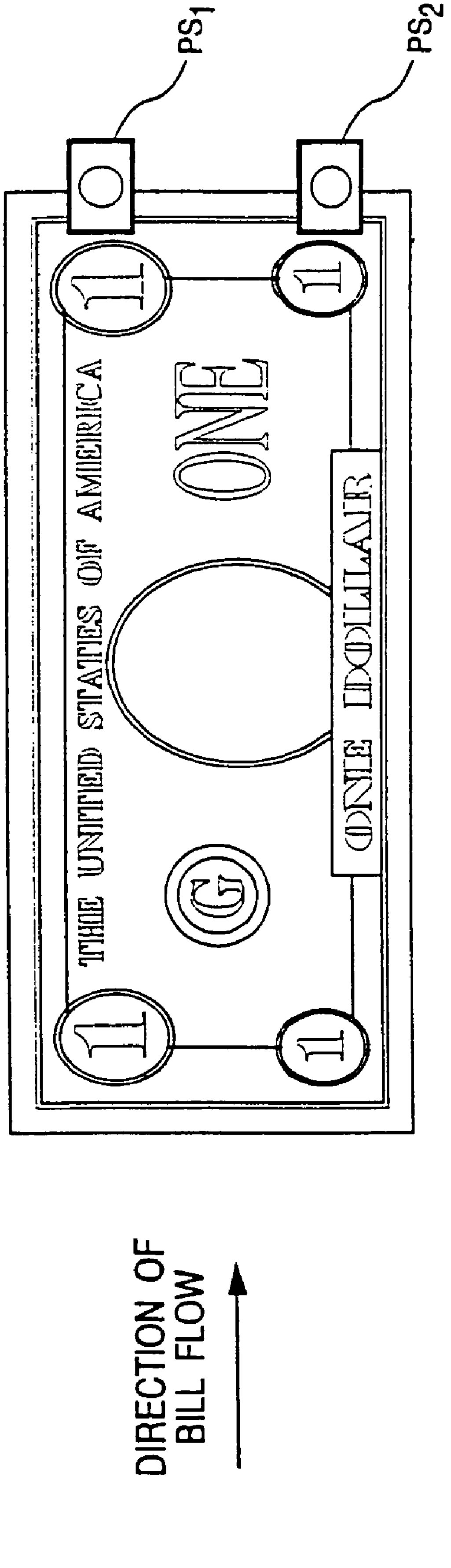

Doubling or overlapping of bills in the illustrative transport system is detected by two photosensors PS1 and PS2 which are located on a common transverse axis that is perpendicular to the direction of bill flow (see e.g., FIGS. 30*a* and 30*b*). The photosensors PS1 and PS2 include photodetectors 293 and 294 mounted within the lower support member 281 in immediate opposition to corresponding light sources 295 and 296 mounted in the upper support member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC convertor unit (not shown) whose output is fed as a digital input to and processed by the system CPU.

The presence of a bill adjacent the photosensors PS1 and PS2 causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

In order to prevent the accumulation of dirt on the light sources 295 and 296 and/or the photodetectors 293, 294 of the photosensors PS1 and PS2, both the light sources and the photodetectors are enclosed by lenses mounted so close to the bill path that they are continually wiped by the bills. This provides a self-cleaning action which reduces maintenance problems and improves the reliability of the outputs from the photosensors over long periods of operation.

The CPU 30, under control of software stored in the EPROM 34, monitors and controls the speed at which the bill transport mechanism 16 transports bills from the bill separating station 14 to the bill stacking unit. Flowcharts of the speed control routines stored in the EPROM 34 are depicted in FIGS. 31–35. To execute more than the first step in any given routine, the currency discriminating system 10 must be operating in a mode requiring the execution of the routine.

Figure 31:
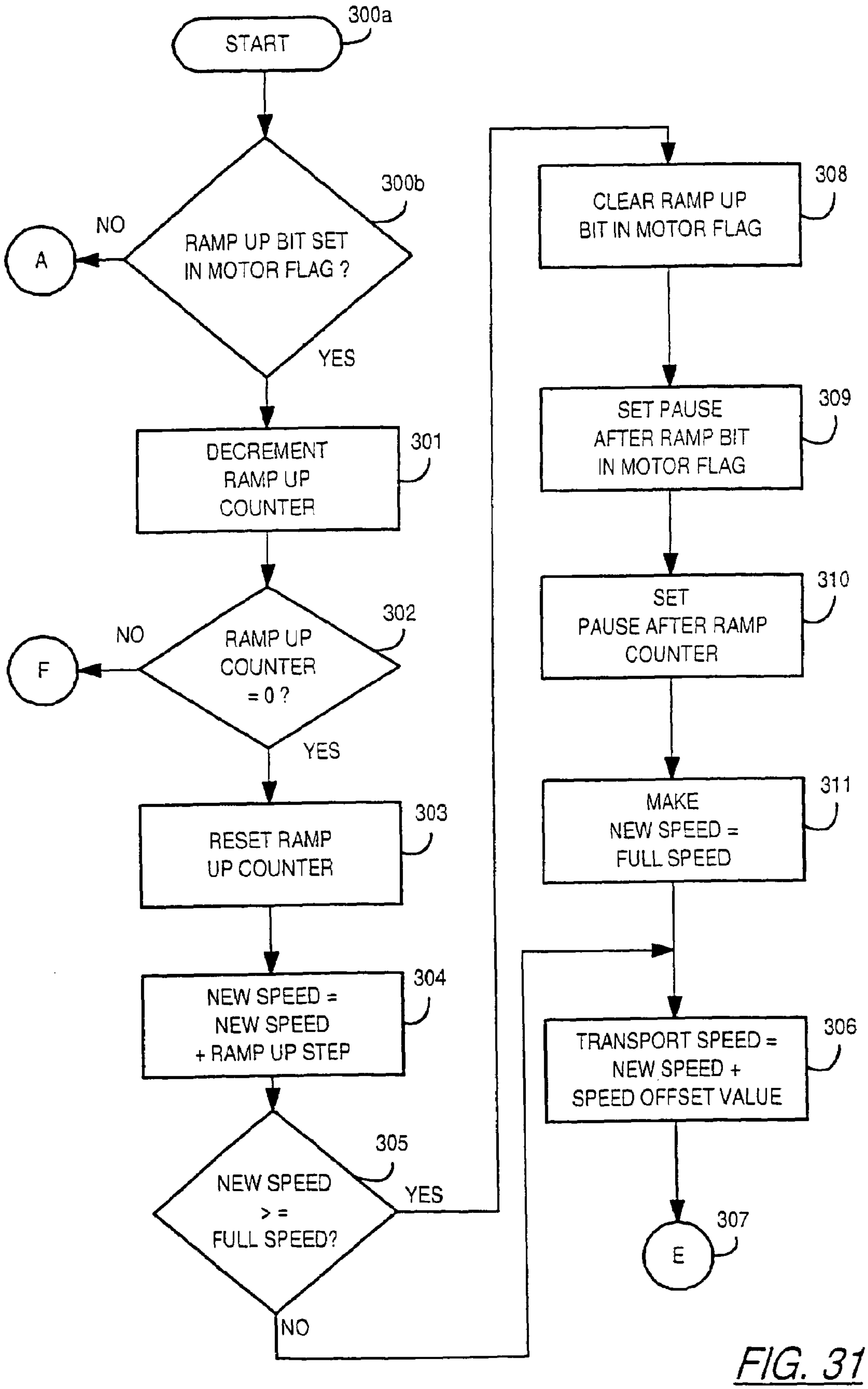
FIG. 31 is a flow chart illustrating the sequential procedure involved in a ramp-up routine for increasing the transport speed of the bill transport mechanism from zero to top speed.

Referring first to FIG. 31, when a user places a stack of bills in the bill accepting station 12 for counting, the transport speed of the bill transport mechanism 16 must accelerate or "ramp up" from zero to top speed. Therefore, in response to receiving the stack of bills in the bill accepting station 12, the CPU 30 sets a ramp-up bit in a motor flag stored in the memory unit 38. Setting the ramp-up bit causes the CPU 30 to proceed beyond step **300*b* of the ramp-up routine. If the ramp-up bit is set, the CPU 30 utilizes a ramp-up counter and a fixed parameter "ramp-up step" to incrementally increase the transport speed of the bill transport mechanism 16 until the bill transport mechanism 16 reaches its top speed. The "ramp-up step" is equal to the incremental increase in the transport speed of the bill transport mechanism 16, and the ramp-up counter determines the amount of time between incremental increases in the bill transport speed. The greater the value of the "ramp-up step", the greater the increase in the transport speed of the bill transport mechanism 16 at each increment. The greater the maximum value of the ramp-up counter, the greater the amount of time between increments. Thus, the greater the value of the "ramp-up step" and the lesser the maximum value of the ramp-up counter, the lesser the time it takes the bill transport mechanism 16** to reach its top speed.

The ramp-up routine in FIG. 31 employs a variable parameter "new speed", a fixed parameter "full speed", and the variable parameter "transport speed". The "full speed" represents the top speed of the bill transport mechanism 16, while the "new speed" and "transport speed" represent the desired current speed of the bill transport mechanism 16. To account for operating offsets of the bill transport mechanism 16, the "transport speed" of the bill transport mechanism 16 actually differs from the "new speed" by a "speed offset value". Outputting the "transport speed" to the bill transport mechanism 16 causes the bill transport mechanism 16 to operate at the transport speed.

To incrementally increase the speed of the bill transport mechanism 16, the CPU 30 first decrements the ramp-up counter from its maximum value (step 301). If the maximum value of the ramp-up counter is greater than one at step 302, the CPU 30 exits the speed control software in FIGS. 31–35 and repeats steps **300*b*, 301, and 302 during subsequent iterations of the ramp-up routine until the ramp-up counter is equal to zero. When the ramp-up counter is equal to zero, the CPU 30 resets the ramp-up counter to its maximum value (step 303). Next, the CPU 30 increases the "new speed" by the "ramp-up step" (step 304). If the "new speed" is not yet equal to the "full speed" at step 305, the "transport speed" is set equal to the "new speed" plus the "speed offset value" (step 306). The "transport speed" is output to the bill transport mechanism 16 at step 307 of the routine in FIG. 31 to change the speed of the bill transport mechanism 16 to the "transport speed". During subsequent iterations of the ramp-up routine, the CPU 30 repeats steps 300*b*–306** until the "new speed" is greater than or equal to the "full speed".

Once the "new speed" is greater than or equal to the "full speed" at step 305, the ramp-up bit in the motor flag is cleared (step 308), a pause-after-ramp bit in the motor flag is set (step 309), a pause-after-ramp counter is set to its maximum value (step 310), and the parameter "new speed" is set equal to the "full speed" (step 311). Finally, the "transport speed" is set equal to the "new speed" plus the "speed offset value" (step 306). Since the "new speed" is equal to the "full speed", outputting the "transport speed" to the bill transport mechanism 16 causes the bill transport mechanism 16 to operate at its top speed. The ramp-up routine in FIG. 31 smoothly increases the speed of the bill transport mechanism without causing jerking or motor spikes. Motor spikes could cause false triggering of the optical scanhead 18 such that the scanhead 18 scans non-existent bills.

Figure 32:
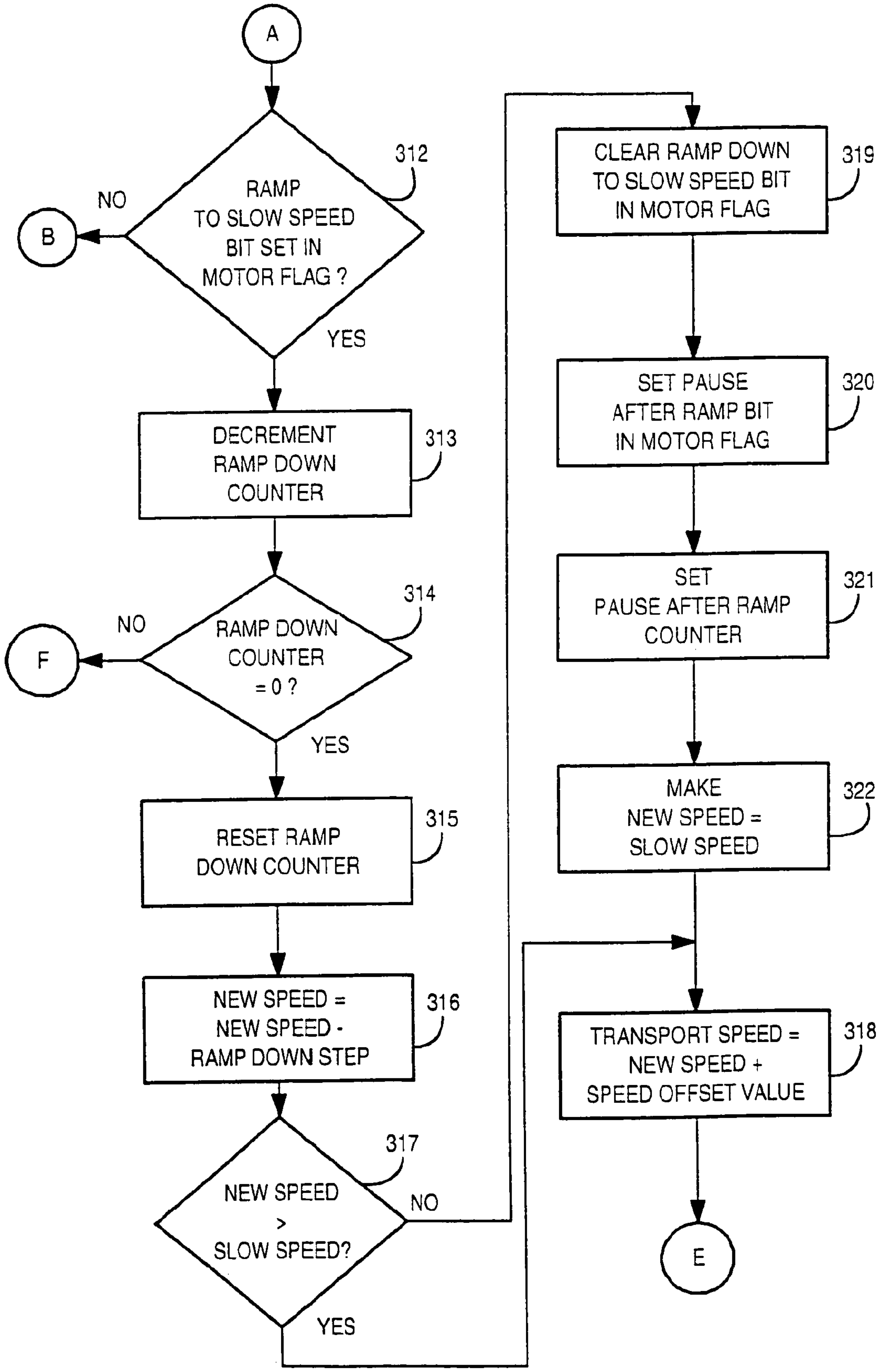
FIG. 32 is a flow chart illustrating the sequential procedure involved in a ramp-to-slow-speed routine for decreasing the transport speed of the bill transport mechanism from top speed to slow speed.

During normal counting, the bill transport mechanism 16 transports bills from the bill separating station 14 to the bill stacking unit at its top speed. In response to the optical scanhead 18 detecting a stranger, suspect or no call bill, however, the CPU 30 sets a ramp-to-slow-speed bit in the motor flag. Setting the ramp-to-slow-speed bit causes the CPU 30 to proceed beyond step 312 of the ramp-to-slow-speed routine in FIG. 32 on the next iteration of the software in FIGS. 31–35. Using the ramp-to-slow-speed routine in FIG. 32, the CPU 30 causes the bill transport mechanism 16 to controllably decelerate or "ramp down" from its top speed to a slow speed. As the ramp-to-slow speed routine in FIG. 32 is similar to the ramp-up routine in FIG. 31, it is not described in detail herein.

It suffices to state that if the ramp-to-slow-speed bit is set in the motor flag, the CPU 30 decrements a ramp-down counter (step 313) and determines whether or not the ramp-down counter is equal to zero (step 314). If the ramp-down counter is not equal to zero, the CPU 30 exits the speed control software in FIGS. 31–35 and repeats steps 312, 313, and 314 of the ramp-to-slow-speed routine in FIG. 32 during subsequent iterations of the speed control software until the ramp-down counter is equal to zero. Once the ramp-down counter is equal to zero, the CPU 30 resets the ramp-down counter to its maximum value (step 315) and subtracts a "ramp-down step" from the variable parameter "new speed" (step 316). The "new speed" is equal to the fixed parameter "full speed" prior to initiating the ramp-to-slow-speed routine in FIG. 32.

After subtracting the "ramp-down step" from the "new speed", the "new speed" is compared to a fixed parameter "slow speed" (step 317). If the "new speed" is greater than the "slow speed", the "transport speed" is set equal to the "new speed" plus the "speed offset value" (step 318) and this "transport speed" is output to the bill transport mechanism 16 (step 307 of FIG. 31). During subsequent iterations of the ramp-to-slow-speed routine, the CPU 30 continues to decrement the "new speed" by the "ramp-down step" until the "new speed" is less than or equal to the "slow speed". Once the "new speed" is less than or equal to the "slow speed" at step 317, the CPU 30 clears the ramp-to-slow-speed bit in the motor flag (step 319), sets the pause-after-ramp bit in the motor flag (step 320), sets the pause-after-ramp counter (step 321), and sets the "new speed" equal to the "slow speed" (step 322). Finally, the "transport speed" is set equal to the" "new speed" plus the "speed offset value" (step 318). Since the "new speed" is equal to the "slow speed", outputting the "transport speed" to the bill transport mechanism 16 causes the bill transport mechanism 16 to operate at its slow speed. The ramp-to-slow-speed routine in FIG. 32 smoothly decreases the speed of the bill transport mechanism 16 without causing jerking or motor spikes.

Figure 33:
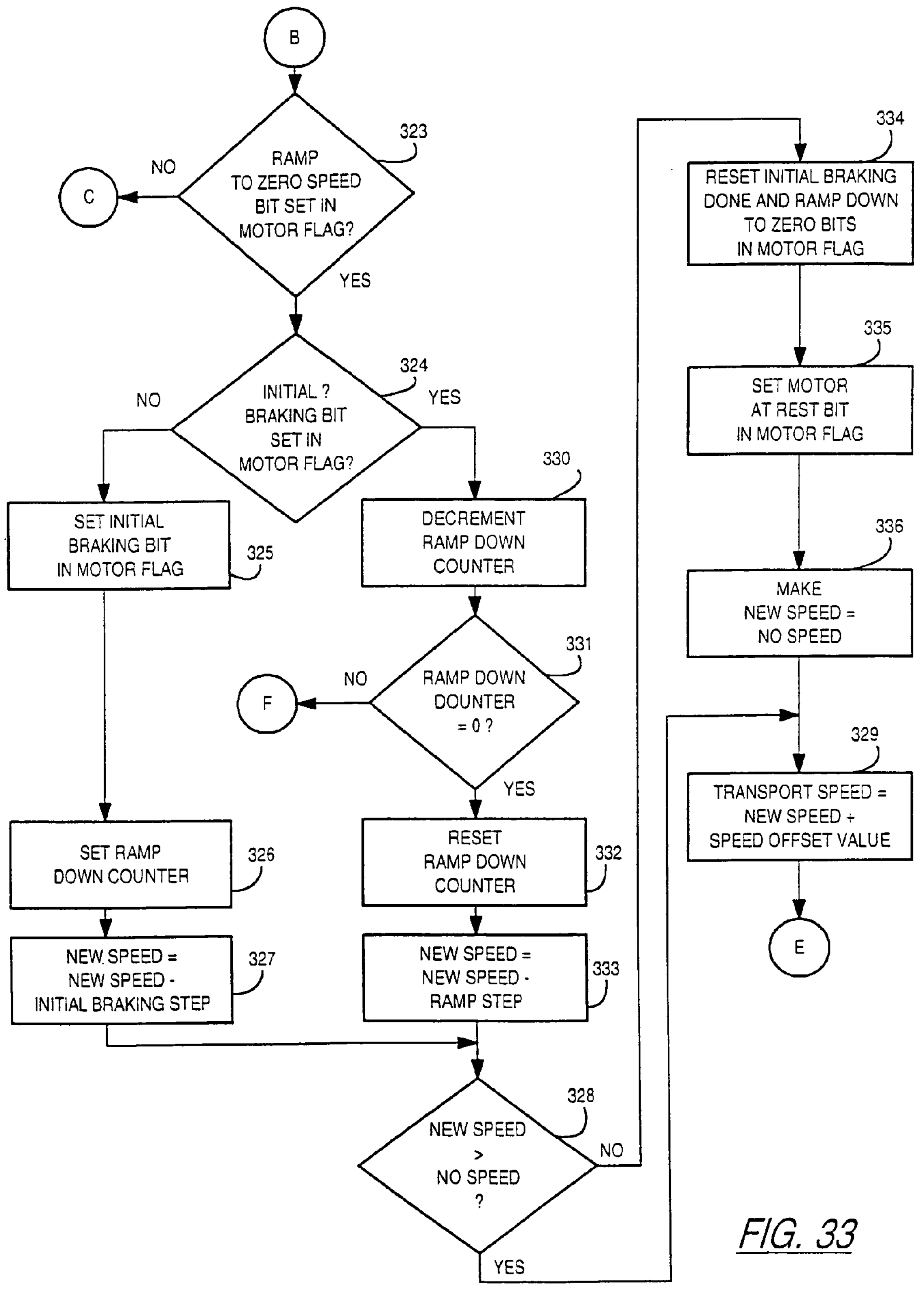
FIG. 33 is a flow chart illustrating the sequential procedure involved in a ramp-to-zero-speed routine for decreasing the transport speed of the bill transport mechanism to zero.

FIG. 33 depicts a ramp-to-zero-speed routine in which the CPU 30 ramps down the transport speed of the bill transport mechanism 16 to zero either from its top speed or its slow speed. In response to completion of counting of a stack of bills, the CPU 30 enters this routine to ramp down the transport speed of the bill transport mechanism 16 from its top speed to zero. Similarly, in response to the optical scanhead 18 detecting a stranger, suspect, or no call bill and the ramp-to-slow-speed routine in FIG. 32 causing the transport speed to be equal to a slow speed, the CPU 30 enters the ramp-to-zero-speed routine to ramp down the transport speed from the slow speed to zero.

With the ramp-to-zero-speed bit set at step 323, the CPU 30 determines whether or not an initial-braking bit is set in the motor flag (step 324). Prior to ramping down the transport speed of the bill transport mechanism 16, the initial-braking bit is clear. Therefore, flow proceeds to the left branch of the ramp-to-zero-speed routine in FIG. 33. In this left branch, the CPU 30 sets the initial-braking bit in the motor flag (step 325), resets the ramp-down counter to its maximum value (step 326), and subtracts an "initial-braking step" from the variable parameter "new speed" (step 327). Next, the CPU 30 determines whether or not the "new speed" is greater than zero (step 328). If the "new speed" is greater than zero at step 328, the variable parameter "transport speed" is set equal to the "new speed" plus the "speed offset value" (step 329) and this "transport speed" is output to the bill transport mechanism 16 at step 307 in FIG. 31.

During the next iteration of the ramp-to-zero-speed routine in FIG. 33, the CPU 30 enters the right branch of the routine at step 324 because the initial-braking bit was set during the previous iteration of the ramp-to-zero-speed routine. With the initial-braking bit set, the CPU 30 decrements the ramp-down counter from its maximum value (step 330) and determines whether or not the ramp-down counter is equal to zero (step 331). If the ramp-down counter is not equal to zero, the CPU 30 immediately exits the speed control software in FIGS. 31–35 and repeats steps 323, 324, 330, and 331 of the ramp-to-slow-speed routine during subsequent iterations of the speed control software until the ramp-down counter is equal to zero. Once the ramp-down counter is equal to zero, the CPU 30 resets the ramp-down counter to its maximum value (step 332) and subtracts a "ramp-down step" from the variable parameter "new speed" (step 333). This "ramp-down step" is smaller than the "initial-braking step" so that the "initial-braking step" causes a larger decremental change in the transport speed of the bill transport mechanism 16 than that caused by the "ramp-down step".

Next, the CPU 30 determines whether or not the "new speed" is greater than zero (step 328). If the "new speed" is greater than zero, the "transport speed" is set equal to the "new speed" plus the "speed offset value" (step 329) and this "transport speed" is outputted to the bill transport mechanism 16 (step 307 in FIG. 31). During subsequent iterations of the speed control software, the CPU 30 continues to decrement the "new speed" by the "ramp-down step" at step 333 until the "new speed" is less than or equal to zero at step 328. Once the "new speed" is less than or equal to the zero at step 328, the CPU 30 clears the ramp-to-zero-speed bit and the initial-braking bit in the motor flag (step 334), sets a motor-at-rest bit in the motor flag (step 335), and sets the "new speed" equal to zero (step 336). Finally, the "transport speed" is set equal to the "new speed" plus the "speed offset value" (step 329). Since the "new speed" is equal to zero, outputting the "transport speed" to the bill transport mechanism 16 at step 307 in FIG. 31 halts the bill transport mechanism 16.

Figure 34:
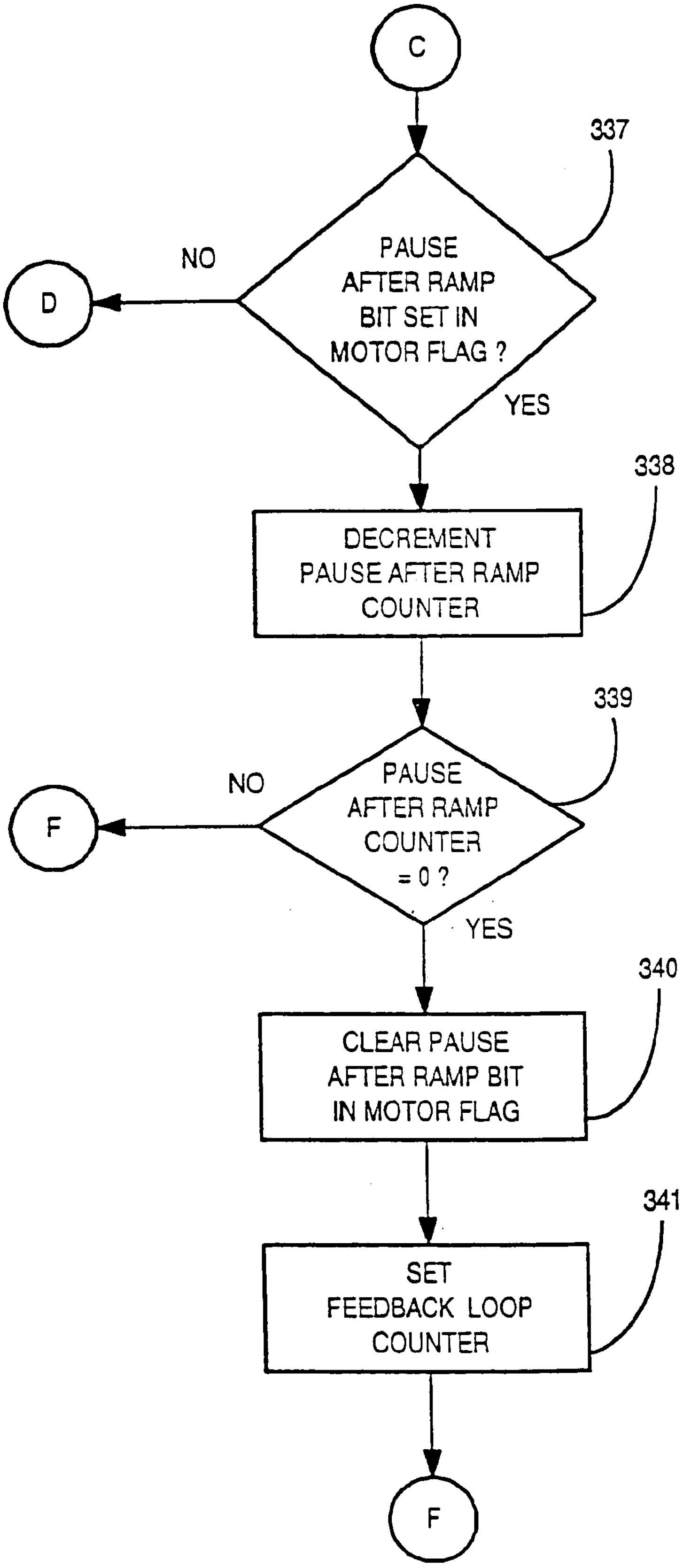
FIG. 34 is a flow chart illustrating the sequential procedure involved in a pause-after-ramp routine for delaying the feedback loop while the bill transport mechanism changes speeds.
Figure 35:
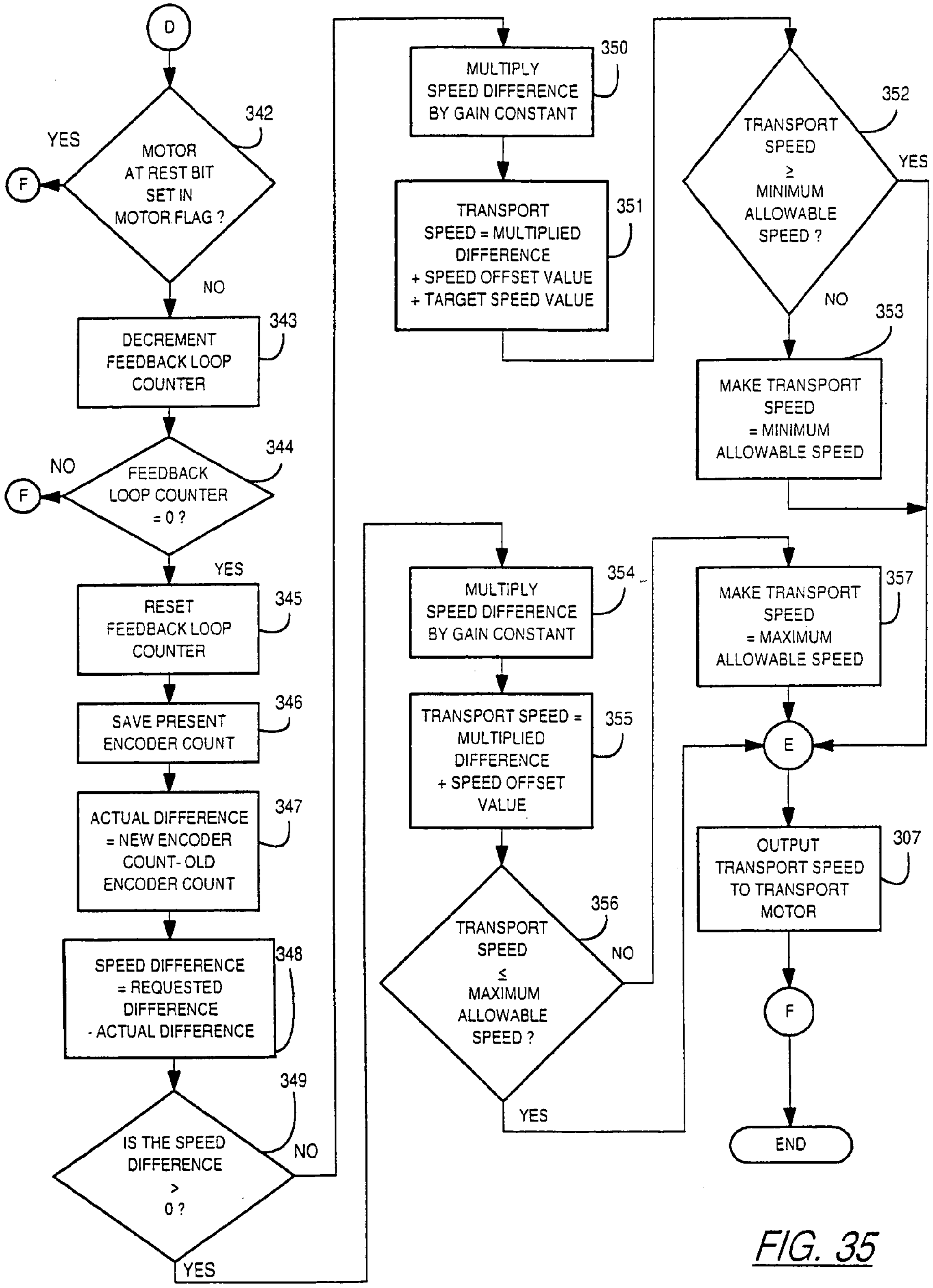
FIG. 35 is a flow chart illustrating the sequential procedure involved in a feedback loop routine for monitoring and stabilizing the transport speed of the bill transport mechanism.

Using the feedback loop routine in FIG. 35, the CPU 30 monitors and stabilizes the transport speed of the bill transport mechanism 16 when the bill transport mechanism 16 is operating at its top speed or at slow speed. To measure the transport speed of the bill transport mechanism 16, the CPU 30 monitors the optical encoder 32. While monitoring the optical encoder 32, it is important to synchronize the feedback loop routine with any transport speed changes of the bill transport mechanism 16. To account for the time lag between execution of the ramp-up or ramp-to-slow-speed routines in FIGS. 31–32 and the actual change in the transport speed of the bill transport mechanism 16, the CPU 30 enters a pause-after-ramp routine in FIG. 34 prior to entering the feedback loop routine in FIG. 35 if the bill transport mechanism 16 completed ramping up to its top speed or ramping down to slow speed during the previous iteration of the speed control software in FIGS. 31–35.

The pause-after-ramp routine in FIG. 34 allows the bill transport mechanism 16 to "catch up" to the CPU 30 so that the CPU 30 does not enter the feedback loop routine in FIG. 35 prior to the bill transport mechanism 16 changing speeds. As stated previously, the CPU 30 sets a pause-after-ramp bit during step 309 of the ramp-up routine in FIG. 31 or step 320 of the ramp-to-slow-speed routine in FIG. 32. With the pause-after-ramp bit set, flow proceeds from step 337 of the pause-after-ramp routine to step 338, where the CPU 30 decrements a pause-after-ramp counter from its maximum value. If the pause-after-ramp counter is not equal to zero at step 339, the CPU 30 exits the pause-after-ramp routine in FIG. 34 and repeats steps 337, 338, and 339 of the pause-after-ramp routine during subsequent iterations of the speed control software until the pause-after-ramp counter is equal to zero. Once the pause-after-ramp counter decrements to zero, the CPU 30 clears the pause-after-ramp bit in the motor flag (step 340) and sets the feedback loop counter to its maximum value (step 341). The maximum value of the pause-after-ramp counter is selected to delay the CPU 30 by an amount of time sufficient to permit the bill transport mechanism 16 to adjust to a new transport speed prior to the CPU 30 monitoring the new transport speed with the feedback loop routine in FIG. 35.

Referring now to the feedback loop routine in FIG. 35, if the motor-at-rest bit in the motor flag is not set at step 342, the CPU 30 decrements a feedback loop counter from its maximum value (step 343). If the feedback loop counter is not equal to zero at step 344, the CPU 30 immediately exits the feedback loop routine in FIG. 35 and repeats steps 342, 343, and 344 of the feedback loop routine during subsequent iterations of the speed control software in FIGS. 31–36 until the feedback loop counter is equal to zero. Once the feedback loop counter is decremented to zero, the CPU 30 resets the feedback loop counter to its maximum value (step 345), stores the present count of the optical encoder 32 (step 346), and calculates a variable parameter "actual difference" between the present count and a previous count of the optical encoder 32 (step 347). The "actual difference" between the present and previous encoder counts represents the transport speed of the bill transport mechanism 16. The larger the "actual difference" between the present and previous encoder counts, the greater the transport speed of the bill transport mechanism. The CPU 30 subtracts the "actual difference" from a fixed parameter "requested difference" to obtain a variable parameter "speed difference" (step 348).

If the "speed difference" is greater than zero at step 349, the bill transport speed of the bill transport mechanism 16 is too slow. To counteract slower than ideal bill transport speeds, the CPU 30 multiplies the "speed difference" by a "gain constant" (step 354) and sets the variable parameter "transport speed" equal to the multiplied difference from step 354 plus the "speed offset value" plus a fixed parameter "target speed" (step 355). The "target speed" is a value that, when added to the "speed offset value", produces the ideal transport speed. The calculated "transport speed" is greater than this ideal transport speed by the amount of the multiplied difference. If the calculated "transport speed" is nonetheless less than or equal to a fixed parameter "maximum allowable speed" at step 356, the calculated "transport speed" is output to the bill transport mechanism 16 at step 307 so that the bill transport mechanism 16 operates at the calculated "transport speed". If, however, the calculated "transport speed" is greater than the "maximum allowable speed" at step 356, the parameter "transport speed" is set equal to the "maximum allowable speed" (step 357) and is output to the bill transport mechanism 16 (step 307).

If the "speed difference" is less than or equal to zero at step 349, the bill transport speed of the bill transport mechanism 16 is too fast or is ideal. To counteract faster than ideal bill transport speeds, the CPU 30 multiplies the "speed difference" by a "gain constant (step 350) and sets the variable parameter "transport speed" equal to the multiplied difference from step 350 plus the "speed offset value" plus a fixed parameter "target speed" (step 351). The calculated "transport speed" is less than this ideal transport speed by the amount of the multiplied difference. If the calculated "transport speed" is nonetheless greater than or equal to a fixed parameter "minimum allowable speed" at step 352, the calculated "transport speed" is output to the bill transport mechanism 16 at step 307 so that the bill transport mechanism 16 operates at the calculated "transport speed". If, however, the calculated "transport speed" is less than the "minimum allowable speed" at step 352, the parameter "transport speed" is set equal to the "minimum allowable speed" (step 353) and is output to the bill transport mechanism 16 (step 307).

It should be apparent that the smaller the value of the "gain constant", the smaller the variations of the bill transport speed between successive iterations of the feedback control routine in FIG. 35 and, accordingly, the less quickly the bill transport speed is adjusted toward the ideal transport speed. Despite these slower adjustments in the bill transport speed, it is generally preferred to use a relatively small "gain constant" to prevent abrupt fluctuations in the bill transport speed and to prevent overshooting the ideal bill transport speed.

Figure 36:
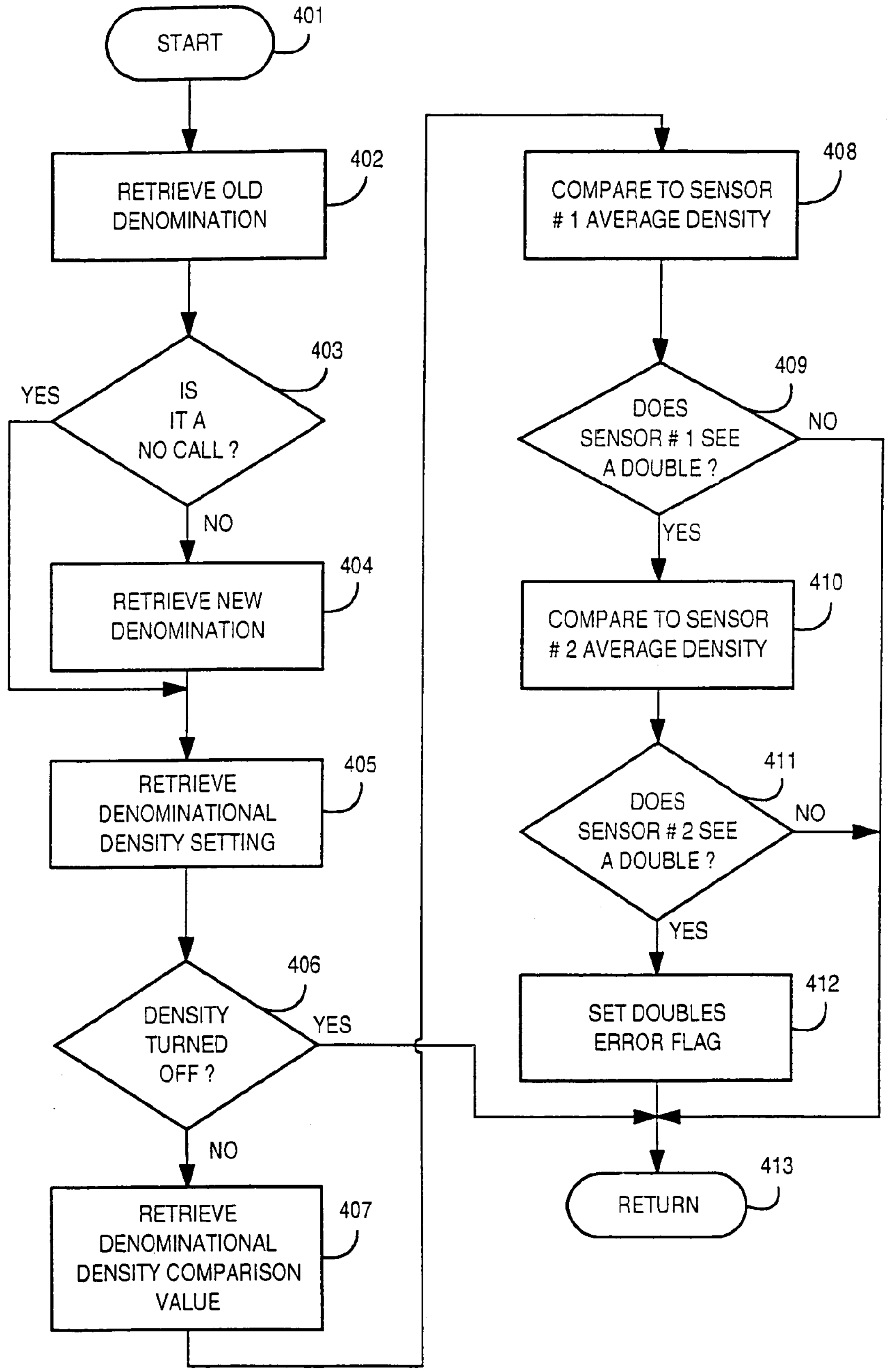
FIG. 36 is a flow chart illustrating the sequential procedure involved in a doubles detection routine for detecting overlapped bills.

A routine for using the outputs of the two photosensors PS1 and PS2 to detect any doubling or overlapping of bills is illustrated in FIG. 36 by sensing the optical density of each bill as it is scanned. This routine starts at step 401 and retrieves the denomination determined for the previously scanned bill at step 402. This previously determined denomination is used for detecting doubles in the event that the newly scanned bill is a "no call", as described below. Step 403 determines whether the current bill is a "no call," and if the answer is negative, the denomination determined for the new bill is retrieved at step 404.

If the answer at step 403 is affirmative, the system jumps to step 405, so that the previous denomination retrieved at step 402 is used in subsequent steps. To permit variations in the sensitivity of the density measurement, a "density setting" is retrieved from memory at step 405. The operator makes this choice manually, according to whether the bills being scanned are new bills, requiring a high degree of sensitivity, or used bills, requiring a lower level of sensitivity. If the "density setting" has been turned off, this condition is sensed at step 406, and the system returns to the main program at step 413. If the "density setting" is not turned off, a denominational density comparison value is retrieved from memory at step 407.

The memory according to one embodiment contains five different density values (for five different density settings, i.e., degrees of sensitivity) for each denomination. Thus, for a currency set containing seven different denominations, the memory contains 35 different values. The denomination retrieved at step 404 (or step 402 in the event of a "no call"), and the density setting retrieved st step 405, determine which of the 35 stored values is retrieved at step 407 for use in the comparison steps described below.

At step 408, the density comparison value retrieved at step 407 is compared to the average density represented by the output of the photosensor PS1. The result of this comparison is evaluated at step 409 to determine whether the output of sensor S1 identifies a doubling of bills for the particular denomination of bill determined at step 402 or 404. If the answer is negative, the system returns to the main program at step 413. If the answer is affirmative, step 410 then compares the retrieved density comparison value to the average density represented by the output of the second sensor PS2. The result of this comparison is evaluated at step 411 to determine whether the output of the photosensor PS2 identifies a doubling of bills. Affirmative answers at both step 409 and step 411 result in the setting of a "doubles error" flag at step 412, and the system then returns to the main program at step 413. The "doubles error" flag can, of course, be used to stop the bill transport motor.

Figure 37:
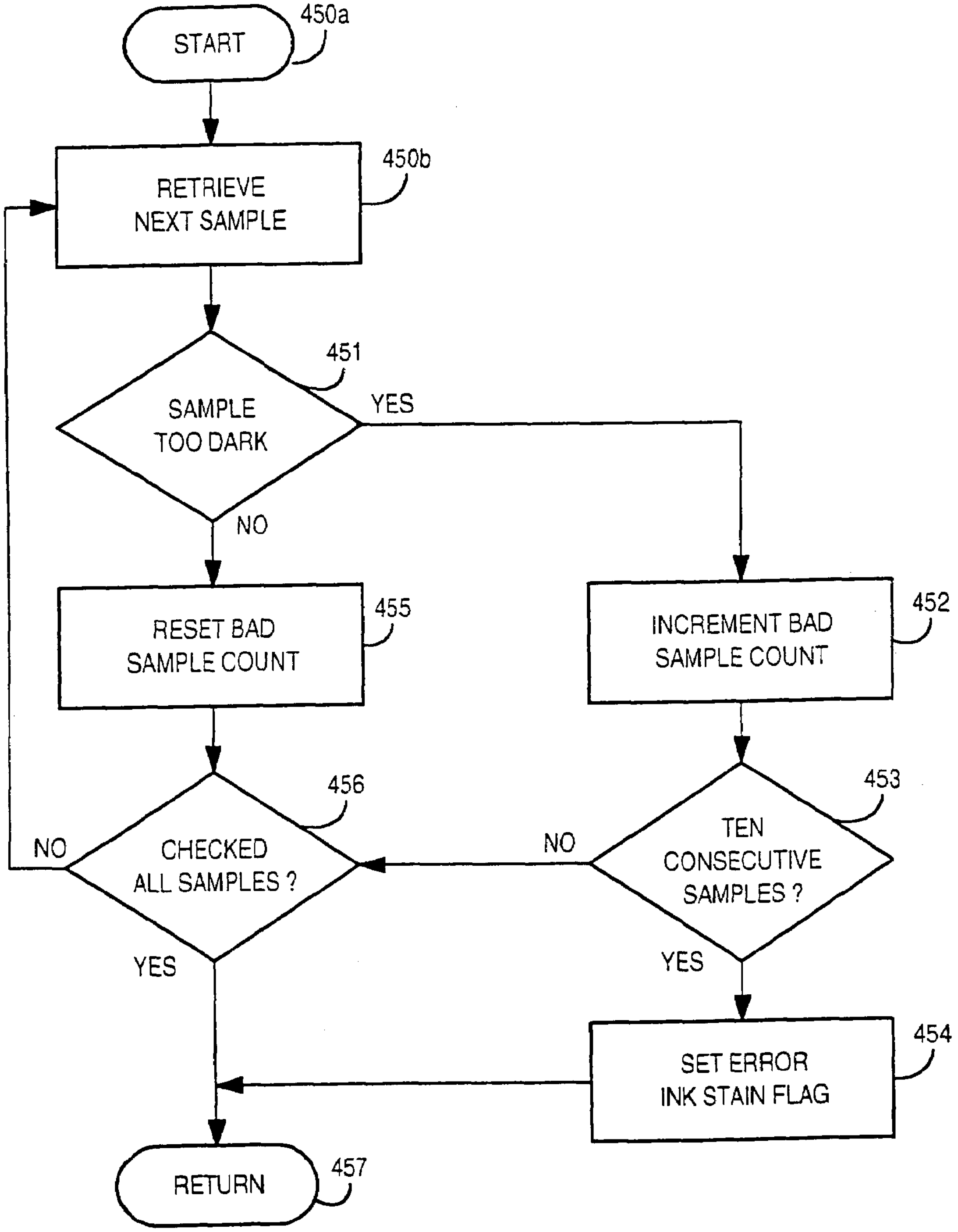
FIG. 37 is a flow chart illustrating the sequential procedure involved in a routine for detecting sample data representing dark blemishes on a bill.

FIG. 37 illustrates a routine that enables the system to detect bills which have been badly defaced by dark marks such as ink blotches, felt-tip pen marks and the like. Such severe defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 37 retrieves each successive data sample at step 450*b* and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 451 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above.

When a negative response is obtained at step 451, the system advances to step 455 where the "bad sample" count is reset to zero, so that this count always represents the number of consecutive bad samples received. From step 455 the system advances to step 456 which determines when all the samples for a given bill have been checked. As long as step 456 yields a negative answer, the system continues to retrieve successive samples at step 450*b*. When an affirmative answer is produced at step 456, the system returns to the main program at step 457.

Figure 38:
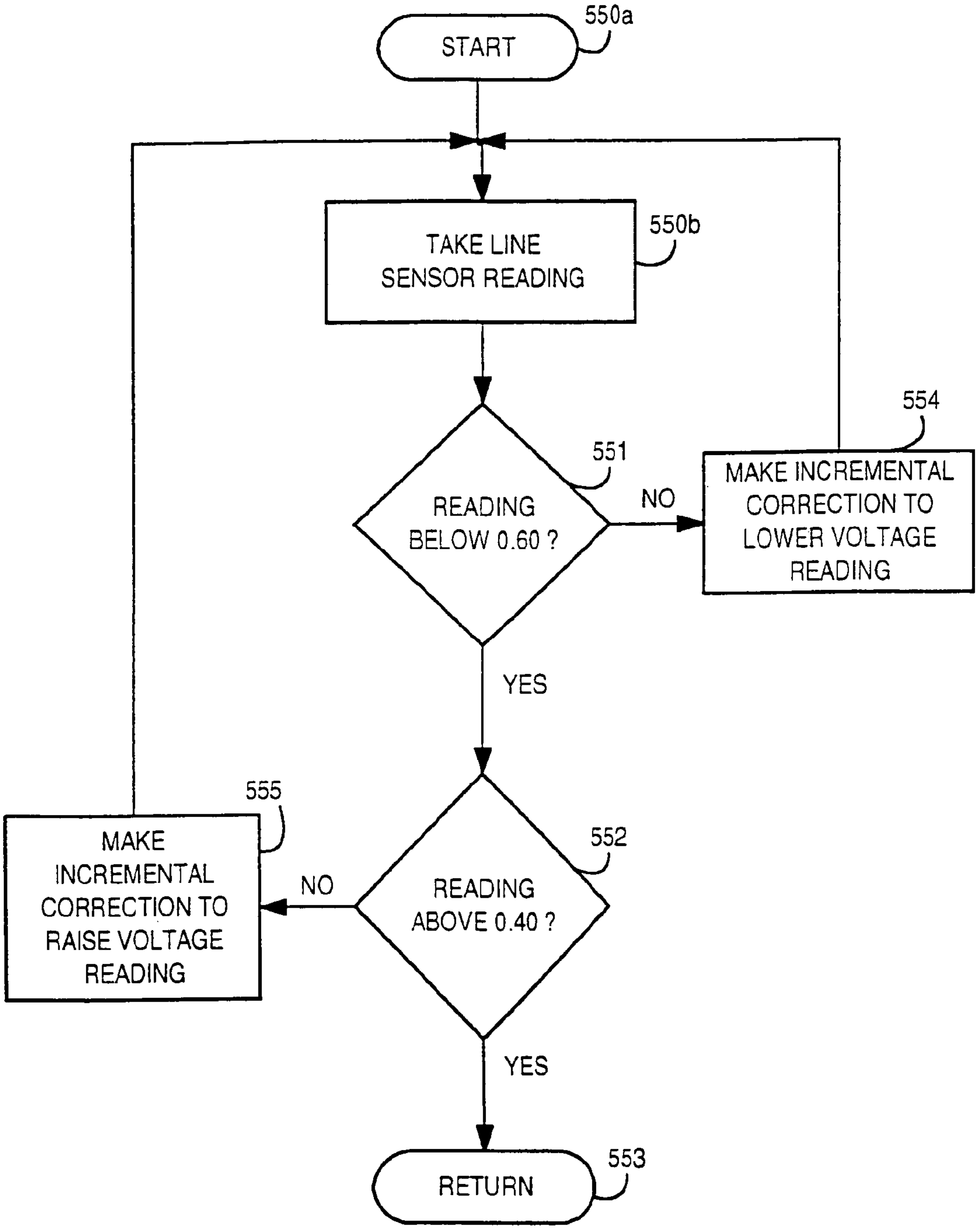
FIG. 38 is a flow chart illustrating the sequential procedure involved in a routine for maintaining a desired readhead voltage level.

A routine for automatically monitoring and making any necessary corrections in various line voltages is illustrated in FIG. 38. This routine is useful in automatically compensating for voltage drifts due to temperature changes, aging of components and the like. The routine starts at step 550 and reads the output of a line sensor which is monitoring a selected voltage at step 550*b*. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

Now that a currency scanner has been described in connection with scanning U.S. currency, an additional currency discrimination system of the present invention will be described.

Figure 39:
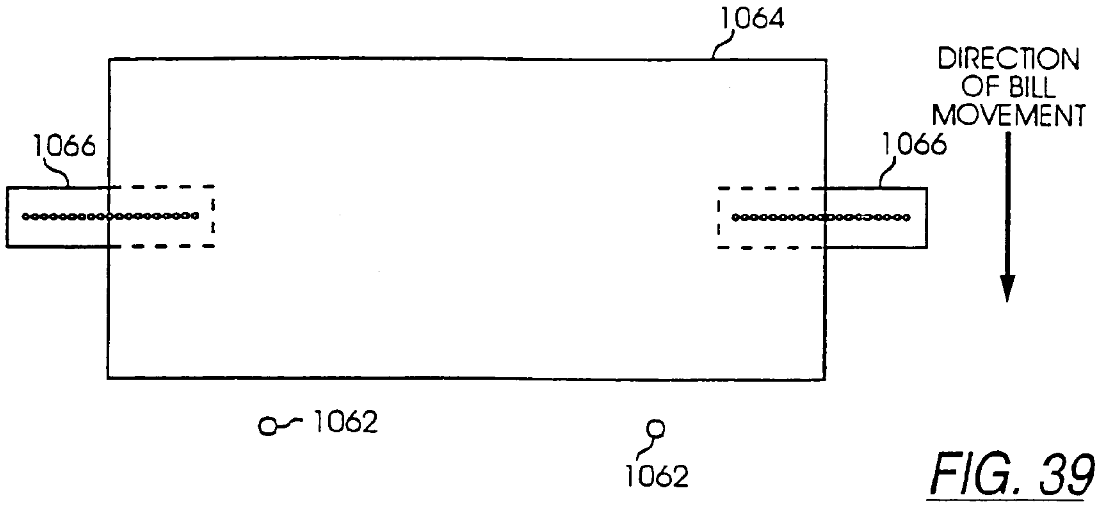
FIG. 39 is a top view of a bill and size determining sensors according to one embodiment of the present invention.

First of all, because currencies come in a variety of sizes, sensors are added to determine the size of a bill to be scanned. These sensors are placed upstream of the scanheads to be described below. One embodiment of size determining sensors is illustrated in FIG. 39. Two leading/trailing edge sensors 1062 detect the leading and trailing edges of a bill 1064 as it passing along the transport path. These sensors in conjunction with the encoder 32 (FIGS. 2*a*–2*b*) may be used to determine the dimension of the bill along a direction parallel to the scan direction which in FIG. 39 is the narrow dimension (or width) of the bill 1064. Additionally, two side edge sensors 1066 are used to detect the dimension of a bill 1064 transverse to the scan direction which in FIG. 39 is the wide dimension (or length) of the bill 1064. While the sensors 1062 and 1066 of FIG. 39 are optical sensors, other means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 40:
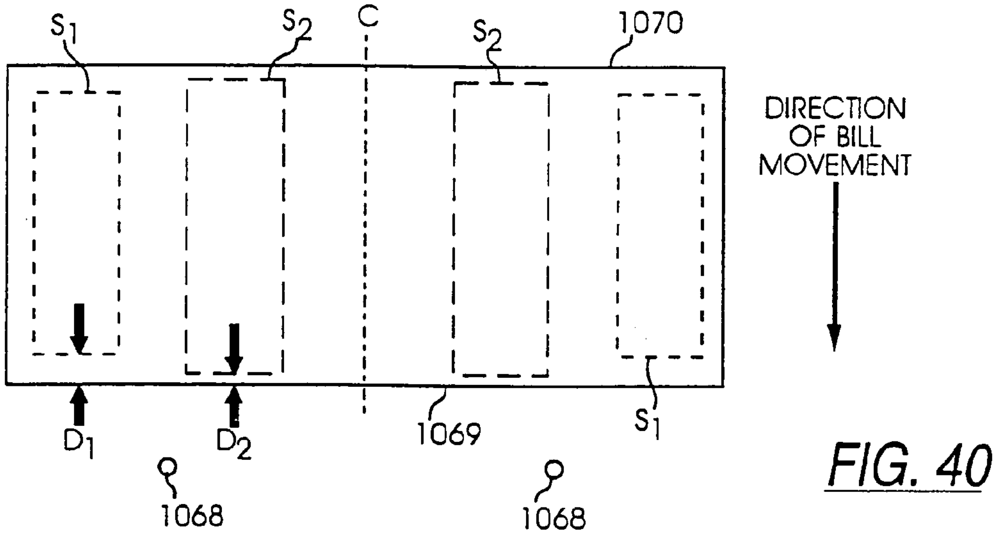
FIG. 40 is a top view of a bill illustrating multiple areas to be optically scanned on a bill according to one embodiment of the present invention.

Secondly, while the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 40, two leading edge detectors 1068 are shown. The detection of the leading edge 1069 of a bill 1070 by leading edge sensors 1068 triggers scanning in an area a given distance away from the leading edge of the bill 1070, e.g., $D_1$ or $D_2$, which may vary depending upon the preliminary indication of the identity of a bill based on the dimensions of a bill. Alternatively, the leading edge 1069 of a bill may be detected by one or more of the scanheads (to be described below) in a similar manner as that described with respect to FIGS. 7*a* and 7*b*. Alternatively, the beginning of scanning may be triggered by positional information provided by the encoder 32 of FIGS. 2*a*–2*b*, for example, in conjunction with the signals provided by sensors 1062 of FIG. 39, thus eliminating the need for leading edge sensors 1068.

Figure 41A:
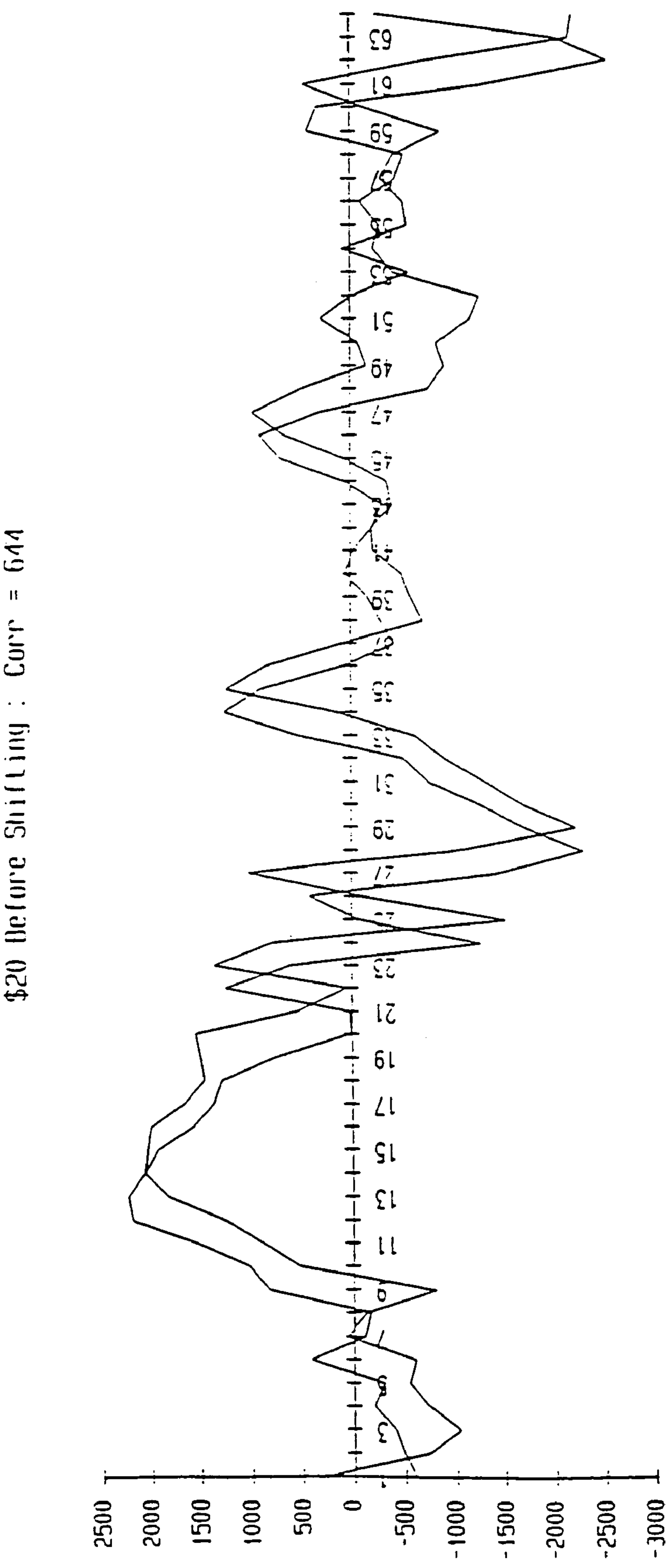
FIG. 41*a* is a graph illustrating a scanned pattern which is offset from a corresponding master pattern.
Figure 41B:
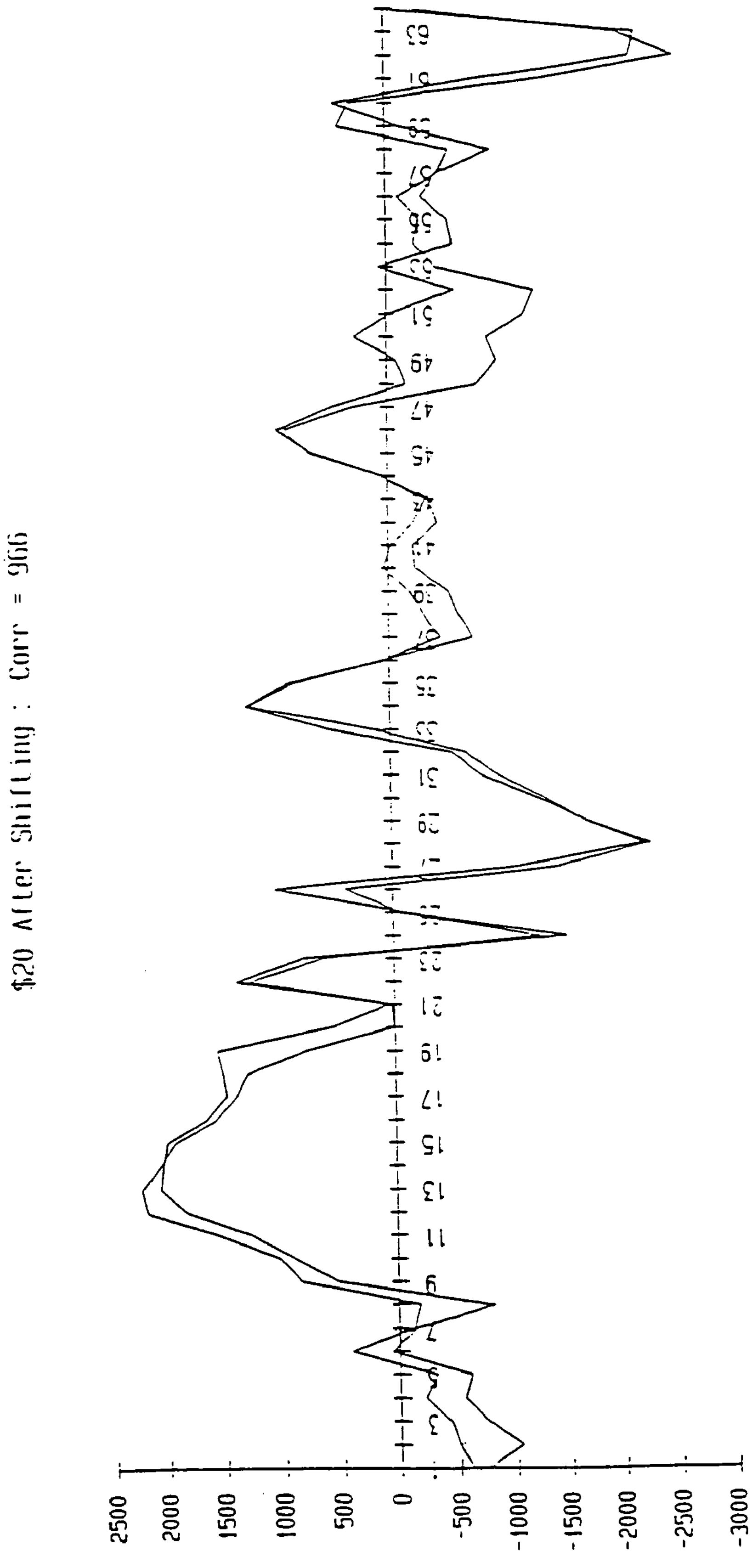
FIG. 41*b* is a graph illustrating the same patterns of FIG. 41*a* after the scanned pattern is shifted relative to the master pattern.

However, when the initiation of scanning is triggered by the detection of the leading edge of a bill, the chance that a scanned pattern will be offset relative to a corresponding master pattern increases. Offsets can result from the existence of manufacturing tolerances which permit the location of printed indicia of a document to vary relative to the edges of the document. For example, the printed indicia on U.S. bills may vary relative to the leading edge of a bill by as much as 50 mils which is 0.05 inches (1.27 mm). Thus when scanning is triggered relative to the edge of a bill (rather than the detection of a certain part of the printed indicia itself, such as the printed borderline of U.S. bills), a scanned pattern can be offset from a corresponding master pattern by one or more samples. Such offsets can lead to erroneous rejections of genuine bills due to poor correlation between scanned and master patterns. To compensate, overall scanned patterns and master patterns can be shifted relative to each other as illustrated in FIGS. 41*a* and 41*b*. More particularly, FIG. 41*a* illustrates a scanned pattern which is offset from a corresponding master pattern. FIG. 41*b* illustrates the same patterns after the scanned pattern is shifted relative to the master pattern, thereby increasing the correlation between the two patterns. Alternatively, instead of shifting either scanned patterns or master patterns, master patterns may be stored in memory corresponding to different offset amounts.

Figure 42:
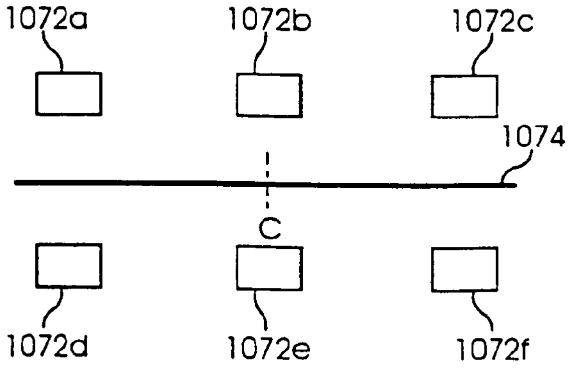
FIG. 42 is a side elevation of a multiple scanhead arrangement according to one embodiment of the present invention.

Thirdly, while it has been determined that the scanning of the central area on the green side of a U.S. bill (see segment S of FIG. 4) provides sufficiently distinct patterns to enable discrimination among the plurality of U.S. denominations, the central area may not be suitable for bills originating in other countries. For example, for bills originating from Country 1, it may be determined that segment $S_1$ (FIG. 40)

provides a more preferable area to be scanned, while segment $S_2$ (FIG. 40) is more preferable for bills originating from Country 2. Alternatively, in order to sufficiently discriminate among a given set of bills, it may be necessary to scan bills which are potentially from such set along more than one segment, e.g., scanning a single bill along both $S_1$ and $S_2$. To accommodate scanning in areas other than the central portion of a bill, multiple scanheads may be positioned next to each other. One embodiment of such a multiple scanhead system is depicted in FIG. 42. Multiple scanheads 1072*a–c* and 1072*d–f* are positioned next to each other along a direction lateral to the direction of bill movement. Such a system permits a bill 1074 to be scanned along different segments. Multiple scanheads 1072*a–f* are arranged on each side of the transport path, thus permitting both sides of a bill 1074 to be scanned.

Two-sided scanning may be used to permit bills to be fed into a currency discrimination system according to the present invention with either side face up. An example of a two-sided scanhead arrangement is described above in connection with FIGS. 2*a*, 6*c*, and 6*d*. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is described above in connection with FIGS. 6*c*, 6*d*, and 12. The implementation of color sensing is discussed in more detailed below.

According to the embodiment of FIG. 42, the bill transport mechanism operates in such a fashion that the central area C of a bill 1074 is transported between central scanheads 1072*b* and 1072*e*. Scanheads 1072*a* and 1072*c* and likewise scanheads 1072*d* and 1072*f* are displaced the same distance from central scanheads 1072*b* and 1072*e*, respectively. By symmetrically arranging the scanheads about the central region of a bill, a bill may-be scanned in either direction, e.g., top edge first (forward direction) or bottom edge first (reverse direction). As described above with respect to FIGS. 1–7*b*, master patterns are stored from the scanning of genuine bills in both the forward and reverse directions. While a symmetrical arrangement is preferred, it is not essential provided appropriate master patterns are stored for a non-symmetrical system.

Figure 43:
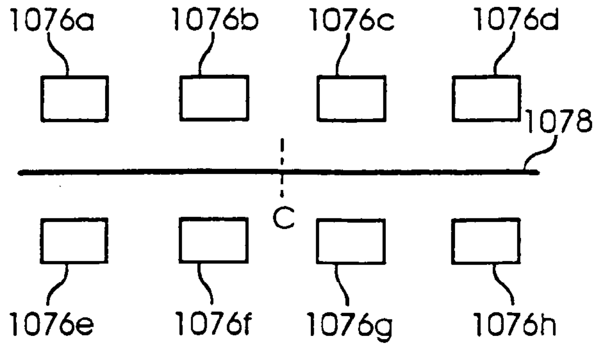
FIG. 43 is a side elevation of a multiple scanhead arrangement according to another embodiment of the present invention.

While FIG. 42 illustrates a system having three scanheads per side, any number of scanheads per side may be utilized. Likewise, it is not necessary that there be a scanhead positioned over the central region of a bill. For example, FIG. 43 illustrates another embodiment of the present invention capable of scanning the segments $S_1$ and $S_2$ of FIG. 40. Scanheads 1076*a*, 1076*d*, 1076*e*, and 1076*h* scan a bill 1078 along segment $S_1$ while scanheads 1076*b*, 1076*c*, 1076*f*, and 1076*g* scan segment $S_2$.

Figure 44:
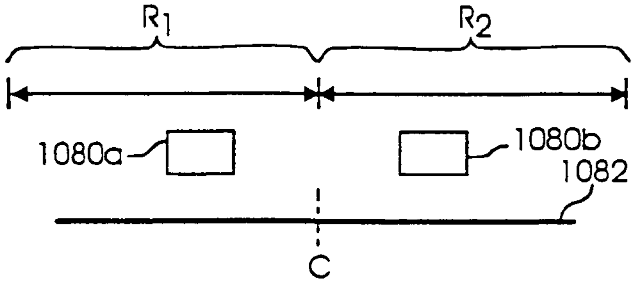
FIG. 44 is a side elevation of a multiple scanhead arrangement according to another embodiment of the present invention.

FIG. 44 depicts another embodiment of a scanning system according to the present invention having laterally moveable scanheads 1080*a–b*. Similar scanheads may be positioned on the opposite side of the transport path. Moveable scanheads 1080*a–b* may provide more flexibility that may be desirable in certain scanning situations. Upon the determination of the dimensions of a bill as described in connection with FIG. 39, a preliminary determination of the identity of a bill may be made. Based on this preliminary determination, the moveable scanheads 1080*a–b* may be positioned over the area of the bill which is most appropriate for retrieving discrimination information. For example, if based on the size of a scanned bill, it is preliminarily determined that the bill is a Japanese 5000 Yen bill-type, and if it has been determined that a suitable characteristic pattern for a 5000 Yen bill-type is obtained by scanning a segment 2.0 cm to the left of center of the bill fed in the forward direction, scanheads 1080*a* and 1080*b* may be appropriately positioned for scanning such a segment, e.g., scanhead 1080*a* positioned 2.0 cm left of center and scanhead 1080*b* positioned 2.0 cm right of center. Such positioning permits proper discrimination regardless of the whether the scanned bill is being fed in the forward or reverse direction. Likewise scanheads on the opposite side of the transport path (not shown) could be appropriately positioned. Alternatively, a single moveable scanhead may be used on one or both sides of the transport path. In such a system, size and color information (to be described in more detail below) may be used to properly position a single laterally moveable scanhead, especially where the orientation of a bill may be determined before scanning.

FIG. 44 depicts a system in which the transport mechanism is designed to deliver a bill 1082 to be scanned centered within the area in which scanheads 1080*a–b* are located. Accordingly, scanheads 1080*a–b* are designed to move relative to the center of the transport path with scanhead 1080*a* being moveable within the range $R_1$ and scanhead 1080*b* being moveable within range $R_2$.

Figure 45:
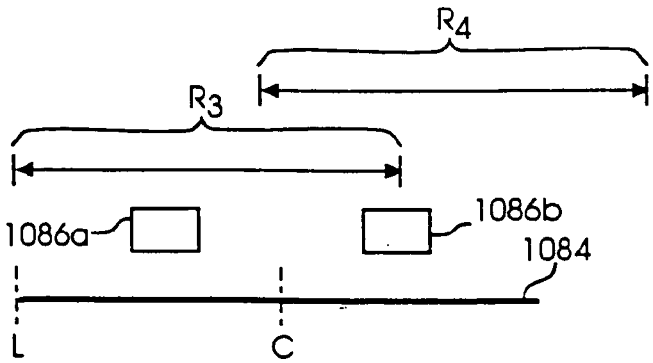
FIG. 45 is a side elevation of a multiple scanhead arrangement according to another embodiment of the present invention.

FIG. 45 depicts another embodiment of a scanning system according to the present invention wherein bills to be scanned are transported in a left justified manner along the transport path, that is wherein the left edge L of a bill 1084 is positioned in the same lateral location relative to the transport path. Based on the dimensions of the bill, the position of the center of the bill may be determined and the scanheads 1086*a–b* may in turn be positioned accordingly. As depicted in FIG. 45, scanhead 1086*a* has a range of motion $R_3$ and scanhead 1086*b* has a range of motion $R_4$. The ranges of motion of scanheads 1086*a–b* may be influenced by the range of dimensions of bills which the discrimination system is designed to accommodate. Similar scanheads may be positioned on the opposite side of the transport path.

Alternatively, the transport mechanism may be designed such that scanned bills are not necessarily centered or justified along the lateral dimension of the transport path. Rather the design of the transport mechanism may permit the position of bills to vary left and right within the lateral dimension of the transport path. In such a case, the edge sensors 1066 of FIG. 39 may be used to locate the edges and center of a bill, and thus provide positional information in a moveable scanhead system and selection criteria in a stationary scanhead system.

Figure 46:
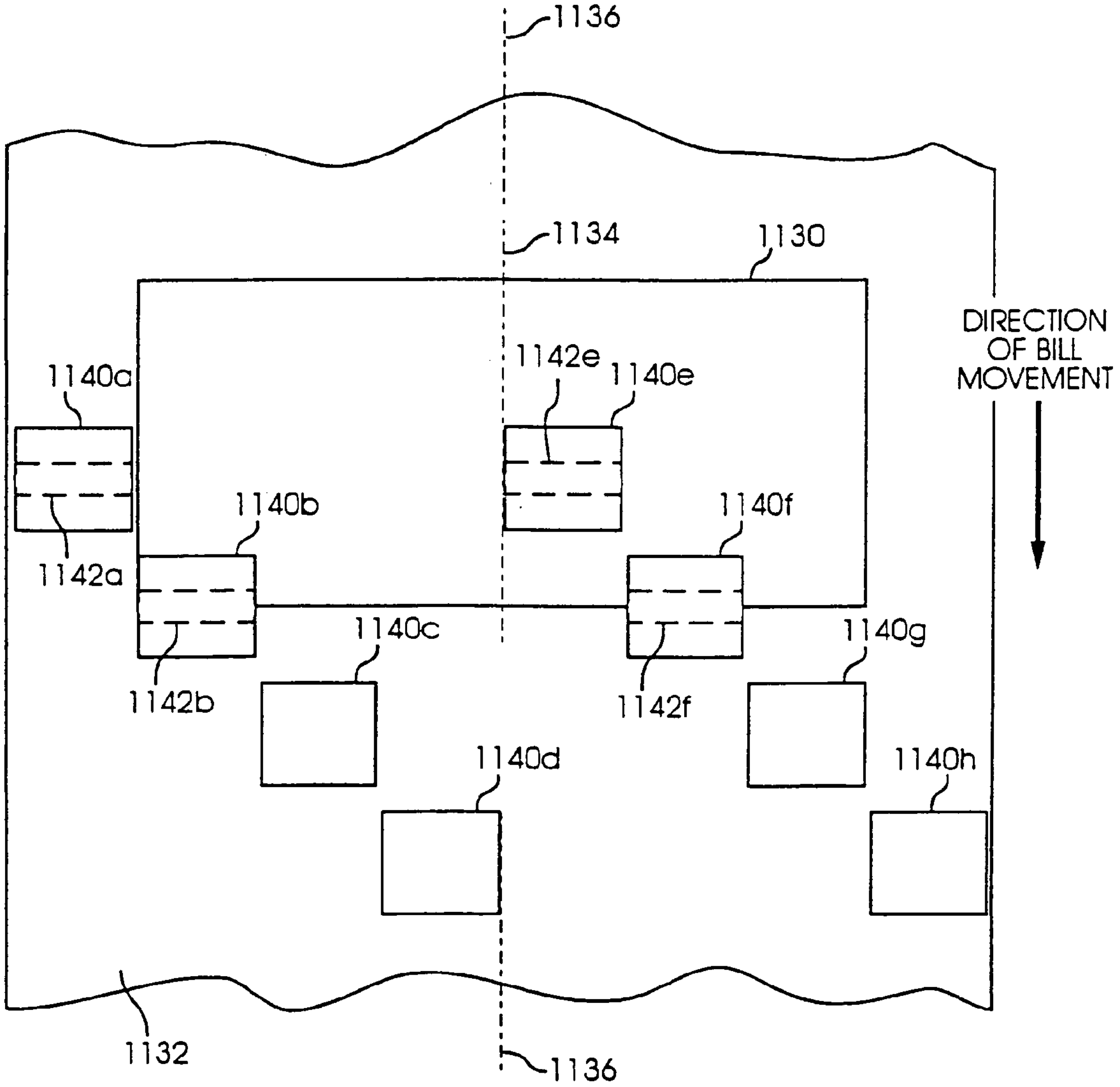
FIG. 46 is a top view of a staggered scanhead arrangement according to one embodiment of the present invention.

In addition to the stationary scanhead and moveable scanhead systems described above, a hybrid system having both stationary and moveable scanheads may be used. Likewise, it should be noted that the laterally displaced scanheads described above need not lie along the same lateral axis. That is, the scanheads may be, for example, staggered upstream and downstream from each other. FIG. 46 is a top view of a staggered scanhead arrangement according to one embodiment of the present invention. As illustrated in FIG. 46, a bill 1130 is transported in a centered manner along the transport path 1132 so that the center 1134 of the bill 1130, is aligned with the center 1136 of the transport path 1132. Scanheads 1140*a–h* are arranged in a staggered manner so as to permit scanning of the entire width of the transport path 1132. The areas illuminated by each scanhead are illustrated by strips 1142*a*, 1142*b*, 1142*e*, and 1142*f* for scanheads 1140*a*, 1140*b*, 1140*e*, and 1140*f*, respectively. Based on size determination sensors, scanheads 1140*a* and 1140*h* may either not be activated or their output ignored.

In general, if prior to scanning a document, preliminary information about a document can be obtained, such as its size or color, appropriately positioned stationary scanheads may be activated or laterally moveable scanheads may be appropriately positioned provided the preliminary information provides some indication as to the potential identity of the document. Alternatively, especially in systems having scanheads positioned over a significant portion of the transport path, many or all of the scanheads of a system may be activated to scan a document. Then subsequently, after some preliminary determination as to a document's identity has been made, only the output or derivations thereof of appropriately located scanheads may be used to generate scanned patterns. Derivations of output signals include, for example, data samples stored in memory generated by sampling output signals. Under such an alternative embodiment, information enabling a preliminary determination as to a document's identity may be obtained by analyzing information either from sensors separate from the scanheads or from one or more of the scanheads themselves. An advantage of such preliminary determinations is that the number of scanned patterns which have to be generated or compared to a set of master patterns is reduced. Likewise the number of master patterns to which scanned patterns must be compared may also be reduced.

While the scanheads 1140*a–h* of FIG. 46 are arranged in a non-overlapping manner, they may alternatively be arranged in an overlapping manner. By providing additional lateral positions, an overlapping scanhead arrangement may provide greater selectivity in the segments to be scanned. This increase in scanable segments may be beneficial in compensating for currency manufacturing tolerances which result in positional variances of the printed indicia on bills relative to their edges. Additionally, in one embodiment, scanheads positioned above the transport path are positioned upstream relative to their corresponding scanheads positioned below the transport path.

Figure 47A:
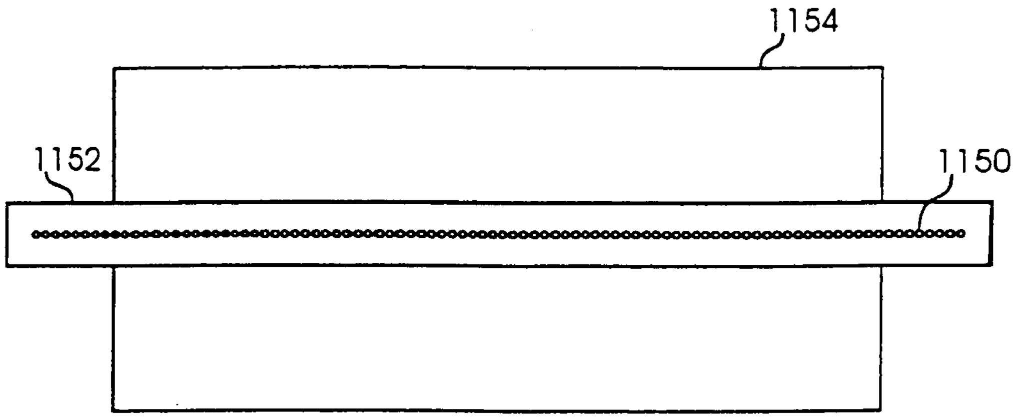
FIG. 47*a* is a top view of a linear array scanhead according to one embodiment of the present invention illustrating a bill being fed in a centered fashion.
Figure 47B:
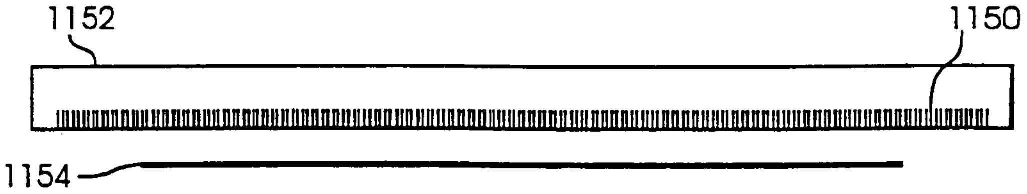
FIG. 47*b* is a side view of a linear array scanhead according to one embodiment of the present invention illustrating a bill being fed in a centered fashion.

FIGS. 47*a* and 47*b* illustrate another embodiment of the present in invention wherein a plurality of analog sensors 1150 such as photodetectors are laterally displaced from each other and are arranged in a linear array within a single scanhead 1152. FIG. 47*a* is a top view while FIG. 47*b* is a side elevation view of such a linear array embodiment. The output of individual sensors 1150 are connected to analog-to-digital converters (not shown) through the use of graded index fibers, such as a "lens array" manufactured by MSG America, Inc., part number SLA20A1675702A3, and subsequently to a CPU (not shown) in a manner similar to that depicted in FIGS. 1 and 6*a*. As depicted in FIGS. 47*a* and 47*b*, a bill 1154 is transported past the linear array scanhead 1152 in a centered fashion. One length for the linear array scanhead is about 6–7 inches (15 cm–17 cm).

In a manner similar to that described above, based on the determination of the size of a bill, appropriate sensors may be activated and their output used to generate scanned patterns. Alternatively many or all of the sensors may be activated with only the output or derivations thereof of appropriately located sensors being used to generate scanned patterns. Derivations of output signals include, for example, data samples stored in memory generated by sampling output signals. As a result, a discriminating system incorporating a linear array scanhead according the present invention would be capable of accommodating a wide variety of bill-types. Additionally, a linear array scanhead provides a great deal of flexibility in how information may be read and processed with respect to various bills. In addition to the ability to generate scanned patterns along segments in a direction parallel to the direction of bill movement, by appropriately processing scanned samples, scanned patterns may be "generated" or approximated in a direction perpendicular to the direction of bill movement. For example, if the linear array scanhead 1152 comprises one hundred and sixty (160) sensors 1150 over a length of 7 inches (17.78 cm) instead of taking samples for 64 encoder pulses from say 30 sensors, samples may be taken for 5 encoder pulses from all 160 cells (or all those positioned over the bill 1154). Alternatively, 160 scanned patterns (or selected ones thereof) of 5 data samples each may be used for pattern comparisons. Accordingly, it can be seen that the data acquisition time is significantly reduced from 64 encoder pulses to only 5 encoder pulses. The time saved in acquiring data can be used to permit more time to be spent processing data and/or to reduce the total scanning time per bill thus enabling increased throughput of the identification system. Additionally, the linear array scanhead permits a great deal of flexibility in tailoring the areas to be scanned. For example, it has been found that the leading edge of Canadian bills contain valuable graphic information. Accordingly, when it is determined that a test bill may be a Canadian bill (or when the identification system is set to a Canadian currency setting), the scanning area can be limited to the leading edge area of bills, for example, by activating many laterally displaced sensors for a relatively few number of encoder pulses.

Figure 48:
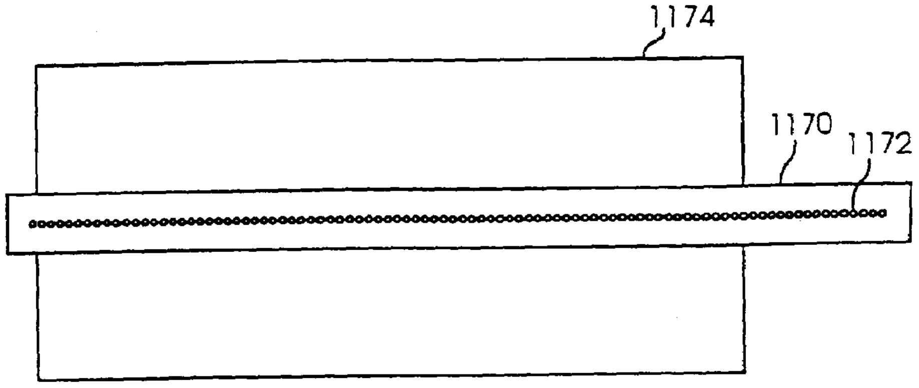
FIG. 48 is a top view of a linear array scanhead according to another embodiment of the present invention illustrating a bill being fed in a non-centered fashion.

FIG. 48 is a top view of another embodiment of a linear array scanhead 1170 having a plurality of analog sensors 1172 such as photodetectors wherein a bill 1174 is transported past the scanhead 1170 in a non-centered manner. As discussed above, positional information from size determining sensors may be used to select appropriate sensors. Alternatively, the linear array scanhead itself may be employed to determine the size of a bill, thus eliminating the need for separate size determining sensors. For example, all sensors may be activated, data samples derived from sensors located on the ends of the linear array scanhead may be preliminarily processed to determine the lateral position and the length of a bill. The width of a bill may be determined either by employing separate leading/trailing edge sensors or pre-processing data samples derived from initial and ending cycle encoder pulses. Once size information is obtained about a bill under test, only the data samples retrieved from appropriate areas of a bill need be further processed.

Figure 49:
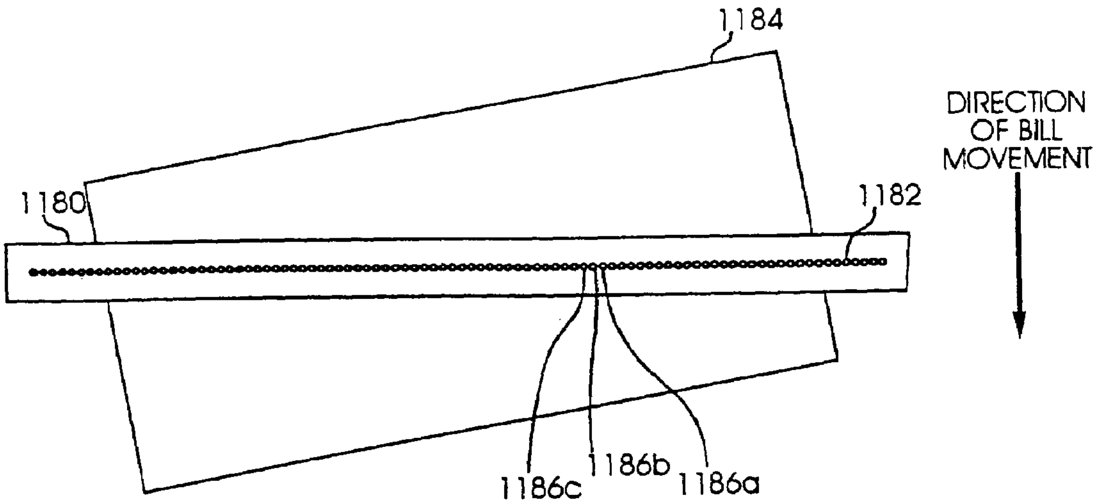
FIG. 49 is a top view of a linear array scanhead according to another embodiment of the present invention illustrating a bill being fed in a skewed fashion.

FIG. 49 is a top view of another embodiment of a linear scanhead 1180 according to the present invention illustrating the ability to compensate for skewing of bills. Scanhead 1180 has a plurality of analog sensors 1182 and a bill 1184 is transported past scanhead 1180 in a skewed manner. Once the skew of a bill has been determined, for example through the use of leading edge sensors, readings from sensors 1182 along the scanhead 1180 may be appropriately delayed. For example, suppose it is determined that a bill is being fed past scanhead 1180 so that the left front corner of the bill reaches the scanhead five encoder pulses before the right front corner of the bill. In such a case, sensor readings along the right edge of the bill can be delayed for 5 encoder pulses to compensate for the skew. Where scanned patterns are to be generated over only a few encoder pulses, the bill may be treated as being fed in a non-skewed manner since the amount of lateral deviation between a scan along a skewed angle and a scan along a non-skewed angle is minimal for a scan of only a few encoder pulses. However, where it is desired to obtain a scan over a large number of encoder pulses, a single scanned pattern may be generated from the outputs of more than one sensor. For example, a scanned pattern may be generated by taking data samples from sensor 1186*a* for a given number of encoder pulses, then taking data samples from sensor 1186*b* for a next given number of encoder pulses, and then taking data samples from sensor 1186*c* for a next given number of encoder pulses. The number of given encoder pulses for which data samples may be taken from the same sensor is influenced by the degree of skew, the greater the degree of skew of the bill, the fewer the number of data samples which may be obtained before switching to the next sensor. Alternatively, master patterns may be generated and stored for various degrees of skew, thus permitting a single sensor to generate a scanned pattern from a bill under test.

With regards to FIGS. 47–49, while only a single linear array scanhead is shown, another linear array scanhead may be positioned on the opposite side of the transport path to permit scanning of either or both sides of a bill. Likewise, the benefits of using a linear array scanhead may also be obtainable using a multiple scanhead arrangement which is configured appropriately, for example such as depicted in FIG. 46 or a linear arrangement of multiple scanheads.

In addition to size and scanned characteristic patterns, color may also be used to discriminate bills. For example, while all U.S. bills are printed in the same colors, e.g., a green side and a black side, bills from other countries often vary in color with the denomination of the bill. For example, a German 50 deutsche mark bill-type is brown in color while a German 100 deutsche mark bill-type is blue in color. Alternatively, color detection may be used to determine the face orientation of a bill, such as where the color of each side of a bill varies. For example, color detection may be used to determine the face orientation of U.S. bills by detecting whether or not the "green" side of a U.S. bill is facing upwards. Separate color sensors may be added upstream of the scanheads described above. According to such an embodiment, color information may be used in addition to size information to preliminarily identify a bill. Likewise, color information may be used to determine the face orientation of a bill which determination may be used to select upper or lower scanheads for scanning a bill accordingly or compare scanned patterns retrieved from upper scanheads with a set of master patterns generated by scanning a corresponding face while the scanned patterns retrieved from the lower scanheads are compared with a set of master patterns generated by scanning an opposing face. Alternatively, color sensing may be incorporated into the scanheads described above. Such color sensing may be achieved by, for example, incorporating color filters, colored light sources, and/or dichroic beamsplitters into the currency discrimination system of the present invention. Color information acquisition is described in more detail in co-pending U.S. application Ser. No. 08/219,093 filed Mar. 29, 1994, for a "Currency Discriminator and Authenticator" incorporated herein by reference. Various color information acquisition techniques are described in U.S. Pat. Nos. 4,841,358; 4,658,289; 4,716,456; 4,825,246; and 4,992,860.

Figure 50A:
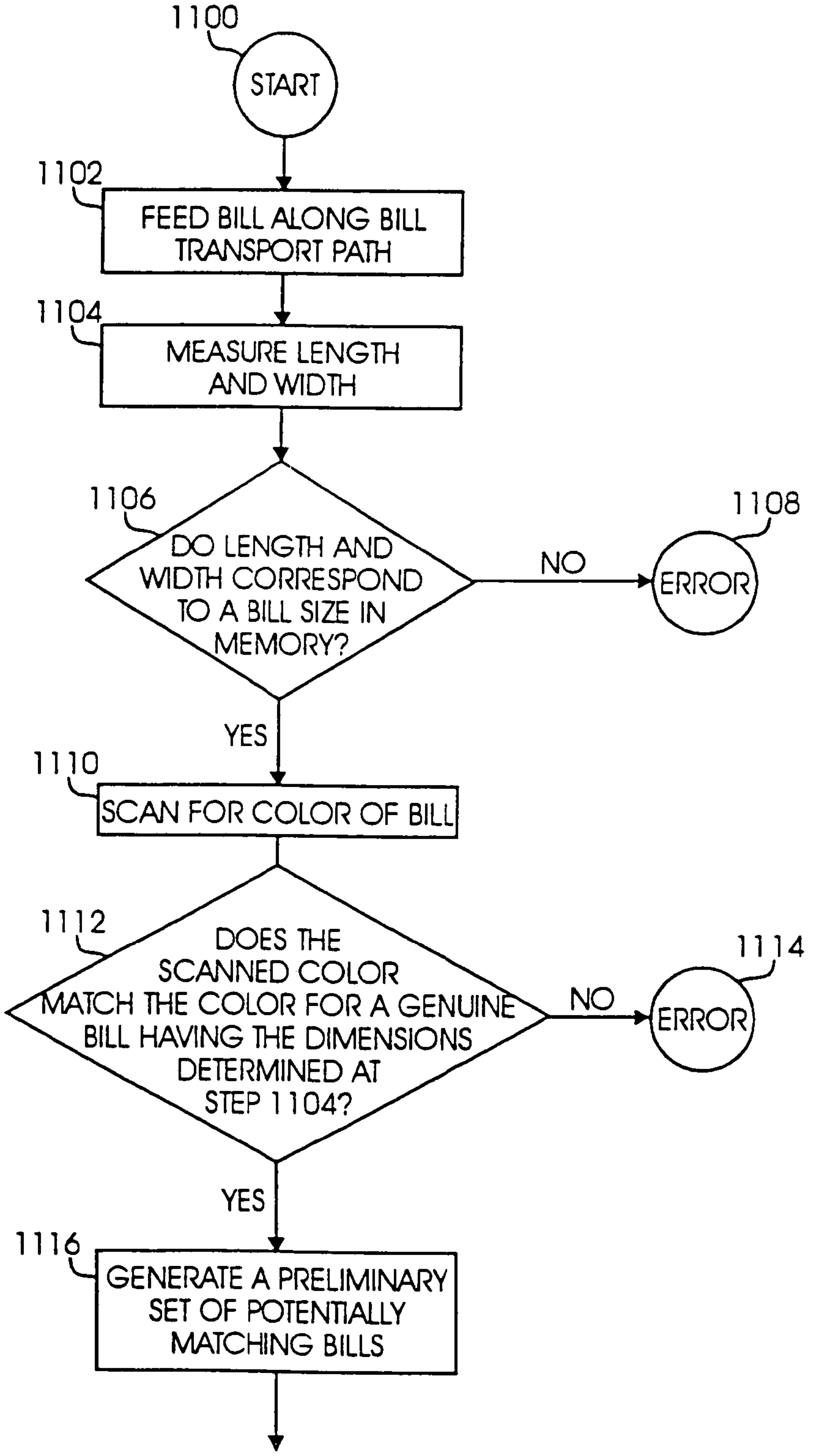
FIGS. 50*a* and 50*b* are a flowchart of the operation of a currency discrimination system according to one embodiment of the present invention.
Figure 50B:
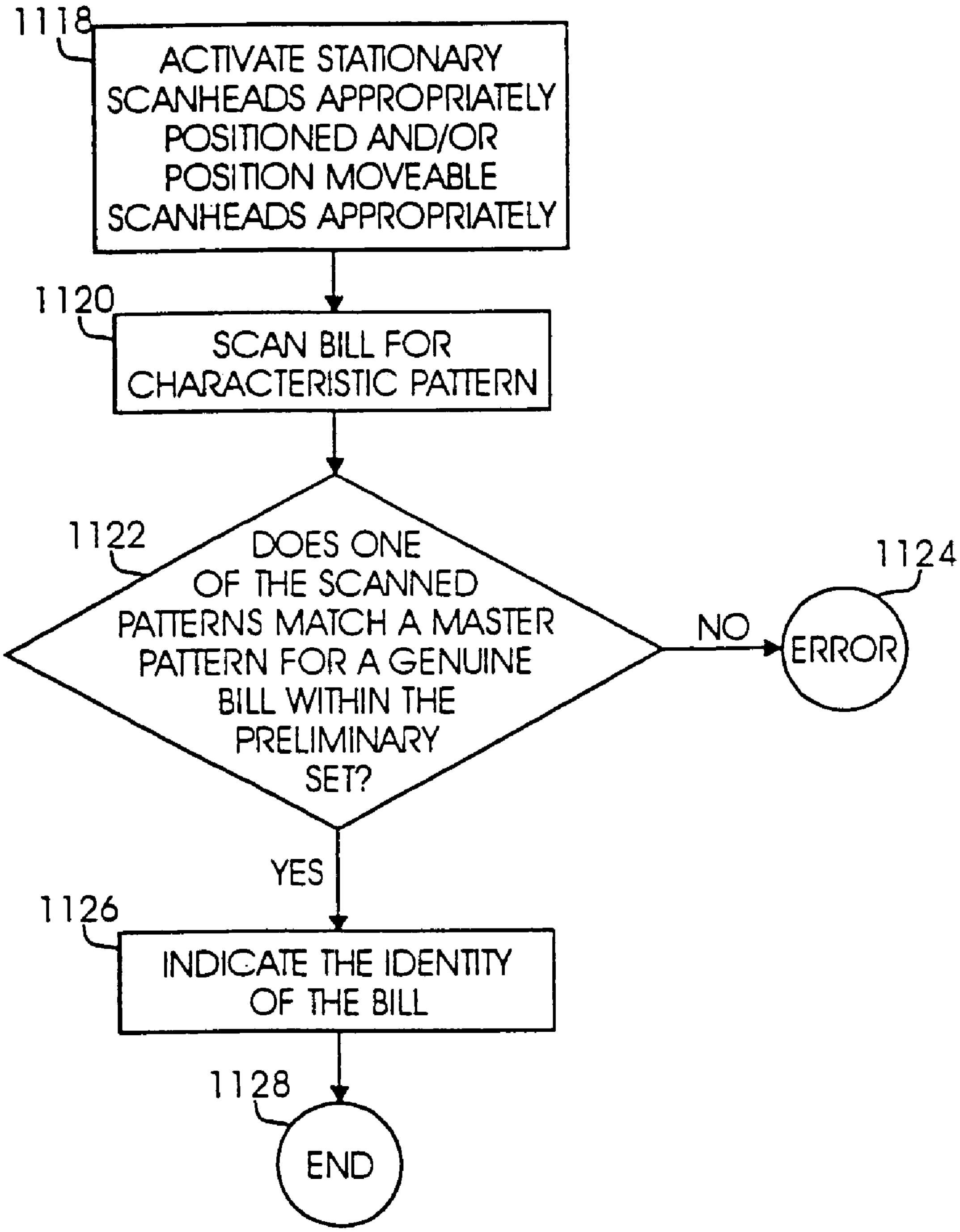

The operation of a currency discriminator according to one embodiment of the present invention may be further understood by referring to the flowchart of FIGS. 50*a* and 50*b*. In the process beginning at step 1100, a bill is fed along a transport path (step 1102) past sensors which measure the length and width of the bill (step 1104). These size determining sensors may be, for example, those illustrated in FIG. 39. Next at step 1106, it is determined whether the measured dimensions of the bill match the dimensions of at least one bill stored in memory, such as EPROM 60 of FIG. 7*a*. If no match is found, an appropriate error is generated at step 1108. If a match is found, the color of the bill is scanned for at step 1110. At step 1112, it is determined whether the color of the bill matches a color associated with a genuine bill having the dimensions measured at step 1104. An error is generated at step 1114 if no such match is found. However, if a match is found, a preliminary set of potentially matching bills is generated at step 1116. Often, only one possible identity will exist for a bill having a given color and dimensions. However, the preliminary set of step 1116 is not limited to the identification of a single bill-type, that is, a specific denomination of a specific currency system; but rather, the preliminary set may comprise a number of potential bill-types. For example, all U.S. bills have the same size and color. Therefore, the preliminary set generated by scanning a U.S. $5 bill would include U.S. bills of all denominations.

Based on the preliminary set (step 1116), selected scanheads in a stationary scanhead system may be activated (step 1118). For example, if the preliminary identification indicates that a bill being scanned has the color and dimensions of a German 100 deutsche mark, the scanheads over regions associated with the scanning of an appropriate segment for a German 100 deutsche mark may be activated. Then upon detection of the leading edge of the bill by sensors 1068 of FIG. 40, the appropriate segment may be scanned. Alternatively, all scanheads may be active with only the scanning information from selected scanheads being processed. Alternatively, based on the preliminary identification of a bill (step 1116), moveable scanheads may be appropriately positioned (step 1118).

Subsequently, the bill is scanned for a characteristic pattern (step 1120). At step 1122, the scanned patterns produced by the scanheads are compared with the stored master patterns associated with genuine bills as dictated by the preliminary set. By only making comparisons with master patterns of bills within the preliminary set, processing time may be reduced. Thus for example, if the preliminary set indicated that the scanned bill could only possibly be a German 100 deutsche mark, then only the master pattern or patterns associated with a German 100 deutsche mark need be compared to the scanned patterns. If no match is found, an appropriate error is generated (step 1124). If a scanned pattern does match an appropriate master pattern, the identity of the bill is accordingly indicated (step 1126) and the process is ended (step 1128).

While some of the embodiments discussed above entailed a system capable of identifying a plurality of bill-types, the system may be adapted to identify a bill under test as either belonging to a specific bill-type or not. For example, the system may be adapted to store master information associated with only a single bill-type such as a United Kingdom 5 pound bill. Such a system would identify bills under test which were United Kingdom 5 pound bills and would reject all other bill-types.

The scanheads of the present invention may be incorporated into a document identification system capable of identifying a variety-of documents. For example, the system may be designed to accommodate a number of currencies from different countries. Such a system may be designed to permit operation in a number of modes. For example, the system may be designed to permit an operator to select one or more of a plurality of bill-types which the system is designed to accommodate. Such a selection may be used to limit the number of master patterns with which scanned patterns are to be compared. Likewise, the operator may be permitted to select the manner in which bills will be fed, such as all bills face up, all bills top edge first, random face orientation, and/or random top edge orientation. Additionally, the system may be designed to permit output information to be displayed in a variety of formats to a variety of peripherals, such as a monitor, LCD display, or printer. For example, the system may be designed to count the number of each specific bill-types identified and to tabulate the total amount of currency counted for each of a plurality of currency systems. For example, a stack of bills could be placed in the bill accepting station 12 of FIGS. 2*a*–2*b*, and the output unit 36 of FIGS. 2*a*–2*b* may indicate that a total of 370 British pounds and 650 German marks were counted. Alternatively, the output from scanning the same batch of bills may provide more detailed information about the specific denominations counted, for example one 100 pound bill, five 50 pound bills, and one 20 pound bill and thirteen 50 deutsche mark bills. Such a device would be useful in a bank teller environment. A bank customer could hand the teller the above stack of bills. The teller could then place the stack of bills in the device. The device quickly scans the bills and indicates that a total of 370 British pounds and 650 German marks were counted. The teller could then issue the customer a receipt. At some point after the above transaction, the teller could separate the bills either by hand and/or by using an automatic sorter device located, for example, in a back room. The above transaction could then be performed rapidly without the customer being detained while the bills are being sorted.

In a document identification system capable of identifying a variety of bills from a number of countries, a manual selection device, such as a switch or a scrolling selection display, may be provided so that the operator may designate what type of currency is to be discriminated. For example, in a system designed to accommodate both Canadian and German currency, the operator could turn a dial to the Canadian bill setting or scroll through a displayed menu and designate Canadian bills. By pre-declaring what type of currency is to be discriminated, scanned patterns need only be compared to master patterns corresponding to the indicated type of currency, e.g., Canadian bills. By reducing the number of master patterns which have to be compared to scanned patterns, the processing time can be reduced.

Alternatively, a system may be designed to compare scanned patterns to all stored master patterns. In such a system, the operator need not pre-declare what type of currency is to be scanned. This reduces the demands on the operator of the device. Furthermore, such a system would permit the inputting of a mixture of bills from a number of countries. The system would scan each bill and automatically determine the issuing country and the denomination.

In addition to the manual and automatic bill-type discriminating systems, an alternate system employs a semi-automatic bill-type discriminating method. Such a system would work in a manner similar to the stranger mode described above. In such a system, a stack of bills is placed in the input hopper. The first bill is scanned and the generated scanned pattern is compared with the master patterns associated with bills from a number of different countries. The discriminator identifies the country-type and the denomination of the bill. Then the discriminator compares all subsequent bills in the stack to the master patterns associated with bills only from the same country as the first bill. For example, if a stack of U.S. bills were placed in the input hopper and the first bill was a $5 bill, the first bill would be scanned. The scanned pattern would be compared to master patterns associated with bills from a number of countries, e.g., U.S., Canadian, and German bills. Upon determining that the first bill is a U.S. $5 bill, scanned patterns from the remaining bills in the stack are compared only to master patterns associated with U.S. bills, e.g., $1, $2, $5, $10, $20, $50, and $100 bills. When a bill fails to sufficiently match one of the compared patterns, the bill may be flagged as described above such as by stopping the transport mechanism with the flagged bill being the last bill deposited in the output receptacle.

A currency discriminating device designed to accommodate both Canadian and German currency bills will now be described. According to this embodiment, a currency discriminating device similar to that described above in connection with scanning U.S. currency (see, e.g., FIGS. 1–38 and accompanying description) is modified so as to be able to accept both Canadian and German currency bills. According to one embodiment when Canadian bills are being discriminated, no magnetic sampling or authentication is performed.

Canadian bills have one side with a portrait (the portrait side) and a reverse side with a picture (the picture side). Likewise, German bills also have one side with a portrait (the portrait side) and a reverse side with a picture (the picture side). In one embodiment, the discriminator is designed to accept either stacks of Canadian bills or stacks of German bills, the bills in the stacks being faced so that the picture side of all the bills will be scanned by a triple scanhead arrangement to be described in connection with FIG. 51. In one embodiment, this triple scanhead replaces the single scanhead arrangement housed in the unitary molded plastic support member 280 (see, e.g., FIGS. 25 and 26).

Figure 51:
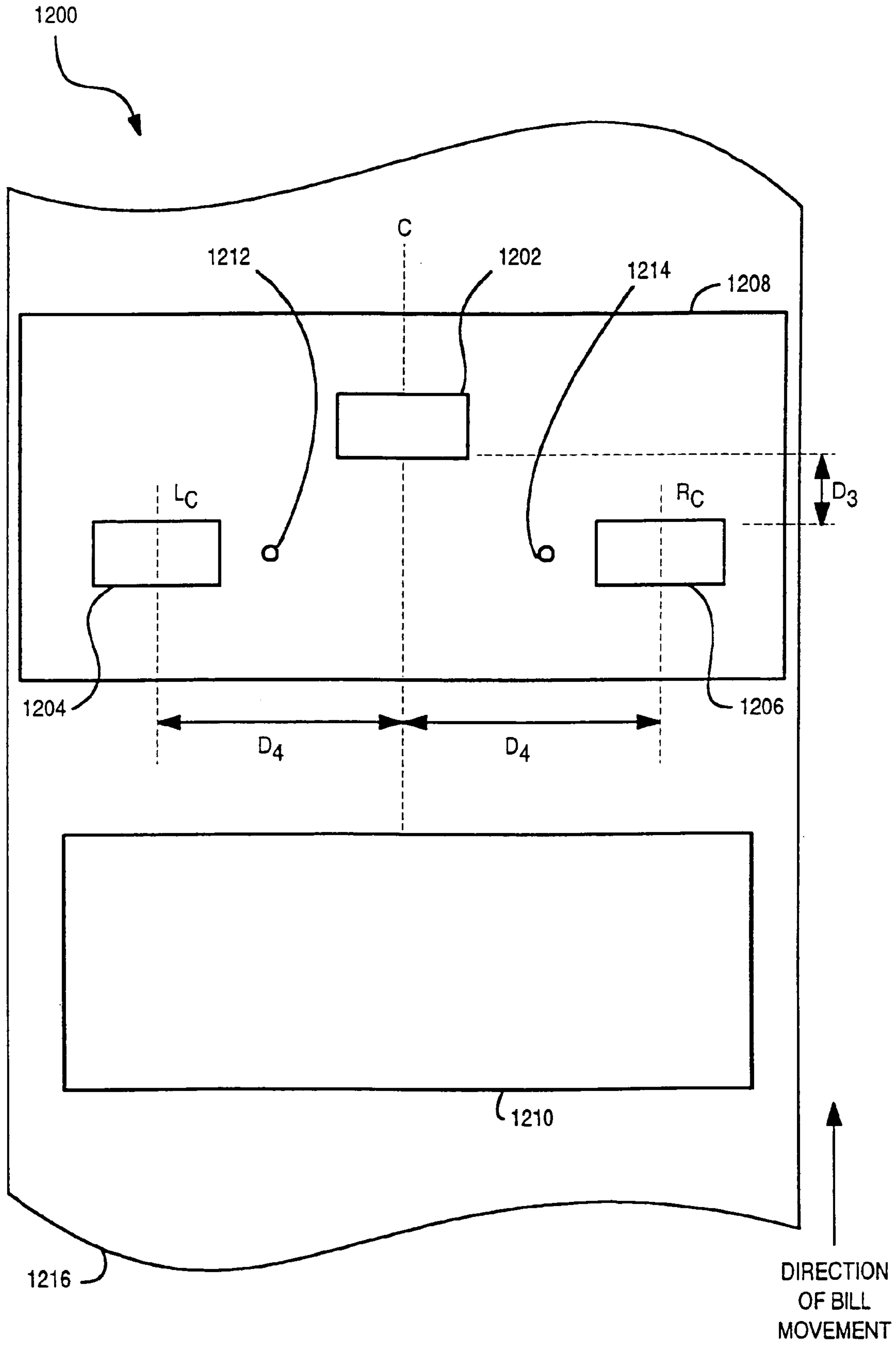
FIG. 51 is a top view of a triple scanhead arrangement utilized in a discriminating device able to discriminate both Canadian and German bills according to one embodiment of the present invention.

FIG. 51 is a top view of a triple scanhead arrangement 1200. The triple scanhead arrangement 1200 comprises a center scanhead 1202, a left scanhead 1204, and a right scanhead 1206 housed in a unitary molded plastic support member 1208. A bill 1210 passes under the arrangement 1200 in the direction shown. O-rings are positioned near each scanhead, preferably two O-rings per scanhead, one on each side of a respective scanhead, to engage the bill continuously while transporting the bill between rolls 223 and 241 (FIG. 20*a*) and to help hold the bill flat against the guide plate 240 (FIG. 20*a*). The left 1204 and right 1206 scanhead are placed slightly upstream of the center scanhead 1202 by a distance $D_3$. In one embodiment, $D_3$ is 0.083 inches (0.21 cm). The center scanhead 1202 is centered over the center C of the transport path 1216. The center $L_C$ of the left scanhead 1204 and the center $R_C$ of the right scanhead 1206 are displaced laterally from center C of the transport path in a symmetrical fashion by a distance $D_4$. In one embodiment $D_4$ is 1.625 inches (4.128 cm).

The scanheads 1202, 1204, and 1206 are each similar to the scanheads describe above connection with FIGS. 1–38, except only a wide slit having a length of about 0.500" and a width of about 0.050" is utilized. The wide slit of each scanhead is used both to detect the leading edge of a bill and to scan a bill after the leading edge has been detected.

Two photosensors 1212 and 1214 are located along the lateral axis of the left and right scanheads 1204 and 1206, one on either side of the center scanhead 1202. Photosensors 1212 and 1214 are same as the photosensors PS1 and PS2 describe above (see, e.g., FIGS. 26 and 30). Photosensors 1212 and 1214 are used to detect doubles and also to measure the dimension of bills in the direction of bill movement which in the embodiment depicted in FIG. 51 is the narrow dimension of bills. Photosensors 1212 and 1214 are used to measure the narrow dimension of a bill by indicating when the leading and trailing edges of a bill passes by the photosensors 1212 and 1214. This information in combination with the encoder information permits the narrow dimension of a bill to be measured.

All Canadian bills are 6" (15.24 cm) in their long dimension and 2.75" (6.985 cm) in their narrow dimension. German bills vary in size according to denomination. In one embodiment of the currency discriminating system, the discriminating device is designed to accept and discriminate $2, $5, $10, $20, $50, and $100 Canadian bills and 10 DM, 20 DM, 50 DM, and 100 DM German bills. These German bills vary in size from 13.0 cm (5.12") in the long dimension by 6.0 cm (2.36") in the narrow dimension for 10 DM bills to 16.0 cm (6.30") in the long dimension by 8.0 cm (3.15") in the narrow dimension for 100 DM bills. The input hopper of the discriminating device is made sufficiently wide to accommodate all the above listed Canadian and German bills, e.g., 6.3" (16.0 cm) wide.

Figure 52:
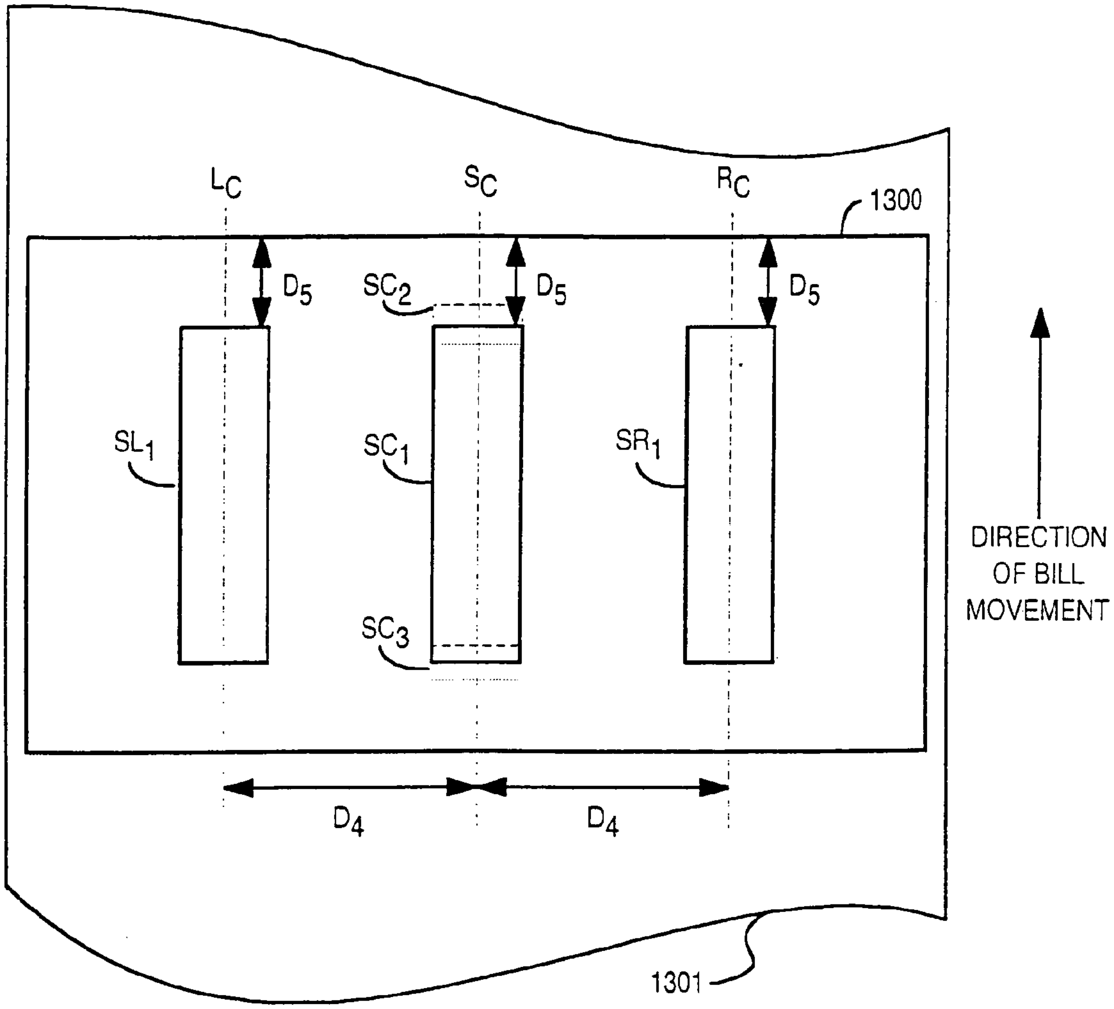
FIG. 52 is a top view of Canadian bill illustrating the areas scanned by the triple scanhead arrangement of FIG. 51 according to one embodiment of the present invention.

FIG. 52 is a top view of a Canadian bill illustrating the areas scanned by the triple scanhead arrangement of FIG. 51. In generating scanned patterns from a Canadian bill 1300 traveling along a transport path 1301, segments $SL_1$, $SC_1$, and $SR_1$ are scanned by the left 1204, center 1202, and right 1206 scanheads, respectively, on the picture side of the bill 1300. These segments are similar to segment S in FIG. 4. Each segment begins a predetermined distance $D_5$ inboard of the leading edge of the bill. In one embodiment $D_5$ is 0.5" (1.27 cm). Segments $SL_1$, $SC_1$, and $SR_1$ each comprise 64 samples as shown in FIGS. 3 and 5. In one embodiment Canadian bills are scanned at a rate of 1000 bills per minute. The lateral location of segments $SL_1$, $SC_1$, and $SR_1$ is fixed relative to the transport path 1301 but may vary left to right relative to bill 1300 since the lateral position of bill 1300 may vary left to right-within the transport path 1301.

A set of eighteen (18) master Canadian patterns are stored for each type of Canadian bill that the system is designed to discriminate, three (3) for each scanhead in both the forward and reverse directions. For example, three patterns are generated by scanning a given genuine Canadian bill in the forward direction with the center scanhead. One pattern is generated by scanning down the center of the bill along segment $SC_1$, a second is generated by scanning along a segment $SC_2$ initiated 1.5 samples before the beginning of $SC_1$, and a third is generated by scanning along a segment $SC_3$ initiated 1.5 samples after the beginning of $SC_1$. The second and third patterns are generated to compensate for the problems associated with triggering off the edge of a bill as discussed above.

To compensate for possible lateral displacement of bills to be scanned along a direction transverse to the direction of bill movement, the exact lateral location along which each of the above master patterns is generated is chosen after considering the correlation results achieved when a bill is displaced slightly to the left or to the right of the center of each scanhead, i.e., lines $L_C$, $S_C$, and $R_C$. For example, in generating a master pattern associated with segment $SC_1$, a scan of a genuine bill may be taken down the center of a bill, a second scan may be taken along a segment 0.15" to the right of center (+0.15"), and a third scan may be taken along a segment 0.15" to the left of center (−0.15"). Based on the correlation result achieved, the actual scan location may be adjusted slightly to the right or left so the effect of the lateral displacement of a bill on the correlation results is minimized. Thus, for example, the master pattern associated with a forward scan of a Canadian $2 bill using the center scanhead 1202 may be taken along a line 0.05" to the right of the center of the bill.

Furthermore, the above stored master patterns are generated either by scanning both a relatively new crisp genuine bill and an older yellowed genuine bill and averaging the patterns generated from each or, alternatively, by scanning an average looking bill.

Master patterns are stored for nine (9) types of Canadian bills, namely, the newer series $2, $5, $10, $20, $50, and $100 bills and the older series $20, $50, and $100 bills. Accordingly, a total of 162 Canadian master patterns are stored (9 types×18 per type).

Figure 53:
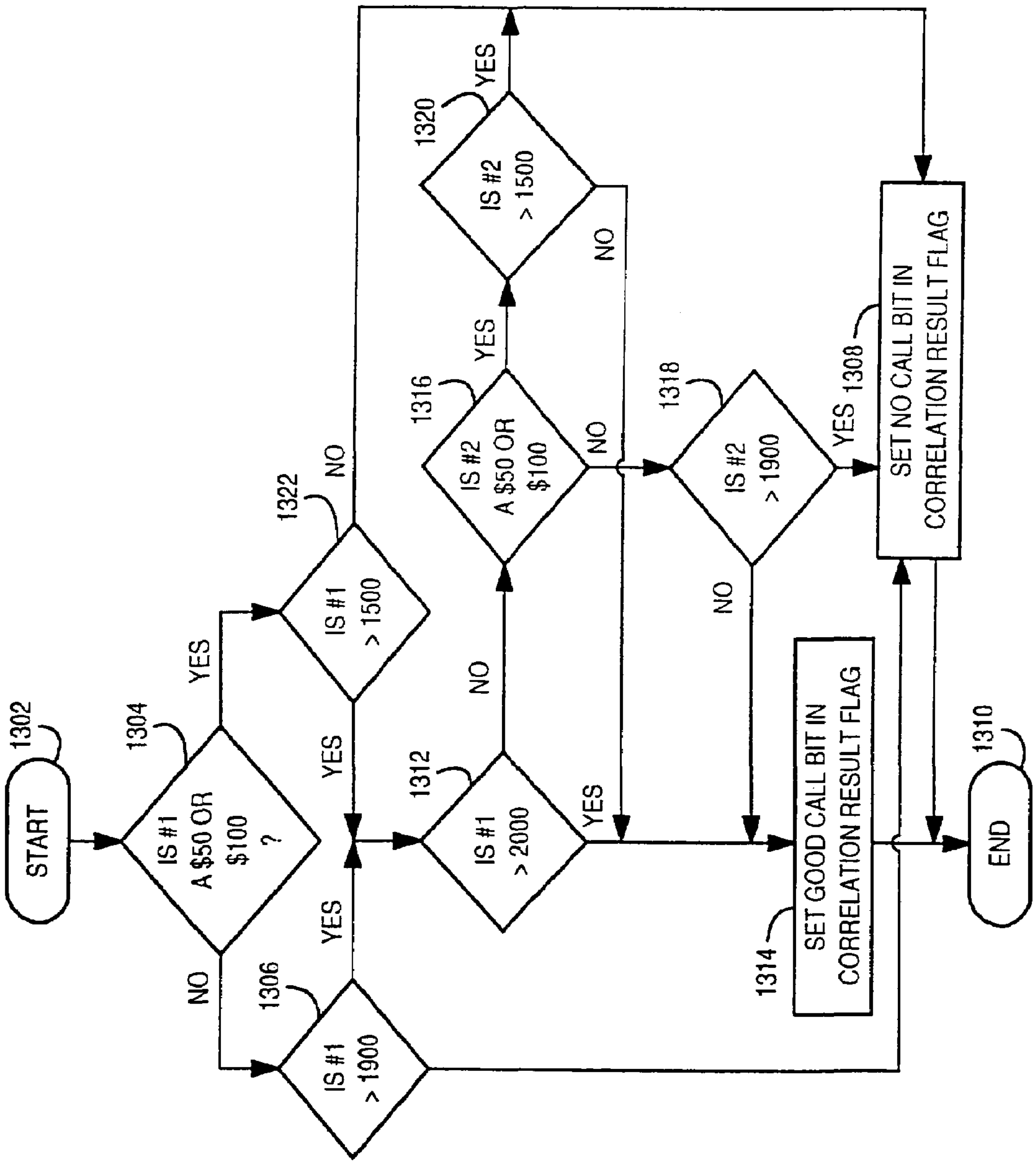
FIG. 53 is a flowchart of the threshold tests utilized in calling the denomination of a Canadian bill according to one embodiment of the present invention.

FIG. 53 is a flowchart of the threshold test utilized in calling the denomination of a Canadian bill. When Canadian bills are being discriminated the flowchart of FIG. 53 replaces the flowchart of FIG. 13. The correlation results associated with correlating a scanned pattern to a master pattern of a given type of Canadian bill in a given scan direction and a given offset in the direction of bill movement from each of the three scanheads are summed. The highest of the resulting 54 summations is designated the #1 correlation and the second highest is preliminarily designated the #2 correlation. The #1 and #2 correlations each have a given bill type associated with them. If the bill type associated with the #2 correlation is merely a different series from, but the same denomination as, the bill type associated with the #1 denomination, the preliminarily designated #2 correlation is substituted with the next highest correlation where the bill denomination is different from the denomination of the bill type associated with the #1 correlation.

The threshold test of FIG. 53 begins at step 1302. Step 1304 checks the denomination associated with the #1 correlation. If the denomination associated with the #1 correlation is not a $50 or $100, the #1 correlation is compared to a threshold of 1900 at step 1306. If the #1 correlation is less than or equal to 1900, the correlation number is too low to identify the denomination of the bill with certainty. Therefore, step 1308 sets a "no call" bit in a correlation result flag and the system returns to the main program at step 1310. If, however, the #1 correlation is greater than 1900 at step 1306, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1 correlation is not greater than 2000 at step 1312, step 1316 checks the denomination associated with the #2 correlation. If the denomination associated with the #2 correlation is not a $50 or $100, the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty because the #1 and #2 correlations are both above 1900 and, yet, are associated with different denominations. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308.

If the denomination associated with the #1 correlation is a $50 or $100 at step 1304, the #1 correlation is compared to a threshold of 1500 at step 1322. If the #1 correlation is less than or equal to 1500, the denomination of the scanned bill cannot be identified with certainty and, therefore, the "no call" bit is set in the correlation result flag at step 1308. If, however, the #1 correlation at step 1322 is greater than 1500, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1 correlation is not greater than 2000 at step 1312, step 1316 checks the denomination associated with the #2 correlation. If the denomination associated with the #2 correlation is not a $50 or $100, the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308 and the system returns to the main program at step 1310.

Now the use of the triple scanhead arrangement 1200 in scanning and discriminating German currency will be described. When scanning German bills, only the output of the center scanhead 1202 is utilized to generate scanned patterns. A segment similar to segment S of FIG. 4 is scanned over the center of the transport path at a predetermined distance $D_6$ inboard after the leading edge of a bill is detected. In one embodiment $D_6$ is 0.25" (0.635 cm). The scanned segment comprises 64 samples as shown in FIGS. 3 and 5. In one embodiment German bills are scanned at a rate of 1000 bills per minute. The lateral location of the scanned segment is fixed relative to the transport path 1216 but may vary left to right relative to bill 1210 since the lateral position of bill 1210 may vary left to right within the transport path 1216.

Figure 54A:
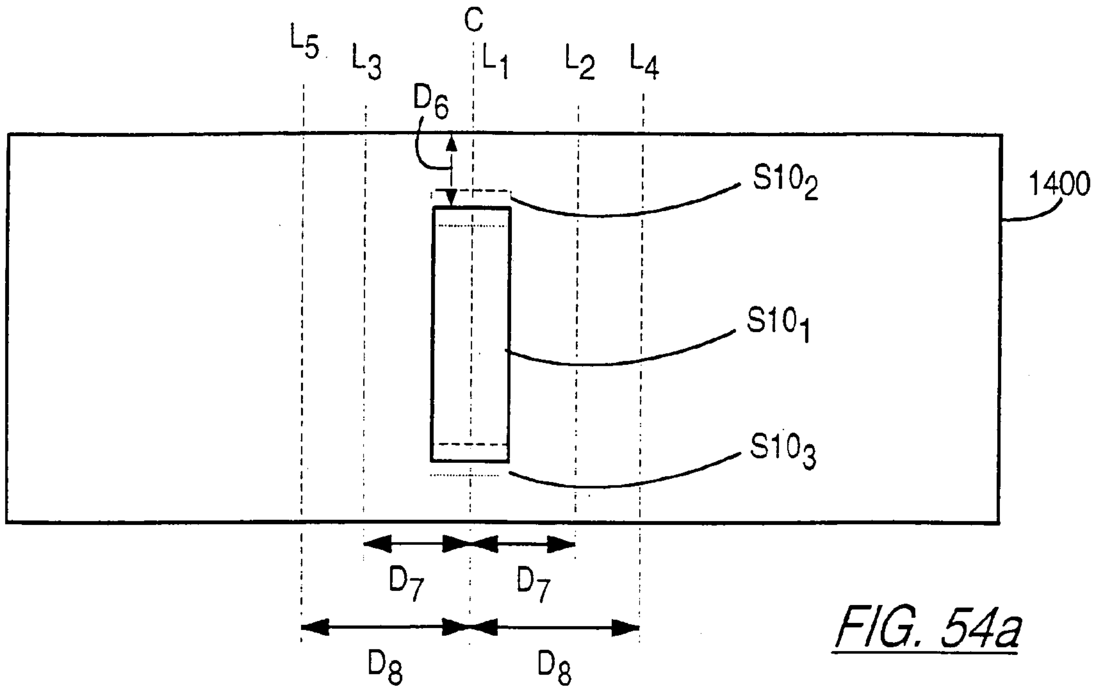
FIG. 54*a* illustrates the general areas scanned in generating master 10 DM German patterns according to one embodiment of the present invention.

FIG. 54*a* illustrates the general areas scanned in generating master 10 DM German patterns. Due to the short length of 10 DM bills in their long dimension relative to the width of the transport path, thirty (30) 10 DM master patterns are stored. A first set of five patterns are generated by scanning a genuine 10 DM bill 1400 in the forward direction along laterally displaced segments all beginning a predetermined distance $D_6$ inboard of the leading edge of the bill 1400. Each of these five laterally displaced segments is centered about a respective one of lines $L_1$–$L_5$. One such segment $\mathbf{S10}_1$ centered about line $L_1$ is illustrated in FIG. 54*a*. Line $L_1$ is disposed down the center C of the bill 1400. In one embodiment lines $L_2$–$L_5$ are disposed in a symmetrical fashion about the center C of the bill 1400. In one embodiment lines $L_2$ and $L_3$ are laterally displaced from $L_1$ by a distance $D_7$ where $D_7$ is 0.24" (0.61 cm) and lines $L_4$ and $L_5$ are laterally displaced from $L_1$ by a distance $D_8$ where $D_8$ is 0.48" (1.22 cm).

A second set of five patterns are generated by scanning a genuine 10 DM bill 1400 in the forward direction along laterally displaced segments along lines $L_1$–$L_5$ all beginning at a second predetermined distance inboard of the leading edge of the bill 1400, the second predetermined distance being less than the predetermined distance $D_6$. One such segment $\mathbf{S10}_2$ centered about line $L_1$ is illustrated in FIG. 54*a*. In one embodiment the second predetermined distance is such that scanning begins one sample earlier than $D_6$, that is about 30 mils before the initiation of the patterns in the first set of five patterns.

A third set of five patterns are generated by scanning a genuine 10 DM bill 1400 in the forward direction along laterally displaced segments along lines $L_1$–$L_5$ all beginning at a third predetermined distance inboard of the leading edge of the bill 1400, the third predetermined distance being greater than the predetermined distance $D_6$. One such segment $\mathbf{S10}_3$ centered about line $L_1$ is illustrated in FIG. 54*a*. In one embodiment the third predetermined distance is such that scanning begins one sample later than $D_6$, that is about 30 mils after the initiation of the patterns in the first set of five patterns.

The above three sets of five patterns yield fifteen patterns in the forward direction. Fifteen additional 10 DM master patterns taken in the manner described above but in the reverse direction are also stored.

Figure 54B:
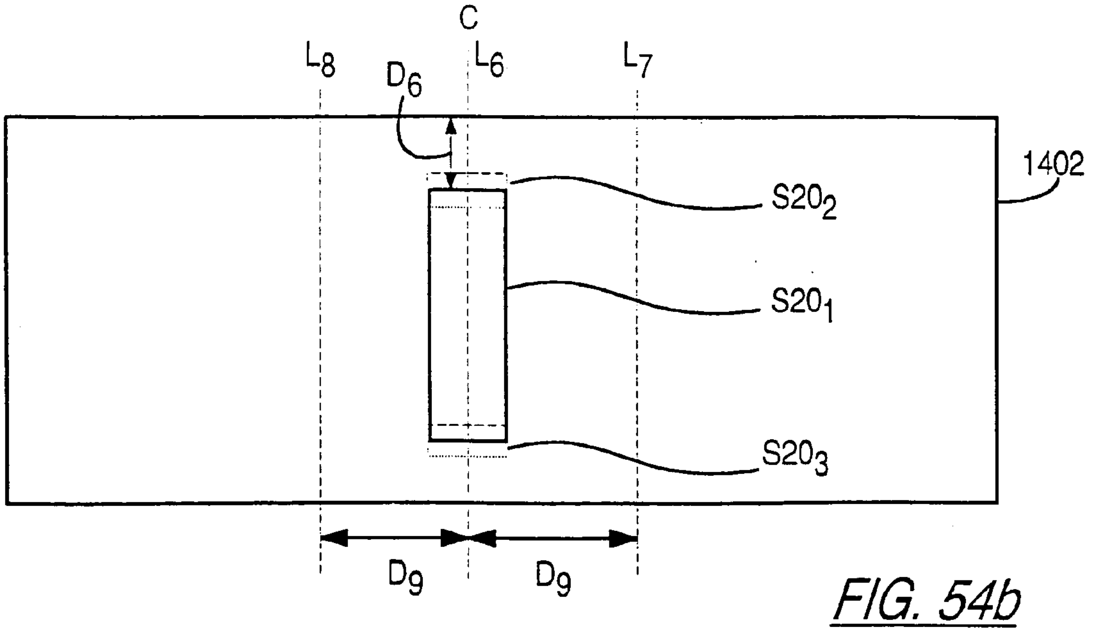
FIG. 54*b* illustrates the general areas scanned in generating master 20 DM, 50 DM, and 100 DM German patterns according to one embodiment of the present invention.

FIG. 54*b* illustrates the general areas scanned in generating master 20 DM, 50 DM, and 100 DM German patterns. Due to the lengths of 20 DM, 50 DM, and 100 DM bills in their long dimension being shorter than the width of the transport path, eighteen (18) 20 DM master patterns, eighteen (18) 50 DM master patterns, and eighteen (18) 100 DM master patterns are stored. The 50 DM master patterns and the 100 DM master patterns are taken in the same manner as the 20 DM master patterns except that the 50 DM master patterns and 100 DM master patterns are generated from respective genuine 50 DM bills and 100 DM bills while the 20 DM master patterns are generated from genuine 20 DM bills. Therefore, only the generation of the 20 DM master patterns will be described in detail.

A first set of three patterns are generated by scanning a genuine 20 DM bill 1402 in the forward direction along laterally displaced segments all beginning a predetermined distance $D_6$ inboard of the leading edge of the bill 1402. Each of these three laterally displaced segments is centered about a respective one of lines $L_6$–$L_8$. One such segment S20$_1$ centered about line $L_6$ is illustrated in FIG. 54*b*. Line $L_6$ is disposed down the center C of the bill 1402. In one embodiment lines $L_7$–$L_8$ are disposed in a symmetrical fashion about the center C of the bill 1402. In one embodiment lines $L_7$ and $L_8$ are laterally displaced from $L_6$ by a distance $D_9$ where $D_9$ is 0.30" (0.76 cm) for the 20 DM bill. The value of $D_9$ is 0.20" (0.51 cm) for the 50 DM bill and 0.10" (0.25 cm) for the 100 DM bill.

A second set of three patterns are generated by scanning a genuine 20 DM bill 1402 in the forward direction along laterally displaced segments along lines $L_6$–$L_8$ all beginning at a second predetermined distance inboard of the leading edge of the bill 1402, the second predetermined distance being less than the predetermined distance $D_6$. One such segment S20$_2$ centered about line $L_6$ is illustrated in FIG. 54*b*. In one embodiment the second predetermined distance is such that scanning begins one sample earlier than $D_6$, that is about 30 mils before the initiation of the patterns in the first set of three patterns.

A third set of three patterns are generated by scanning a genuine 20 DM bill 1402 in the forward direction along laterally displaced segments along lines $L_6$–$L_8$ all beginning at a third predetermined distance inboard of the leading edge of the bill 1402, the third predetermined distance being greater than the predetermined distance $D_6$. One such segment S20$_3$ centered about line $L_6$ is illustrated in FIG. 54*b*. In one embodiment the third predetermined distance is such that scanning begins one sample later than $D_6$, that is about 30 mils after the initiation of the patterns in the first set of three patterns.

The above three sets of three patterns yield nine patterns in the forward direction. Nine additional 20 DM master patterns taken in the manner described above but in the reverse direction are also stored. Furthermore, the above stored master patterns are generated either by scanning both a relatively new crisp genuine bill and an older yellowed genuine bill and averaging the patterns generated from each or, alternatively, by scanning an average looking bill.

This yields a total of 84 German master patterns (30 for 10 DM bills, 18 for 20 DM bills, 18 for 50 DM bills, and 18 for 100 DM bills). To reduce the number of master patterns that must compared to a given scanned pattern, the narrow dimension of a scanned bill is measured using photosensors 1212 and 1214. After a given bill has been scanned by the center scanhead 1202, the generated scanned pattern is correlated only against certain ones of above described 84 master patterns based on the size of the narrow dimension of the bill as determined by the photosensors 1212 and 1214. The narrow dimension of each bill is measured independently by photosensors 1212 and 1214 and then averaged to indicate the length of the narrow dimension of a bill. In particular, a first number of encoder pulses occur between the detection of the leading and trailing edges of a bill by the photosensor 1212. Likewise, a second number of encoder pulses occur between the detection of the leading and trailing edges of the bill by the photosensor 1214. These first and second numbers of encoder pulses are averaged to indicate the length of the narrow dimension of the bill in terms of encoder pulses.

The photosensors 1212 and 1214 can also determine the degree of skew of a bill as it passes by the triple scanhead arrangement 1200. By counting the number of encoder pulses between the time when photosensors 1212 and 1214 detect the leading edge of a bill, the degree of skew can be determined in terms of encoder pulses. If no or little skew is measured, a generated scanned pattern is only compared to master patterns associated with genuine bills having the same narrow dimension length. If a relatively large degree of skew is detected, a scanned pattern will be compared with master patterns associated with genuine bills having the next smaller denominational amount than would be indicated by the measured narrow dimension length.

Table 4 indicates which denominational set of master patterns are chosen for comparison to the scanned pattern based on the measured narrow dimension length in terms of encoder pulses and the measured degree of skew in terms of encoder pulses:

TABLE 4

| Narrow Dimension Length in Encoder Pulses | Degree of Skew in Encoder Pulses | Selected Set of Master Patterns |
|---|---|---|
| <1515 | Not applicable | 10 DM |
| ≧1515 and <1550 | ≧175 | 10 DM |
| ≧1515 and <1550 | <175 | 20 DM |
| ≧1550 and <1585 | ≧300 | 10 DM |
| ≧1550 and <1585 | <300 | 20 DM |
| ≧1585 and <1620 | ≧200 | 20 DM |
| ≧1585 and <1620 | <200 | 50 DM |
| ≧1620 and <1655 | ≧300 | 20 DM |
| ≧1620 and <1655 | <300 | 50 DM |
| ≧1655 and <1690 | ≧150 | 50 DM |
| ≧1655 and <1690 | <150 | 100 DM |
| ≧1690 and <1725 | ≧300 | 50 DM |
| ≧1690 and <1725 | <300 | 100 DM |
| ≧1725 | Not applicable | 100 DM |

Figure 55:
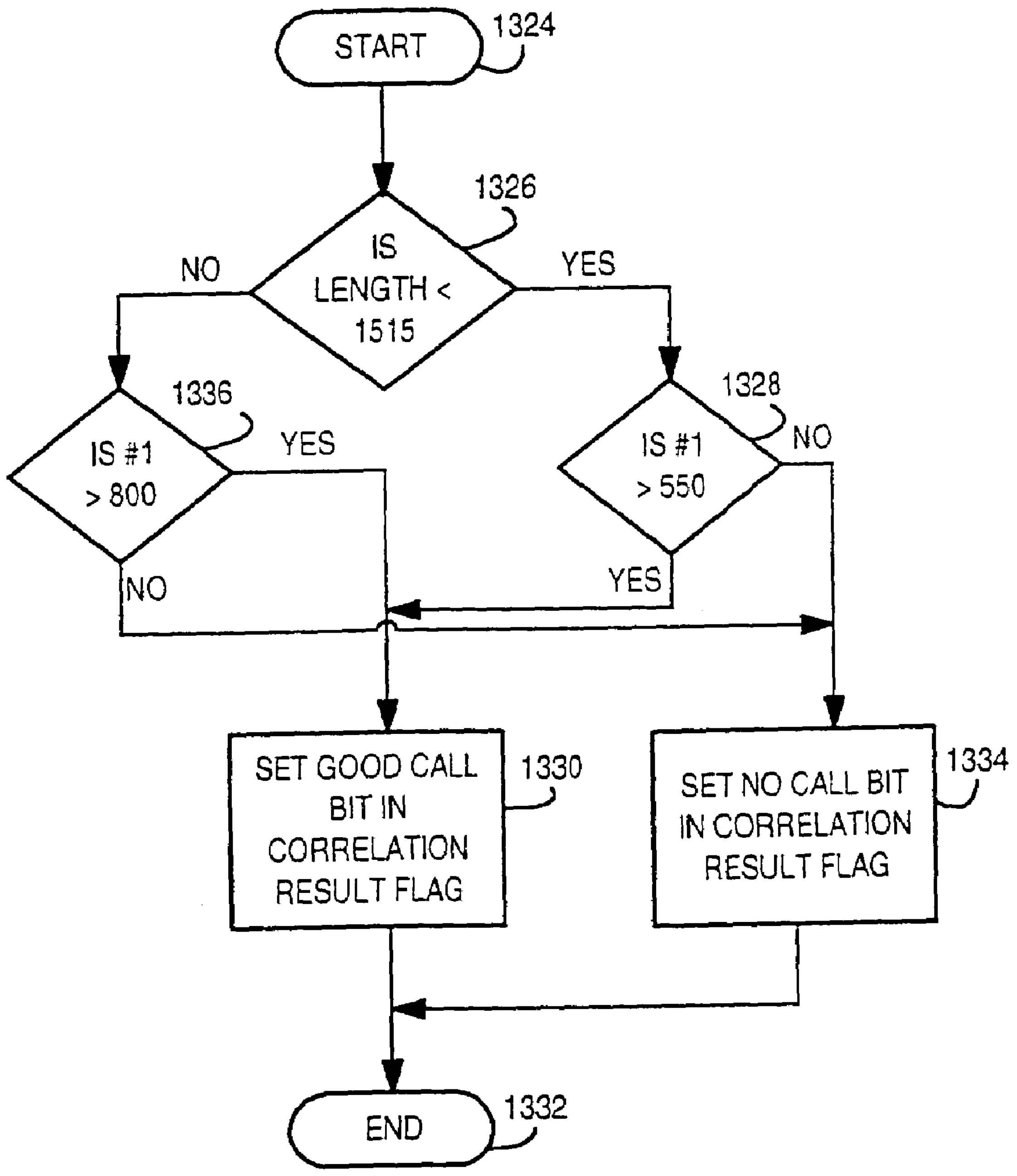
FIG. 55 is a flowchart of the threshold tests utilized in calling the denomination of a German bill according to one embodiment of the present invention.

FIG. 55 is a flowchart of the threshold test utilized in calling the denomination of a German bill. It should be understood that this threshold test compares the scanned bill pattern only to the set of master patterns selected in accordance with Table 4. Therefore, the selection made in accordance with Table 4 provides a preliminary indication as to the denomination of the scanned bill. The threshold test in FIG. 55, in effect, serves to confirm or overturn the preliminary indication given by Table 4.

The threshold test of FIG. 55 begins at step 1324. Step 1326 checks the narrow dimension length of the scanned bill in terms of encoder pulses. If the narrow dimension length is less than 1515 at step 1326, the preliminary indication is that the denomination of the scanned bill is a 10 DM bill. In order to confirm this preliminary indication, the #1 correlation is compared to 550 at step 1328. If the #1 correlation is greater than 550, the correlation number is sufficiently high to identify the denomination of the bill as a 10 DM bill. Accordingly, a "good call" bit is set in a correlation result flag at step 1330, and the system returns to the main program at step 1332. If, however, the #1 correlation is less than or equal to 550 at step 1328, the preliminary indication that the scanned bill is a 10 DM bill is effectively overturned. The system advances to step 1334 which sets a "no call" bit in the correlation result flag.

If step 1326 determines that the narrow dimension length is greater than or equal to 1515, a correlation threshold of 800 is required to confirm the preliminary denominational indication provided by Table 4. Therefore, if the #1 correlation is greater than 800 at step 1336, the preliminary indication provided by Table 4 is confirmed. To confirm the preliminary indication, the "good call" bit is set in the correlation result flag. If, however, the #1 correlation is less than or equal to 800 at step 1336, the preliminary indication is rejected and the "no call" bit in the correlation result flag is set at step 1334. The system then returns to the main program at step 1332.

According to one embodiment, the operator of the above described currency discriminating device designed to accommodate both Canadian and German currency bills pre-declares whether Canadian or German bills are to be discriminated. By depressing an appropriate key on the keypad 62 (FIG. 59), the display 63 will scroll through five different modes: a count mode, a Canadian stranger mode, a Canadian mixed mode, a German stranger mode, and a German mixed mode. In the count mode, the device acts like a simply bill counter (counting the number of bills in a stack but not discriminating them by denomination). Canadian stranger mode is similar to the stranger mode described below in connection with FIG. 59 but bills are scanned as described above in connection with FIG. 52 and scanned patterns are correlated against Canadian master patterns. Likewise, Canadian mixed mode is similar to the mixed mode described below in connection with FIG. 59 but bills are scanned as described above in connection with FIG. 52 and scanned patterns are correlated against Canadian master patterns. Likewise German stranger and German mixed mode are similar to the stranger and mixed modes described below in connection with FIG. 59 but bills are scanned as described above in connection with the scanning of German bills and scanned patterns are correlated against German master patterns.

Figure 56:
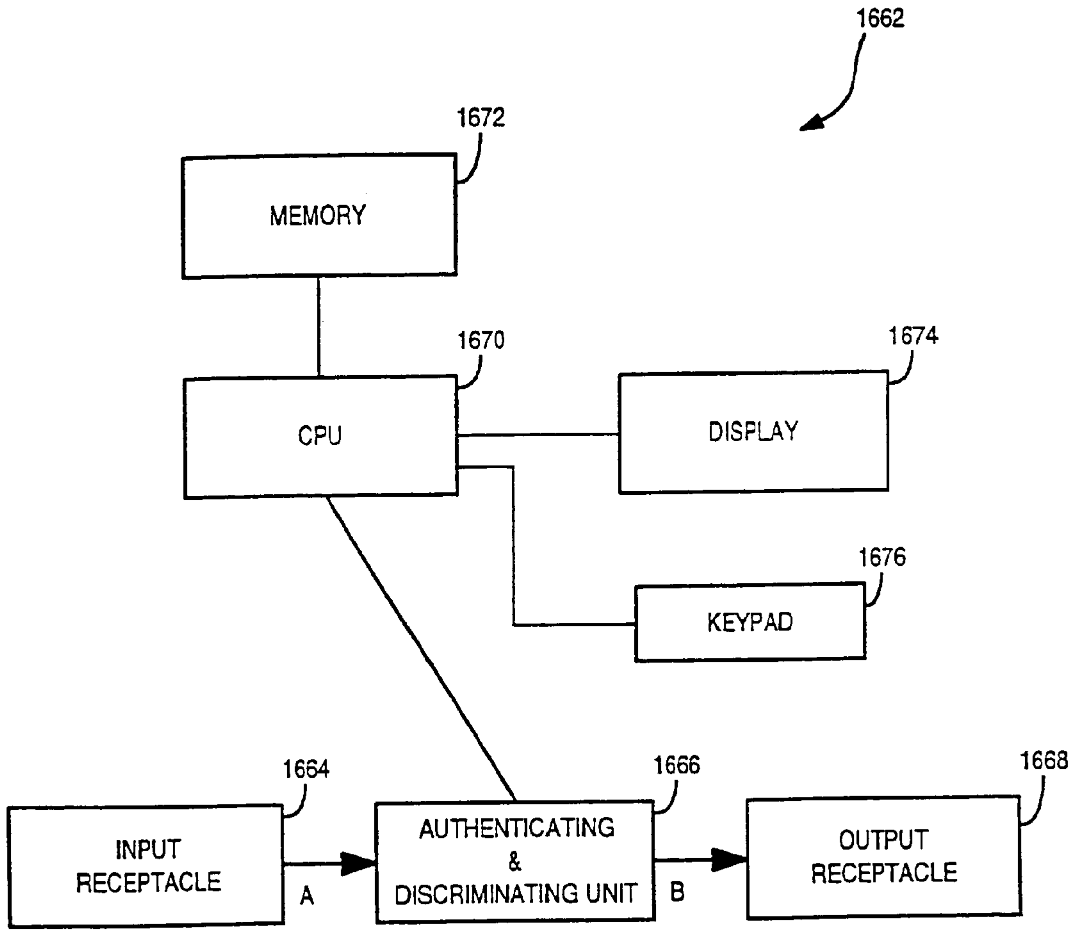
FIG. 56 is a functional block diagram illustrating one embodiment of a document authenticator and discriminator according to the present invention.

FIG. 56 is a functional block diagram illustrating another embodiment of a currency discriminator system 1662 according to the present invention. The discriminator system 1662 comprises an input receptacle 1664 for receiving a stack of currency bills. A transport mechanism defining a transport path (as represented by arrows A and B) transports the bills in the input receptacle past one or more sensors of an authenticating and discriminating unit 1666 to an output receptacle 1668 where the bills are re-stacked such that each bill is stacked on top of or behind the previous bill so that the most recent bill is the top-most or rear-most bill. The authenticating and discriminating unit scans and determines the denomination of each passing bill. Any variety of discriminating techniques may be used. For example, the discriminating method disclosed in U.S. Pat. No. 5,295,196 (incorporated herein in its entirety) may be employed to optically scan each bill. Depending on the characteristics of the discriminating unit employed, the discriminator may be able to recognize bills only if fed face up or face down, regardless of whether fed face up or face down, only if fed in a forward orientation or reverse orientation, regardless of whether fed in a forward or reverse orientation, or some combination thereof. Additionally, the discriminating unit may be able to scan only one side or both sides of a bill. In addition to determining the denomination of each scanned bill, the authenticating and discriminating unit 1666 may additionally include various authenticating tests such as an ultraviolet authentication test as disclosed in U.S. patent application Ser. No. 08/317,349 filed on Oct. 4, 1994 for a "Method and Apparatus for Authenticating Documents Including Currency."

Signals from the authenticating and discriminating unit 1666 are sent to a signal processor such as a central processor unit ("CPU") 1670. The CPU 1670 records of results of the authenticating and discriminating tests in a memory 1672. When the authenticating and discriminating unit 1666 is able to confirm the genuineness and denomination of a bill, the value of the bill is added to a total value counter in memory 1672 that keeps track of the total value of the stack of bills that were inserted in the input receptacle 1664 and scanned by the authenticating and discriminating unit 1666. Additionally, depending on the mode of operation of the discriminator system 1662, counters associated with one or more denominations are maintained in the memory 1672. For example, a $1 counter may be maintained to record how many $1 bills were scanned by the authenticating and discriminating unit 1666. Likewise, a $5 counter may be maintained to record how many $5 bills were scanned, and so on. In an operating mode where individual denomination counters are maintained, the total value of the scanned bills may be determined without maintaining a separate total value counter. The total value of the scanned bills and/or the number of each individual denomination may be displayed on a display 1674 such as a monitor or LCD display.

As discussed above, a discriminating unit such as the authenticating and discriminating unit 1666 may not be able to identify the denomination of one or more bills in the stack of bills loaded into the input receptacle 1664. For example, if a bill is excessively worn or soiled or if the bill is torn a discriminating unit may not be able to identify the bill. Furthermore, some known discrimination methods do not have a high discrimination efficiency and thus are unable to identify bills which vary even somewhat from an "ideal" bill condition or which are even somewhat displaced by the transport mechanism relative to the scanning mechanism used to discriminate bills. Accordingly, such poorer performing discriminating units may yield a relatively large number of bills which are not identified. Alternatively, some discriminating units may be capable of identifying bills only when they are fed in a predetermined manner. For example, some discriminators may require a bill to be faced in a predetermined manner. Accordingly, when a bill is fed face down past a discriminating unit which can only identify bills fed face up, the discriminating unit can not identify the bill. Likewise, other discriminators require a specific edge of a bill to be fed first, for example, the top edge of a bill. Accordingly, bills which are not fed in the forward direction, that is, those that are fed in the reverse direction, are not identified by such a discriminating unit.

According to one embodiment, the discriminator system 1662 is designed so that when the authenticating and discriminating unit is unable to identify a bill, the transport mechanism is stopped so that the unidentified bill is the last bill transported to the output receptacle. After the transport mechanism stops, the unidentified bill is then, for example, positioned at the top of or at the rear of the stack of bills in the output receptacle 1668. The output receptacle 1668 is preferably positioned within the discriminator system 1662 so that the operator may conveniently see the flagged bill and/or remove it for closer inspection. Accordingly, the operator is able to easily see the bill which has not been identified by the authenticating and discriminating unit 1666. The operator may then either visually inspect the flagged bill while it is resting on the top of or at the rear of the stack, or alternatively, the operator may chose to remove the bill from the output receptacle in order to examine the flagged bill more closely. The discriminator system 1662 may be designed to continue operation automatically when a flagged bill is removed from the output receptacle or, according to one embodiment of the present invention, may be designed to require a selection element to be depressed. Upon examination of a flagged bill by the operator, it may be found that the flagged bill is genuine even though it was not identified by the discriminating unit. However, because the bill was not identified, the total value and/or denomination counters in the memory 1672 will not reflect its value. According to one embodiment, such an unidentified bill is removed from the output stack and either re-fed through the discriminator or set aside. In the latter case, any genuine set aside bills are counted by hand.

In some discriminators, unidentified bills are routed to a separate reject receptacle. In prior such systems, an unidentified genuine bill would have to be removed from a reject receptacle and re-fed through the discriminator or the stack of rejected bills would have to be counted by hand and the results separately recorded. Furthermore, because re-fed bills have gone unidentified once, they are more likely to go unidentified again and ultimately may have to be counted by hand. However, as discussed above, such procedures may increase the chance for human error or at least lower the efficiency of the discriminator and the operator.

In order to avoid problems associated with re-feeding bills, counting bills by hand, and adding together separate totals, according to one embodiment of the present invention a number of selection elements associated with individual denominations are provided. In FIG. 56, these selection elements are in the form of keys or buttons of a keypad 1676 or 62. Other types of selection elements such as switches or displayed keys in a touch-screen environment may be employed. The operation of the selection elements will be described in more detail in connection with FIG. 59 but briefly when an operator determines that a flagged bill is acceptable, the operator may simply depress the selection element associated with the denomination of the flagged bill and the corresponding denomination counter and/or the total value counter are appropriately incremented and the discriminator system 1662 or 10 resumes operating again. As discussed above, a bill may be flagged for any number of reasons including the bill being a no call or suspect bill. In non-automatic restart discriminators, where an operator has removed a genuine flagged bill from the output receptacle for closer examination, the bill is first replaced into the output receptacle before a corresponding selection element is chosen. An advantage of the above described procedure is that appropriate counters are incremented and the discriminator is restarted with the touch of a single key, greatly simplifying the operation of the discriminator system 1662 or 10 while reducing the opportunities for human error. When an operator determines that a flagged bill is not acceptable, the operator may remove the unacceptable flagged bill from the output receptacle without replacement and depress a continuation key on the keypad 1676 or 62. When the continuation key is selected the denomination counters and the total value counter are not affected and the discriminator system 1662 or 10 will resume operating again. In automatic restart discriminators, the removal of a bill from the output receptacle is treated as an indication that the bill is unacceptable and the discriminator automatically resumes operation without affecting the denomination counters and/or total value counters.

Figure 57:
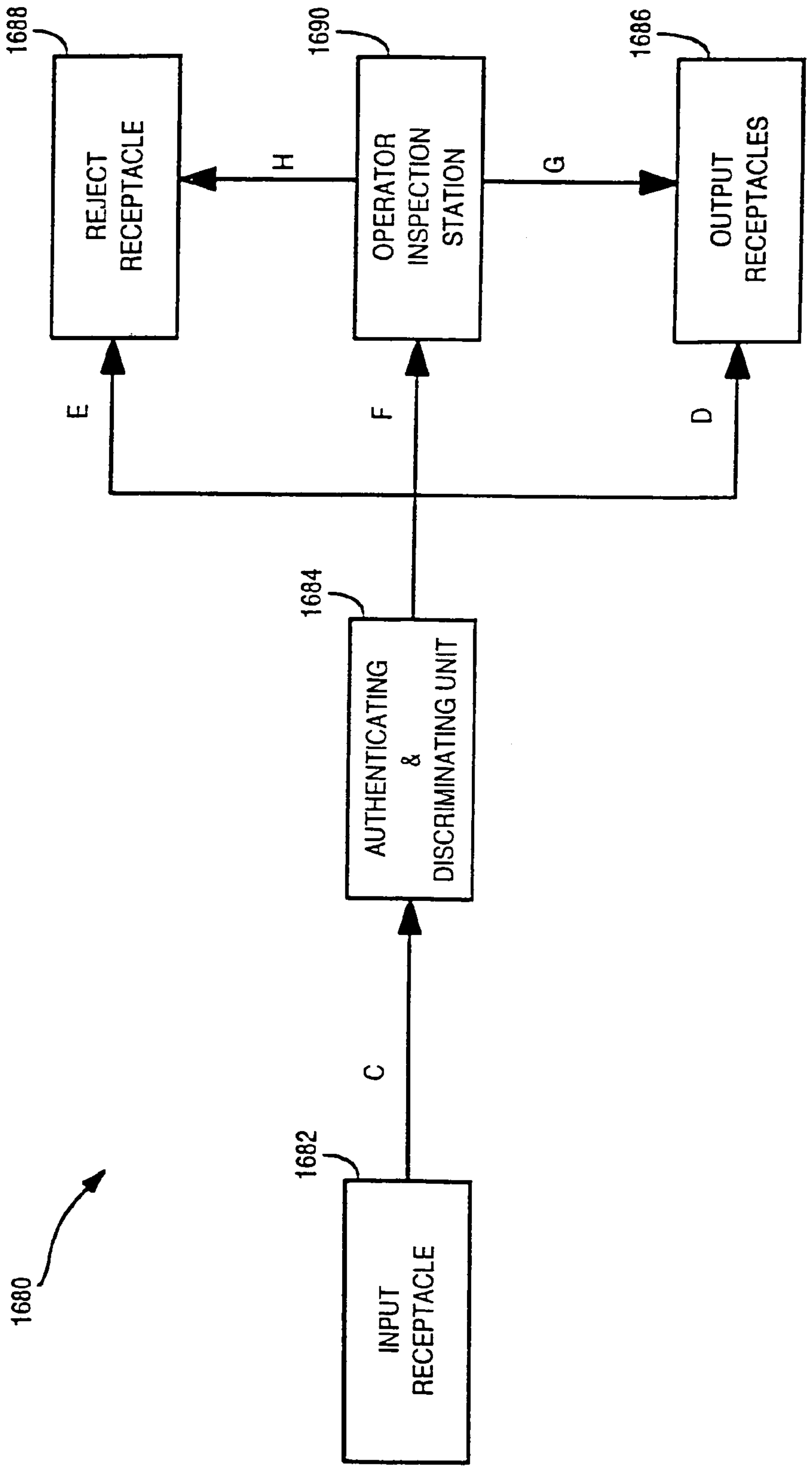
FIG. 57 is a functional block diagram illustrating another embodiment of a document authenticator and discriminator according to the present invention.

Turning now to FIG. 57, there is shown a functional block diagram illustrating another embodiment of a document authenticator and discriminator according to the present invention. The discriminator system 1680 comprises an input receptacle 1682 for receiving a stack of currency bills. A transport mechanism defining a transport path (as represented by arrow C) transports the bills in the input receptacle, one at a time, past one or more sensors of an authenticating and discriminating unit 1684. Based on the results of the authenticating and discriminating unit 1684, a bill is either transported to one of a plurality of output receptacles 1686 (arrow D), to a reject receptacle 1688 (arrow E), or to an operator inspection station 1690 (arrow F). When is bill is determined to be genuine and its denomination has been identified, the bill is transported to one of a plurality of output receptacles. For example, the discriminator system 1680 may comprise seven output receptacles 1686, one associated with each of seven U.S. denominations, i.e., $1, $2, $5, $10, $20, $50, and $100. The transport mechanism directs (arrow D) the identified bill to the corresponding output receptacle. Alternatively, where the authenticating and discriminating unit determines that a bill is a fake, the bill is immediately routed (arrow E) to the reject receptacle 1688. Finally, if a bill is not determined to be fake but for some reason the authenticating and discriminating unit 1684 is not able to identify the denomination of the bill, the flagged bill is routed (arrow F) to an inspection station and the discriminator system 1680 stops operating. The inspection station is preferably positioned within the discriminator system 1680 so that the operator may conveniently see the flagged bill and/or remove it for closer inspection. If the operator determines that the bill is acceptable, the operator returns the bill to the inspection station if it was removed and selects a selection element (not shown) corresponding to the denomination of the flagged bill. Appropriate counters (not shown) are incremented, the discriminator system 1680 resumes operation, and the flagged bill is routed (arrow G) to the output receptacle associated with the chosen selection element. On the other hand, if the operator determines that the flagged bill is unacceptable, the operator returns the bill to the inspection station if it was removed and selects a continuation element (not shown). The discriminator system 1680 resumes operation, and the flagged bill is routed (arrow H) to the reject receptacle 1688 without incrementing the counters associated with the various denomination and/or the total value counters. Alternatively, the discriminator system 1680 may permit the operator to place any unacceptable unidentified bills aside or into the reject receptacle by hand. While transport paths D and G and paths E and H are illustrated as separate paths, paths D and G and paths E and H, respectively, may be the same path so that all bills proceeding to either one of the output receptacles 1686 or the reject receptacle 1688, respectively, are routed through the inspection station 1690.

Figure 58A:
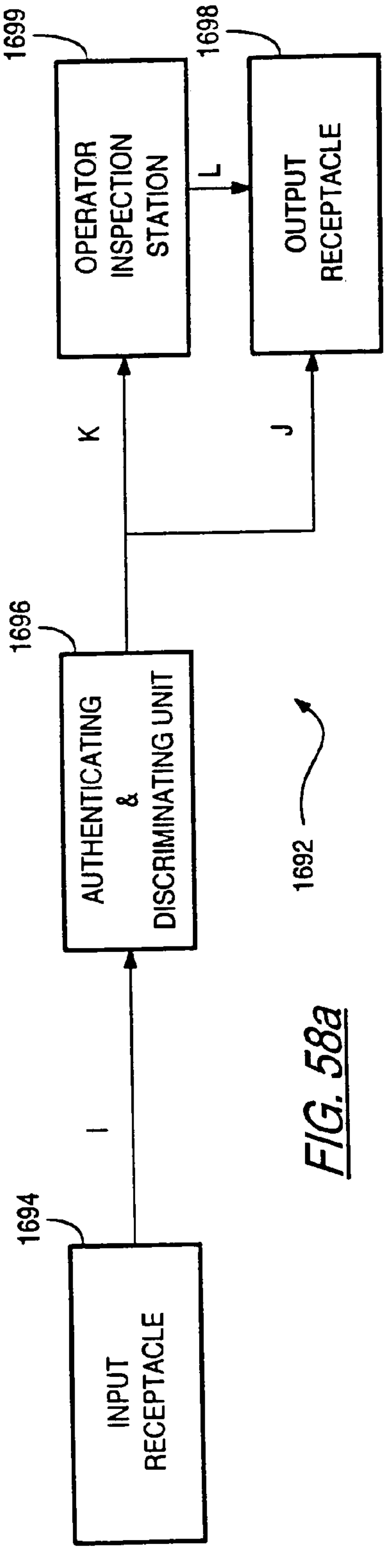
FIG. 58*a* is a functional block diagram illustrating another embodiment of a document authenticator and discriminator according to the present invention.

Turning now to FIG. 58*a*, there is shown a functional block diagram illustrating another embodiment of a document authenticator and discriminator according to the present invention. The discriminator system 1692 comprises an input receptacle 1694 for receiving a stack of currency bills. A transport mechanism (as represented by arrow I) transports the bills in the input receptacle, one at a time, past one or more sensors of an authenticating and discriminating unit 1696. Based on the results of the authenticating and discriminating unit 1696, a bill is either transported to a single output receptacle 1698 (arrow J) or to an operator inspection station 1699 (arrow K). When is bill is determined to be genuine and its denomination has been identified, the bill is transported to the single output receptacle. Alternatively, where the authenticating and discriminating unit determines that a bill is a fake or for some reason the authenticating and discriminating unit 1696 is not able to identify the denomination of the bill, the flagged bill is routed (arrow K) to an inspection station and the discriminator system 1692 stops operating. The inspection station is preferably positioned within the discriminator system 1692 so that the operator may conveniently see the flagged bill and/or remove it for closer inspection. Where a bill has been positively determined to be a fake by the authenticating and discriminating unit 1696, an appropriate indication, for example, via a message in a display or the illumination of a light, can be given to the operator as to the lack of genuineness of the bill. The operator may then remove the bill without replacement from the inspection station 1699 and select a continuation element. Where a bill has not been positively identified as a fake nor has had its denomination identified and where the operator determines that the bill is acceptable, the operator returns the bill to the inspection station if it was removed and selects a selection element (not shown) corresponding to the denomination of the flagged bill. Appropriate counters (not shown) are incremented, the discriminator system 1692 resumes operation, and the flagged bill is routed (arrow L) to the single output receptacle 1698. On the other hand, if the operator determines that the flagged bill is unacceptable, the operator removes the bill without replacement from the inspection station and selects a continuation element (not shown). The discriminator system 1692 resumes operation without incrementing the counters associated with the various denomination and/or the total value counters. While transport paths J and L are illustrated as separate paths, they may be the same path so that all bills proceeding to the single output receptacle 1698 are routed through the inspection station 1699.

Figure 58B:
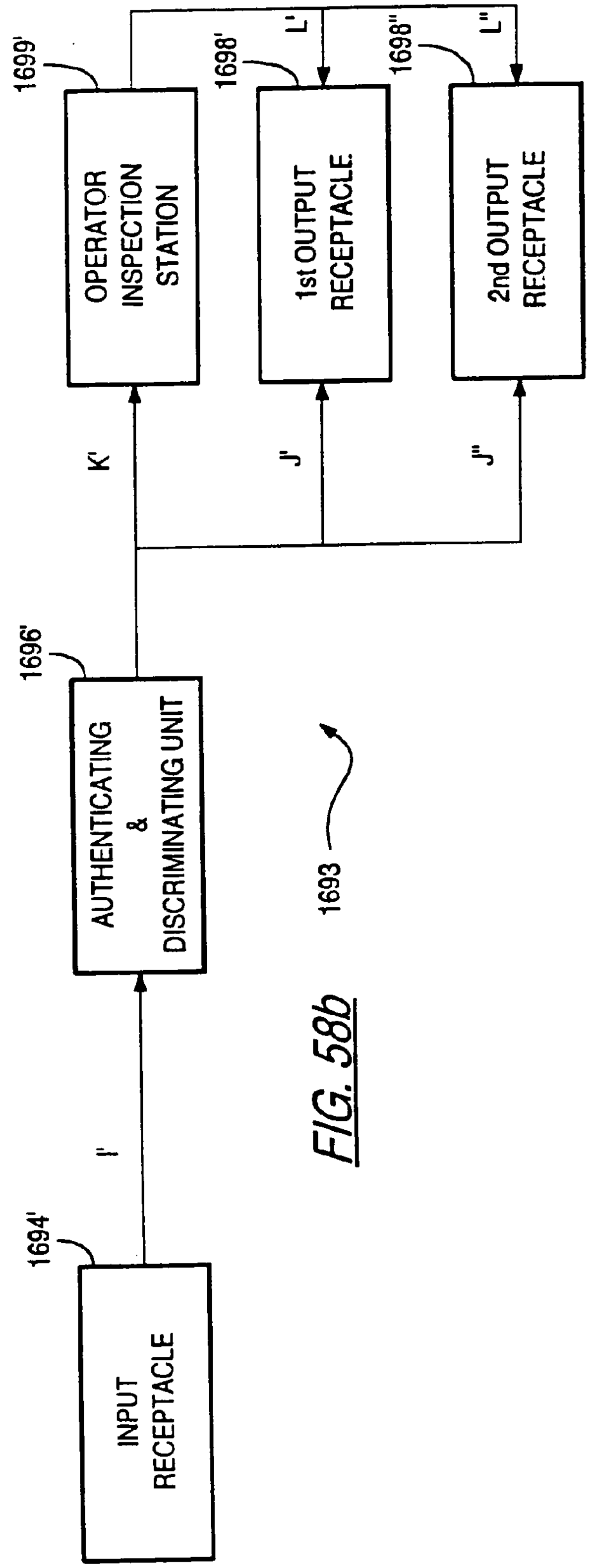
FIG. 58*b* is a functional block diagram illustrating another embodiment of a document authenticator and discriminator according to the present invention.

Turning now to FIG. 58*b*, there is shown a functional block diagram illustrating another embodiment of a document authenticator and discriminator according to the present invention. The discriminator system 1693 comprises an input receptacle 1694' for receiving a stack of currency bills. A transport mechanism (as represented by arrow I') transports the bills in the input receptacle, one at a time, past one or more sensors of an authenticating and discriminating unit 1696'. Based on the results of the authenticating and discriminating unit 1696', a bill is either transported to one of two output receptacles 1698' (arrow J') or 1698" (arrow J”) or to an operator inspection station 1699' (arrow K'). When a bill is determined to be genuine and its denomination has been identified, the bill is transported to one of the two output receptacles. Alternatively, where the authenticating and discriminating unit determines that a bill is a fake or for some reason the authenticating and discriminating unit 1696' is not able to identify the denomination of the bill, the flagged bill is routed (arrow K') to an inspection station and the discriminator system 1693 stops operating. The inspection station is preferably positioned within the discriminator system 1693 so that the operator may conveniently see the flagged bill and/or remove it for closer inspection. Where a bill has been positively determined to be a fake by the authenticating and discriminating unit 1696', an appropriate indication, for example, via a message in a display or the illumination of a light, can be given to the operator as to the lack of genuineness of the bill. The operator may then remove the bill without replacement from the inspection station 1699' and select a continuation element. Where a bill has not been positively identified as a fake nor has had its denomination identified and where the operator determines that the bill is acceptable, the operator returns the bill to the inspection station if it was removed and selects a selection element (not shown) corresponding to the denomination of the flagged bill. Appropriate counters (not shown) are incremented, the discriminator system 1693 resumes operation, and the flagged bill is routed (arrow L'or arrow L") to one of the two output receptacles 1698' and 1698". On the other hand, if the operator determines that the flagged bill is unacceptable, the operator removes the bill without replacement from inspection station and selects a continuation element (not shown). The discriminator system 1693 resumes operation without incrementing the counters associated with the various denomination and/or the total value counters. While transport paths J', J", and L', L" are illustrated as separate paths, they may be the same path so that all bills proceeding to one of the two output receptacles 1698', 1698" are routed through the inspection station 1699'.

Figure 58C:
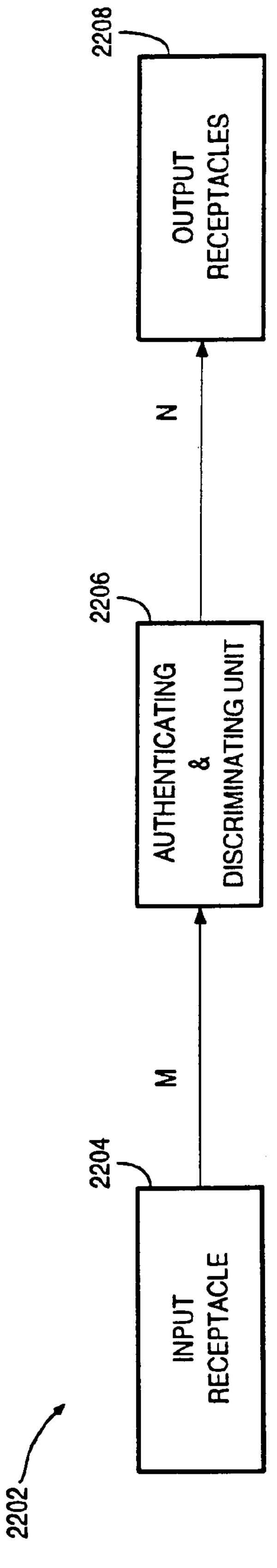
FIG. 58*c* is a functional block diagram illustrating another embodiment of a document authenticator and discriminator according to the present invention.

Turning now to FIG. 58*c*, there is shown a functional block diagram illustrating another embodiment of a document authenticator and discriminator according to the present invention. The discriminator system 2202 comprises an input receptacle 2204 for receiving a stack of currency bills. A transport mechanism defining a transport path (as represented by arrow M) transports the bills in the input receptacle, one at a time, past one or more sensors of an authenticating and discriminating unit 2206. Bills are then transported to one of a plurality of output receptacles 2208 (arrow N). In one embodiment, where the authenticating and discriminating unit determines that a bill is a fake, the flagged bill is routed to a separate one of said output receptacles. The operation of the discriminator may or may not then be suspended. When a bill is not determined to be fake but for some reason the authenticating and discriminating unit 2206 is not able to identify the denomination of the bill, the no call bill may be transported one of the output receptacles. In one embodiment, no call bills are transported to a separate one of the output receptacles. In another embodiment, no calls are not delivered to a special separate output receptacle. The operation of the discriminator may or may not then be suspended. For example, in a two output pocket discriminator, all bills may be transported to the same output receptacle regardless of whether they are determined to be suspect, no call, or properly identified. In this example, the operation of the discriminator may be suspended and an appropriate message displayed when a suspect or no call bill is encountered. Alternatively, suspect bills may be delivered to one of the output receptacles (i.e., a reject receptacle) and no calls and identified bills may be sent to the other output receptacle. In this example, the operation of the discriminator need not be suspended when a suspect bill is encountered but may be suspended when a no call bill is encountered. If the operation is suspended at the time the no call bill is detected and the operator determines that the no call bill is acceptable, the operator returns the bill to the output receptacle from which it was removed (if it was removed) and selects a selection element (not shown) corresponding to the denomination of the flagged bill. Appropriate counters (not shown) are incremented, the discriminator system 2202 resumes operation. On the other hand, if the operator determines that the flagged bill is unacceptable, the operator removes the bill without replacement form the output receptacle and selects a continuation element (not shown). The discriminator system 2202 resumes operation without incrementing the counters associated with the various denomination and/or the total value counters. In another embodiment, no call bills are delivered to an output receptacle separate from the one or more output receptacles receiving identified bills. The operation of the discriminator need not be suspended until all the bills placed in the input receptacle have been processed. The value of any no call bills may then be added to the appropriate counters after the stack of bills has been processed through a reconciliation process. The entering of the value of no call bills is discussed in more detail below in connection with FIGS. 62–67.

Figure 58D:
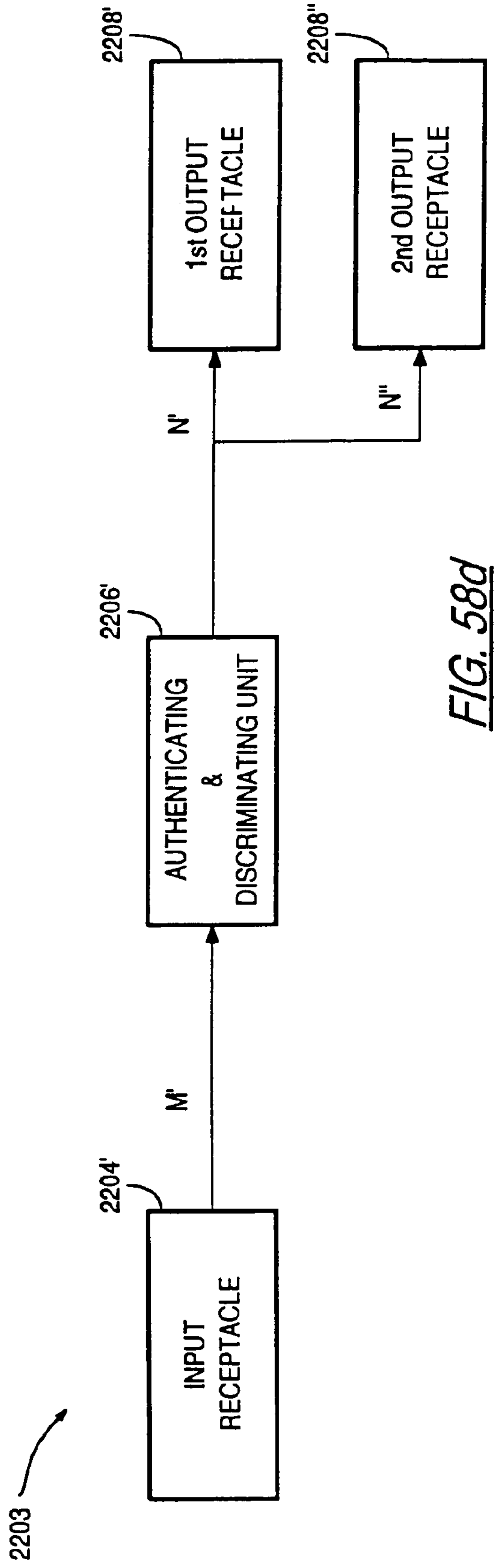
FIG. 58*d* is a functional block diagram illustrating another embodiment of a document authenticator and discriminator according to the present invention.

Turning now to FIG. 58*d*, there is shown a functional block diagram illustrating another embodiment of a document authenticator and discriminator according to the present invention. The discriminator system 2203 comprises an input receptacle 2204' for receiving a stack of currency bills. A transport mechanism defining a transport path (as represented by arrow M') transports the bills in the input receptacle, one at a time, past one or more sensors of an authenticating and discriminating unit 2206'. Bills are then transported to one of two output receptacles 2208', 2208" (arrows N', N"). In one embodiment, where the authenticating and discriminating unit determines that a bill is a fake, the flagged bill is routed to a specific one of said output receptacles. The operation of the discriminator may or may not then be suspended. When a bill is not determined to be fake but for some reason the authenticating and discriminating unit 2206' is not able to identify the denomination of the bill, the no call bill may be transported to one of the output receptacles. In one embodiment, no call bills are transported to a specific one of the output receptacles. In another embodiment, no calls are not delivered to a special separate output receptacle. The operation of the discriminator may or may not then be suspended. For example, in a two output pocket discriminator, all bills may be transported to the same output receptacle regardless of whether they are determined to be suspect, no call, or properly identified. In this example, the operation of the discriminator may be suspended and an appropriate message displayed when a suspect or no call bill is encountered. Alternatively, suspect bills may be delivered to a specific one of the two output receptacles (i.e., a reject receptacle) and no calls and identified bills may be sent to the other output receptacle. In this example, the operation of the discriminator need not be suspended when a suspect bill is encountered but may be suspended when a no call bill is encountered. If the operation is suspended at the time the no call bill is detected and the operator determines that the no call bill is acceptable, the operator returns the bill to the output receptacle from which it was removed (if it was removed) and selects a selection element (not shown) corresponding to the denomination of the flagged bill. Appropriate counters (not shown) are incremented, the discriminator system 2203 resumes operation. On the other hand, if the operator determines that the flagged bill is unacceptable, the operator removes the bill without replacement the output receptacle and selects a continuation element (not shown). The discriminator system 2203 resumes operation without incrementing the counters associated with the various denomination and/or the total value counters. In another embodiment, no call bills are delivered to a specific output receptacle separate from the output receptacle receiving identified bills. The operation of the discriminator need not be suspended until all the bills placed in the input receptacle have been processed. Alternatively, the operation of the discriminator need not be suspended when a no call is encountered but may be suspended when a suspect bill is detected so that the operator may remove any suspect bills from the discriminator. The value of any no call bills may then be added to the appropriate counters after the stack of bills has been processed through a reconciliation process. The entering of the value of no call bills is discussed in more detail below in connection with FIGS. 62–67.

Figure 59:
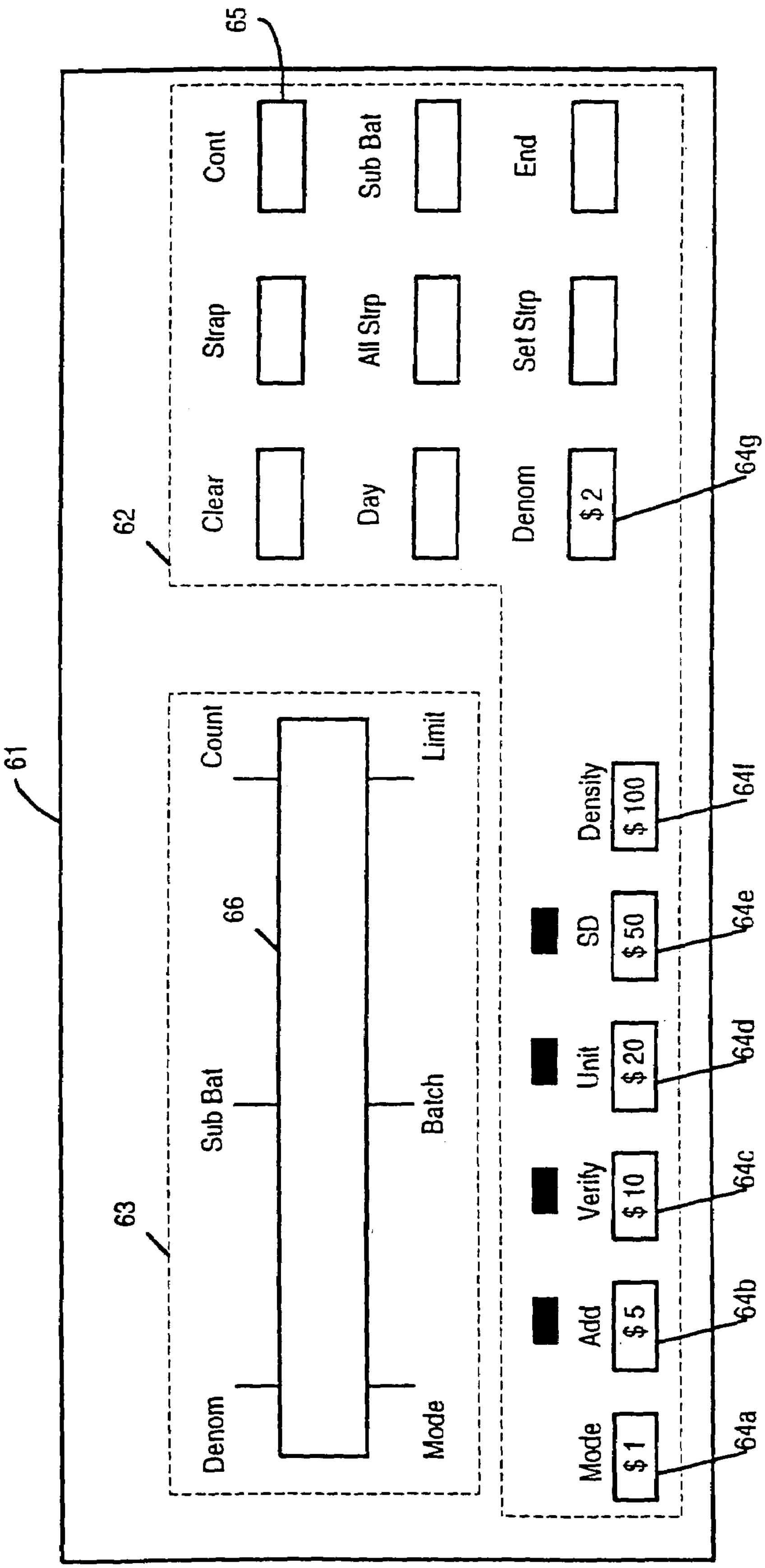
FIG. 59 is an enlarged plan view of the control and display panel in the machine of FIG. 1.

The operation of the selection elements according to one embodiment will now be described in more detail in conjunction with FIG. 59 which is a front view of a control panel 61 of one embodiment of the present invention. The control panel 61 comprises a keypad 62 and a display section 63. The keypad 62 comprises a plurality of keys including seven denomination selection elements 64*a*–64*g*, each associated with one of seven U.S. currency denominations, i.e., $1, $2, $5, $10, $20, $50, and $100. For foreign bill discriminators, the denomination selection elements may be labeled according to the currency system which a discriminator is designed to handle and accordingly, there may be more or less than seven denomination selection elements. The $1 denomination selection key 64*a* also serves as a mode selection key. The keypad 62 also comprises a "Continuation" selection element 65. Various information such as instructions, mode selection information, authentication and discrimination information, individual denomination counter values, and total batch counter value are communicated to the operator via an LCD 66 in the display section 63. A discriminator according to one embodiment of the present invention has a number of operating modes including a mixed mode, a stranger mode, a sort mode, a face mode, and a forward/reverse orientation mode. The operation of a discriminator having the denomination selection elements 64*a*–64*g* and the continuation element 65 will now be discussed in connection with several operating modes.

(A) Mixed Mode

Mixed mode is designed to accept a stack of bills of mixed denomination, total the aggregate value of all the bills in the stack and display the aggregate value in the display 63. Information regarding the number of bills of each individual denomination in a stack may also be stored in denomination counters. When an otherwise acceptable bill remains unidentified after passing through the authenticating and discriminating unit, operation of the discriminator may be resumed and the corresponding denomination counter and/or the aggregate value counter may be appropriately incremented by selecting the denomination selection key 64*a*–64*g* associated with the denomination of the unidentified bill. For example, if the discriminator system 62 of FIG. 56 or 10 of FIG. 1 stops operation with an otherwise acceptable $5 bill being the last bill deposited in the output receptacle, the operator may simply select key 64*b*. When key 64*b* is depressed, the operation of the discriminator is resumed and the $5 denomination counter is incremented and/or the aggregate value counter is incremented by $5. Furthermore, in the discriminator systems 1680 of FIG. 57 and 1692 of FIG. 58, the flagged bill may be routed from the inspection station to an appropriate output receptacle. Otherwise, if the operator determines the flagged bill is unacceptable, the bill may be removed from the output receptacle of FIG. 1 or 56 or the inspection station of FIGS. 8 and 9 (or in the system 1680 of FIG. 57, the flagged bill may be routed to the reject receptacle 1688). The continuation key 65 is depressed after the unacceptable bill is removed, and the discriminator resumes operation without affecting the total value counter and/or the individual denomination counters.

(B) Stranger Mode

Stranger mode is designed to accommodate a stack of bills all having the same denomination, such as a stack of $10 bills. In such a mode, when a stack of bills is processed by the discriminator the denomination of the first bill in the stack is determined and subsequent bills are flagged if they are not of the same denomination. Alternatively, the discriminator may be designed to permit the operator to designate the denomination against which bills will be evaluated with those of a different denomination being flagged. Assuming the first bill in a stack determines the relevant denomination and assuming the first bill is a $10 bill, then provided all the bills in the stack are $10 bills, the display 63 will indicate the aggregate value of the bills in the stack and/or the number of $10 bills in the stack. However, if a bill having a denomination other than $10 is included in the stack, the discriminator will stop operating with the non-$10 bill or "stranger bill" being the last bill deposited in the output receptacle in the case of the discriminator system 62 of FIG. 56 or 10 of FIG. 1 (or the inspection station of FIGS. 8 and 9). The stranger bill may then be removed from the output receptacle and the discriminator is started again either automatically or by depression of the "Continuation" key 65 depending on the set up of the discriminator system. An unidentified but otherwise acceptable $10 bill may be handled in a manner similar to that described above in connection with the mixed mode, e.g., by depressing the $10 denomination selection element 64*c*, or alternatively, the unidentified but otherwise acceptable $10 bill may be removed from the output receptacle and placed into the input hopper to be re-scanned. Upon the completion of processing the entire stack, the display 63 will indicate the aggregate value of the $10 bills in the stack and/or the number of $10 bills in the stack. All bills having a denomination other than $10 will have been set aside and will not be included in the totals. Alternatively, these stranger bills can be included in the totals via operator selection choices. For example, if a $5 stranger bill is detected and flagged in a stack of $10 bills, the operator may be prompted via the display as to whether the $5 bill should be incorporated into the running totals. If the operator responds positively, the $5 bill is incorporated into appropriate running totals, otherwise it is not. Alternatively, when the discriminator stops on a stranger bill, such as a $5, the operator may depress the denomination selection element-associated with that denomination to cause the value of the stranger bill to be incorporated into the totals. Likewise for other types of flagged bills such as no calls. Alternatively, a set-up selection may be chosen whereby all stranger bills are automatically incorporated into appropriate running totals.

(C) Sort Mode

According to one embodiment, the sort mode is designed to accommodate a stack of bills wherein the bills are separated by denomination. For example, all the $1 bills may be placed at the beginning of the stack, followed by all the $5 bills, followed by all the $10 bills, etc. Alternatively, the sort mode may be used in conjunction with a stack of bills wherein the bills are mixed by denomination. The operation of the sort mode is similar to that of the stranger mode except that after stopping upon the detection of a different denomination bill, the discriminator is designed to resume operation upon removal of all bills from the output receptacle. Returning to the above example, assuming the first bill in a stack determines the relevant denomination and assuming the first bill is a $1 bill, then the discriminator processes the bills in the stack until the first non-$1 bill is detected, which in this example is the first $5 bill. At that point, the discriminator will stop operating with the first $5 being the last bill deposited in the output receptacle. The display 63 may be designed to indicate the aggregate value of the preceding $1 bills processed and/or the number of preceding $1 bills. The scanned $1 bills and the first $5 bill are removed from the output receptacle and placed in separate $1 and $5 bill stacks. The discriminator will start again automatically and subsequent bills will be assessed relative to being $5 bills. The discriminator continues processing bills until the first $10 bill is encountered. The above procedure is repeated and the discriminator resumes operation until encountering the first bill which is not a $10 bill, and so on. Upon the completion of processing the entire stack, the display 63 will indicate the aggregate value of all the bills in the stack and/or the number of bills of each denomination in the stack. This mode permits the operator to separate a stack of bills having multiple denominations into separate stacks according to denomination.

(D) Face Mode

Face mode is designed to accommodate a stack of bills all faced in the same direction, e.g., all placed in the input hopper face up (that is the portrait or black side up for U.S. bills) and to detect any bills facing the opposite direction. In such a mode, when a stack of bills is processed by the discriminator, the face orientation of the first bill in the stack is determined and subsequent bills are flagged if they do not have the same face orientation. Alternatively, the discriminator may be designed to permit designation of the face orientation to which bills will be evaluated with those having a different face orientation being flagged. Assuming the first bill in a stack determines the relevant face orientation and assuming the first bill is face up, then provided all the bills in the stack are face up, the display 63 will indicate the aggregate value of the bills in the stack and/or the number of bills of each denomination in the stack. However, if a bill faced in the opposite direction (i.e., face down in this example) is included in the stack, the discriminator will stop operating with the reverse-faced bill being the last bill deposited in the output receptacle. The reverse-faced bill then may be removed from the output receptacle. In automatic re-start embodiments, the removal of the reverse-faced bill causes the discriminator to continue operating. The removed bill may then be placed into the input receptacle with the proper face orientation. Alternatively, in non-automatic re-start embodiments, the reverse-faced bill may be either placed into the input receptacle with the proper face orientation and the continuation key 65 depressed, or placed back into the output receptacle with the proper face orientation. Depending on the set up of the discriminator when a bill is placed back into the output receptacle with the proper face orientation, the denomination selection key associated with the reverse-faced bill may be selected, whereby the associated denomination counter and/or aggregate value counter are appropriately incremented and the discriminator resumes operation. Alternatively, in embodiments wherein the discriminator is capable of determining denomination regardless of face orientation, the continuation key 65 or a third key may be depressed whereby the discriminator resumes operation and the appropriate denomination counter and/or total value counter is incremented in accordance with the denomination identified by the discriminating unit. In discriminators that require a specific face orientation, any reverse-faced bills will be unidentified bills. In discriminators that can accept a bill regardless of face orientation, reverse-faced bills may be properly identified. The later type of discriminator may have a discriminating unit with a scanhead on each side of the transport path. Examples of such dual-sided discriminators are disclosed above (see e.g., FIGS. 2*a*, 6*c*, 20*a*, 26, and 42. The ability to detect and correct for reverse-faced bills is important as the Federal Reserve requires currency it receives to be faced in the same direction.

In a multi-output receptacle discriminator, the face mode may be used to route all bills facing upward to one output receptacle and all bills facing downward to another output receptacle. In single-sided discriminators, reverse-faced bills may be routed to an inspection station such as 1690 of FIG. 57 for manual turnover by the operator and the unidentified reverse-faced bills may then be passed by the discriminator again. In dual-sided discriminators, identified reverse-faced bills may be routed directly to an appropriate output receptacle. For example, in dual-sided discriminators bills may be sorted both by face orientation and by denomination, e.g., face up $1 bills into pocket #1, face down $1 bills into pocket #2, face up $5 bills into pocket #3, and so on or simply by denomination, regardless of face orientation, e.g., all $1 bills into pocket #1 regardless of face orientation, all $2 bills into pocket #2, etc.

(E) Forward/Reverse Orientation Mode

Forward/Reverse Orientation mode ("Orientation" mode) is designed to accommodate a stack of bills all oriented in a predetermined forward or reverse orientation direction. For example in a discriminator that feeds bills along their narrow dimension, the forward direction may be defined as the fed direction whereby the top edge of a bill is fed first and conversely for the reverse direction. In a discriminator that feeds bills along their long dimension, the forward direction may be defined as the fed direction whereby the left edge of a bill is fed first and conversely for the reverse direction. In such a mode, when a stack of bills is processed by the discriminator, the forward/reverse orientation of the first bill in the stack is determined and subsequent bills are flagged if they do not have the same forward/reverse orientation. Alternatively, the discriminator may be designed to permit the operator to designate the forward/reverse orientation against which bills will be evaluated with those having a different forward/reverse orientation being flagged. Assuming the first bill in a stack determines the relevant forward/reverse orientation and assuming the first bill is fed in the forward direction, then provided all the bills in the stack are also fed in the forward direction, the display 63 will indicate the aggregate value of the bills in the stack and/or the number of bills of each denomination in the stack. However, if a bill having the opposite forward/reverse orientation is included in the stack, the discriminator will stop operating with the opposite forward/reverse oriented bill being the last bill deposited in the output receptacle. The opposite forward/reverse oriented bill then may be removed from the output receptacle. In automatic re-start embodiments, the removal of the opposite forward/reverse oriented bill causes the discriminator to continue operating. The removed bill may then be placed into the input receptacle with the proper face orientation. Alternatively, in non-automatic re-start embodiments, the opposite forward/reverse oriented bill may be either placed into the input receptacle with the proper forward/reverse orientation and the continuation key 65 depressed, or placed back into the output receptacle with the proper forward/reverse orientation. Depending on the set up of the discriminator when a bill is placed back into the output receptacle with the proper forward/reverse orientation, the denomination selection key associated with the opposite forward/reverse oriented bill may be selected, whereby the associated denomination counter and/or aggregate value counter are appropriately incremented and the discriminator resumes operation. Alternatively, in embodiments wherein the discriminator is capable of determining denomination regardless of forward/reverse orientation, the continuation key 65 or a the third key may be depressed whereby the discriminator resumes operation and the appropriate denomination counter and/or total value counter is incremented in accordance with the denomination identified by the discriminating unit. In single-direction discriminators, any reverse-oriented bills will be unidentified bills. In dual-direction discriminators, reverse-oriented bills may be properly identified by the discriminating unit. An example of a dual-direction discriminating system is described above connection with FIGS. 1–7*b* and in U.S. Pat. No. 5,295,196. The ability to detect and correct for reverse-oriented bills is important as the Federal Reserve may soon require currency it receives to be oriented in the same forward/reverse direction.

In a multi-output receptacle discriminator, the orientation mode may be used to route all bills oriented in the forward direction to one output receptacle and all bills oriented in the reverse direction to another output receptacle. In single-direction discriminators, reverse-oriented bills may be routed to an inspection station such as 1690 of FIG. 57 for manual turnover by the operator and the unidentified reverse-oriented bills may then be passed by the discriminator again. In discriminators capable of identifying bills fed in both forward and reverse directions ("dual-direction discriminators"), identified reverse-oriented bills may be routed directly to an appropriate output receptacle. For example, in dual-direction discriminators bills may be sorted both by forward/reverse orientation and by denomination, e.g., forward $1 bills into pocket #1, reverse $1 bills into pocket #2, forward $5 bills into pocket #3, and so on or simply by denomination, regardless of forward/reverse orientation, e.g., all $1 bills into pocket #1 regardless of forward/reverse orientation, all $2 bills into pocket #2, etc.

Suspect Mode

In addition to the above modes, a suspect mode may be activated in connection with these modes whereby one or more authentication tests may be performed on the bills in a stack. When a bill fails an authentication test, the discriminator will stop with the failing or suspect bill being the last bill transported to the output receptacle. The suspect bill then may be removed from the output receptacle and set aside.

Likewise, one or more of the above described modes may be activated at the same time. For example, the face mode and the forward/reverse orientation mode may be activated at the same time. In such a case, bills that are either reverse-faced or opposite forward/reverse oriented will be flagged.

According to one embodiment, when a bill is flagged, for example, by stopping the transport motor with the flagged bill being the last bill deposited in the output receptacle, the discriminating device indicates to the operator why the bill was flagged. This indication may be accomplished by, for example, lighting an appropriate light, generating an appropriate sound, and/c; displaying an appropriate message in the display section 63 (FIG. 59). Such indication might include, for example, "no call", "stranger", "failed magnetic test", "failed UV test", "no security thread", etc.

Figure 60A:
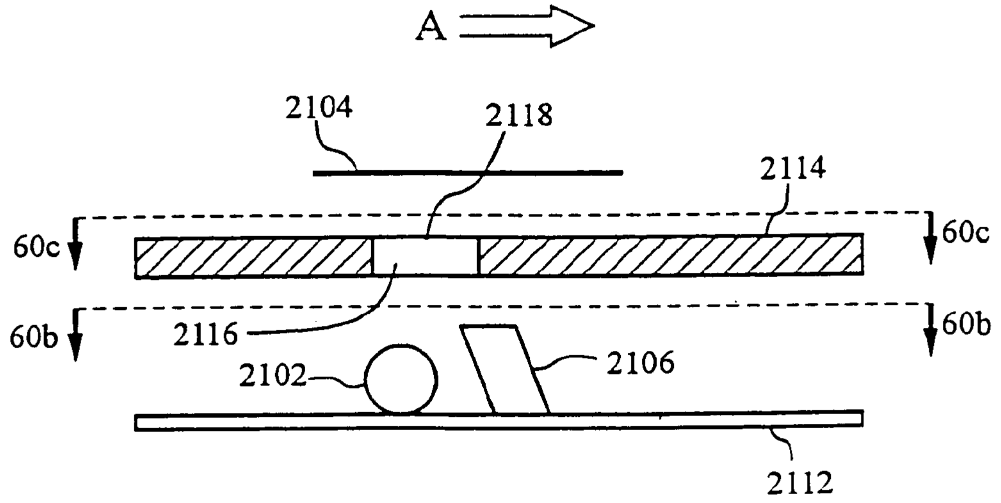
FIG. 60*a* is a side view of one embodiment of a document authenticating system according to the present invention.
Figure 60B:
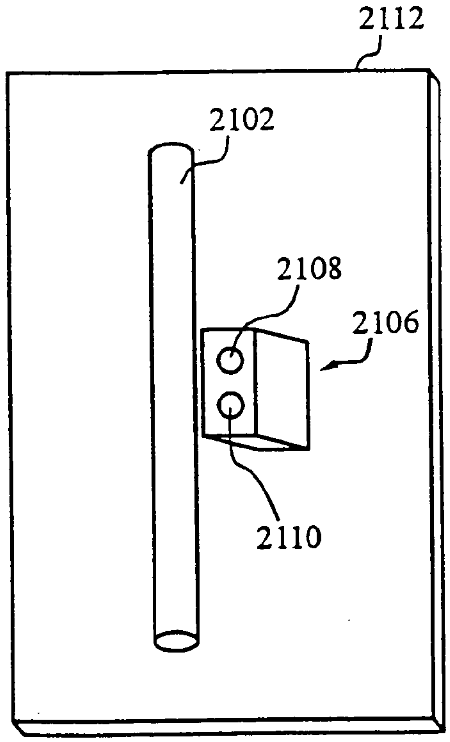
FIG. 60*b* is a top view of the embodiment of FIG. 60*a* along the direction 60*b;*
Figure 60C:
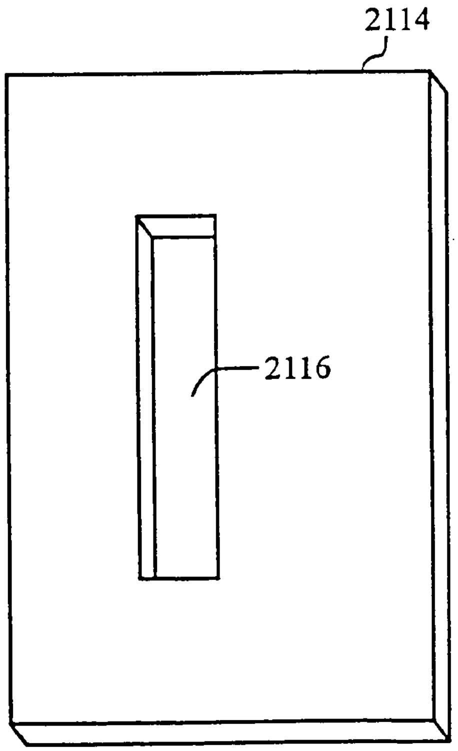
FIG. 60*c* is a top view of the embodiment of FIG. 60*a* along the direction 60*c;*

Referring now to FIGS. 60*a*–60*c*, there is shown a side view of one embodiment of a document authenticating system according to the present invention, a top view of the embodiment of FIG. 60*a* along the direction 60*b*, and a top view of the embodiment of FIG. 60*a* along the direction 60*c*, respectively. An ultraviolet ("UV") light source 2102 illuminates a document 2104. Depending upon the characteristics of the document, ultraviolet light may be reflected off the document and/or fluorescent light may be emitted from the document. A detection system 2106 is positioned so as to receive any light reflected or emitted toward it but not to receive any UV light directly from the light source 2102. The detection system 2106 comprises a UV sensor 2108, a fluorescence sensor 2110, filters, and a plastic housing. The light source 2102 and the detection system 2106 are both mounted to a printed circuit board 2112. The document 2104 is transported in the direction indicated by arrow A by a transport system (not shown). The document is transported over a transport plate 2114 which has a rectangular opening 2116 in it to permit passage of light to and from the document. In one embodiment of the present invention, the rectangular opening 2116 is 1.375 inches (3.493 cm) by 0.375 inches (0.953 cm). To minimize dust accumulation onto the light source 2102 and the detection system 2106 and to prevent document jams, the opening 2116 is covered with a transparent UV transmitting acrylic window 2118. To further reduce dust accumulation, the UV light source 2102 and the detection system 2106 are completely enclosed within a housing (not shown) comprising the transport plate 2114.

Figure 61:
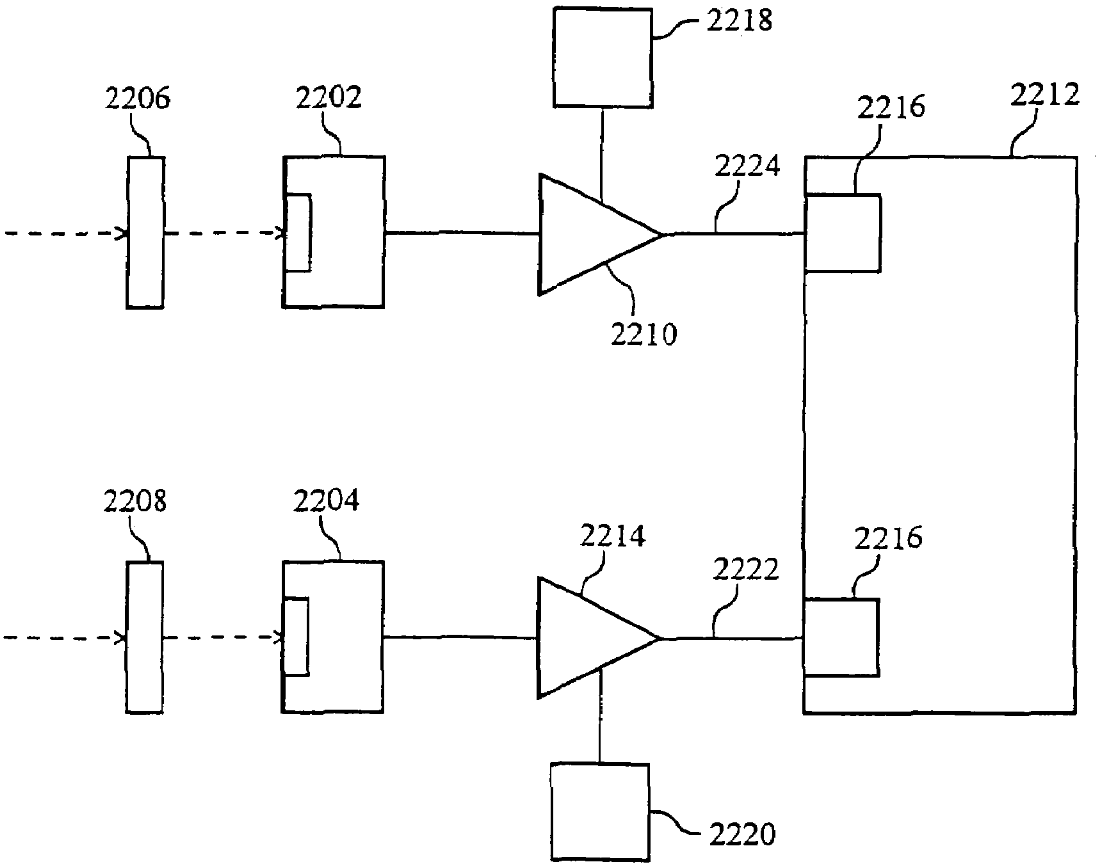
FIG. 61 is a functional block diagram illustrating one embodiment of a document authenticating system according to the present invention.

Referring now to FIG. 61, there is shown a functional block diagram illustrating one embodiment of a document authenticating system according to the present invention. FIG. 61 shows an UV sensor 2202, a fluorescence sensor 2204, and filters 2206, 2208 of a detection system such as the detection system 2106 of FIG. 60. Light from the document passes through the filters 2206, 2208 before striking the sensors 2202, 2204, respectively. An ultraviolet filter 2206 filters out visible light and permits UV light to be transmitted and hence to strike UV sensor 2202. Similarly, a visible light filter 2208 filters out UV light and permits visible light to be transmitted and hence to strike fluorescence sensor 2204. Accordingly, UV light, which has a wavelength below 400 nm, is prevented from striking the fluorescence sensor 2204 and visible light, which has a wavelength greater than 400 nm, is prevented from striking the UV sensor 2202. In one embodiment the UV filter 2206 transmits light having a wavelength between about 260 nm and about 380 nm and has a peak transmittance at 360 nm. In one embodiment, the visible light filter 2208 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In one embodiment the filters are about 8 mm in diameter and about 1.5 mm thick.

The UV sensor 2202 outputs an analog signal proportional to the amount of light incident thereon and this signal is amplified by amplifier 2210 and fed to a microcontroller 2212. Similarly, the fluorescence sensor 2204 outputs an analog signal proportional to the amount of light incident thereon and this signal is amplified by amplifier 2214 and fed to a microcontroller 2212. Analog-to-digital converters 2216 within the microcontroller 2212 convert the signals from the amplifiers 2210, 2214 to digital and these digital signals are processed by the software of the microcontroller 2212. The UV sensor 2202 may be, for example, an ultraviolet enhanced photodiode sensitive to light having a wavelength of about 360 nm and the fluorescence sensor 2204 may be a blue enhanced photodiode sensitive to light having a wavelength of about 450 nm. Such photodiodes are available from, for example, Advanced Photonix, Inc., Massachusetts. The microcontroller 2212 may be, for example, a Motorola 68HC 16.

The exact characteristics of the sensors 2202, 2204 and the filters 2206, 2208 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 2218, 2220 permit the gains of amplifiers 2210, 2214 to be adjusted to appropriate levels. Calibration may be performed by positioning a piece of white fluorescent paper on the transport plate 2114 so that it completely covers the rectangular opening 2116 of FIG. 60. The potentiometers 2218, 2220 may then be adjusted so that the output of the amplifiers 2210, 2214 is 5 volts.

The implementation of one embodiment of a document authenticating system according to the present invention as illustrated in FIG. 61 with respect to the authentication of U.S. currency will now be described. As discussed above, it has been determined that genuine United States currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresce;
3) Reflects a high level of ultraviolet light and fluoresces;
4) Reflects a high level of ultraviolet light and does not fluoresce.

Counterfeit bills in categories (1) and (2) may be detected by a currency authenticator employing an ultraviolet light reflection test according to one embodiment of the present invention. Counterfeit bills in category (3) may be detected by a currency authenticator employing both an ultraviolet reflection test and a fluorescence test according to another embodiment of the present invention. Only counterfeits in category (4) are not detected by the authenticating methods of the present invention.

According to one embodiment of the present invention, fluorescence is determined by any signal that is above the noise floor. Thus, the amplified fluorescent sensor signal 2222 will be approximately 0 volts for genuine U.S. currency and will vary between approximately 0 and 5 volts for counterfeit bills depending upon their fluorescent characteristics. Accordingly, an authenticating system according to one embodiment of the present invention will reject bills when signal 2222 exceeds approximately 0 volts.

According to one embodiment of the present invention, a high level of reflected UV light ("high UV") is indicated when the amplified UV sensor signal 2224 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to one embodiment of the present invention tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 2116 of the transport plate 2114. It is noted that a certain amount of UV light is always reflected off the acrylic window 2118. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 2224 will initially vary between 1.0 and 5.0 volts depending upon the UV reflectance characteristics of the document being scanned and will slowly drift downward as the light source degrades. In an alternative embodiment to one embodiment wherein the threshold level is adjusted as the light source degrades, the sampling of the UV sensor output may be used to adjust the gain of the amplifier 2210 thereby maintaining the output of the amplifier 2210 at its initial levels.

It has been found that the voltage ratio between counterfeit and genuine U.S. bills varies from a discernable 2-to-1 ratio to a non-discernable ratio. According to one embodiment of the present invention a 2-to-1 ratio is used to discriminate between genuine and counterfeit bills. For example, if a genuine U.S. bill generates an amplified UV output sensor signal 2224 of 4.0 volts, documents generating an amplified UV output sensor signal 2224 of 2.0 volts or less will be rejected as counterfeit. As described above, this threshold of 2.0 volts may either be lowered as the light source degrades or the gain of the amplifier 2210 may be adjusted so that 2.0 volts remains an appropriate threshold value.

According to one embodiment of the present invention, the determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification," incorporated herein by reference in its entirety.

In a similar manner, the presence of fluorescence may be performed by sampling the output of the fluorescence sensor at a number of intervals. However, in one embodiment, a bill is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

Figure 62:
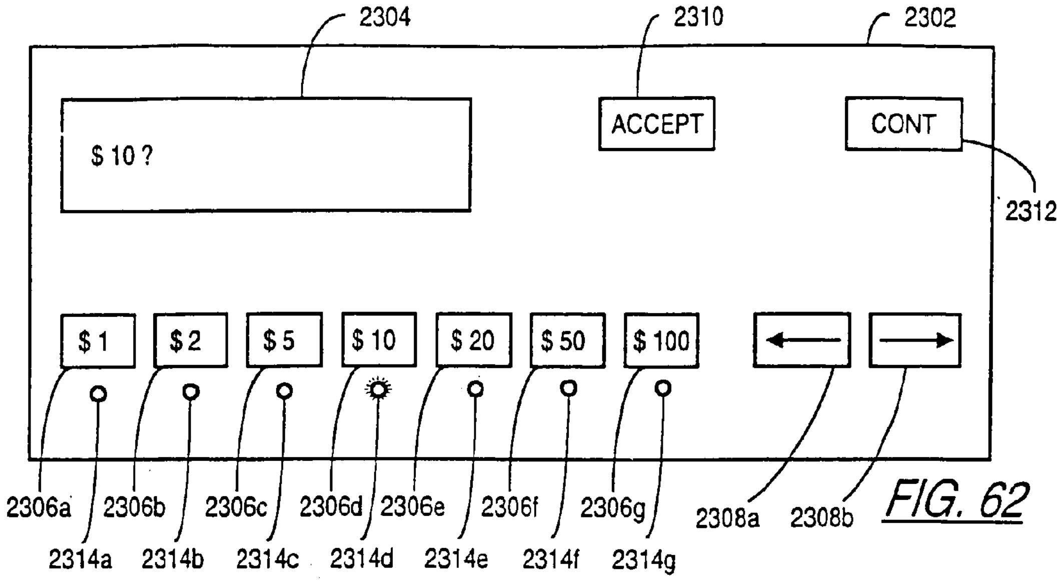
FIGS. 62–67 are enlarged plan views of various embodiments of control panels.

Means for entering the value of no call bills were discussed above in connection with FIG. 59 and the operating modes discussed above. Now several additional means will be discussed in connection with FIGS. 62–66. FIG. 62 is a front view of a control panel 2302 similar to that of FIG. 59. The control panel 2302 comprises a display area 2304, several denomination selection elements 2306*a–g* in the form of keys, left and right scroll keys 2308*a–b*, an accept selection element 2310, and a continuation selection element 2312. Each denomination selection element 2306*a–g* has a prompting means associated therewith. In FIG. 62, the prompting means are in the form of small lights or lamps 2314*a–g* such as LEDs. In FIG. 62, the light 2314*d* associated with the $10 denomination key 2306*d* is illuminated so as to prompt the operator that a denomination of $10 is being suggested. Alternatively, instead of the lamps 2314*a–g* being separate from the denomination keys 2306*a–g*, the denomination keys could be in the form of illuminable keys whereby one of the keys 2306*a–g* would light up to suggest its corresponding denomination to the operator. In place of, or in addition to, the illuminable lights 2314*a–g* or keys, the display area 2304 may contain a message to prompt or suggest a denomination to the operator. In FIG. 62, the display area 2304 contains the message "$10?" to suggest the denomination of $10. In the embodiment of FIG. 59, the display area 63 may be used-to suggest a denomination to-the operator without the need of illuminable lights and keys.

Figure 63:
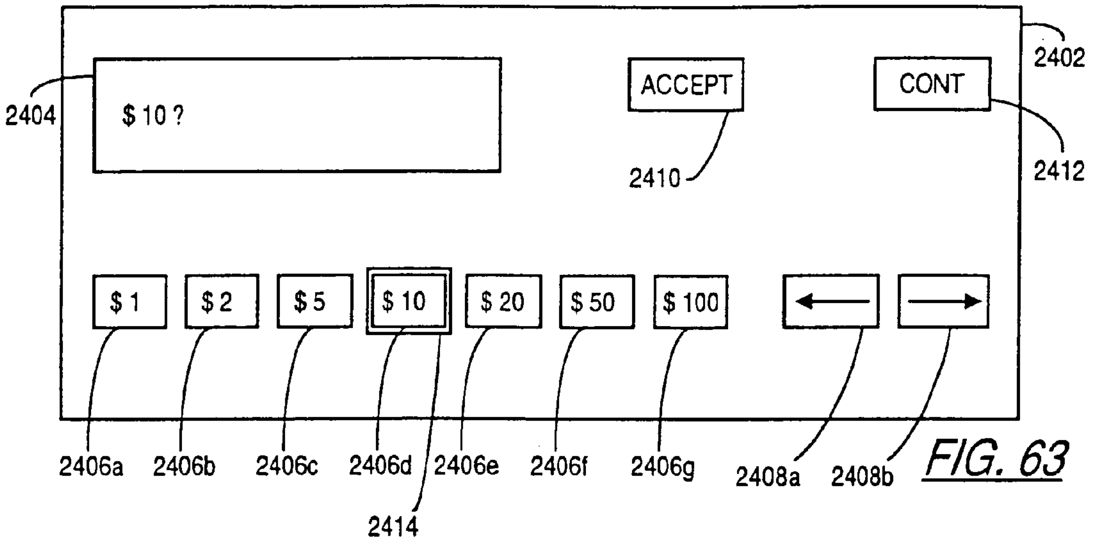

The control panel 2402 of FIG. 63 is similar to the control panel 2302 of FIG. 62; however, the denomination selection elements 2406*a–g*, scroll keys 2408*a–b*, accept key 2410, and continuation key 2412 are displayed keys in a touch-screen environment. To select any given key, the operator touches the screen in the area of the key to be selected. The operation of a touch screen is described in more detail in connection with FIG. 68. The discriminator may contain prompting means to suggest a denomination to the operator. For example, an appropriate message may be displayed in a display area 2404. Alternatively, or additionally, the prompting means may include means for highlighting one of the denomination selection elements 2406*a–g*. For example, the appearance of one of the denomination selection elements may be altered such as by making it lighter or darker than the remaining denomination selection elements or reversing the video display (e.g., making light portions dark and making the dark portions light or swapping the background and foreground colors). Alternatively, a designated denomination selection element may be highlighted by surrounding it with a box, such as box 2414 surrounding the $10 key 2406*d*.

Figure 64:
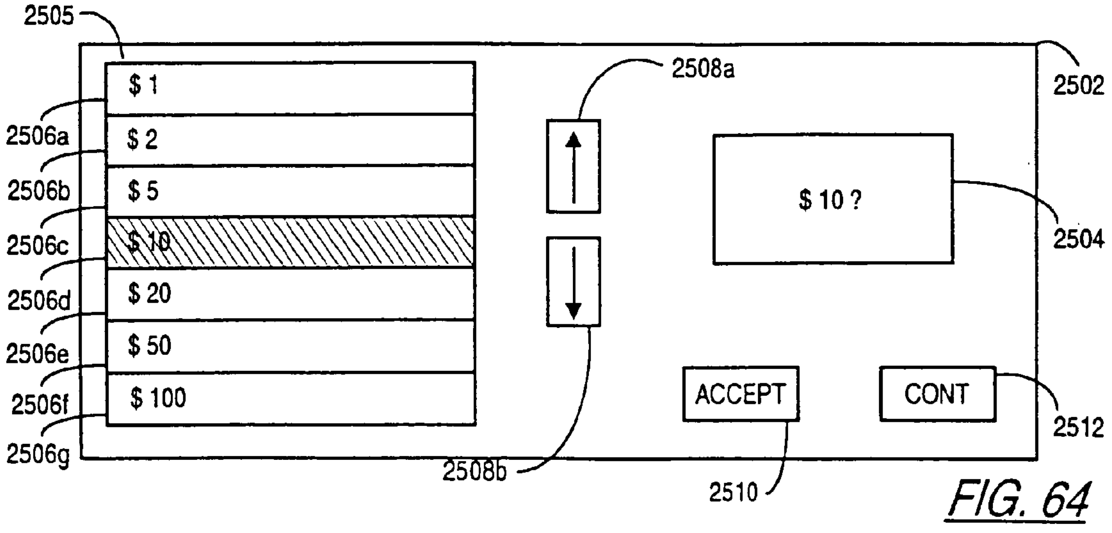

Another embodiment of a control panel 2502 is depicted in FIG. 64. The control panel 2502 has several denomination indicating elements 2506*a–g* in the form of menu list 2505, scroll keys 2508*a–b*, an accept selection element 2510, and a continuation selection element 2512. The various selection elements may be, for example, physical keys or displayed keys in a touch screen environment. For example, the menu list 2505 may be displayed in a non-touch screen activated display area while the scroll keys 2508*a–b*, accept key 2510, and continuation key 2512 may be physical keys or displayed touch screen keys. In such an environment a user may accept a denominational selection by pressing the accept key 2510 when the desired denomination indicating element is highlighted and may use the scroll keys 2508*a–b* to vary the denomination indicating element that is highlighted. Alternatively, the denomination indicating elements 2506*a–g* may themselves be selection elements such as by being displayed touch screen active keys. In such an embodiment a given denomination element may be made to be highlighted and/or selected by touching the screen in the area of one of the denomination selection elements 2506*a–g*. The touching of the screen in the area of one of the denomination selection elements may simply cause the associated denomination selection element to become highlighted requiring the touching and/or pressing of the accept key 2510 or alternatively may constitute acceptance of the associated denomination selection element without requiring the separate selection of the accept key 2510. The discriminator may contain prompting means to suggest a denomination to the operator. For example, an appropriate message may be displayed in a display area 2504. Alternatively, or additionally, the prompting means may include means for highlighting one of the denomination indicating elements 2506*a–g*. For example, the appearance of one of the denomination indicating elements may be altered such as by making it lighter or darker than the remaining denomination indicating elements or by reversing the video display (e.g., making light portions dark and making the dark portions light or swapping the background and foreground colors). In FIG. 64, the hash marks are used to symbolize the alternating of the display of the $10 denomination indicating element 2506*d* relative to the other denomination indicating elements such as by using a reverse video display.

Figure 65:
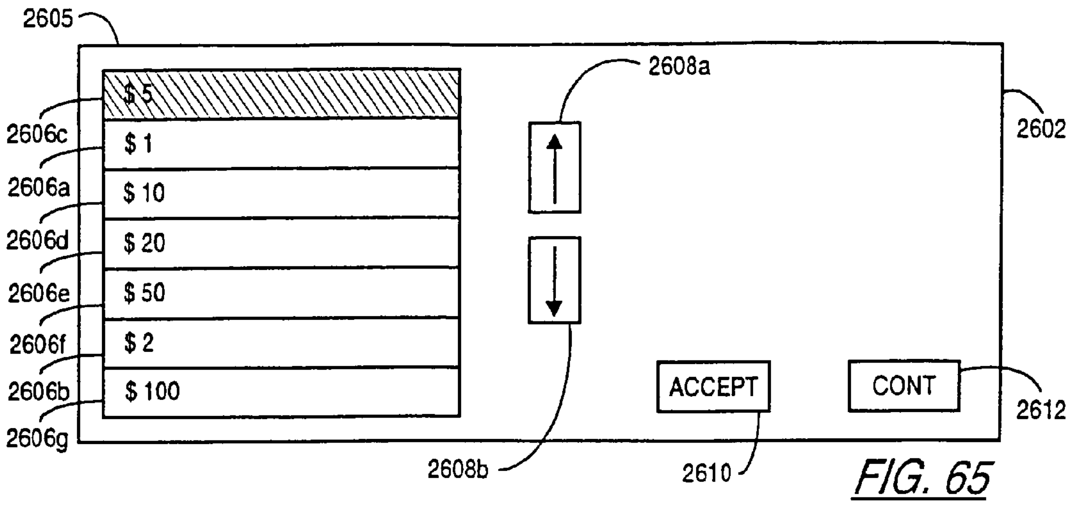

Control panel 2602 of FIG. 65 is similar to control panel 2502 of FIG. 64; however, the control panel 2602 does not have a separate display area. Additionally, the order of the denomination indicating elements 2606*a–g* of menu list 2605 is varied relative to those of menu list 2505. The order of the denomination selection element may be user-defined (i.e., the operator may preset the order in which the denominations should be listed) or may be determined by the discriminator and be, for example, based on the historical occurrence of no calls of each denomination, based on the denomination of the most recently detected no call, based on calculated correlation values for a given no call bill, or perhaps based on random selection. Such criteria will be described in more detail below.

Figure 66A:
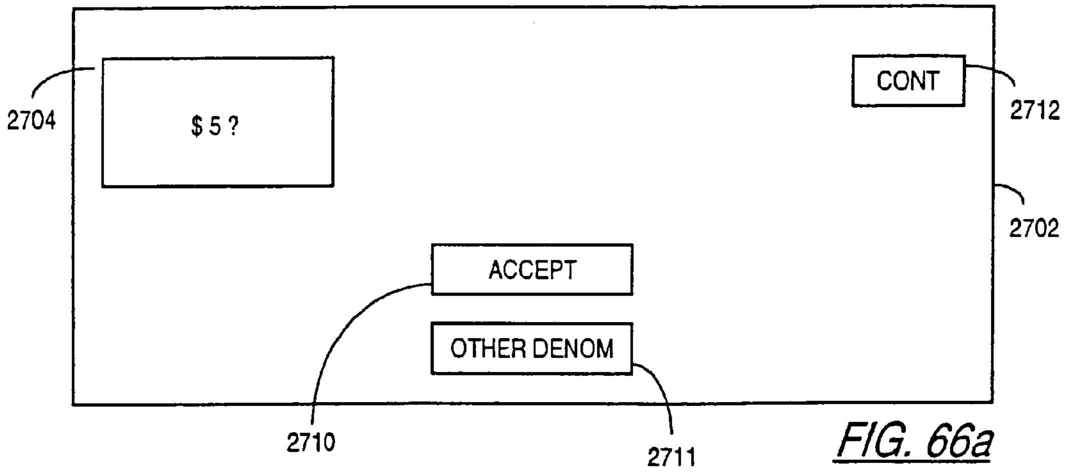
Figure 66B:
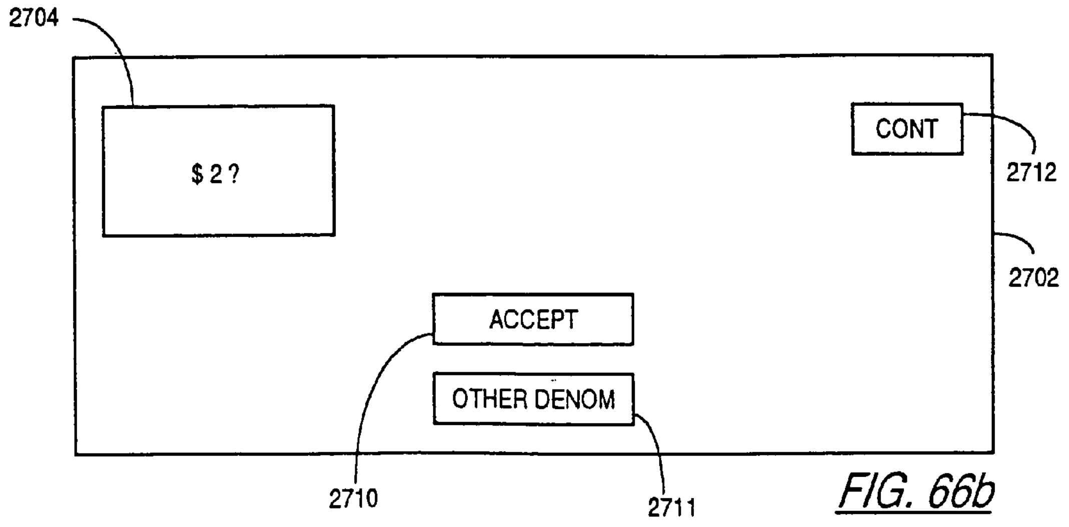

The control panel 2702 of FIGS. 66*a* and 66*b* comprises a display area 2704, an accept key 2710, a next or other denomination key 2711, and a continuation key 2712. Alternatively, the accept key may be designated a "YES" key while the other denomination key may be designated a "NO" key. These keys may be physical keys or displayed keys. The discriminator prompts or suggest a denomination by displaying an appropriate message in the display area 2704. If the operator wishes to accept this denomination suggestion, the accept key 2710 may be selected. If other the operator wishes to select a different denomination, the other denomination key 2711 may be selected. If in the example given in FIG. 66*a* the operator wishes to select a denomination other than the $5 prompted in the display area 2704, the other denomination key 2711 may be selected which results in prompting of a different denomination, e.g., $2 as shown in FIG. 66*b*. The "OTHER DENOM" key 2711 may be repeatedly selected to scroll through the different denominations.

Figure 67:
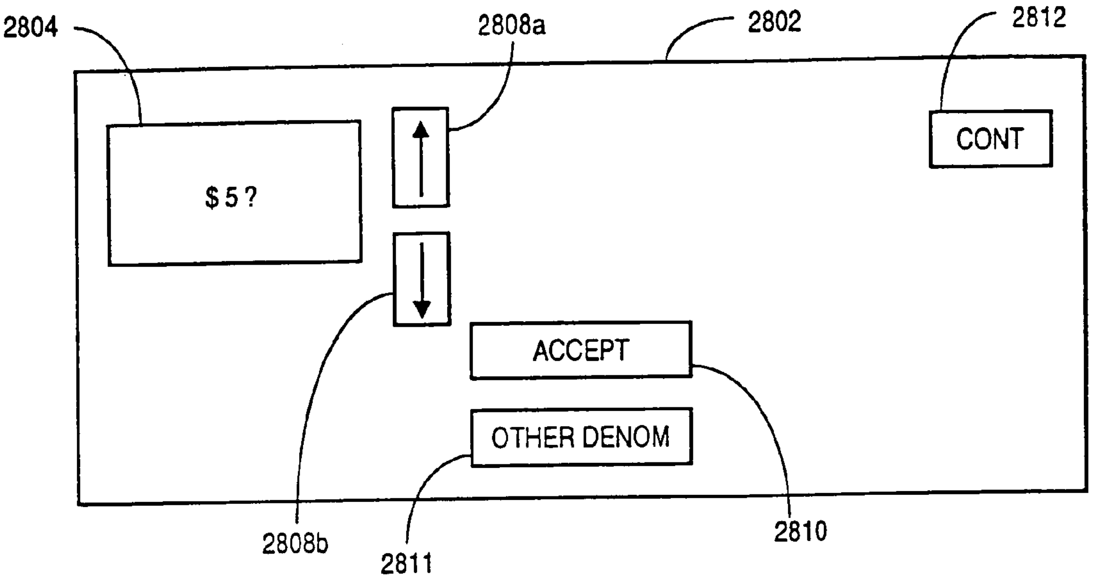

The control panel 2802 of FIG. 67 is similar to that of FIGS. 66*a–b* and additionally comprises scroll keys 2808*a–b*. These scroll keys 2808*a–b* may be provided in addition to or in place of the other denomination key 2811. The order in which denominations are suggested to an operator, for example, in FIGS. 66 and 67, may be based on a variety of criteria as will be discussed below such as user-defined criteria or order, historical information, previous bill denomination, correlation values, or previous no call information.

Now several embodiments of the operation of discriminators embodying control panels such as those of FIGS. 59 and 62–67 will be discussed. These can be employed in conjunction with a variety of discriminators and scanners such as those illustrated in FIGS. 1 and 56–58. In particular, several methods for reconciling the value of no call bills will be discussed in connection with these control panels. As discussed above, for example, in connection with the several previously described operating modes, when a discriminator encounters a no call bill, that is, when a discriminator is unable to determine or call the denomination of a bill, any counters keeping track of the number or value of each denomination of bills or of the total value of the bills processed will not include the no call bill. Traditionally, any no calls bills had to be set aside and manually counted by hand with the operator being required to add their values to the totals provided by the discriminator. As discussed above, this can lead to errors and reduced efficiency. To counter this problem, according to an embodiment of the present invention, means are provided for incorporating the value of no call bills. In single pocket discriminators, reconciliation may be accomplished on-the-fly with the discriminator suspending operation when each no call is encountered, prompting the operator to enter the value of the no call, and then resuming operation. In multi-output pocket discriminators, no call bills may be reconciled either on-the-fly or after the completion of processing all the bills placed in the input hopper or after completion of processing some other designated batch of bills. Under the first approach, the operation of the discriminator is suspended when each no call bill is detected with or without the no call bill being routed to a special location. The operator is then prompted to enter the value of the no call where upon the discriminator resumes operation. Based on the value indicated by the operator, appropriate counters are augmented. Under the second approach, any no call bills are routed to a special location while the discriminator continues processing subsequent bills. When all the bills have been processed, the operator is prompted to reconcile the values of any intervening no call bills. For example, assume a stack of fifty bills is placed in the input hopper and processed with four no calls being routed to a separate output receptacle from the receptacle or receptacles into which the bills whose denominations have been determined. After all fifty bills have been processed, the operation of the transport mechanism is halted and the operator is prompted to reconcile the value of the four no call bills. The methods for reconciling these four no calls will be discussed below after describing several denomination indicating and/or prompting means and methods. Alternatively, instead of waiting until all the bills in the stack have been processed, the discriminator may prompt the operator to reconcile the value of any no call bills while the remaining bills are still being processed. When the operator indicates the denominations of the no call bills, appropriate counters are augmented to reflect the value of the no call bills.

Several embodiments of means for permitting the operator to indicate the value of a flagged bill such as a no call and/or for prompting the operator as to the value of a flagged bill such as a no call will no w be discussed. A first method was discussed above in connection with several operating modes and in connection with FIG. 59. According to one embodiment, the control panel of FIG. 59 comprises denomination indicating means in the form of the denomination selection elements 64*a–g* for permitting the operator to indicate the denomination of a bill but does not additionally comprise means for prompting the operator as to the denomination of a particular bill. Under this method, the operator examines a no call bill. If the bill is acceptable, the operator selects the denomination selection element associated with the denomination of the no call bill and the appropriate counters are augmented to reflect the value of the no call bill. For example, if the operator determines a no call bill is an acceptable $10 bill, the operator may press the $10 selection element 64*c* of FIG. 59. If the operation of the discriminator had been suspended, the selection of a denomination selection causes the operation of the discriminator to resume. In a on-the-fly reconciliating machine (i.e., one that suspends operation upon detection of each no call bill), if the operator determines that a particular no call bill is unacceptable, a continuation selection element may be selected to cause the discriminator to resume operation without negatively affecting the status of any counters. Under this approach, the denomination selection elements provide the operator with means for indicating the value of a no call bill. In FIGS. 62–67, additional examples of means for indicating the value of no call bills are provided. For example, in FIGS. 62–65, according to one embodiment, a denomination may be indicated in a similar manner by pressing one of the denomination selection elements. Alternatively, or additionally, a denomination may be indicated by selecting one of the denomination selection elements and selecting an accept key. Another example of a method of indicating a particular denomination selection element would be by utilizing one or more scroll keys. The selection of a denomination selection element may be indicated by, for example, the lights 2314 of FIG. 62, or by highlighting a particular selection element as in FIGS. 63–65. Alternatively a displayed message, as in FIGS. 62–64, 66, and 67, may be used to indicate which denomination is currently selected. The scroll keys could be used to alter which denomination is presently selected, for example, by altering which light 2314 is illuminated, which selection element is highlighted, or which denomination appears in the displayed message. Selection of an accept key while a particular denomination is selected may be used to indicate the selected denomination to the discriminator.

In addition to means for permitting the operator to indicate the denomination of one or more no calls, a discriminator may be provided with one or more means of prompting the operator as to the denomination of a no call bill. These means can be the means used to indicate which denomination is currently selected, e.g., the lights 2314 of FIG. 62, the highlighting of FIGS. 63–65, and/or the displayed message of FIGS. 62–64, 66, and 67. Several methods that may be employed in prompting the operator to enter the value of one or more no call bills will now be discussed.

A discriminator containing means for prompting an operator as to the value of a no call bill may base its selection of the denomination to be prompted to the operator on a variety of criteria. According to one embodiment, default denomination or sequence of denominations may be employed to prompt a denomination to an operator. For example, the discriminator may begin by prompting the lowest denomination, e.g., $1. Alternatively, the discriminator may begin by prompting the operator with the first denomination in a pre-defined sequence or on a menu list. The order of the denominations in the sequence or on the menu list may be a default order, e.g., increasing or decreasing denominational order, user-defined order, manufacturer-defined order.

According to another embodiment, a denomination to be prompted to the operator is determined on a random basis. The discriminator simply randomly or pseudo-randomly chooses one of a plurality of denominations and suggests this denomination to the operator. The denomination prompted to an operator may remain the same for all no call bills or alternatively, a new randomly selected denomination may be chosen for each no call encountered. If the operator agrees that a given no call bill is of the denomination suggested by the prompting means and finds the particular no call bill to be acceptable, the operator may simply choose the accept element or the corresponding denomination selection element depending on the embodiment of the control panel employed. If the operator finds a particular bill to be acceptable but does not have the suggested denomination, the operator may alter the denomination that is selected by, for example, altering the displayed suggested denomination by using the scroll keys, scrolling among the plurality of denomination selection and/or indicating elements, or directly selecting the appropriate denomination by pressing or touching the appropriate denomination selection element. If the operator finds that a no call bill is not acceptable, the operator may simply select a continuation key.

According to another embodiment, a denomination to be prompted to the operator is determined on the basis of the denomination of the last bill that was identified by the discriminator. For example, suppose the tenth bill in a stack was determined by the discriminator to be a $10, the eleventh bill was a no call and indicated by the operator to be a $5 bill, and the twelfth was a no call bill. According to this embodiment, the discriminator would suggest to the operator that the twelfth bill is a $10 bill. The operator may accept this suggestion or alter the suggested denomination as described above.

According to another embodiment, a denomination to be prompted to the operator is determined on the basis of the denomination of the last no call bill as indicated by the operator. For example, suppose the tenth bill was a no call and indicated by the operator to be a $5 bill, the eleventh bill in a stack was determined by the discriminator to be a $10, and the twelfth was a no call bill. According to this embodiment, the discriminator would suggest to the operator that the twelfth bill is a $5 bill. The operator may accept this suggestion or alter the suggested denomination as described above.

According to another embodiment, a denomination to be prompted to the operator is determined on the basis of the denomination of the immediately preceding bill, regardless of whether the denomination of that bill was determined by the discriminator or was indicated by the operator. For example, suppose the tenth bill in a stack was determined by the discriminator to be a $10, the eleventh bill was a no call and indicated by the operator to be a $5 bill, and the twelfth was also a no call bill. According to this embodiment, the discriminator would suggest to the operator that the twelfth bill is a $5 bill. The operator may accept this suggestion or alter the suggested denomination as described above.

According to another embodiment, a denomination to be prompted to the operator is determined on the basis of historical information concerning no call bills such as statistical information regarding previous no call bills. For example, suppose that for a given discriminator 180 no calls had been encountered since the discriminator was placed in service. According to this embodiment, information regarding these no calls is stored in memory. Assume that of these 180 no call bills, 100 were indicated by the operator to be $5s, 50 were $10s, and the remaining 30 were $20s. According to this embodiment, the discriminator would suggest to the operator that a no call bill was a $5. The operator may accept this suggestion or alter the suggested denomination as described above. Variations on the data which constitute the historical basis may be made. For example, the historical basis according to this embodiment may be all no calls encountered since a given machine was place in service as in the above example, the last predetermined number of no calls detected, e.g., the last 100 no calls detected, or the last predetermined number of bills processed, e.g., the no calls encountered in the last 1000 bills processed. Alternatively, the historical basis may be set by the manufacturer based on historical data retrieved from a number of discriminators.

According to another embodiment, a denomination to be prompted to the operator is determined on the basis of a comparison of information retrieved from a given no call bill and master information associated with genuine bills. For example, in some discriminators, the denomination of a bill is determined by scanning the bill, generating a scanned pattern from information retrieved via the scanning step, and comparing the scanned pattern with one or more master patterns associated with one or more genuine bills associated with one or more denominations. If the scanned pattern sufficiently matches one of the master patterns, the denomination of the bill is called or determined to be the denomination associated with the best matching master pattern. However, in some discriminators, a scanned pattern must meet some threshold degree of matching or correlation before the denomination of a bill will be called. In such discriminators, bills whose scanned pattern does not sufficiently match one of the master patterns are not called, i.e., they are no calls. According to the present embodiment, the discriminator would suggest to the operator that a no call had the denomination associated with the master pattern that most closely matched its scanned pattern even though that match was insufficient to call the denomination of the bill without the concurrence of the operator. The operator may accept this suggestion or alter the suggested denomination as described above. For example, in a discriminator similar to that described in U.S. Pat. No. 5,295,196, the discriminator may prompt the operator with the denomination associated with the master pattern that has the highest correlation with the scanned pattern associated with the given no call bill. Additional examples may be made with reference to FIGS. 13 and 19*a–c*. For example, with respect to FIG. 13, if the highest correlation for a bill is below 800, the bill is a no call bill. In such a case, assume the highest correlation is 790 and this correlation is associated with a $1 bill. When this no call bill is to be reconciled, the discriminator would suggest to the operator that the no call was a $1 bill.

According to another embodiment, a denomination to be prompted to the operator is determined on the basis of preset criteria established by the manufacturer. For example, in FIG. 64, the denomination indicating elements are arranged in increasing denominational order. The discriminator may be designed to default so that a given one of these denomination selection elements is initially highlighted when no call bills are to be reconciled. For example, for each no call the $10 element 2506*d* may initially be selected. Alternatively, the discriminator may be designed to default to the first denomination selection element listed, e.g., the $1 denomination element 2506*a*.

According to another embodiment, a denomination to be prompted to the operator is determined on the basis of user-defined criteria set by the operator of a discriminator. For example, in FIG. 64, the operator may designate the discriminator to default so that a given one of the denomination indicating elements is initially highlighted when no call bills are to be reconciled. For example, for each no call the operator may designate that the $10 element 2506*d* is to be initially selected. The operator may be permitted to set the default no call denomination, for example, in a set up mode entered into before bills in a stack are processed.

In addition to the ways discussed above whereby an initial denomination is prompted to the operator in connection with the reconciling a no call bill, according to other embodiments one or more alternate denominations are may also be suggested. For example, according to the method whereby the initial bill is suggested to the operator based on the denomination associated with a master pattern having the highest correlation relative to a scanned pattern, if the operator rejects the initial suggestion, the discriminator may be designed to then suggest an alternate denomination based on the master pattern associated with a genuine bill of a different denomination having the next highest correlation value. If the operator rejects the second suggestion, the discriminator may be designed to then suggest a second alternate denomination based on the master pattern associated with a genuine bill of a different denomination having the next highest correlation value, and so on.

For example, suppose the highest correlation was associated with a $1, the second highest correlation was associated with $10, and the third highest correlation was associated with $50. According to this embodiment, the discriminator would initially suggest that the no call was a $1. If the operator determined the no call was not a $1, the discriminator would then suggest that the no call was a $10. If the operator determined the no call was not a $10, the discriminator would then suggest that the no call was a $50. For example, according to the embodiment of FIGS. 66*a*–b, the discriminator would first ask whether the no call was a $1 by displaying the message "$1?" in the display area 2704. If the no call was a $1, the operator would depress the accept or yes key 2710. If the no call was not a $1 bill, the operator would depress the other denomination or no key 2711, in which case, the display area would display the message "$10?" and so on. Alternatively, the denomination selection elements may be arranged so that their relative order is based on the correlation results. For example, taking the menu list 2605 of FIG. 65, the denomination elements may be ordered in the order of decreasing correlation values, e.g., according to the previous example with the $1 denomination element being listed first, the $10 denomination element being listed second, the $50 denomination element being listed third and so on. Alternatively, the denomination elements may be listed in the reverse order. According to another embodiment, the denomination element associated with the highest correlation may be listed in the middle of the list surrounded by the denomination elements associated with the second and third highest correlations, and so on. For the above example, the $1 element 2606*a* would be listed in the middle of the menu list 2605 surrounded by the $10 element 2606*d* on one side and the $50 element 2606*f* on the other side.

Likewise the order in which denominations are suggested to the operator and/or arranged on the control panel may be based on other criteria such as those described above, such as the prior bill information (e.g., last bill, last no call, last call denomination), historical information, user-defined order, manufacturer-defined order, and random order. For example, using the historical data example given above based on 180 no calls (100 $5 no calls, 50 $10 no calls, and 30 $20 no calls), the order that denominations are suggested to the operator may be first $5, then $10, and then $20. Alternatively, using the last bill information and assuming the following sequence of bills ($2, $5, $5, $5, $20, $10, no call indicated to be a $50, no call); the discriminator would suggest denominations for the last no call in the following order: $50, $10, $20. $5, $2. Likewise the-order in which the denominations are arranged on a control panel such as in FIGS. 65 and 63 may be determined based on such information, for example, according to the orders described above in connection with using correlation values. For example, the denominations may be listed in the prompting order suggested above (e.g., $5, $10, $20 in the historical information example and $50, $10, $20, $5, $2 in the last bill example). Alternatively they may be listed in the reverse order. Alternatively, they may be arranged with the first suggested denomination being in the center of the list and being initially highlighted or selected. This first suggested denomination may be surrounded by the second and third suggested denominations which are in turn surrounded by the fourth and fifth suggested denomination, and so on. A default sequence may be used to provide the order for any remaining denominations which are not dictated by a particular prompting criteria in a given situation. In the above examples, the denominations might be arranged on a menu list in the following orders: $2, $1, $10, $5, $20, $50, $100 for the historical information example and $1, $5, $10, $50, $20, $2, $100. In general, an example of a listing order according to this approach could be from top to bottom: 6th priority or suggested denomination, 4th, 2nd, 1st, 3rd, 5th, and 7th.

Embodiments arranging the respective order in which denominations are suggested to the operator and/or displayed on the control panel will likely aid the operator by reducing the projected number of times the operator will need to hit one of the scroll keys and/or "OTHER DENOM" or "NO" key.

Now several methods will be described in connection reconciliation of no calls in multi-output pocket machines after all bills in a stack have been processed. Recalling a previous example in which four no call bills were separated out from a stack of fifty bills and the machine halted after processing all fifty bills, the discriminator then prompts the operator to reconcile the value of the four no call bills. For example, assume the no call bills corresponded to the 5th, 20th, 30th, and 31st bills in the stack and were $2, $50, $10, and $2 bills respectively. The degree of intelligence employed by the discriminator in prompting the operator to reconcile the value of the no call bills may vary depending on the particular embodiment employed. According to one embodiment the operator may depress or select the denomination selection elements corresponding the denominations of the no call bills without any prompting from the discriminator as to they respective denominations. For example, using the control panel of FIG. 59, the operator would depress the $2 selection element 64*g* twice, the $10 selection element 64*c* once, and the $50 selection element 64*e* once. The discriminator may or may not inform the operator that four no call bills must be reconciled and may or may not limit the operator to entering four denominations. Likewise, in other embodiments, the operator may use the scroll keys to cause the desired denomination to become selected and then depress the accept key. Alternatively, a numerical keypad may be provided for permitting the operator to indicate the number of bills of each denomination that have not been called. For example, the above example, the operator could use the scroll keys so that the $2 denomination was selected, then press "2" on the keypad for the number of $2 no calls in the batch, and then press an enter or accept key. Then the operator could use the scroll keys so that the $10 denomination was selected, then press "1" on the keypad for the number of $10 no calls in the batch, and then press an enter or accept key and so on. The keypad may comprise, for example, keys or selection elements associated with the digits 0–9.

Alternatively, the discriminator may prompt the operator as to the denomination of each no call bill, for example, by employing one of the prompting methods discussed above, e.g., default, random, user-defined criteria, manufacturer defined criteria, prior bill information (last bill, last no call, last called denomination), historical information, scanned and master comparison information (e.g., highest correlation). For example, the discriminator may serially interrogate the examiner as to the denomination of each no call, for example, the display may initially query "Is 1st no call a $2?". Depending on the embodiment of the control panel being used, the operator could then select "ACCEPT" or "YES" or select the $2 denomination selection element, select "OTHER DENOM" or "NO" or use the scroll keys or select the appropriate denomination selection element, or if the operator finds the first bill unacceptable, the operator may put the first no call bill aside and select "CONT". The discriminator may then query the operator as to the denomination of the second no call bill, and so on. The denomination prompted to the operator would depend on the prompting criteria employed. For example, suppose the prompting criteria was the denomination of the preceding bill and further suppose that in the four no call example given above that the first bill was a $2, the 2nd bill was a $10, the 3rd bill was a $1, the 4th bill was a $1, the 19th bill was a $50, the 29th bill was a $10, and as stated above, the 30th bill was a $10. The discriminator would then prompt the operator as to whether the first no call was a $1. Since the first no call is a $2, the operator would choose "NO", "OTHER DENOM", scroll, or hit the $2 selection element depending on the embodiment be used. If the "NO" or "OTHER DENOM" key were pressed, the discriminator would review the preceding bills in reverse order and suggest the first denomination encountered that had not already been suggested, in this case a $10. If the "NO" or "OTHER DENOM" key were pressed again, the discriminator would then suggest a $2. A predetermined default sequence may be utilized when prior bill information does not contain the desired denomination. Once the operator indicates that the first no call is a $2, the discriminator would then prompt the operator as to whether the second no call was a $50. Since the second no call was indeed a $50 the operator would choose "ACCEPT", "YES", or select the $50 denomination selection element depending on the embodiment chosen. The discriminator would then suggest that the third no call was a $10 and the operator would similarly indicate acceptance of the $10 suggested denomination. Finally, the discriminator would suggest that the fourth no call was a $10. Since the last no call was a $2, the operator would reject the $10 suggestion and indicate that the fourth no call bill was a $2 as described above. The operation of the discriminator using a different prompting criteria would proceed in a similar manner and as described above with respect to each of the described prompting methods.

While discussed above with respect to no calls, the above embodiments could also be employed in connection with other types of flagged bills such as reverse-faced bills, reverse forward/reverse oriented bills, unfit bills, suspect bills, etc.

Figure 68:
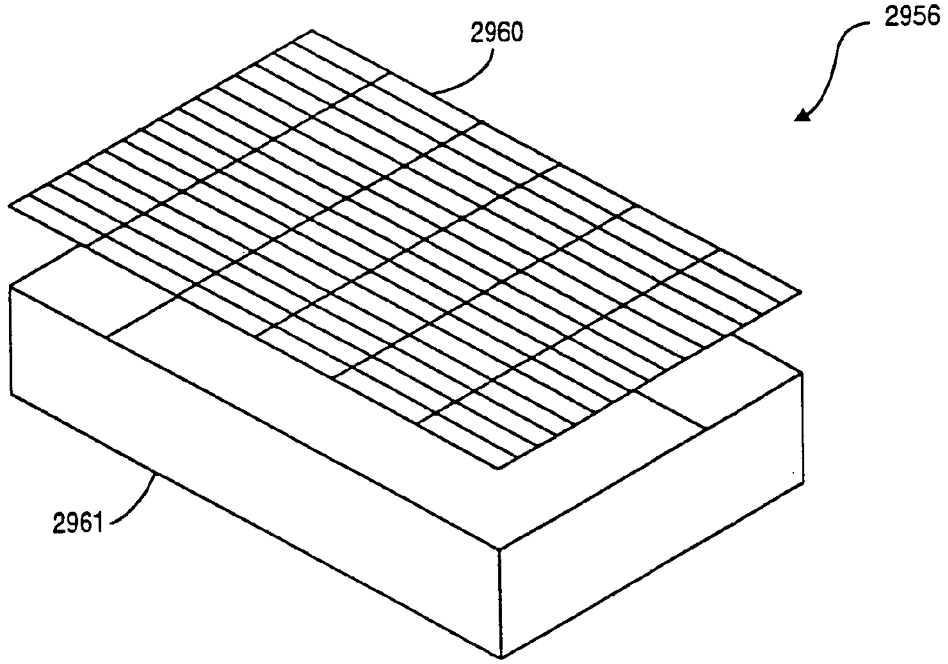
FIG. 68 is an exploded perspective view of a touch screen device.

Referring now to FIG. 68, the touch screen I/O device 2956 includes a touch screen 2960 mounted over a graphics display 2961. In one embodiment, the display 2961 is a liquid crystal display (LCD) with backlighting. The display may have, for example, 128 vertical pixels and 256 horizontal pixels. The display 2961 contains a built-in character generator which permits: the display 2961 to display text and numbers having font and size pre-defined by the manufacturer of the display. Moreover, a controller such as a CPU is programmed to permit the loading and display of custom fonts and shapes (e.g., key outlines) on the display 2961. The display 2961 is commercially available as Part No. GMF24012EBTW from Stanley Electric Company, Ltd., Equipment Export Section, of Tokyo, Japan.

The touch screen 2960 may be an X-Y matrix touch screen forming a matrix of touch responsive points. The touch screen 2960 includes two closely spaced but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the controller. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit which is detected by the controller through the respective buses at the edges of the two polyester layers, thereby providing a means for detecting the X and Y coordinates of the switch closure. A matrix touch screen 2960 of the above type is commercially available from Dynapro Thin Film Products, Inc. of Milwaukee, Wis.

As illustrated in FIG. 68, the touch screen 2960 forms a matrix of ninety-six optically transparent switch elements having six columns and sixteen rows. The controller is programmed to divide the switch elements in each column into groups of three to form five switches in each column. Actuation of any one of the three switch elements forming a switch actuates the switch. The uppermost switch element in each column remains on its own and is unused.

Although the touch screen 2960 uses an X-Y matrix of optically transparent switches to detect the location of a touch, alternative types of touch screens may be substituted for the touch screen 2960. These alternative touch screens use such well-known techniques as crossed beams of infrared light, acoustic surface waves, capacitance sensing, and resistive membranes to detect the location of a touch. The structure and operation of the alternative touch screens are described and illustrated, for example, in U.S. Pat. Nos. 5,317,140, 5,297,030, 5,231,381, 5,198,976, 5,184,115, 5,105,186, 4,931,782, 4,928,094, 4,851,616, 4,811,004, 4,806,709, and 4,782,328, which are incorporated herein by reference.

We claim:

1. A currency counting and discrimination device for receiving a stack of currency bills, rapidly counting and discriminating the bills in the stack, and then re-stacking the bills comprising:
- an input receptacle for receiving a stack of currency bills to be discriminated, each bill having a denomination associated therewith, the denomination of a bill being indicative of a value of the bill;
- a discriminating unit for discriminating the denomination of said currency bills;
- one or more output receptacles for receiving said currency bills after being discriminated by said discriminating unit;
- a transport mechanism for transporting said currency bills, one at a time, from said input receptacle past a sensor of said discriminating unit and to said one or more output receptacles;
- one or more counters keeping track of the value of bills discriminated; and
- value indicating means for an operator of said device to indicate the value of any bills whose denomination are not determined by said discriminating unit, said bills whose denomination are not determined by said discriminating unit being no call bills, said means appropriately effecting said one or more counters.

2. A currency counting and discrimination device for receiving a stack of currency bills, rapidly counting and discriminating the bills in the stack, and then re-stacking the bills comprising:
- an output receptacle for receiving a stack of currency bills to be discriminated, each bill having a denomination associated therewith, the denomination of a bill being indicative of a value of the bill;
- a discriminating unit for discriminating the denomination of the currency bills;
- an output receptacle for receiving the currency bills after being discriminated by the discriminating unit;
- a transport mechanism for transporting the currency bills, one at a time, from the input receptacle past a sensor of said discriminating unit and to the output receptacle;
- one or more counters keeping track of the value of bills discriminated;
- means for suspending the operation of the transport mechanism when the discriminating unit is unable to identify the denomination of a bill; and
- a keypad capable for receiving input from an operator of the device, the keypad enabling, upon suspension of the operation of the device, the operator to either (a) indicate the value of a bill whose denomination is not determined by the discriminating unit and restart the operation of the device or (b) restart the operation of the device without indicating the value of a bill whose denomination is not determined by the discriminating unit.

3. A currency denominating device adapted to receive a stack of currency bills, rapidly denominate and count the bills in the stack, and re-stack the bills comprising:
- a bill input receptacle adapted to receive a stack of currency bills, each bill having a value associated therewith;

a single output receptacle;

a bill transport defining a transport path and adapted to transport the bills, one at a time, from the input receptacle to the output receptacle along the transport path;

a sensor positioned adjacent to the transport path;

a control panel having an input device adapted to receive input from an operator of the device; and a processor electrically coupled to the sensor and the control panel and programmed to:

(a) denominate bills;

(b) keep track of the value of bills processed;

(c) suspend the operation of the device when the denominating processor is unable to identify the denomination of a bill;

(d) enable the operator, upon suspension of the operation of the device, to designate via the control panel the denomination of a bill whose denomination is not determined by the processor; and (e) enable the operator, upon suspension of the operation of the device, to restart the operation of the device without designating the denomination of a bill whose denomination is not determined by the processor.

4. The device of claim 3 wherein the processor is programmed to restart the operation of the device after the operator designates the denomination of a bill whose denomination is not determined by the processor.

5. The device of claim 3 wherein the processor is programmed to suspend the operation of the device with the bill whose denomination the processor is unable to identify being located in the output receptacle.

6. Currency denominating apparatus comprising:

a bill input receptacle;

a single output receptacle;

a bill transport adapted to transfer bills between the input receptacle and the output receptacle;

one or more sensors positioned proximate the bill transport and operable to generate signals indicative of denominational characteristics of bills transported by the transport;

a plurality of denomination keys corresponding to a plurality of denominations;

a continuation key; and a processor programmed to:

(a) denominate bills transported by the bill transport in response to the signals generated by the one or more sensors, (b) keep track of the denominations of the bills in one or more counters;

(c) suspend operation of the transport when the processor is unable to denominate a bill based on the signals;

(d) reflect upon selection of one of the denomination keys after the operation of the transport has been suspended, the denomination corresponding to the selected denomination key in the one or more counters; and (e) restart the operation of the transport without adversely affecting the one or more counters upon selection of the continuation key after the operation of the transport has been suspended.

7. The device of claim 6 wherein the processor is programmed to restart the operation of the device upon selection of one of the denomination keys after the operation of the transport has been suspended.

8. Currency denominating apparatus comprising:

a bill input receptacle adapted to receive a stack of currency bills;

a single output receptacle;

a bill transport adapted to transfer bills, one at a time, from the input receptacle to the output receptacle;

one or more sensors positioned proximate the bill transport and operable to generate signals indicative of denominational characteristics of bills transported by the transport;

a plurality of denomination keys corresponding to a plurality of denominations;

a continuation key;

a denomination counter corresponding to each of the plurality of denominations; and a processor programmed to:

(a) denominate bills transported by the bill transport in response to the signals generated by the one or more sensors, (b) keep track of the number of bills of each of the plurality of denominations by incrementing the corresponding denomination counter each time the processor denominates a bill;

(c) suspend operation of the transport when the processor is unable to denominate a bill based on the signals with the bill which the processor was unable to denominate being located in the output receptacle where the bill can be conveniently examined and if desired removed from the device;

(d) upon a single depression of one of the denomination keys after the operation of the transport has been suspended, increment the denomination counter corresponding to the denomination of the depressed denomination key and restart the operation of the transport; and (e) restart the operation of the transport without adversely affecting the denomination counters upon depression of the continuation key after the operation of the transport has been suspended.

9. A currency denominating device comprising:

a bill input receptacle;

a single output receptacle;

a bill transport defining a transport path between the input receptacle and the output receptacle, bills to be transported having a value associated therewith;

at least one sensor positioned adjacent to the transport path;

a bill denominating processor electrically coupled to the sensor;

one or more counters keeping track of the value of bills processed;

a controller programmed to suspend the operation of the device when the denominating processor is unable to identify the denomination of a bill;

a plurality of denomination keys associated with different bill denominations, the denomination keys enabling the operator to designate the value of a bill whose denomination is not determined by the processor upon suspension of the operation of the device; and a continuation key enabling the operator, upon suspension of the operation of the device, to restart the operation of the device without designating the value of a bill whose denomination is not determined by the processor.

10. The device of claim 9 wherein the denomination keys enable the operator to both designate the value of a bill whose denomination is not determined by the processor upon suspension of the operation of file device and restart the operation of the device with a touch of a single denomination key.

11. A currency counting and discrimination device for receiving a stack of currency bills, rapidly counting and discriminating the bills in the stack, and then re-stacking the bills comprising:

an input receptacle adapted to receive a stack of currency bills to be discriminated, each bill having a denomination associated therewith, the denomination of a bill being indicative o a value of the bill;

a discriminating unit adapted to discriminate the denomination of the currency bills;

a single output receptacles adapted to receive the currency bills after being discriminated by the discriminating unit;

a transport mechanism adapted to transport the currency bills, one at a time, from the input receptacle past a sensor of the discriminating unit and to the output receptacle;

one or more counters adapted to keep track of the value of bills discriminated;

a controller programmed to suspend the operation of the transport mechanism when the discriminating unit is unable to identify the denomination of a bill; and an operator interface capable of receiving input from an operator of the device, the interface enabling, upon suspension of the operation of the device, the operator to either (a) indicate the value of a bill whose denomination is not determined by the discriminating unit and restart the operation of the device or (b) restart the operation of the device without indicating the value of a bill whose denomination is not determined by the discriminating unit.

12. The device of claim 11 wherein the controller is programmed to suspend the transport mechanism with the bill whose denomination the discriminating unit is unable to identify being located in the output receptacle.

13. A method of discriminating and counting currency bills comprising the acts of:

receiving a stack of currency bills in an input receptacle of a currency evaluation device, each bill having a denomination associated therewith;

transferring the bills, under the control of the evaluation device, one at a time from the input receptacle, past a sensor of a discriminating unit, to a single output receptacle;

determining, under control of the evaluation device, the denomination of each passing bill;

incrementing, under the control of the evaluation device, a count corresponding to one of a plurality of denominations based on the determined denomination of each passing bill when the device determines the denomination of a bill;

stopping, under the control of the evaluation device, the transferring when the device is unable to determine the denomination of a bill so that the bill whose denomination is not determined is located at a predetermined position within the output receptacle, the bill whose denomination is not determined being termed a no call bill;

an operator of the evaluation device examining the no call bill; and the operator either (a) depressing a key corresponding to the denomination of the no call bill when examining results in a determination that the bill is acceptable, whereby, under the control of the discrimination device, the corresponding count associated with the denomination of the no call bill is incremented and the transferring is continued; or (b) removing the no call bill without replacement when the examining does not result in a determination that the no call bill is acceptable and depressing a continuation key whereby, under the control of the bill evaluation device, the transferring is continued.

14. A method of discriminating and counting currency bills comprising the acts of:

receiving a stack of currency bills in an input receptacle of a currency denominating device;

transferring, under control of the device, the bills in the input receptacle one at a time past a denominating sensor to a single output receptacle;

denominating under control of the device, the bills based on a predetermined criterion;

incrementing, under control of the device, a count corresponding to one of a plurality of denominations of bills the device is capable of denominating when the device identifies a bill as satisfying the predetermined criterion;

stopping, under control of the device, the transferring when a bill fails to satisfy the predetermined criterion or when the device is unable to determine whether a bill satisfies the predetermined criterion, the transferring stopping so that the bill that triggered the stopping is located at an identifiable position within the output receptacle;

an operator of the device examining the triggering bill; and the operator either (a) depressing a key corresponding to the denomination of the triggering bill when the examining results in a determination that the bill is acceptable, whereby, under the control of the device, the corresponding count associated with the denomination of the triggering bill is incremented and the transferring is continued; or (b) removing the triggering bill without replacement when the examining does not result in a determination that the triggering bill is acceptable and depressing a continuation key whereby, under the control of the device, the transferring is continued.

15. A method of discriminating and counting currency bills using a currency discriminating device having denomination keys and a continuation key and one or more counters keeping track of bills processed by the device comprising the acts of:

receiving a stack of currency bills in an input receptacle of the currency discriminating device;

feeding the bills in the input receptacle one at a time past a sensor to a single output receptacle;

generating a signal from the sensor;

determining automatically the denomination of bills fed past the sensor using the signal from the sensor;

incrementing an appropriate counter when the denomination of a bill is determined automatically;

suspending the feeding when the denomination of a bill is not automatically determined; and either manually designating the denomination of a bill whose denomination is not automatically determined by depressing an appropriate denomination key or manually depressing the continuation key on the device to cause the feeding to be resumed without designating the denomination of a bill whose denomination is not automatically determined.

16. The method of claim 15 further comprising the act of the discriminating device incrementing an appropriate counter in response to the depression of the denomination key.

17. The method of claim 16 further comprising the act of the discriminating device resuming operation in response to the depression of the denomination key.

18. The method of claim 15 wherein the discriminating device has an additional key in addition to the denomination keys and further comprising, after manually designating the denomination, the act of the discriminating device incrementing an appropriate counter in response to the depression of the additional key.

19. The method of claim 18 further comprising the act of the discriminating device resuming operation in response to the depression of the additional key.

20. A method of discriminating and counting currency bills using a single output receptacle currency discriminating device having keys including denomination keys and a continuation key and one or more counters keeping track of bills processed by the device comprising the acts of:

receiving a stack of currency bills in an input receptacle of the currency discriminating device;

feeding the bills in the input receptacle one at a time past a sensor of a discriminating unit to a single output receptacle, the discriminating unit determining the denomination of bills fed past the sensor;

incrementing an appropriate counter when the discriminating unit determines the denomination of a bill;

suspending operation of the device when the discriminating unit fails to determine the denomination of a bill; and either (i) manually selecting the denomination of a bill whose denomination is not determined by the discriminating unit by depressing an appropriate denomination key or (ii) manually selecting a continuation key.

21. The method of claim 20 further comprising the act of manually depressing a key after the act of selecting the denomination to cause the selected denomination to be indicated to the device.

22. A method of discriminating and counting currency bills using a single output receptacle currency discriminating device having keys including denomination keys and one or more counters keeping track of bills processed by the device comprising the acts of:

receiving a stack of currency bills in an input receptacle of the currency discriminating device;

feeding the bills in the input receptacle one at a time past a sensor of a discriminating unit to a single output receptacle, the discriminating unit determining the denomination of passing bills;

incrementing an appropriate counter when the discriminating unit determines the denomination of a bill;

suspending operation of the device when the discriminating unit fails to determine the denomination of a bill; and either (i) manually selecting an appropriate denomination key corresponding to the denomination of a bill whose denomination is not determined by the discriminating unit, (ii) manually selecting a continuation key.

23. The method of claim 22 wherein the act of selecting an appropriate denomination key comprising the act of scrolling to the denomination to be selected.

24. The method of claim 23 further comprising the act of the operator manually selecting a key after the act of selecting an appropriate denomination key to cause the selected denomination to be indicated to the device.

25. The method of claim 22 further comprising the act of the operator manually selecting a key after the act of selecting an appropriate denomination key to cause the selected denomination to be indicated to the device.

26. A method of discriminating and counting currency bills using a currency discriminating device having a control panel and one or more counters keeping track of bills processed by the device comprising the acts of:

receiving a stack of currency bills in an input receptacle of the currency discriminating device;

the discriminating device feeding the bills in the input receptacle one at a time past a sensor of a discriminating unit to a single output receptacle, the discriminating unit determining the denomination of passing bills;

the discriminating device incrementing an appropriate counter when the discriminating unit determines the denomination of a bill;

the discriminating device suspending operation when the discriminating unit fails to determine the denomination of a bill; and an operator of the device either (a) using the control panel to manually communicate the denomination of a bill whose denomination is not determined by the discriminating unit to the discriminating unit or (b) using the control panel to manually restart the operation of the device without communicating the denomination of a bill whose denomination is not determined by the discriminating unit to the discriminating unit.

27. The method of claim 26 further comprising the act of the discriminating device resuming operation after the operator communicates the denomination of the bill.

28. A method of discriminating and counting currency bills using a currency discriminating device having a control panel and one or more counters keeping track of bills processed by the device comprising the acts of:

receiving a stack of currency bills in an input receptacle of the currency discriminating device;

feeding the bills in the input receptacle one at a time past a sensor of a discriminating unit to a single output receptacle, the discriminating unit determining the denomination of passing bills;

incrementing an appropriate counter when the discriminating unit determines the denomination of a bill;

suspending the feeding when the discriminating unit fails to determine the denomination of a bill with the bill whose denomination the discriminating unit failed to determine being located in an output receptacle; and after suspending the feeding either:

(a) manually using the control panel to indicate the denomination of the bill whose denomination is not determined by the discriminating unit or (b) manually removing from the output receptacle the bill whose denomination the discriminating unit failed to determine and then using the control panel to restart the feeding without indicating the denomination of the bill whose denomination is not determined by the discriminating unit.

29. The method of claim 28 further comprising the act of resuming feeding the bills after the denomination of the bill is indicated.

* * * * *

UNITED STATES PATENT AND TRADEMARK OFFICE

CERTIFICATE OF CORRECTION

PATENT NO. : 6,980,684 B1 
DATED : December 27, 2005
INVENTOR(S) : Mark C. Munro It is certified that error appears in the above-identified patent and that said Letters Patent is hereby corrected as shown below:

Column 110,
Line 37, change "output" to -- input --;

Column 111,
Line 55, change "reflect" to -- reflect, --;

Column 113,
Line 1, change "operation of file device" to -- operation of the device --;
Line 11, change "indicative o a value" to -- indicative of a value --.

Signed and Sealed this

Second Day of May, 2006

JON W. DUDAS
*Director of the United States Patent and Trademark Office*